(12) United States Patent
Allin et al.

(10) Patent No.: US 7,725,384 B2
(45) Date of Patent: May 25, 2010

(54) CONSTRUCTION PAYMENT MANAGEMENT SYSTEM AND METHOD WITH ONE-TIME REGISTRATION FEATURES

(75) Inventors: Patrick J. Allin, Lake Bluff, IL (US); Charles C. Cherry, Glenview, IL (US); William H. Eichhorn, Hinsdale, IL (US); Howard L. Niden, Chicago, IL (US)

(73) Assignee: Textura Corporation, Lake Bluff, IL (US)

( * ) Notice: Subject to any disclaimer, the term of this patent is extended or adjusted under 35 U.S.C. 154(b) by 174 days.

(21) Appl. No.: 11/900,573

(22) Filed: Sep. 12, 2007

(65) Prior Publication Data

US 2008/0046359 A1 Feb. 21, 2008

Related U.S. Application Data

(63) Continuation of application No. 11/032,699, filed on Jan. 10, 2005, now abandoned.

(60) Provisional application No. 60/583,782, filed on Jun. 29, 2004.

(51) Int. Cl.
*G06Q 40/00* (2006.01)
(52) U.S. Cl. .................. 705/37; 705/36; 705/35
(58) Field of Classification Search .............. 705/35–38
See application file for complete search history.

(56) References Cited

U.S. PATENT DOCUMENTS

| | | | |
|---|---|---|---|
| 4,700,318 A | 10/1987 | Ockman | |
| 4,774,664 A | 9/1988 | Campbell et al. | |
| 4,876,648 A | 10/1989 | Lloyd | |
| 4,937,743 A | 6/1990 | Rassman et al. | |
| 4,989,141 A | 1/1991 | Lyons et al. | |
| 5,189,606 A | 2/1993 | Burns et al. | |
| 5,239,462 A | 8/1993 | Jones et al. | |
| 5,323,315 A | 6/1994 | Highbloom | |
| 5,521,815 A | 5/1996 | Rose, Jr. | |
| 5,644,727 A | 7/1997 | Atkins | |
| 5,699,527 A | 12/1997 | Davidson | |
| 5,704,045 A | 12/1997 | King et al. | |
| 5,709,410 A | 1/1998 | Reeves, Jr. | |
| 5,761,674 A | 6/1998 | Ito | |
| 5,765,140 A | 6/1998 | Knudson et al. | |
| 5,819,230 A | 10/1998 | Christie et al. | |
| 5,870,720 A | 2/1999 | Chusid et al. | |
| 5,870,721 A | 2/1999 | Norris | |

(Continued)

OTHER PUBLICATIONS

FMI survey: 84% saw unethical practices in past year Anonymous. Contractor. Newton: Jun. 2004. vol. 51, Iss. 6; p. 1, 2 pgs.*

(Continued)

*Primary Examiner*—Frantzy Poinvil
*Assistant Examiner*—Clement Graham
(74) *Attorney, Agent, or Firm*—Michael Best & Friedrich LLP

(57) ABSTRACT

A system and method for managing a construction payment process. One method embodying the invention can include electronically receiving registration information including payment information from a plurality of participants, electronically storing the registration information for use with multiple construction projects, and transferring a plurality of payments to a plurality of participants associated with a plurality of construction projects by electronically accessing the registration information.

20 Claims, 159 Drawing Sheets

U.S. PATENT DOCUMENTS

| | | |
|---|---|---|
| 5,875,437 A | 2/1999 | Atkins |
| 5,940,812 A | 8/1999 | Tengel et al. |
| 5,950,206 A | 9/1999 | Krause |
| 5,995,947 A | 11/1999 | Fraser et al. |
| 6,021,397 A | 2/2000 | Jones et al. |
| 6,025,774 A | 2/2000 | Forbes |
| 6,029,149 A | 2/2000 | Dykstra et al. |
| 6,038,547 A | 3/2000 | Casto |
| 6,067,533 A | 5/2000 | McCauley et al. |
| 6,076,064 A | 6/2000 | Rose, Jr. |
| 6,112,190 A | 8/2000 | Fletcher et al. |
| 6,185,543 B1 | 2/2001 | Galperin et al. |
| 6,366,892 B1 | 4/2002 | Altman et al. |
| 6,385,594 B1 | 5/2002 | Lebda et al. |
| 6,393,410 B1 | 5/2002 | Thompson |
| 6,438,526 B1 | 8/2002 | Dykes et al. |
| 6,460,021 B1 | 10/2002 | Kirksey |
| 6,579,764 B2 | 6/2003 | Kuwazawa |
| 6,581,040 B1 | 6/2003 | Wright et al. |
| 6,633,875 B2 | 10/2003 | Brady |
| 6,643,625 B1 | 11/2003 | Acosta et al. |
| 6,842,760 B1 | 1/2005 | Dorgan et al. |
| 6,859,768 B1 | 2/2005 | Wakelam et al. |
| 6,904,412 B1 | 6/2005 | Broadbent et al. |
| 6,952,717 B1 | 10/2005 | Monchilovich et al. |
| 6,985,886 B1 | 1/2006 | Broadbent et al. |
| 7,031,930 B2 | 4/2006 | Freeman et al. |
| 7,076,455 B1 | 7/2006 | Fogelson |
| 2001/0027407 A1 | 10/2001 | Mori |
| 2001/0042785 A1 | 11/2001 | Walker et al. |
| 2001/0044768 A1 | 11/2001 | Wares |
| 2001/0047326 A1 | 11/2001 | Broadbent et al. |
| 2002/0040339 A1 | 4/2002 | Dhar et al. |
| 2002/0046147 A1 | 4/2002 | Livesay et al. |
| 2002/0052835 A1 | 5/2002 | Toscano |
| 2002/0055904 A1 | 5/2002 | Mon |
| 2002/0069167 A1 | 6/2002 | Conlow |
| 2002/0073114 A1 | 6/2002 | Nicastro et al. |
| 2002/0077967 A1 | 6/2002 | Ingram et al. |
| 2002/0087378 A1 | 7/2002 | Como |
| 2002/0099617 A1 | 7/2002 | Fogelson |
| 2002/0107788 A1 | 8/2002 | Cunningham |
| 2002/0107790 A1 | 8/2002 | Nielson |
| 2002/0107803 A1 | 8/2002 | Lisanke et al. |
| 2002/0120480 A1 | 8/2002 | Kroeger |
| 2002/0124028 A1 | 9/2002 | Kroeger |
| 2002/0128889 A1 | 9/2002 | Kroeger |
| 2002/0133390 A1 | 9/2002 | Kroeger |
| 2002/0138410 A1 | 9/2002 | Siska |
| 2002/0143594 A1 | 10/2002 | Kroeger |
| 2002/0152155 A1 | 10/2002 | Greenwood et al. |
| 2002/0165723 A1 | 11/2002 | Kroeger |
| 2002/0194274 A1 | 12/2002 | Kroeger |
| 2002/0198755 A1 | 12/2002 | Birkner et al. |
| 2003/0009420 A1 | 1/2003 | Jones |
| 2003/0018492 A1 | 1/2003 | Carlson |
| 2003/0018507 A1 | 1/2003 | Flanagan |
| 2003/0023677 A1 | 1/2003 | Morison Zuill et al. |
| 2003/0036972 A1 | 2/2003 | Zamma |
| 2003/0050871 A1 | 3/2003 | Broughton |
| 2003/0135401 A1 | 7/2003 | Parr |
| 2003/0135481 A1 | 7/2003 | Helmes et al. |
| 2003/0156142 A1 | 8/2003 | Nonaka et al. |
| 2003/0179241 A1 | 9/2003 | Nonaka et al. |
| 2003/0200168 A1 | 10/2003 | Cullen, III et al. |
| 2003/0220806 A1 | 11/2003 | Hoffman et al. |
| 2003/0225587 A1 | 12/2003 | Mueller |
| 2003/0225748 A1 | 12/2003 | Haeberle |
| 2003/0233267 A1 | 12/2003 | Hertel-Szabadi |
| 2003/0233303 A1 | 12/2003 | Elazouni |
| 2003/0236676 A1 | 12/2003 | Graham |
| 2003/0236692 A1 | 12/2003 | Hertel-Szabadi |
| 2004/0054566 A1 | 3/2004 | J'Maev |
| 2004/0059592 A1 | 3/2004 | Yadav-Ranjan |
| 2004/0078296 A1 | 4/2004 | Dykes et al. |
| 2004/0083164 A1 | 4/2004 | Schwartz et al. |
| 2004/0083165 A1 | 4/2004 | Lawrence |
| 2004/0088246 A1 | 5/2004 | Jepsen et al. |
| 2004/0117302 A1 | 6/2004 | Weichert et al. |
| 2004/0117361 A1 | 6/2004 | Greer et al. |
| 2004/0153350 A1 | 8/2004 | Kim et al. |
| 2004/0153366 A1 | 8/2004 | Olson et al. |
| 2004/0181482 A1 | 9/2004 | Yap |
| 2004/0186763 A1 | 9/2004 | Smith |
| 2004/0210470 A1 | 10/2004 | Rusk |
| 2004/0215633 A1 | 10/2004 | Harris |
| 2004/0230521 A1 | 11/2004 | Broadbent et al. |
| 2004/0255266 A1 | 12/2004 | Dement |
| 2005/0021449 A1 | 1/2005 | Sweeney |
| 2005/0033690 A1 | 2/2005 | Antognini et al. |
| 2005/0039115 A1 | 2/2005 | Gordon et al. |
| 2005/0076213 A1 | 4/2005 | Conlow |
| 2005/0137931 A1 | 6/2005 | Janssen |
| 2005/0171790 A1 | 8/2005 | Blackmon |
| 2005/0182641 A1 | 8/2005 | Ing et al. |
| 2005/0197856 A1 | 9/2005 | Drucker |
| 2005/0197953 A1 | 9/2005 | Broadbent et al. |
| 2005/0204283 A1 | 9/2005 | Kroeger |
| 2005/0209897 A1 | 9/2005 | Luhr |
| 2005/0216400 A1 | 9/2005 | Doyle et al. |
| 2005/0222923 A1 | 10/2005 | Lambright |
| 2005/0222942 A1 | 10/2005 | Pheil et al. |
| 2006/0010005 A1 | 1/2006 | Rowland |
| 2006/0173775 A1 | 8/2006 | Cullen, III et al. |
| 2007/0288334 A1 | 12/2007 | Creedle et al. |
| 2008/0027861 A1 | 1/2008 | Gendler |

OTHER PUBLICATIONS

Wisconsin Builders Association; "Fund Creation and Management Policy;" WBA Foundation [online]; [retrieved on Jan. 12, 2005]; Retrieved from the Internet <URL: http://www.wisbuild.org/pdfs/policysht.pdf>; pp. 1-2.

Wisconsin Builders Association; "Code of Ethics;" WBA Foundation [online]; [retrieved on Jan. 12, 2005]; Retrieved from the Internet <URL: http://www.wisbuild.org/pdfs/codethic.pdf>; p. 1.

Wisconsin Builders Association; Bylaws [online]; Sep. 2004 [retrieved on Jan. 12, 2005]; Retrieved from the Internet <URL: http://www.wisbuild.org/pdfs/WBAbylaws2004.pdf>; pp. 1-7.

Wisconsin Builders Association; "Donation Types;" WBA Foundation [online]; [retrieved on Jan. 12, 2005]; Retrieved from the Internet <URL: http://www.wisbuild.org/pdfs/dontypes.pdf>; p. 1.

Wisconsin Builders Association; 2003-2004 Legislative Session: in Review [online]; Jul. 2004 [retrieved on Jan. 12, 2005]; Retrieved from the Internet <URL: http://www.wisbuild.org/pdfs/0304policyupdt.pdf>; pp. 1-4.

Wisconsin Builders Association; "Policy Agenda;" Wisconsin Builders Association—Preserving and Promoting the American Dream [online]; [retrieved on Jan. 12, 2005]; Retrieved from the Internet <URL: http://www.wbaonline.org/site/content/government/policy.asp>; p. 1.

Wisconsin Builders Association; "Resource Center;" Wisconsin Builders Association—Preserving and Promoting the American Dream [online]; [retrieved on Jan. 12, 2005]; Retrieved from the Internet <URL: http://www.wbaonline.org/site/content/resource/index.asp>; p. 1.

Wisconsin Builders Association; "Call to Action;" Wisconsin Builders Association—Preserving and Promoting the American Dream [online]; [retrieved on Jan. 12, 2005]; Retrieved from the Internet <URL: http://www.wbaonline.org/site/content/government/call.asp>; p. 1.

Wisconsin Builders Association; "Helpful Links;" Wisconsin Builders Association—Preserving and Promoting the American Dream

[online]; [retrieved on Jan. 12, 2005]; Retrieved from the Internet <URL: http://www.wbaonline.org/site/content/resource/helpful.asp>; pp. 1-5.

Wisconsin Builders Association; "Press Releases;" Wisconsin Builders Association—Preserving and Promoting the American Dream [online]; [retrieved on Jan. 12, 2005]; Retrieved from the Internet <URL: http://www.wbaonline.org/site/content/resource/press.asp>; pp. 1-2.

Wisconsin Builders Association; "Construction Data;" Wisconsin Builders Association—Preserving and Promoting the American Dream [online]; [retrieved on Jan. 12, 2005]; Retrieved from the Internet <URL: http://www.wbaonline.org/site/content/resource/construction.asp>; pp. 1-2.

Wisconsin Builders Association; "Consumer Information;" Wisconsin Builders Association—Preserving and Promoting the American Dream [online]; [retrieved on Jan. 12, 2005]; Retrieved from the Internet <URL: http://www.wbaonline.org/site/content/resource/consumer.asp>; p. 1.

Wisconsin Builders Association; "Publications;" Wisconsin Builders Association—Preserving and Promoting the American Dream [online]; [retrieved on Jan. 12, 2005]; Retrieved from the Internet <URL: http://www.wbaonline.org/site/content/resource/publications.asp>; p. 1.

Wisconsin Builders Association; "Contact Us;" Wisconsin Builders Association—Preserving and Promoting the American Dream [online]; [retrieved on Jan. 12, 2005]; Retrieved from the Internet <URL: http://www.wbaonline.org/site/content/contact/>; pp. 1-3.

Wisconsin Department of Administration: Division of State Facilities; "List of Projects Out for Bid;" WISBUILD DSF Information System [online]; Jan. 12, 2005 [retrieved on Jan. 12, 2005]; Retrieved from the Internet <URL: http://wisbuild.doa.state.wi.us/dfd/dfd_reports/bid_list_public.asp >; pp. 1-4.

Cortexion, Inc.; Cortexion, Inc.—Financial Project Management [online]; [retrieved on Jun. 22, 2006]; Retrieved from the Internet <URL: http://www.cortexion.com/Default.aspx >; p. 1.

Cortexion, Inc.; "Implementing the Cortexion™ System;" Cortexion, Inc.—Implementation [online]; [retrieved on Jun. 22, 2006]; Retrieved from the Internet <URL: http://www.cortexion.com/Implementation.aspx >; p. 1.

Cortexion, Inc.; "Cortexion provides a unique and valuable service to project Owners and Lenders;" Cortexion, Inc.—Services [online]; [retrieved on Jun. 22, 2006]; Retrieved from the Internet <URL: http://www.cortexion.com/Services. aspx >; pp. 1-2.

Cortexion, Inc.; "Banks & Lenders;" Cortexion, Inc.—Benefits for Banks [online]; [retrieved on Jun. 22, 2006]; Retrieved from the Internet <URL: http://www.cortexion.com/Popups/Banks.aspx >; p. 1.

Cortexion, Inc.; "Project Owners;" Cortexion, Inc.—Benefits for Project Owners [online]; [retrieved on Jun. 22, 2006]; Retrieved from the Internet <URL: http://www.cortexion.com/Popups/Owners.aspx >; p. 1.

Cortexion, Inc.; "Design Professionals;" Cortexion, Inc.—Benefits for Design Professionals [online]; [retrieved on Jun. 22, 2006]; Retrieved from the Internet <URL: http://www.cortexion.com/Popups/Designers.aspx >; p. 1.

Cortexion, Inc.; "General Contractors;" Cortexion, Inc.—Benefits for General Contractors [online]; [retrieved on Jun. 22, 2006]; Retrieved from the Internet <URL: http://www.cortexion.com/Popups/GeneralContractors.aspx >; p. 1.

Cortexion, Inc.; "Subcontractors;" Cortexion, Inc.—Benefits for Subcontractors [online]; [retrieved on Jun. 22, 2006]; Retrieved from the Internet <URL: http://www.cortexion.com/Popups/Subcontractors.aspx >; p. 1.

Cortexion, Inc.; "Suppliers;" Cortexion, Inc.—Benefits for Suppliers—Materials, Equipment [online]; [retrieved on Jun. 22, 2006]; Retrieved from the Internet <URL: http://www.cortexion.com/Popups/Suppliers.aspx >; p. 1.

Cortexion, Inc.; "Rental Yards;" Cortexion, Inc.—Benefits for Rental Yards [online]; [retrieved on Jun. 22, 2006]; Retrieved from the Internet <URL: http://www.cortexion.com/Popups/RentalYards.aspx >; p. 1.

Cortexion, Inc.; "Guaranteed Savings;" Cortexion, Inc.—Guaranteed Savings [online]; [retrieved on Jun. 22, 2006]; Retrieved from the Internet <URL: http://www.cortexion.com/Savings.aspx >; p. 1.

Cortexion, Inc.; "Reduction of Risk;" Cortexion, Inc.—Reduction of Risk [online]; [retrieved on Jun. 22, 2006]; Retrieved from the Internet <URL: http://www.cortexion.com/Risk.aspx >; p. 1.

Cortexion, Inc.; "No Upfront Costs;" Cortexion, Inc.—No Upfront Costs [online]; [retrieved on Jun. 22, 2006]; Retrieved from the Internet <URL: http://www.cortexion.com/Costs.aspx >; p. 1.

Cortexion, Inc.; "Better Project Control;" Cortexion, Inc.—Better Project Control [online]; [retrieved on Jun. 22, 2006]; Retrieved from the Internet <URL: http://www.cortexion.com/ProjectControl.aspx >; p. 1.

Cortexion, Inc.; "Schedule Control;" Cortexion, Inc.—Schedule Control [online]; [retrieved on Jun. 22, 2006]; Retrieved from the Internet <URL: http://www.cortexion.com/ScheduleControl.aspx >; p. 1.

Cortexion, Inc.; "Easy to Use;" Cortexion, Inc.—Easy to Use [online]; [retrieved on Jun. 22, 2006]; Retrieved from the Internet <URL: http://www.cortexion.com/Easy.aspx >; p. 1.

Cortexion, Inc.; "Better Visibility;" Cortexion, Inc.—Better Visibility [online]; [retrieved on Jun. 22, 2006]; Retrieved from the Internet <URL: http://www.cortexion.com/Visibility.aspx >; p. 1.

Cortexion, Inc.; "High Team Morale;" Cortexion, Inc.—High Team Morale [online]; [retrieved on Jun. 22, 2006]; Retrieved from the Internet <URL: http://www.cortexion.com/Morale.aspx >; p. 1.

Cortexion, Inc.; "The Cortexion team is dedicated to eliminating inefficiencies in construction financing and project management;" Cortexion, Inc.—About Us [online]; [retrieved on Jun. 22, 2006]; Retrieved from the Internet <URL: http://www.cortexion.com/AboutUs.aspx >; pp. 1-2.

Hart Business Solutions, Inc.; "Maximizing Construction Billing Efficiency and Accuracy: The Integrated Payment Application Mandate;" Jul. 2004; pp. 1-7.

Hart Business Solutions, LLC.; Accelerate Your Progress Payment Applications; GCPay Brochure; pp. 1-2.

Expesite, Inc.; "Features and Benefits;" Web Based Project Management Software | Project Management System [online]; [retrieved on Jul. 3, 2007]; Retrieved from the Internet <URL: http://www.expesite.com/homepage/products_services/products_services.asp>; pp. 1-2.

Expesite, Inc.; "Project Fact Sheet and Corporate Fact Sheet;" Media Kit [online]; [retrieved on Jul. 3, 2007]; Retrieved from the Internet <URL: http://www.expesite.com/homepage/press/mediakit.pdf>; pp. 1-5.

Expesite, Inc.; "National Companies Sign Up for Online Project Management;" Expesite—Collaboration Program Management [online]; [retrieved on Jul. 3, 2007]; Retrieved from the Internet <URL: http://www.expesite.com/homepage/press/2002_2003/nationalcompanies.asp>; Jan. 28, 2002; p. 1.

Expesite, Inc.; "Expesite Rolls Our New Cost Tracking Tool in Latest Release;" Expesite—Collaboration Program Management [online]; [retrieved on Jul. 3, 2007]; Retrieved from the Internet <URL: http://www.expesite.com/homepage/press/2004/version50.asp>; Jan. 6, 2003; p. 1.

Expesite, Inc.; "Expesite Releases New Version of Web-Based Project Management Tool;" Expesite—Collaboration Program Management [online]; [retrieved on Jul. 3, 2007]; Retrieved from the Internet <URL: http://www.expesite.com/homepage/press/2006/newreleasejam.asp>; Jan. 6, 2004; p. 1.

Harland Financial Solutions, Inc.; "Harland Financial Solutions Mortgage Solutions;" Mortgage Solutions [online]; [retrieved on Dec. 7, 2006]; Retrieved from the Internet <URL: http://www.harlandfs.com/ProductsAndServices/MortgageSolutions.asp>; pp. 1-2.

Harland Financial Solutions, Inc.; "Harland—Point of Sale;" Point of Sale [online]; [retrieved on Dec. 7, 2006]; Retrieved from the Internet <URL: http://www.harlandfs.com/ProductsAndServices/pointofsale.asp>; pp. 1-2.

Harland Financial Solutions, Inc.; "Harland —Point of Sale;" Interlinq® E3® Origination Client [online]; [retrieved on Dec. 7, 2006]; Retrieved from the Internet <URL: http://www.harlandfs.com/ProductsAndServices/pointofsale.asp?ID=292>; pp. 1-2.

Harland Financial Solutions, Inc.; "Interlinq® E3® Origination Client;" Product Brochure [online]; [retrieved on Dec. 7, 2006]; Retrieved from the Internet <URL: http://www.harlandfs.com/images/IE3_OrigClient_PS%200906R5.pdf>; 2006; pp. 1-2.

Harland Financial Solutions, Inc.; "Harland—Point of Sale;" Interlinq® Entrè [online]; [retrieved on Dec. 7, 2006]; Retrieved from the Internet <URL: http://www.harlandfs.com/ProductsAndServices/pointofsale.asp? ID=142>; pp. 1-2.

Harland Financial Solutions, Inc.; "Interlinq® Entre;" Product Brochure [online]; [retrieved on Dec. 7, 2006]; Retrieved from the Internet <URL: http://www.harlandfs.com/ProductsAndServices/images/interlinq/Entre_Brochure.pdf>; pp. 1-4.

Harland Financial Solutions, Inc.; "Harland—Point of Sale;" Interlinq® eMortgageWare® [online]; [retrieved on Dec. 7, 2006]; Retrieved from the Internet <URL: http://www.harlandfs.com/ProductsAndServices/pointofsale.asp? ID=184>; pp. 1-2.

Harland Financial Solutions, Inc.; "Interlinq® eMortgageWare®;" Product Brochure [online]; [retrieved on Dec. 7, 2006]; Retrieved from the Internet <URL: http://www.harlandfs.com/ProductsAndServices/images/interlinq/eMW_Brochure.pdf>; 2005; pp. 1-4.

Harland Financial Solutions, Inc.; "Harland—Mortgage Loan Origination & Production;" Mortgage Loan Origination & Production [online]; [retrieved on Dec. 7, 2006]; Retrieved from the Internet <URL: http://www.harlandfs.com/ProductsAndServices/LoanOrigProd.asp>; pp. 1-2.

Harland Financial Solutions, Inc.; "Harland—Mortgage Loan Origination & Production;" Interlinq® E3® [online]; [retrieved on Dec. 7, 2006]; Retrieved from the Internet <URL: http://www.harlandfs.com/ProductsAndServices/LoanOrigProd.asp?ID=143>; pp. 1-2.

Harland Financial Solutions, Inc.; "Interlinq® E3®;" Product Brochure [online]; [retrieved on Dec. 7, 2006]; Retrieved from the Internet <URL: http://www.harlandfs.com/ProductsAndServices/images/interlinq/E3_Brochure.pdf>; 2005; pp. 1-6.

Harland Financial Solutions, Inc.; "Harland—Mortgage Loan Origination & Production;" Interlinq® MortgageWare® [online]; [retrieved on Dec. 8, 2006]; Retrieved from the Internet <URL: http://www.harlandfs.com/ProductsAndServices/LoanOrigProd.asp?ID=144>; pp. 1-3.

Harland Financial Solutions, Inc.; "Harland—Mortgage Loan Origination & Production;" Interlinq® PostClosing [online]; [retrieved on Dec. 7, 2006]; Retrieved from the Internet <URL: http://www.harlandfs.com/ProductsAndServices/LoanOrigProd.asp?ID=145>; pp. 1-3.

Harland Financial Solutions, Inc.; "Harland Financial Solutions—Secondary Marketing;" Interlinq® Smart™ [online]; [retrieved on Dec. 8, 2006]; Retrieved from the Internet <URL: http://www.harlandfs.com/ProductsAndServices/LoanOrigProd.asp?ID=160>; pp. 1-3.

Harland Financial Solutions, Inc.; "Harland—Loan Servicing;" Loan Servicing [online]; [retrieved on Dec. 7, 2006]; Retrieved from the Internet <URL: http://www.harlandfs.com/ProductsAndServices/LoanServicing.asp>; p. 1.

Harland Financial Solutions, Inc.; "Harland—Loan Servicing;" Interlinqe® Loan Servicing [online]; [retrieved on Dec. 7, 2006]; Retrieved from the Internet <URL: http://www.harlandfs.com/ProductsAndServices/LoanServicing.asp?ID=150>; pp. 1-2.

Harland Financial Solutions, Inc.; "Interlinq® Loan Servicing;" Product Brochure [online]; [retrieved on Dec. 7, 2006]; Retrieved from the Internet <URL: http://www.harlandfs.com/ProductsAndServices/images/interlinq/LS_Brochure.pdf>; 2006; pp. 1-6.

Harland Financial Solutions, Inc.; "Harland—Loan Servicing;" Interlinq® BuilderBlocks [online]; [retrieved on Dec. 8, 2006]; Retrieved from the Internet <URL: http://www.harlandfs.com/ProductsAndServices/LoanServicing.asp? ID=148>; pp. 1-2.

Harland Financial Solutions, Inc.; "Interlinq® BuilderBlock$;" Product Brochure [online]; [retrieved on Dec. 8, 2006]; Retrieved from the Internet <URL: http://www.harlandfs.com/ProductsAndServices/images/interlinq/BBlocksBrochure.pdf>; 2005; pp. 1-4.

Hart Business Solutions, LLC; "Overview;" GCPay™ Help Text [online]; [retrieved on Nov. 14, 2005]; Retrieved from the Internet <URL: http://www.gcpay.com/images/GCPay_HelpMain.html>; pp. 1-35.

Hart Business Solutions, LLC; "GCPay™ Customer Feedback;" GCPay Testimonials [online]; [retrieved on Dec. 16, 2005]; Retrieved from the Internet <URL: http://www.gcpay.com/testimonials.jsp>; p. 1.

Hart Business Solutions, LLC; "About GCPay™;" About GCPay [online]; [retrieved on Dec. 16, 2005]; Retrieved from the Internet <URL: http://www.gcpay.com/aboutGCPay.jsp>; pp. 1-2.

Hart Business Solutions, LLC; GCPay Slideshow [online]; [retrieved on Dec. 16, 2006]; Retrieved from the Internet <URL: http://www.gcpay.com/images/slides/Slide[1b-15b].gif>; pp. 1-15.

Hart Business Soutions, LLC; "Hart Business Solutions to Unveil GCPay at Sage Summit;" Press Release; Oct. 25, 2005; p. 1.

Kelly, Jeffrey; "A Better Building? Well, A Better Way to Pay For It;" Richmond Times Dispatch; May 22, 2005; p. D-7; Richmand Newspapers, Inc.

Emerging Solutions, Inc.; "Constructware, Communication. Collaboration. Control.;" Constructware home page [online]; [retrieved on Jan. 18, 2006]; Retrieved from the Internet <URL: http://www.constructware.com>; pp. 1-2.

Jobpac International Systems Pty Ltd.; Jobpac—Home [online]; [retrieved on Jan. 18, 2006]; Retrieved from the Internet <URL: http://www.jobpac.com.au>; p. 1.

Primavera Systems, Inc.; Primavera Systems, Inc.—Project and Portfolio Management [online]; [retrieved on Jan. 18, 2006]; Retrieved from the Internet <URL: http://www.primavera.com>; p. 1.

Constructsure; ConstructSure Risk Management, Inspection, Fund Control, and Estimating Services [online]; [retrieved on Jun. 9, 2004]; Retrieved from the Internet <URL: http://www.econstructsure.com/solutions.htm>; p. 1.

Constructsure; "New Program Release—Construction Renovation Bond Program;" ConstructSure Risk Management, Inspection, Fund Control, and Estimating Services [online]; [retrieved on Jun. 9, 2004]; Retrieved from the Internet <URL: http://www.econstructsure.com/bond_index.htm>; pp. 1-2.

Constructsure; "Our Mission;" ConstructSure Risk Management, Inspection, Fund Control, and Estimating Services [online]; [retrieved on Jun. 9, 2004]; Retrieved from the Internet <URL: http://www.econstructsure.com/mission.htm>; p. 1.

Constructsure; "About ConstructSure;" ConstructSure Risk Management, Inspection, Fund Control, and Estimating Services [online]; [retrieved on Jun. 9, 2004]; Retrieved from the Internet <URL: http://www.econstructsure.com/company.htm>; pp. 1-2.

Constructsure; "Our Team;" ConstructSure Risk Management, Inspection, Fund Control, and Estimating Services [online]; [retrieved on Jun. 9, 2004]; Retrieved from the Internet <URL: http://www.econstructsure.com/team.htm>; pp. 1-3.

Constructsure; "Our Customers;" ConstructSure Risk Management, Inspection, Fund Control, and Estimating Services [online]; [retrieved on Jun. 9, 2004]; Retrieved from the Internet <URL: http://www.econstructsure.com/customers.htm>; p. 1.

Constructsure; "Our Partners;" ConstructSure Risk Management, Inspection, Fund Control, and Estimating Services [online]; [retrieved on Jun. 9, 2006]; Retrieved from the Internet <URL: http://www.econstructsure.com/partners.htm>; p. 1.

FAS Construction Management, Inc.; About FAS Graphic [online]; [retrieved on Jun. 9, 2004]; Retrieved from the Internet <URL: http://www.fascompanies.com/Products/CMPM/CMPMGraphic.htm>; p. 1.

FAS Construction Management, Inc.; FAS CM/PM Text [online]; [retrieved on Jun. 9, 2004]; Retrieved from the Internet <URL: http://www.fascompanies.com/Products/CMPM/CMPMText.htm>; p. 1.

FAS Construction Management, Inc.; About FAS Graphic [online]; [retrieved on Jun. 9, 2004]; Retrieved from the Internet <URL: http://www.fascompanies.com/Products/CRM/CRMGraphic.htm>; p. 1.

FAS Construction Management, Inc.; FAS CRM Text [online]; [retrieved on Jun. 9, 2004]; Retrieved from the Internet <URL1: http://www.fascompanies.com/Products/CRM/CRMText.htm>; p. 1.

FAS Construction Management, Inc.; "About FAS Construction Management;" About FAS Title [online]; [retrieved Jun. 9, 2004]; Retrieved from the Internet <URL: http://www.fascompanies.com/About%20FAS/AboutTitle.htm>; p. 1.
FAS Construction Management, Inc.; About FAS Graphic [online]; [retrieved on Jun. 9, 2004]; Retrieved from the Internet <URL: http://www.fascompanies.com/About%20FAS/AboutGraphic.htm>; p. 1.
FAS Construction Management, Inc.; About FAS Text [online]; [retrieved on Jun. 9, 2004]; Retrieved from the Internet <URL: http://www.fascompanies.com/About%20FAS/AboutText.htm>; p. 1.
SafeDocs; "About SafeDocs;" About SafeDocs [online]; [retrieved on Jun. 9, 2004]; Retrieved from the Internet <URL: http://www.sfdocs.com/about.html>; pp. 1-2.
SafeDocs; SafeDocs Home [online]; [retrieved on Jun. 9, 2004]; Retrieved from the Internet <URL: http://www.sfdocs.com/>; p. 1.
SafeDocs; Unprecedented Document Security [online]; [retrieved on Jun. 9, 2004]; Retrieved from the Internet <URL: http://www.sfdocs.com/feature1_popup.html>; p. 1.
SafeDocs; "Value Proposition;" Turn Days Into Hours [online]; [retrieved on Jun. 9, 2004]; Retrieved from the Internet <URL: http://www.sfdocs.com/feature2_popup.html>; p. 1.
SafeDocs; "Work-Flow;" Unlimited Application Options [online]; [retrieved on Jun. 9, 2004]; Retrieved from the Internet <URL: http://www.sfdocs.com/feature3_popup.html>; p. 1.
Harland Financial Solutions, Inc.; Harland Financial Solutions [online]; [retrieved on Jun. 9, 2004]; Retrieved from the Internet <URL: http://harlandfinancialsolutions.com/>; p. 1.
Harland Financial Solutions, Inc.; "Touché Customer Relationship Management Solution;" Harland—Touché Customer Relationship Solution [online]; [retrieved on Jun. 9, 2004]; Retrieved from the Internet <URL: http://harlandfinancialsolutions.com/ProductsandServices/Touche.asp>; p. 1.
Harland Financial Solutions, Inc.; "Touché Analyzer;" Harland Financial Solutions—Touché Analyzer [online]; [retrieved on Jun. 9, 2004]; Retrieved from the Internet <URL: http://harlandfinancialsolutions.com/ProductsandServices/Analyzer.asp?IE=156>; pp. 1-2.
Harland Financial Solutions, Inc.; "Touché Messenger;" Harland—Touché Messenger [online]; [retrieved on Jun. 9, 2004]; Retrieved from the Internet <URL: http://harlandfinancialsolutions.com/ProductsandServices/Messenger.asp?ID=157>; pp. 1-2.
Harland Financial Solutions, Inc.; "Expert Series Tools;" Harland—Expert Series Tools [online]; [retrieved on Jun. 9, 2004]; Retrieved from the Internet <URL: http://harlandfinancialsolutions.com/ProductsandServices/Expert.asp>; p. 1.
Harland Financial Solutions, Inc.; "Analytical Tools;" Harland—Analytical Tools [online]; [retrieved on Jun. 9, 2004]; Retrieved from the Internet <URL: http://harlandfinancialsolutions.com/ProductsandServices/Analysis.asp>; p. 1.
Harland Financial Solutions, Inc.; "Touché Advisor Data Enhancement Services;" Harland—Data Enhancement [online]; [retrieved on Jun. 9, 2004]; Retrieved from the Internet <URL: http://harlandfinancialsolutions.com/ProductsandServices/InformationServices.asp>; pp. 1-2.
Eclectus, Inc.; Construction Industry Management and Planning Software—ECL Software [online], [retrieved on Jun. 9, 2004]; Retrieved from the Internet <URL: http://www.eclectusinc.com/>; p. 1.
Eclectus, Inc.; "Products;" CMIS, Home Construction Accounting, Estimating, Management and Payroll Software—ECL Software [online]; [retrieved on Jun. 30, 2004]; Retrieved from the Internet <URL: http://www.eclectusinc.com/cmis.html>; p. 1.
Eclectus, Inc.; Construction Industry Management Information System, Fund Control Software and Public Safety—ECL Software [online]; [retrieved on Jun. 9, 2004]; Retrieved from the Internet <URL: http://www.eclectusinc.com/products.html>; p. 1.
Eclectus, Inc.; "Fund Control;" Fund Control Banking Software—ECL Software [online]; [retrieved on Jun. 9, 2004]; Retrieved from the Internet <URL: http://www.eclectusinc.com/fc.html>; pp. 1-2.
Landamerica Financial Group, Inc.; "Contact;" Welcome to SafeDraw [online]; [retrieved on Jun. 9, 2004]; Retrieved from the Internet <URL: http://www.safedraw.com/contact.asp?UPK=&LoD=&LoT=&EID=&SID=>; p. 1.
Landamerica Financial Group, Inc.; "Request Info;" Welcome to SafeDraw [online]; [retrieved on Jun. 9, 2004]; Retrieved from the Internet <URL: http://www.safedraw.com/RequestInfo.asp?UPK=&LoD=&LoT=&EID=&SID=>; p. 1.
Landamerica Financial Group, Inc.; "Login;" Welcome to SafeDraw [online]; [retrieved on Jun. 9, 2004]; Retrieved from the Internet <URL: http://www.safedraw.com/login.asp>; pp. 1-2.
Landamerica Financial Group, Inc.; "About AD Logo;" Welcome to SafeDraw [online]; [retrieved on Jun. 9, 2004]; Retrieved from the Internet <URL: http://www.safedraw.com/aboutAccuDraw.asp?UPK=&LoD=&LoT=&EID=&SID=>; p. 1.
Landamerica Financial Group, Inc.; "Questions & Answers;" Welcome to SafeDraw [online]; [retrieved on Jun. 9, 2004]; Retrieved from the Internet <URL: http://www.safedraw.com/QandA.asp?UPK=&LoD=&LoT=&EID=&SID=>; pp. 1-2.
Landamerica Financial Group, Inc.; "Terms;" Welcome to SafeDraw [online]; [retrieved on Jun. 9, 2004]; Retrieved from the Internet <URL: http://www.safedraw.com/safedraw_terms_out.asp?UPK=&LoD=&LoT=&EID=&SID=>; pp. 1-4.
Construction Monitoring Systems, LLC; "Contact;" Welcome to AccuDraw [online]; [retrieved on Jun. 9, 2004]; Retrieved from the Internet <URL: http://accudraw.com/contact.asp>; p. 1.
Construction Monitoring Systems, LLC; "Request Info;" Welcome to AccuDraw [online]; [retrieved on Jun. 9, 2004]; Retrieved from the Internet <URL: http://accudraw.com/RequestInfo.asp?UPK=&LoD=&LoT=&EID=&SID=>; p. 1.
Construction Monitoring Systems, LLC; "About AD Logo;" Welcome to AccuDraw [online]; [retrieved on Jun. 9, 2004]; Retrieved from the Internet <URL: http://accudraw.com/aboutAccuDraw.asp?UPK=IoD=&LoT=&EID=&SID=>; p. 1.
Construction Monitoring Systems, LLC; "Questions & Answers;" Welcome to AccuDraw [online]; [retrieved on Jun. 9, 2004]; Retrieved from the Interent <URL: http://accudraw.com/QandA.asp?UPK=&LoD=&LoT=&EID=&SID=>; pp. 1-2.
Construction Monitoring Systems, LLC; "AccuDraw, An AD network product;" Lender Page [online]; [retrieved on Jun. 9, 2004]; Retrieved from the Internet <URL: http://accudraw.com/LenderPage.asp>; pp. 1-3.
Construction Monitoring Systems, LLC; "AccuDraw, An AD network product;" Processor Page [online]; [retrieved on Jun. 9, 2004]; Retrieved from the Internet <URL: http://accudraw.com/ProcessorPage.asp>; pp. 1-3.
Construction Monitoring Systems, LLC; "AccuDraw, an AD network product;" Builder Page [online]; [retrieved Jun. 9, 2004]; Retrieved from the Internet <URL: http://accudraw.com/BuilderPage.asp>; pp. 1-3.
Gradebeam LLC; "Welcome to GradeBeam;" GradeBeam—Home [online]; [retrieved on Sep. 15, 2004]; Retrieved from the Internet <URL: http://www.gradebeam.com/>; p. 1.
Gradebeam LLC; "GradeBeam Frequently Asked Questios;" GradeBeam—FAQ's [online]; [retrieved Sep. 15, 2004]; Retrieved from the Internet <URL: http://www.gradebeam.com/faq.html>; pp. 1-4.
Gradebeam LLC; "GradeBeam, Construction Communication System;" Slideshow [online]; [retrieved on Sep. 15, 2004]; Retrieved from Internet <URL: http://www.gradebeam.com/presentation.pps>; pp. 1-17.
Gradebeam LLC; "About Us;" GradeBeam—About Us [online]; [retrieved on Sep. 15, 2004]; Retrieved from the Internet <U RL: http://www.gradebeam.com/main/aboutus.asp>; pp. 1-2.
Gradebeam LLC; "User Agreement;" GradeBeam—User Agreement [online]; [retrieved on Sep. 15, 2004]; Retrieved from the Internet <URL: http://www.gradebeam.com/main/useragreeemnt.asp>; pp. 1-8.
Computerease, Inc.; "Paragon, Software for Contractors;" p. 1.
Construction Monitoring Systems, LLC; AccuDraw Explored Guide Cover Letter; p. 1.
Construction Monitoring Systems, LLC; AccuDraw Explored Guide [online]; [retrieved Feb. 21, 2006]; Retrieved from the Internet <URL: https://accudraw.com/AccuDraw%20EXPLORED%20web%20version.htm>; pp. 1-17.

Construction Monitoring Systems, LLC; "CMS / AccuDraw Processor Manual;" pp. 1-10.

Construction Monitoring Systems, LLC; "Your Agenda Screen Shot;" Welcome to AccuDraw [online]; [retrieved Feb. 28, 2006]; Retrieved from the Internet <URL: https://accudraw.com/agenda.asp?UPK=287&LoD=13596&LoT=33953&EID=38664.763587963.706538&SID=106>; p. 1.

Construction Monitoring Systems, LLC; "Draw Details Screen Shot;" Welcome to AccuDraw [online]; [retrieved Feb. 28, 2006]; Retrieved from the Internet <URL: https://accudraw.com/DrawApproval2.asp?UPK=287&LoD=13596&LoT=33953&EID=38664.763587963.706538&SID=106&PID=38820.3345023148.312131&CD=1>; pp. 1-2.

Construction Monitoring Systems, LLC; "User Information Screen Shot;" Welcome to AccuDraw [online]; [retrieved Feb. 28, 2006]; Retrieved from the Internet <URL: https://accudraw.com/userinfo.asp?UPK=287&LoD=13596&LoT=33953&EID=38664.763587963.706538&SID=106 >; p. 1.

Construction Monitoring Systems, LLC; "Accudraw: Construction Loan Monitoring Software for the Financial Services Industry;" AccuDraw Brochure; pp. 1-2.

Rawlins, Gordon C.; "Construction ERP Software: Balancing Data Between Finance & The Field;" CFMA BP; pp. 77-78, 81-82; Sep.-Oct. 2004.

Zoellick, Bill; "Electronic Signatures—Commentary on the Electronic Signatures in Global and National Commerce Act;" Fastwater Library B2B Economy; 2000 [retrieved on Jan. 12, 2005]; Retrieved from the Internet <URL: www.fastwater.com/Library/B2BEcononw/DigitalSigs/DigSig-Commentary-fr.php3>; pp. 1-11.

Sacke & Associates Inc.; "Computer Methods International Corp. Appoints Sacke & Associates Inc. as Its North American Public Relations Agency of Record;" Company News [online]; Aug. 28, 2003 [retrieved on Mar. 16, 2005]; Retrieved from the Internet <URL: http://www.sackepr.com/SackeCMiAug28-2003.html>; pp. 1-2.

Wisconsin Builders Association; "The WBA Foundation;" Wisconsin Builders Association—Preserving and Promoting the American Dream [online]; [retrieved on Jan. 12, 2005]; Retrieved from the Internet <URL: http://www.wbaonline.org/site/content/about/wba.asp>; pp. 1-3.

Wisconsin Builders Association; "WBA Foundation Donor Funds;" Wisconsin Builders Association—Preserving and Promoting the American Dream [online]; [retrieved on Jan. 12, 2005]; Retrieved from the Internet <URL: http://www.wisbuild.org/site/content/about/donorfunds.asp>; pp. 1-2.

Wisconsin Builders Association; "Past Presidents;" Wisconsin Builders Association—Preserving and Promoting the American Dream [online]; [retrieved on Jan. 12, 2005]; Retrieved from the Internet <URL: http://www.wbaonline.org/site/content/about/past.asp>; pp. 1-2.

Wisconsin Builders Association; "Committee Chairs;" Wisconsin Builders Association—Preserving and Promoting the American Dream [online]; [retrieved on Jan. 12, 2005]; Retrieved from the Internet <URL: http://www.wbaonline.org/site/content/about/committee.asp>; p. 1.

Wisconsin Builders Association; "Board of Directors;" Wisconsin Builders Association—Preserving and Promoting the American Dream [online]; [retrieved on Jan. 12, 2005]; Retrieved from the Internet <URL: http://www.wbaonline.org/site/content/about/board.asp>; pp. 1-6.

Wisconsin Builders Association; "About Wisconsin Builders Association;" Wisconsin Builders Association—Preserving and Promoting the American Dream [online]; [retrieved on Jan. 12, 2005]; Retrived from the Internet <URL: http://www.wbaonline.org/site/content/about/>; p. 1.

Wisconsin Builders Association; "Frequently Asked Questions;" WBA Foundation [online]; [retrieved on Jan. 12, 2005]; Retrieved from the Internet <URL: http://www.wisbuild.org/pdfs/FAQ.pdf>; pp. 1-2.

Macomber Builders Kicks Off Second Century of Construction Excellence With Computer Methods, PR Newswire, New York: Apr. 22, 2004. p. 1.

* cited by examiner

FIG. 9

EDIT ORGANIZATION

- USER PREFERENCES
  - EDIT USER
  - CHANGE PASSWORD
- MESSAGES
  - READ MESSAGES
- PROJECTS
  - BROWSE PROJECTS
- ORGANIZATIONS
  - EDIT ORGANIZATION
  - INVITE ORGANIZATION
  - BROWSE ORGANIZATIONS
- USER MANAGEMENT
  - CREATE USER
  - BROWSE USERS

BUSINESS INFORMATION

- NAME:* DERUYTER FLOORING
- ADDRESS:* 111 1ST STREET
- ADDRESS LINE 2:
- CITY:* SOMEWHEREVILLE
- STATE/PROVINCE:* WISCONSIN
- ZIP CODE:* 53224
- PHONE:* 999-123-4444
- ALTERNATE PHONE:
- FAX:
- MOBILE:
- ☑ EXEMPT FROM BACKUP WITHHOLDING
- FEDERAL TAX ID # OR SOCIAL SECURITY #:
- ORGANIZATION TYPE: CORPORATION

PRIMARY CONTACT INFORMATION

- LOCAL ADMIN:* DAVID DERUYTER
- POSITION:

CHECK
999999  999999999

- BANK NAME:* FIRST BANK
- BANK ROUTING #:* 999999999
- BANK ACCOUNT #:* 999999

UPDATE ORGANIZATION

ENTER PROJECT BUDGET

- USER PREFERENCES
  - EDIT USER
  - CHANGE PASSWORD
- MESSAGES
  - READ MESSAGES
- PROJECTS
  - BROWSE PROJECTS
- ORGANIZATIONS
  - EDIT ORGANIZATION
  - INVITE ORGANIZATION
  - BROWSE ORGANIZATIONS
- USER MANAGEMENT
  - CREATE USER
  - BROWSE USERS

HOME | LOG OUT
STEVE JOHNSON – JOHNSON CONSTRUCTION
PROJECT: ANDREWS BODY SHOP

PROJECT NAME: ANDREWS BODY SHOP
PROJECT NUMBER:
CONTRACT VALUE: $73,854.00
RETENTION PERCENT: 0.0

| PHASE CODE | PHASE DESCRIPTION | ORGANIZATION | BUDGET AMOUNT | ACCOUNT CODE | MATERIALS ONLY? | SELECT |
|---|---|---|---|---|---|---|
| 1245 | FOUNDATION | JOHNSON CONSTRUCTION | $18985.00 | 24 | ☐ | TERMINATE |
| 2358 | FLOORING | TOM CONCRETE | $23156 | 14 | ☐ | TERMINATE |
| 8542.00 | PLUMBING | MECHANICAL SOLUTIONS | $5168 | 14 | ☐ | TERMINATE |

SAVE DRAFT BUDGET | SAVE AND FINALIZE SELECTED | ADD BUDGET LINE | DELETE SELECTED

RELATED TASKS AFTER SAVING:
SETUP DRAW DATES
SETUP INVOICE CODES

ENTER INVOICE

HOME — TOM BUSCH - TOM CONCRETE
PROJECT: ANDREWS BODY SHOP

| PROJECT NAME: | ANDREWS BODY SHOP | PROJECT #: | |
|---|---|---|---|
| DRAW #: | 2 | | |
| DRAW DATE: | 12/12/04 | PROJECT ADDRESS: | 924 MAIN ST. GREEN BAY, WISCONSIN 54301 BROWN COUNTY |

| PHASE CODE | PHASE DESCRIPTION | BUDGET AMOUNT | PAYMENTS TO DATE | RETENTION TO DATE | REMAINING BALANCE | INVOICE AMOUNT |
|---|---|---|---|---|---|---|
| 2358 | FLOORING | $7821.00 | $0.00 | $0.00 | $7821.00 | $ 3611.00 |

[CONFIRM INVOICE AMOUNTS]

USER PREFERENCES
- EDIT USER
- CHANGE PASSWORD

MESSAGES
- READ MESSAGES

PROJECTS
- BROWSE PROJECTS

ORGANIZATIONS
- EDIT ORGANIZATION
- INVITE ORGANIZATION
- BROWSE ORGANIZATIONS

USER MANAGEMENT
- CREATE USER
- BROWSE USERS

USER PREFERENCES
- EDIT USER
- CHANGE PASSWORD

MESSAGES
- READ MESSAGES

PROJECTS
- BROWSE PROJECTS

ORGANIZATIONS
- EDIT ORGANIZATION
- INVITE ORGANIZATION
- BROWSE ORGANIZATIONS

USER MANAGEMENT
- CREATE USER
- BROWSE USERS

HOME | LOG OUT
TOM BUSCH - TOM CONCRETE
PROJECT: ANDREWS BODY SHOP

SWORN STATEMENT FOR CONTRACTOR AND SUBCONTRACTOR

STATE OF WISCONSIN
COUNTY OF BROWN

THE AFFIANT, TOM BUSCH,
SAYS THAT THEY ARE OF TOM CONCRETE
THAT THEY HAVE A CONTRACT WITH JEFF ANDREWS OWNER ON THE FOLLOWING
DESCRIBED PREMISES IN SAID COUNTY, TO WIT:
ANDREWS BODY SHOP
924 MAIN ST., GREEN BAY, WISCONSIN 54301 BROWN COUNTY

THAT, FOR THE PURPOSES OF SAID CONTRACT, THE FOLLOWING PERSONS HAVE BEEN CONTRACTED WITH, AND HAVE FURNISHED OR ARE FURNISHING AND PREPARING MATERIALS FOR, AND HAVE DONE OR ARE DOING LABOR ON SAID IMPROVEMENT. THAT THERE IS DUE AND TO BECOME DUE THEM, RESPECTIVELY, THE AMOUNTS SET OPPOSITE THEIR FOR MATERIALS OR LABOR AS STATED. THAT THIS STATEMENT IS A FULL, TRUE, AND COMPLETE STATEMENT OF ALL SUCH PERSONS, THE AMOUNTS PAID AND THE AMOUNTS DUE OR TO BECOME DUE TO EACH.

| NAME | KIND OR WORK | CONTRACTED AMOUNT | RETENTION (INC. CURRENT) | PREVIOUS PAYMENTS | THIS PAYMENT | BALANCE DUE |
|---|---|---|---|---|---|---|
| TOM CONCRETE | 2358 - FLOORING | $7,821.00 | $0.00 | $0.00 | $3,611.00 | $4,210.00 |
| DAVID DERUYTER | 2358.1 - CARPET INSTALLATION | $3,850.00 | $0.00 | $0.00 | $1,754.00 | $2,086.00 |
| MATT FRAMING | 2358.2 - FLOORING | $11,485.00 | $0.00 | $0.00 | $2,954.00 | $8,631.00 |
| TOTALS | | $23,156.00 | $0.00 | $0.00 | $8,229.00 | $14,927.00 |
| AMOUNT OF ORIGINAL CONTRACT: | | $23,156.00 | | WORK COMPLETED TO DATE: | | $8,229.00 |
| EXTRAS TO CONTRACT: | | $0.00 | | LESS 0.0% RET: | | $0.00 |
| TOTAL CONTRACT AND EXTRAS: | | $23,156.00 | | | | $8,229.00 |
| CREDITS TO CONTRACT: | | $0.00 | | NET PREVIOUSLY PAID: | | $0.00 |
| ADJUSTED TOTAL CONTRACT: | | $23,156.00 | | BALANCE TO BECOME DUE: | | $14,927.00 |

DATED: 9TH DAY OF DECEMBER 2004
COMPANY: TOM CONCRETE
ADDRESS: ALABAMA
SIGNED THIS 9TH DAY OF DECEMBER, 2004                SIGNATURE: _____

BACK TO PREVIOUS SCREEN

INTERNET

FILE EDIT VIEW FAVORITES TOOLS HELP

ADDRESS HTTP://WWW.URL.COM/

- USER PREFERENCES
  - EDIT USER
  - CHANGE PASSWORD
- MESSAGES
  - READ MESSAGES
- PROJECTS
  - BROWSE PROJECTS
- ORGANIZATIONS
  - EDIT ORGANIZATION
  - INVITE ORGANIZATION
  - BROWSE ORGANIZATIONS
- USER MANAGEMENT
  - CREATE USER
  - BROWSE USERS

LOGO

HOME | LOG OUT
STEVE JOHNSON – JOHNSON CONSTRUCTION
PROJECT: ANDREWS BODY SHOP

VIEW DRAW REQUEST

PROJECT NAME: ANDREWS BODY SHOP         PROJECT NUMBER:
DRAW #: 2
DRAW DATE: 12/12/04                     PROJECT ADDRESS: 924 MAIN ST.
                                        GREEN BAY,
                                        WISCONSIN 54301
                                        BROWN COUNTY

ORGANIZATION: JOHNSON CONSTRUCTION   PHASE CODE: 1245 FOUNDATION
| LIEN WAIVER RECEIVED? | REQUEST AMOUNT | BUDGET AMOUNT | PAYMENT AMOUNT | HOLDBACK ACCRUED | REMAINING BALANCE |
|---|---|---|---|---|---|
| YES | $7492.00 | $18985.00 | $7492.00 | $0.00 | $11493.00 |

ORGANIZATION: TOM CONCRETE   PHASE CODE: 2358 FLOORING
| LIEN WAIVER RECEIVED? | REQUEST AMOUNT | BUDGET AMOUNT | PAYMENT AMOUNT | HOLDBACK ACCRUED | REMAINING BALANCE |
|---|---|---|---|---|---|
| YES | $8229.00 | $23156.00 | $8229.00 | $0.00 | $14927.00 |

SUBCONTRACTED LIEN WAIVERS
| LIEN WAIVER RECEIVED? | ORGANIZATION NAME | PHASE CODE | PHASE CODE DESCRIPTION |
|---|---|---|---|
| NO | DERUYTER FLOORING | 2358.1 | CARPET INSTALLATION |
| NO | MATT FRAMING | 2358.2 | FLOORING |

ORGANIZATION: MECHANICAL SOLUTIONS   PHASE CODE: 8542.00 PLUMBING
| LIEN WAIVER RECEIVED? | REQUEST AMOUNT | BUDGET AMOUNT | PAYMENT AMOUNT | HOLDBACK ACCRUED | REMAINING BALANCE |
|---|---|---|---|---|---|
| YES | $16842.00 | $31713.00 | $16842.00 | $0.00 | $14871.00 |

TOTALS: $32,563.00   $73,854.00   $32,563.00   $0.00   $41,291.00

*FIG. 74*

| | | HOME | HELP | LOG OUT |
|---|---|---|---|---|

USER PREFERENCES
- EDIT USER PROFILE
- CHANGE PASSWORD

MESSAGES
- VIEW MESSAGES
- SEND MESSAGES

PROJECTS
- OPEN NEW PROJECT

ORGANIZATIONS
- EDIT BANK PROFILE
- ADD AN ORGANIZATION
- BROWSE ORGANIZATIONS

USER MANAGEMENT
- BROWSE USERS
- LOGIN AS USER

REPORTS
- VIEW REPORTS

PROJECT NAME: PALANTHINIKOS MEMORIAL CENTER    PROJECT NUMBER: P3235532

DRAW #: 2

DRAW DATE: 1/29/2004    PROJECT ADDRESS: 18 CROSS MAIN ST, GREEN BAY, WISCONSIN 54301

| REQUEST AMOUNT | ORGANIZATION | ROLE | BUDGET ITEM | BUDGET AMOUNT | PAYMENT AMOUNT | HOLDBACK ACCRUED | REMAINING BALANCE |
|---|---|---|---|---|---|---|---|
| $0.00 | JOHNSON CONSTRUCTION | GENERAL CONTRACTOR | GENERAL CONTRACTOR | $100000.00 | $2800.00 | $0.00 | $97200.00 |
| $0.00 | AUGUST WINTERS & SONS INCORPORATED | SUBCONTRACTOR | EXCAVATION | $30000.00 | $0.00 | $0.00 | $30000.00 |
| $0.00 | CARTIER PLUMBING | SUBCONTRACTOR | PLUMBING | $20000.00 | $0.00 | $0.00 | $20000.00 |
| $0.00 | PEDERSEN CONSTRUCTION | SUBCONTRACTOR | HVAC | $25000.00 | $0.00 | $0.00 | $25000.00 |
| $128.35 | AARDVARK ELECTRIC | SUBCONTRACTOR | ELECTRICAL | $50000.00 | $39060.00 | $0.00 | $8000.00 |

GENERAL COMMENTS:

COMMENTS TO INSPECTOR:

A DRAW REQUEST HAS BEEN INITIATED ON THIS PROJECT. NO INSPECTION WAS SCHEDULED. DO YOU WANT TO SCHEDULE AN INSPECTION NOW?

⦿ YES    ○ NO

[ SUBMIT ]

Figure 91:
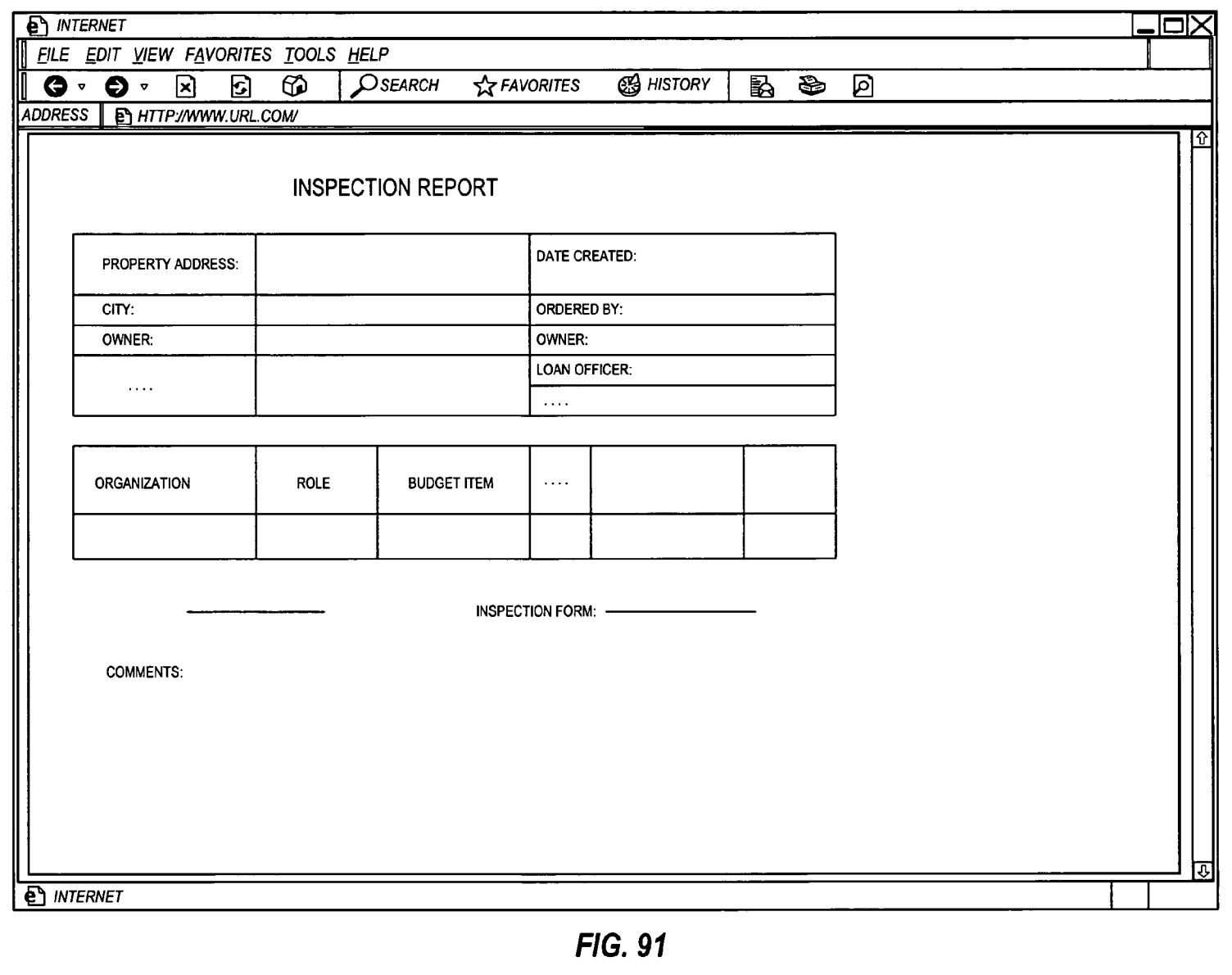

INSPECTION REPORT

| PROPERTY ADDRESS: | | DATE CREATED: |
|---|---|---|
| CITY: | | ORDERED BY: |
| OWNER: | | OWNER: |
| ⋮ | | LOAN OFFICER: |
| | | ⋮ |

| ORGANIZATION | ROLE | BUDGET ITEM | |
|---|---|---|---|
| | | ⋮ | |

INSPECTION FORM: _____

COMMENTS: _____

☒ EMAIL
FILE EDIT VIEW INSERT FORMAT TOOLS ACTIONS HELP
REPLY | REPLY TO ALL | FORWARD

FROM:
TO:
CC:
SUBJECT:

SENT:

AUTHORIZE DRAW REQUEST TWO
THIS IS A SYSTEM MESSAGE:

YOU ARE REQUESTED TO CHECK THE INSPECTION REPORT ENTERED FOR THE PROJECT.

YOUR AUTHORIZATION IS REQUIRED BEFORE THIS DRAW CAN PROCEED TO THE NEXT PHASE WHEREIN DRAW PARTICIPANTS WILL BE ASKED TO SEND IN THEIR LIEN WAIVERS.

PLEASE NOTE THAT IF YOU CHOOSE NOT TO AUTHORIZE THIS DRAW, THIS DRAW WILL NOT PROCEED TO THE NEXT PHASE AND WILL BE TERMINATED.

TO VIEW A SUMMARY OF THE INSPECTION REPORT AS WELL AS TO GRANT OR DENY AUTHORIZATIONS FOR THIS DRAW, PLEASE FOLLOW THE LINK GIVEN BELOW:

TO VIEW THE DETAILS OF THE INSPECTION REPORT, PLEASE CLICK THE LINK GIVEN BELOW:

KIND REGARDS,
SYSTEM

NOTIFICATION: P035

AUTH: ARE THE PAYMENT DETAILS ENTERED BY DRAW PARTICIPANTS ACCEPTABLE? DID THE INSPECTION REPORT INDICATE THAT WORK IS ON SCHEDULE?

☒ EMAIL

ISSUE A CHANGE REQUEST

| | | | | | |
|---|---|---|---|---|---|
| PROJECT NAME: | BAY BEACH PARK | | | PROJECT NUMBER: | 235 |
| OWNER: | AMERICA BANK | | | PROJECT ADDRESS: | 5764 BEACH RD.<br>BROWN<br>GREEN BAY,<br>WISCONSIN 54301 |

| CHANGE<br>AMOUNT | ORGANIZATION | ROLE | BUDGET ITEM | BUDGET<br>AMOUNT | PAYMENT<br>AMOUNT | REMAINING<br>BALANCE |
|---|---|---|---|---|---|---|
| $ 1568 | W.M. CONSTRUCTION | GENERAL<br>CONTRACTOR | GENERAL<br>CONTRACTOR | $1,148,400.00 | $0.00 | $1,148,400.00 |
| $ 1568 | W.M. CONSTRUCTION | GENERAL<br>CONTRACTOR | GENERAL<br>CONTRACTOR | $351,600.00 | $0.00 | $351,600.00 |
| | | | TOTAL: | $1,500,000.00 | $0.00 | $1,500,000.00 |

CHANGE DESCRIPTION:

PAYMENT FROM: ⦿ LOAN  ○ OWNER PAYMENT
PAYMENT METHOD: ⦿ LOAN  ○ OWNER CHECK  ○ CREDIT CARD
CURRENTLY ESTIMATED COMPLETION DATE: 2/15/2005
NEW ESTIMATED COMPLETION DATE: 2/15/2005

[ SAVE & NOTIFY ]

INTERNET

FILE EDIT VIEW FAVORITES TOOLS HELP

ADDRESS | HTTP://WWW.URL.COM/

LOGO

HOME | LOG OUT

MATT GREEN - STEWART SYSTEMS
PROJECT: BUILDERS EXCHANGE OFFICE

- USER PREFERENCES
  - EDIT USER
  - CHANGE PASSWORD
- MESSAGES
  - READ MESSAGES
- PROJECTS
  - CREATE PROJECT
  - BROWSE PROJECTS
- ORGANIZATIONS
  - VIEW ORGANIZATION
  - INVITE ORGANIZATION
  - BROWSE ORGANIZATIONS

EDIT PROJECT

PROJECT INFORMATION

| Field | Value | Field | Value |
|---|---|---|---|
| PROJECT NAME* | BUILDERS EXCHANGE | CONTRACT VALUE* | 346000.00 |
| INTERNAL PROJECT NUMBER | 267 | CONTRACT DATE* | |
| ORIGINAL ESTIMATED START DATE | 11/24/2004 | PROJECT TYPE* | COMMERCIAL - REMODEL |
| ESTIMATED START DATE | 11/24/2004 | ORIGINAL ESTIMATED COMPLETION DATE | 12/25/2004 |
| | | ESTIMATED COMPLETION DATE* | 12/25/2004 |

PROJECT FUNDING

| Field | Value | Field | Value |
|---|---|---|---|
| BANK NAME* | 1ST BANK | LOAN AMOUNT | 0.00 |
| CITY* | DEPERE | APPRAISED VALUE | 0.00 |
| STATE* | WISCONSIN | LOAN TO VALUE PERCENT | 0.00 |
| ROUTING NUMBER* | 484848484 | | |
| ACCOUNT NUMBER* | 2253 | | |

PROJECT OWNER

| Field | Value | Field | Value |
|---|---|---|---|
| OWNER NAME* | | CITY* | |
| ADDRESS LINE 1* | | STATE* | ALABAMA |
| ADDRESS LINE 2 | | ZIP CODE* | |

SITE INFORMATION

| Field | Value | Field | Value |
|---|---|---|---|
| ADDRESS LINE 1* | 1050 GLORY RD | COUNTY* | BROWN |
| ADDRESS LINE 2 | | CENSUS TRACT | |
| CITY* | GREEN BAY | ASSESSORS PARCEL NO. | |
| STATE* | WISCONSIN | | |
| ZIP* | 54304 | | |
| PROPERTY LEGAL DESCRIPTION | | | |

| GENERAL CONTRACTOR | STEWART SYSTEMS | CUSTOMER NUMBER | 17 |
|---|---|---|---|
| PROJECT NUMBER | 27 | | |

UPDATE PROJECT

*FIG. 119*

1.1.1 OPEN PROJECT

1.1.2 CREATE DRAW SCHEDULE

1.1.3 IDENTIFY AND ASSIGN PROJECT ROLES

1.1.4 ENTER BUDGETS

1.2.2 ENTER ORGANIZATION DETAILS

1.2.3 MAINTAIN ORGANIZATION DETAILS

1.3 ADMINISTER DRAW

1.3.1 DECLARE DRAW

1.3.4 REQUEST INSPECTION

1.3.5 EXECUTE INSPECTION

1.3.6 AUTHORIZE DRAW

1.3.7 ENTER & STAGE LIEN WAIVER

PROCESS NOT INCLUDED

GLOSSARY OF PROJECT ROLES

CONSTRUCTION PAYMENT MANAGEMENT SYSTEM AND METHOD WITH ONE-TIME REGISTRATION FEATURES

RELATED APPLICATIONS

This is a continuation patent application of U.S. patent application Ser. No. 11/032,699 filed on Jan. 10, 2005, now abandoned which claims the benefit of prior filed provisional patent application Ser. No. 60/583,782 filed on Jun. 29, 2004, both of which are incorporated herein by reference.

BACKGROUND OF THE INVENTION

Residential and commercial construction projects require several organizations to communicate with one another in order to distribute payments. A conventional construction payment management process begins with a verbal notification that a draw from the construction loan or the property owner's account will take place. The general contractor (GC) of the construction project notifies subcontractors (or any other person, firm, or corporation engaged by the GC, such as material suppliers) of the draw by telephone, fax, or at a meeting. The subcontractors prepare invoices and send them to the GC by mail, fax, hand delivery, or at a meeting with the GC. The GC and the subcontractors often must negotiate the final invoice dollar amount by telephone or at meetings. The GC confirms the invoices, enters the details into a GC project accounting system, and prepares its own invoice.

Once the invoices are complete, the GC also manually prepares a sworn statement. In the sworn statement, the GC confirms that the subcontractors engaged by the GC have performed particular services in the construction or repair of the property. In the sworn statement, the GC also confirms the dollar amount entitled to each subcontractor.

The GC forwards the executed sworn statement to the title company and the construction loan lender and/or the property owner. The lender, the property owner, or the title company notifies an inspector that an inspection of the property must be performed and sends the sworn statement to the inspector. The inspector assembles the previous inspection reports for the property. The inspector performs the new inspection and manually prepares an inspection report. The inspector distributes the inspection report to the lender, the property owner, and/or the title company by fax, mail, or hand delivery.

The lender, the property owner, and/or the title company receives the sworn statement and the inspection report by mail, fax, hand delivery, or at a meeting with the GC and/or the inspector. The lender, the property owner, and/or the title company must retrieve the previous draw and project documentation. The lender, the property owner, and/or the title company often must negotiate the payment amounts and project details with the GC by telephone, fax, or at a meeting. The lender, the property owner, and/or the title company approves the sworn statement and communicates the approval by telephone, fax, or at a meeting. The lender or the property owner then approves the disbursement of the dollar amount specified in the sworn statement.

The construction loan lender or the property owner's bank generally transfers the funds necessary to pay all of the subcontractors to an escrow account. Often the title company then disburses the funds from the escrow account to the GC. The GC and/or the title company prepares checks for the subcontractors. At this time, the subcontractors generally complete lien waivers for the previous draw of funds from the construction loan or for the work completed during the previous month. As a result, the lien waivers for the current draw or the current month are not actually released until a subsequent draw is made from the construction loan or until the next month. In addition, subcontractors may have their own subcontractors that they must pay after receiving payment from the GC.

The conventional construction payment process can take 90 days or longer from the date of the verbal draw notification to the date the subcontractors actually receive payment. The conventional construction payment process generally involves unreliable verbal notification of events upon which movement of the process is contingent. For example, if one subcontractor is unavailable to prepare an invoice or submit a lien waiver, the payment process for all of the other subcontractors can be delayed.

The conventional construction payment process also involves enormous amounts of data entry. For example, for a single large construction project, a GC often must enter hundreds of invoices into its accounting system each month. Also, a GC must gather hundreds of lien waivers each month. In addition, a GC must prepare, approve, sign, and distribute hundreds of checks to subcontractors each month. Further, a GC must store all of the paper documents collected during each draw process. The timing of the draw notifications, the approvals, and the exchanges of lien waivers for payment requires hundreds of faxes, phone calls, and meetings each month.

SUMMARY OF THE INVENTION

Embodiments of the invention provide a system and method for managing a construction payment process. One method embodying the invention can include electronically receiving registration information including payment information from a plurality of participants, electronically storing the registration information for use in connection with multiple construction projects, and transferring a plurality of payments to a plurality of participants associated with a plurality of construction projects by electronically accessing the registration information.

One construction payment management system embodying the invention can include an application server that stores an organization module and a database management system. The organization module receives organization registration information including payment information from a plurality of participants for use in connection with multiple construction projects. The system can also include a database server connected to the database management system. The database server stores the organization registration information, and the database management system accesses the organization registration information. The application server uses the organization registration information to transfer a plurality of payments to a plurality of participants associated with a plurality of construction projects.

Another method for managing a construction payment process can include electronically receiving registration information including payment information from a plurality of participants, electronically storing the registration information for use in connection with multiple construction projects, displaying at least a portion of the registration information to a user, receiving from the user a selection of at least one participant to be included in a construction project, and transferring a payment to the at least one participant for the construction project based on the registration information.

BRIEF DESCRIPTION OF THE DRAWINGS

FIG. 9 is an illustration of a create organization form.

FIG. 12 is an illustration of an edit organization form.

FIG. 20 is an illustration of an edit organization form.

FIG. 23 is an illustration of a create user form.

FIG. 28 is an illustration of an edit user form.

FIGS. 31 and 32 are illustrations of a create project form.

FIG. 37 is an illustration of an enter top level budget form.

FIG. 50 is an illustration of an enter budget form.

FIG. 52 is an illustration of an enter top level budget form.

FIG. 56 is an illustration of an initiate draw form.

FIG. 58 is an illustration of an enter invoice form.

FIG. 60 is an illustration of a sign invoice form.

FIG. 62 is an illustration of a view pending draw request screen.

FIG. 65 is an illustration of an automatically-generated invoice form.

FIG. 66 is an illustration of a sworn statement form.

FIG. 68 is an illustration of a view draw request screen.

FIG. 70 is an illustration of a lien waiver form.

FIG. 72 is an illustration of a view draw request screen.

FIG. 74 is an illustration of a view draw request form.

FIG. 88 is an illustration of an inspection required screen.

FIG. 90 is an illustration of an enter inspection report form.

FIG. 91 is an illustration of an inspection report form screen.

FIG. 95 is an illustration of an Authorize Draw Request One form.

FIG. 100 is an illustration of an Authorize Draw Request Two notification.

FIG. 101 is an illustration of an Authorize Draw Request Two form.

FIG. 106 is an illustration of a change request form.

FIG. 111 is an illustration of an authorize change request form.

FIG. 119 is an illustration of a project profile form.

FIG. 121 is an illustration of a project information screen.

FIG. 122 is an illustration of a close project screen.

FIG. 123 is a schematic illustration of manage access screen tasks.

FIG. 124 is an illustration of a log in screen.

FIG. 125 is an illustration of a log out screen.

FIG. 126 is an illustration of a project home page screen.

FIG. 127 is an illustration of a reset password screen.

FIG. 128 is an illustration of a main screen for a particular user.

FIG. 129 is an illustration of a browse projects screen.

FIG. 130 is an illustration of a forgot password screen.

FIG. 131 is an illustration of a your password notification.

FIG. 132 is a schematic illustration of a manage message screens process.

Figure 133:
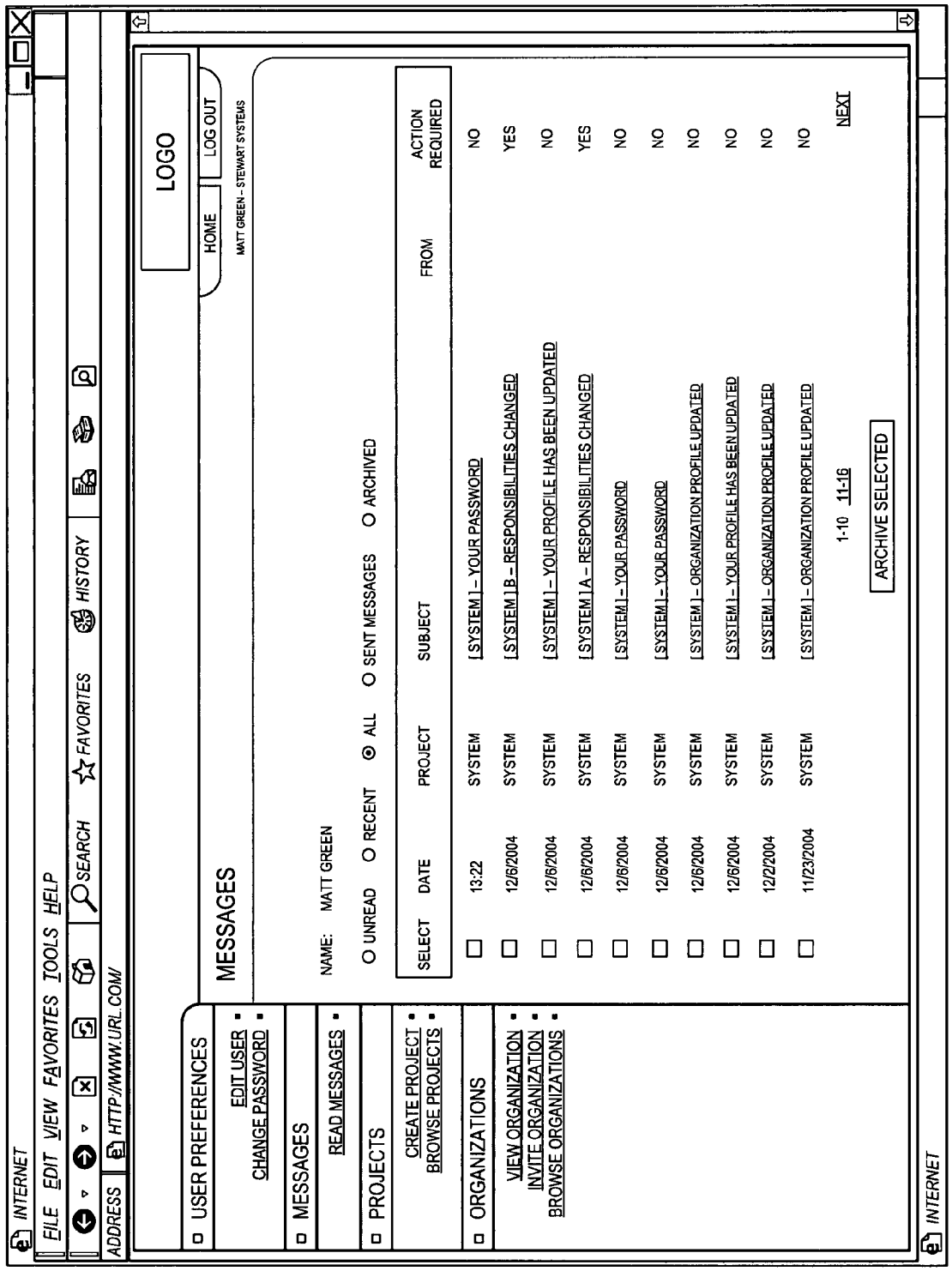

FIG. 133 is an illustration of a view messages screen.

Figure 134:
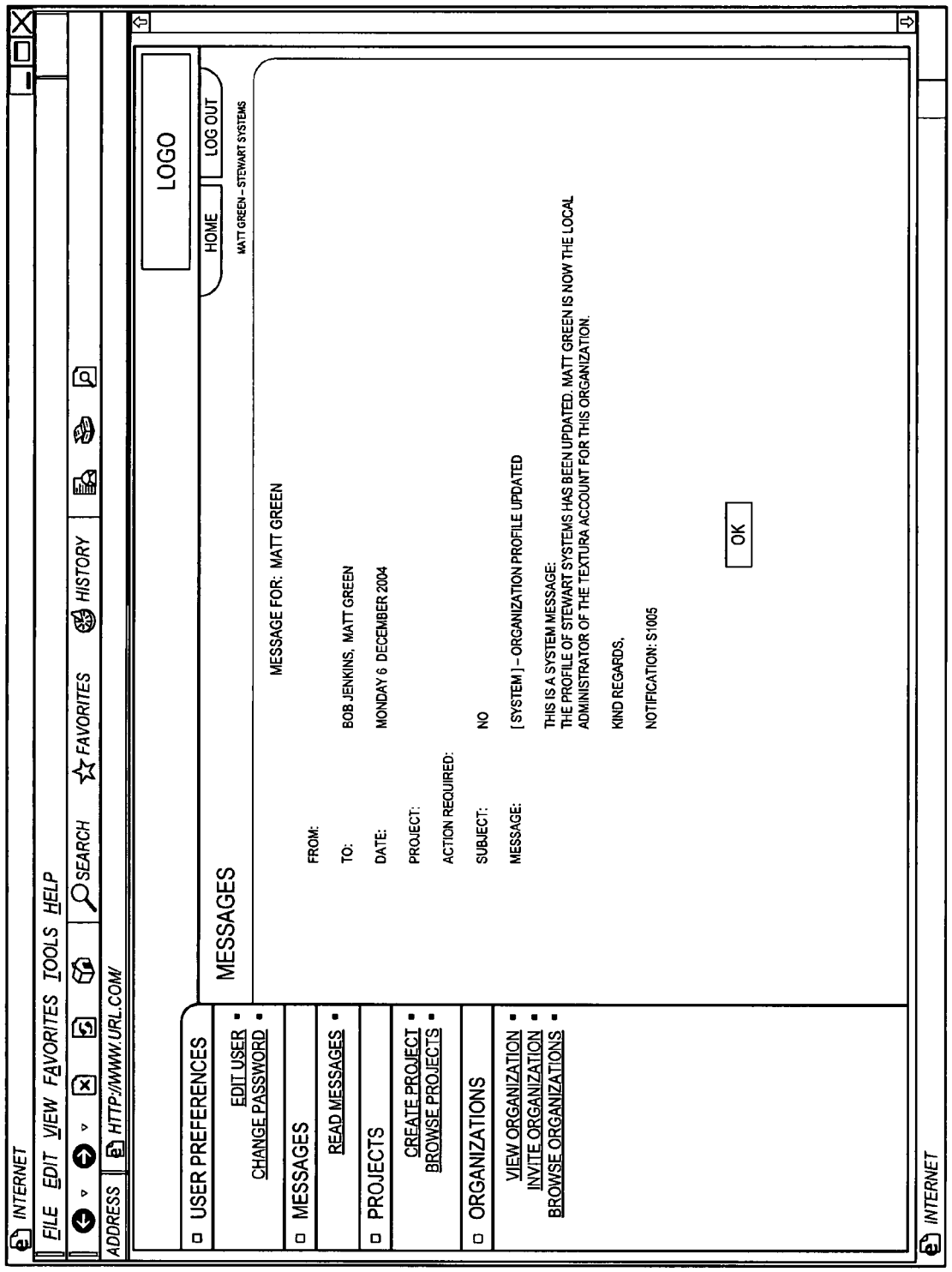

FIG. 134 is an illustration of a specific message being viewed by a user.

Figure 135:
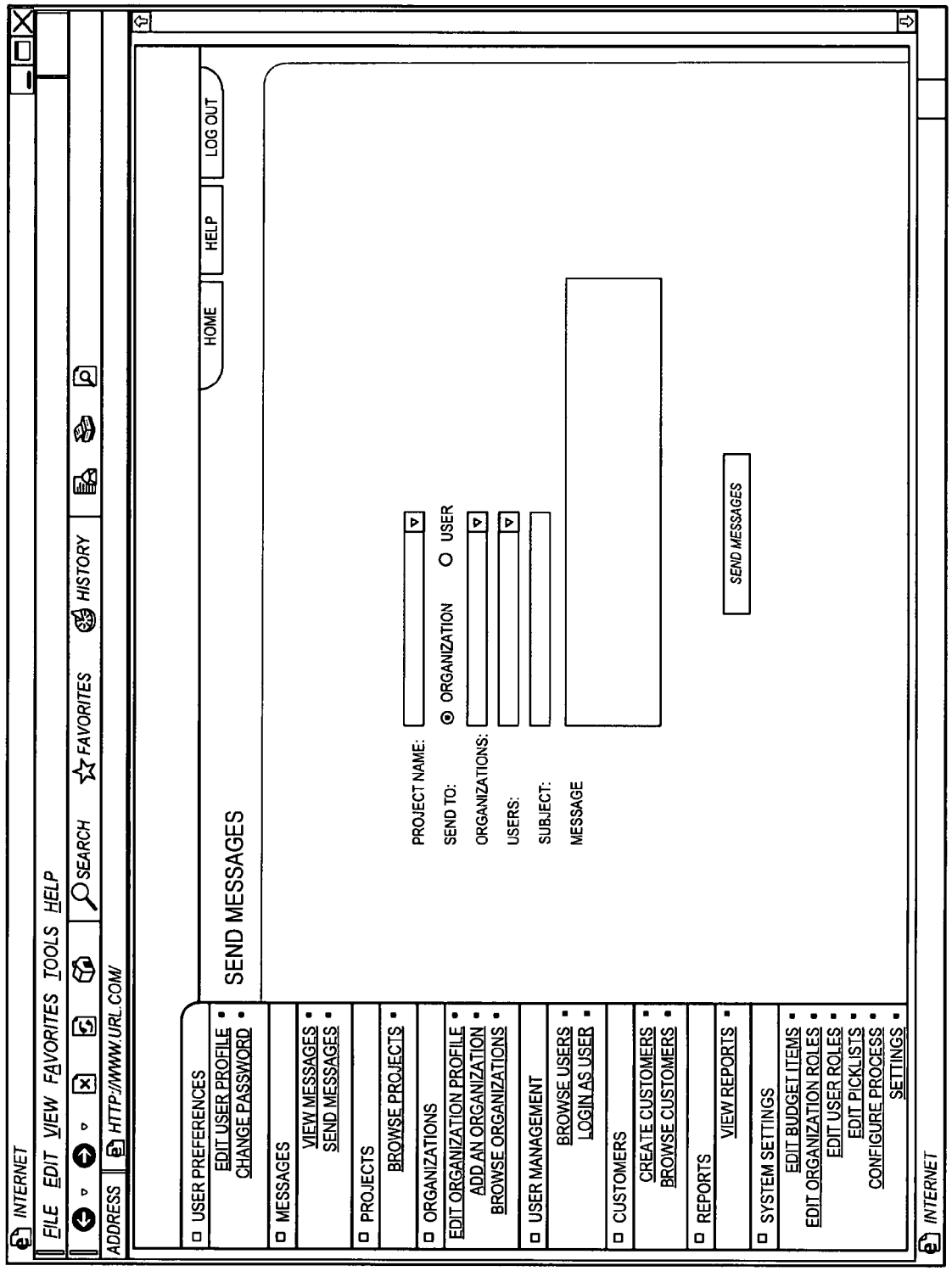

FIG. 135 is an illustration of a create/send messages screen.

Figure 136:
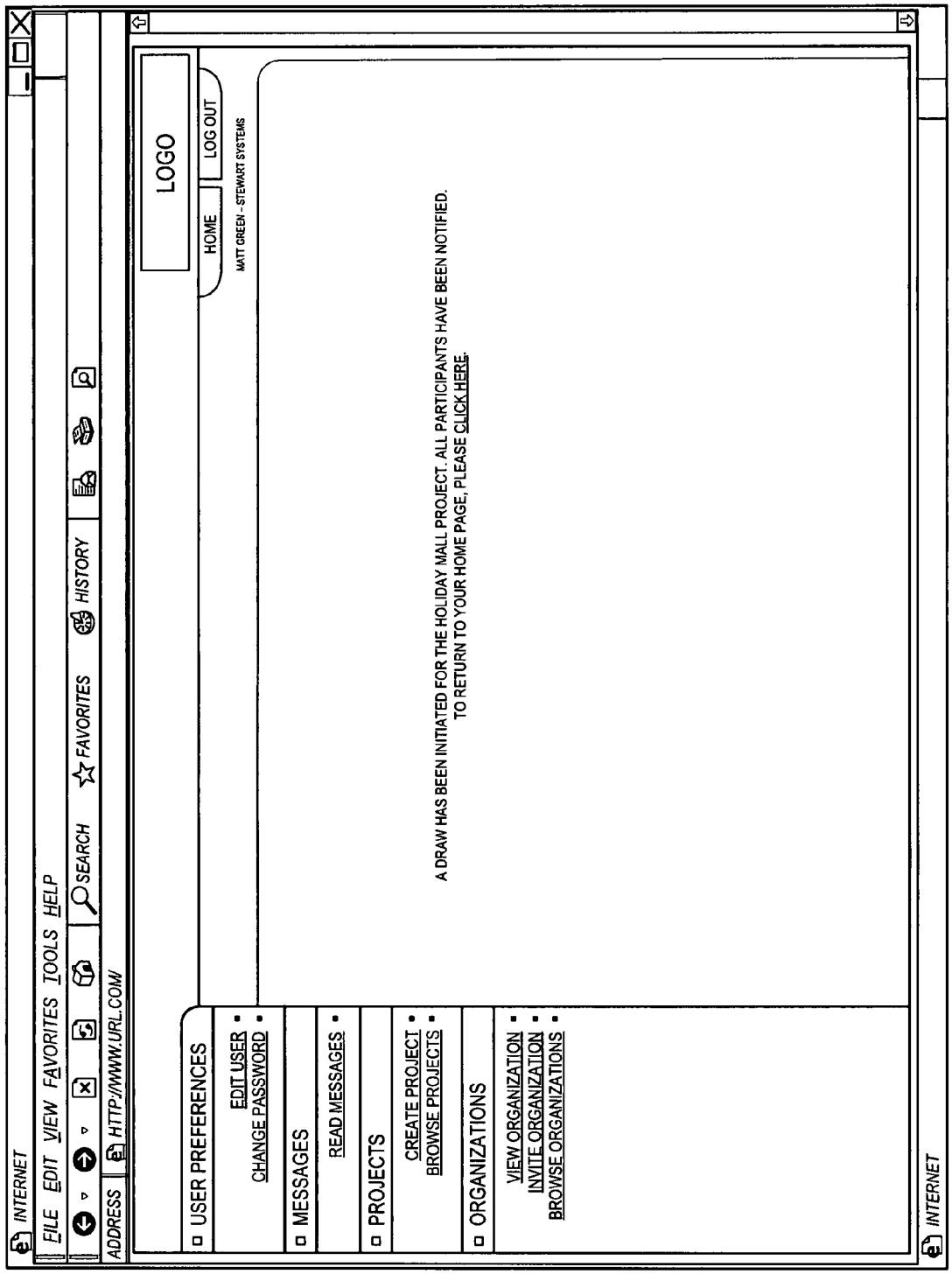
Figure 137:
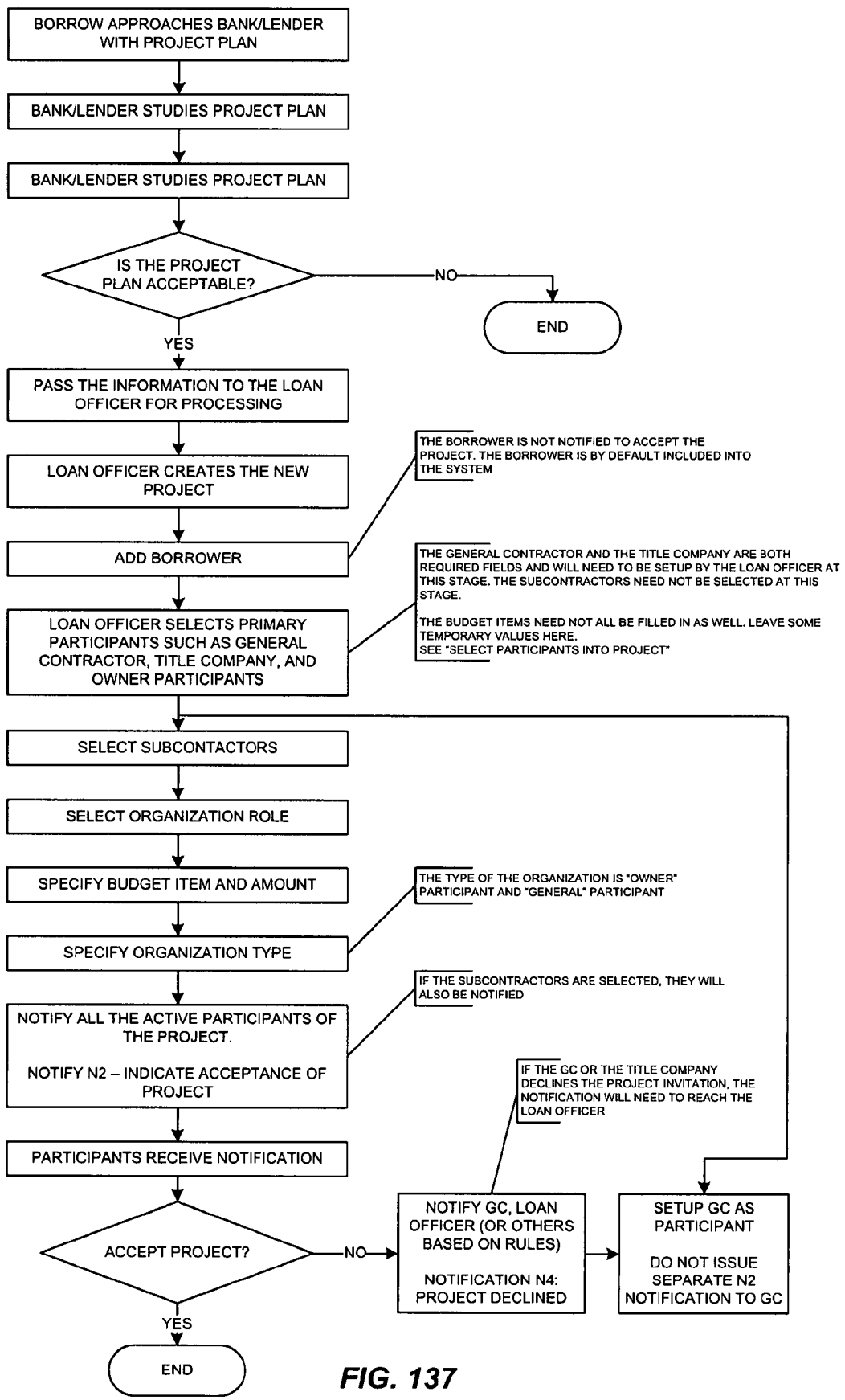
Figure 138:
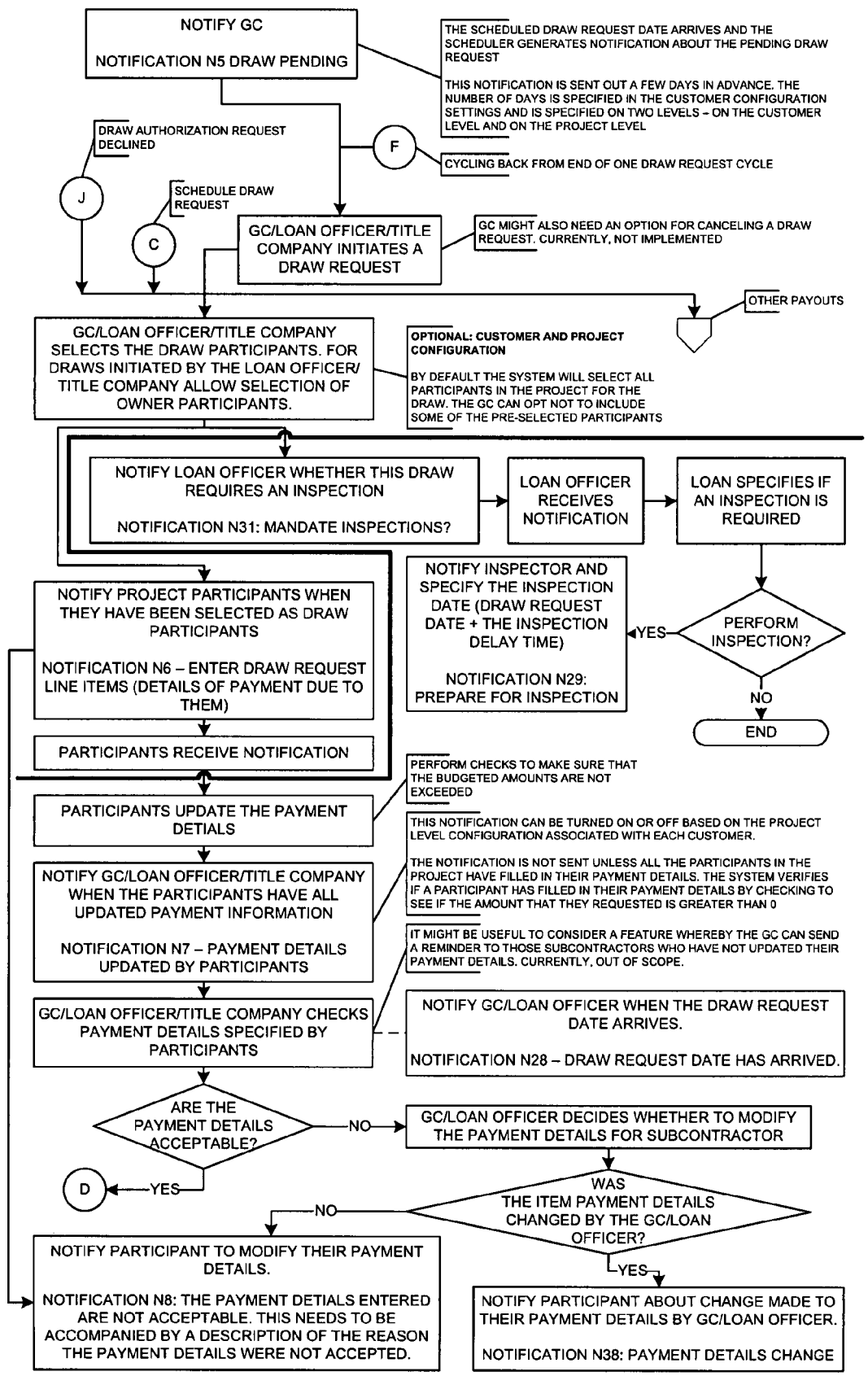
Figure 139:
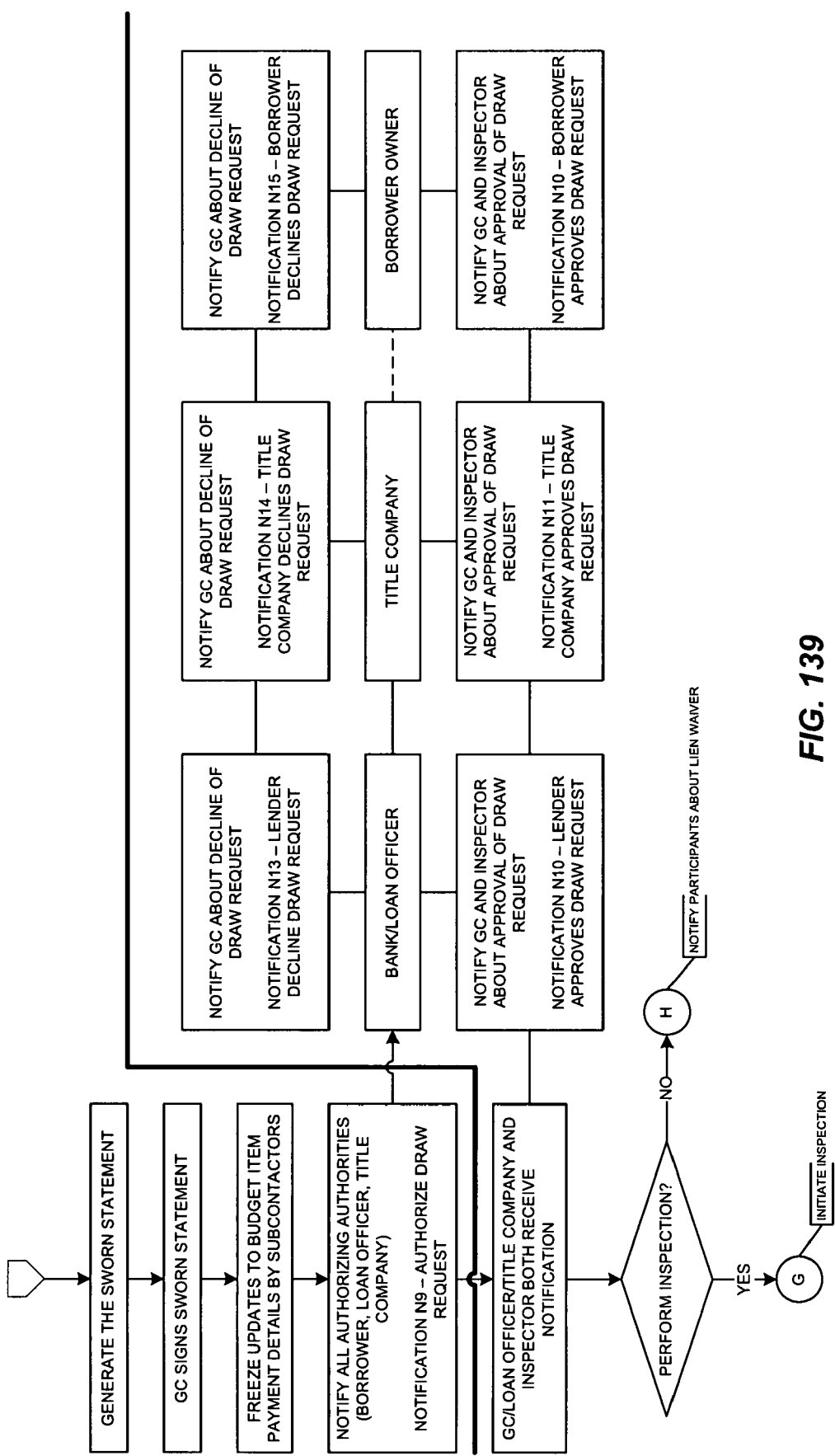
Figure 140:
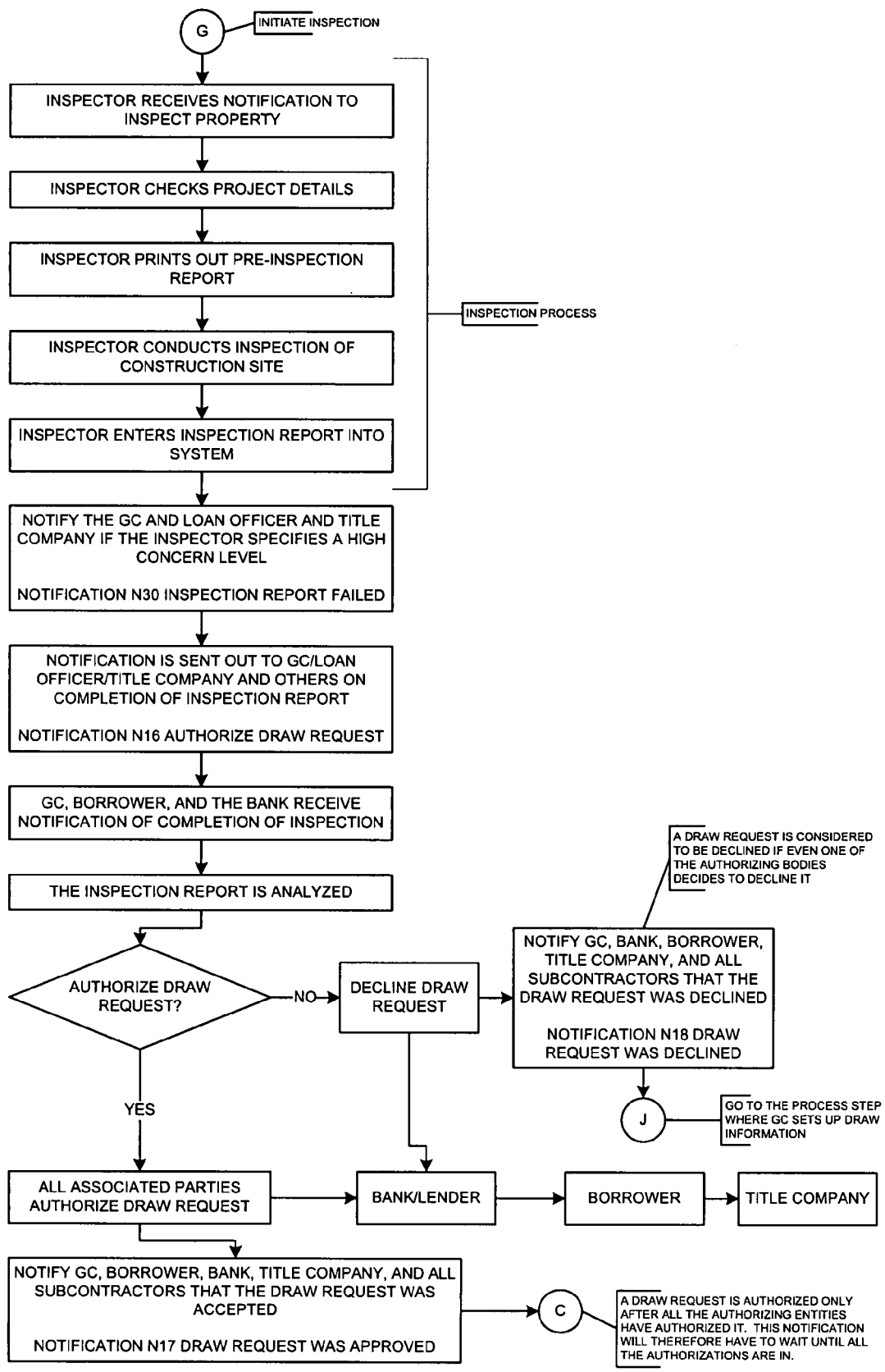
Figure 141:
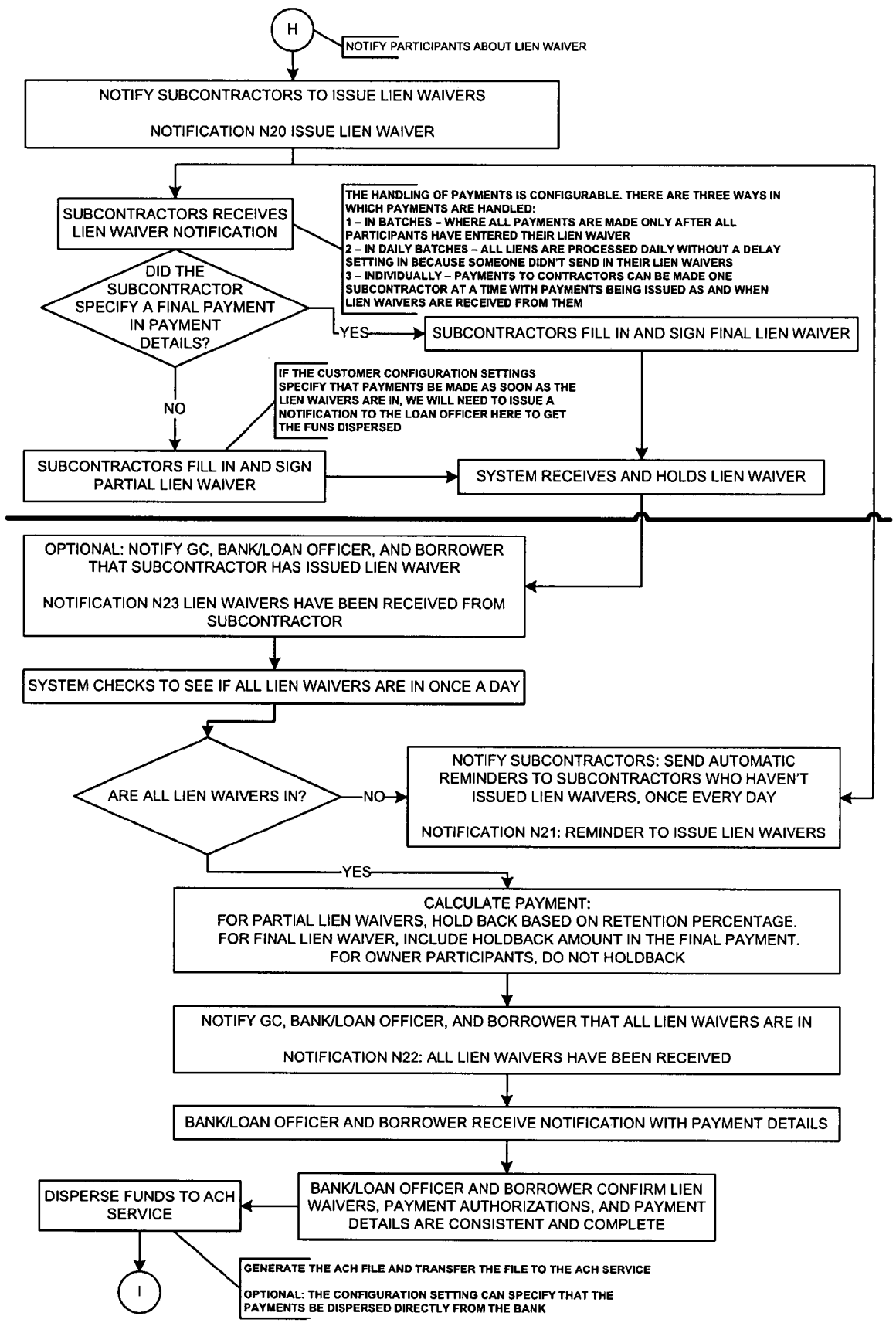
Figure 142:
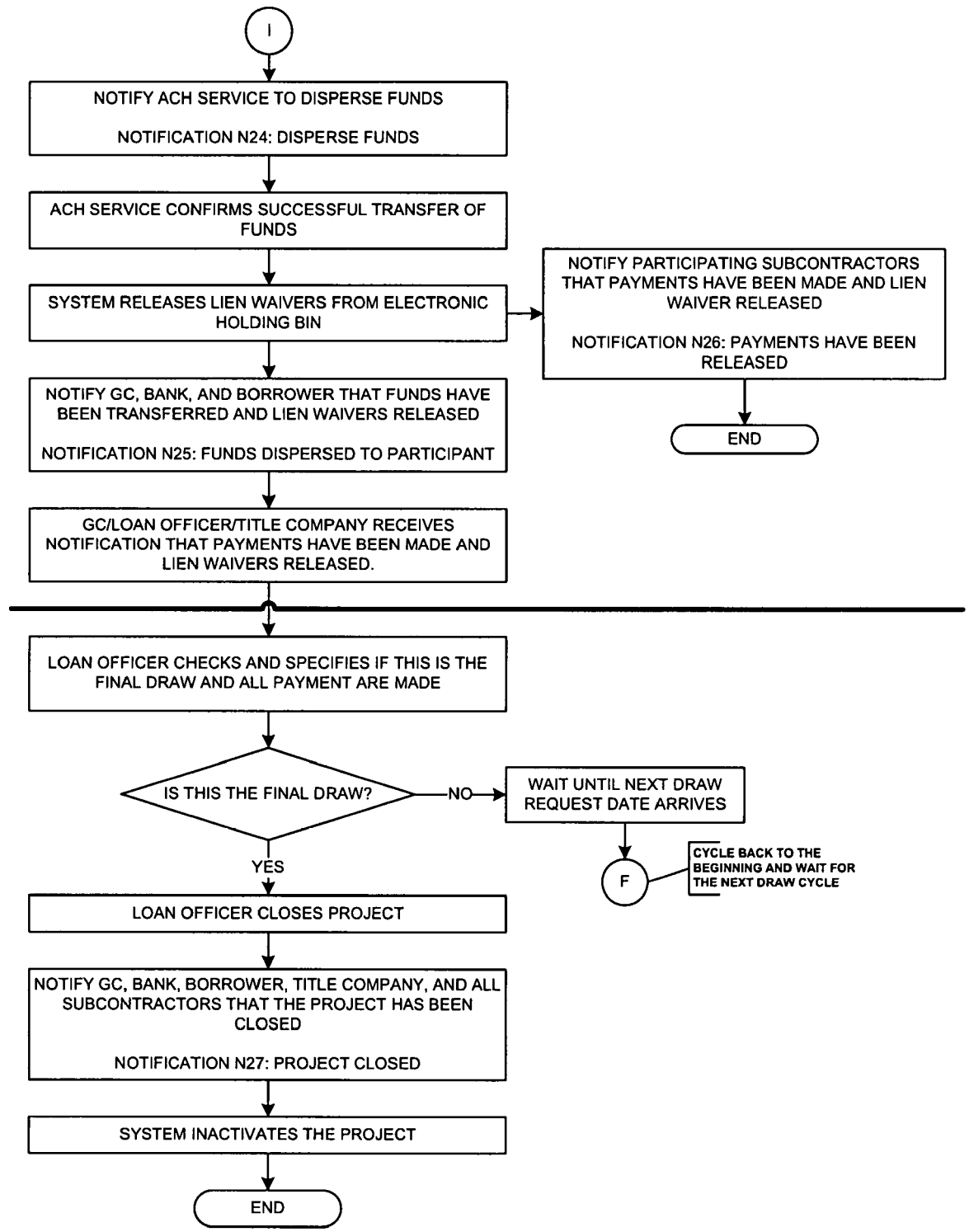
Figure 143:
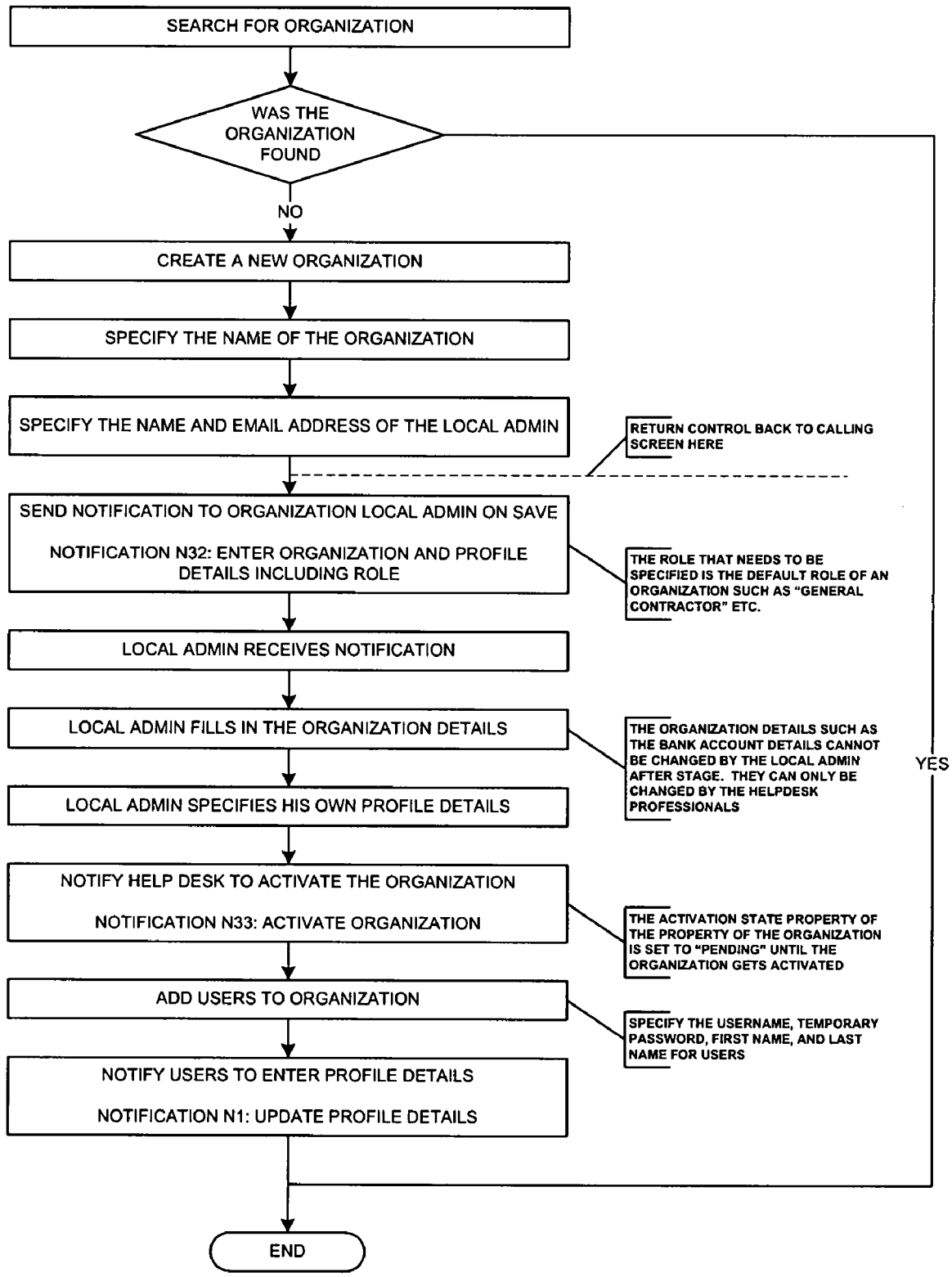
Figure 144:
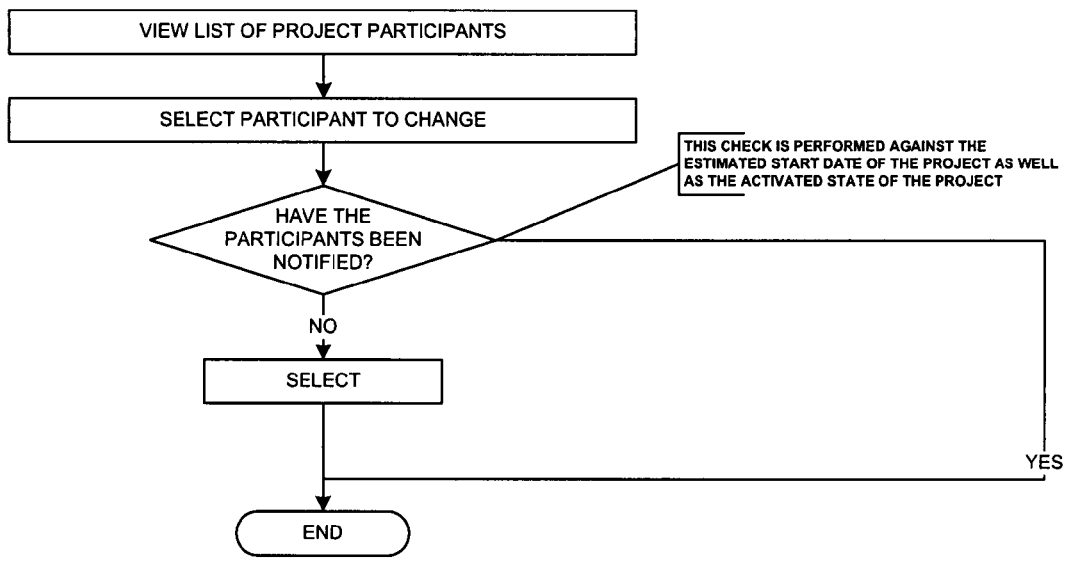
Figure 145:
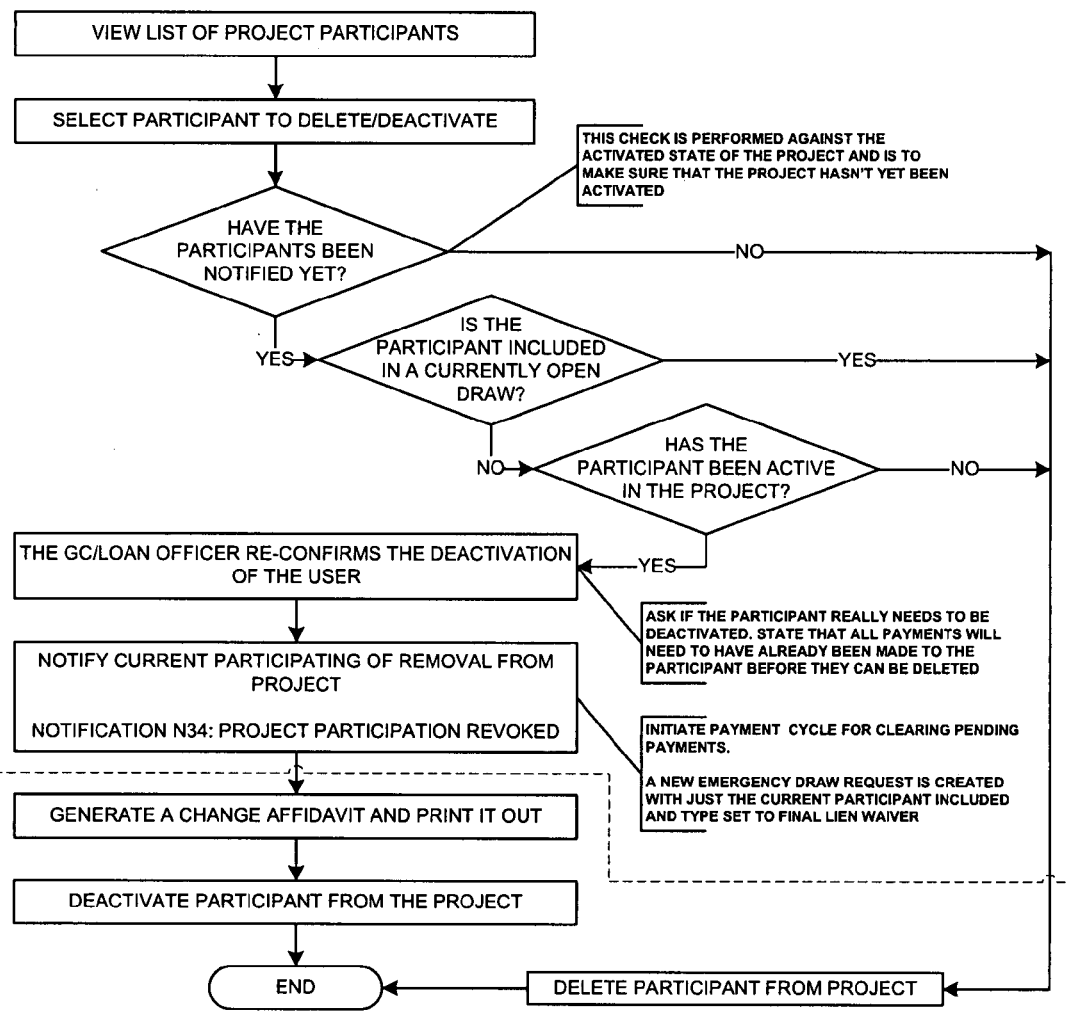
Figure 146:
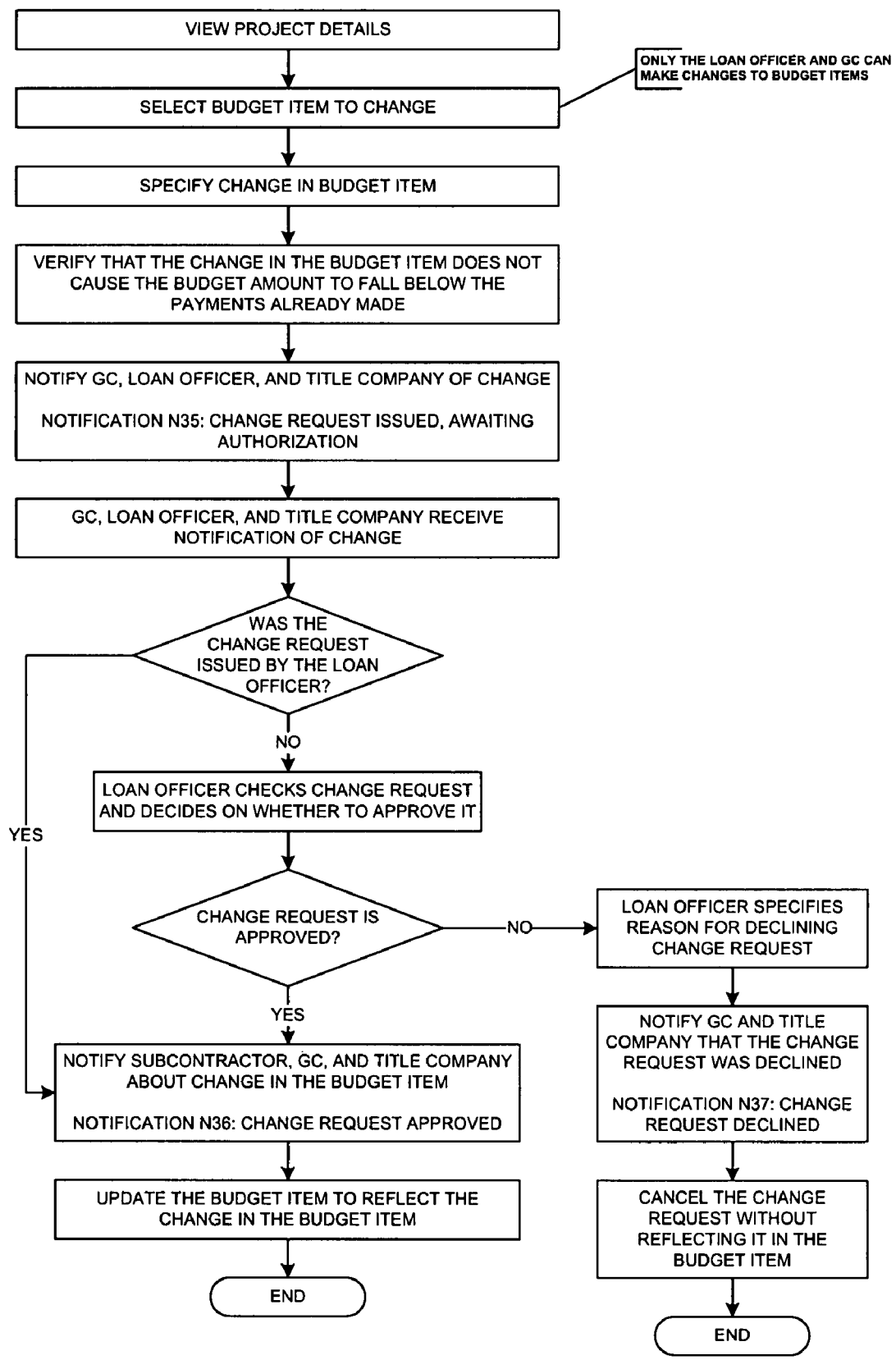
Figure 147:
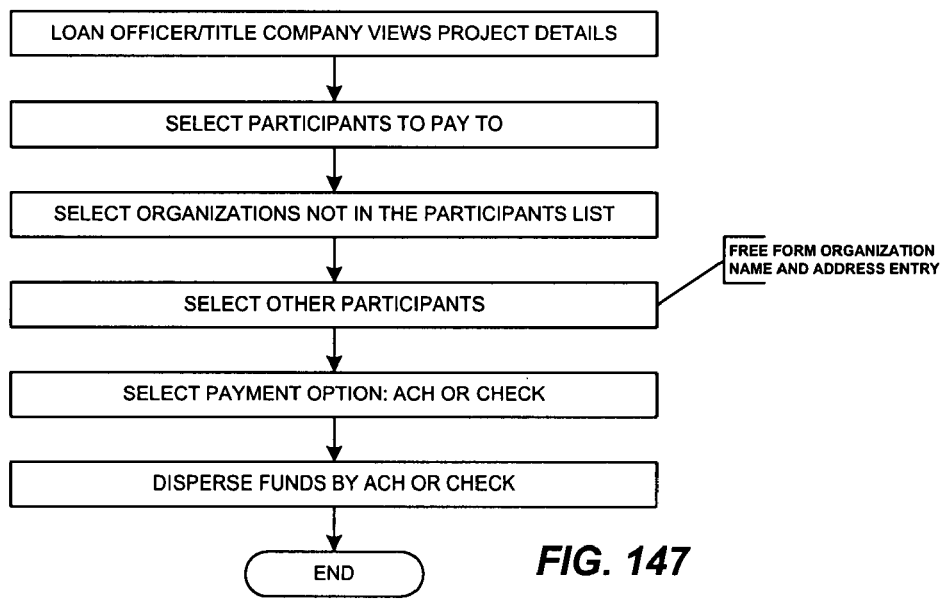
Figure 148:
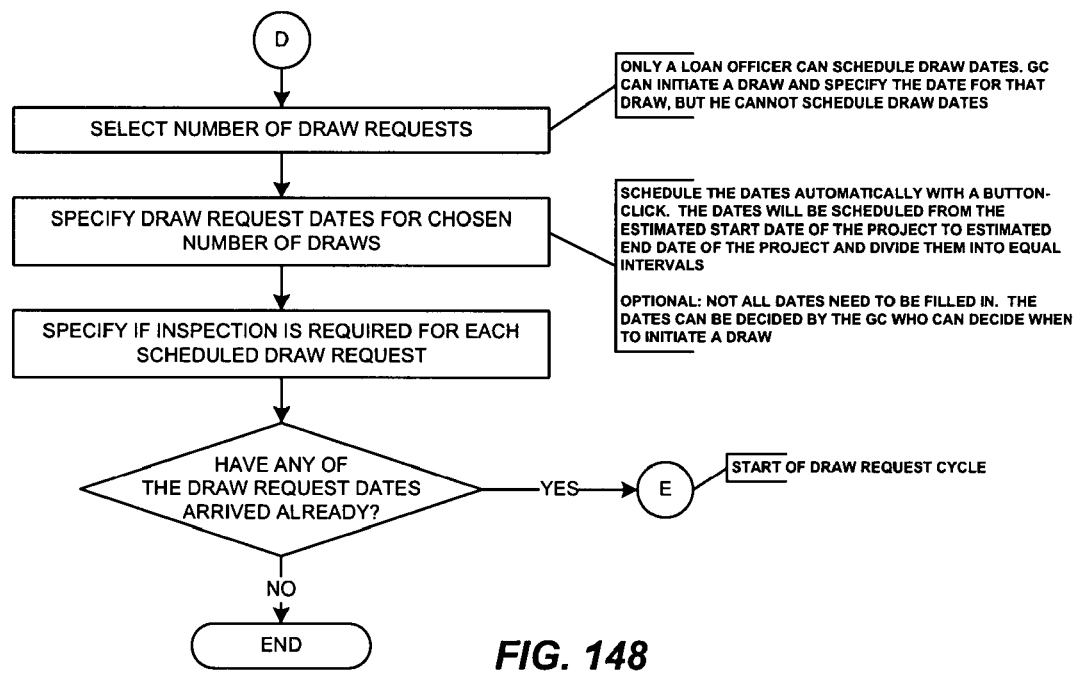
Figure 149:
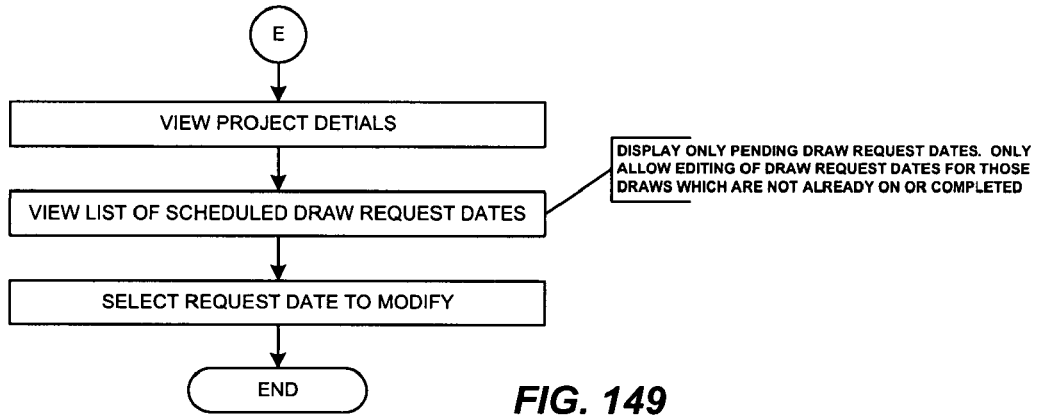
Figure 150:
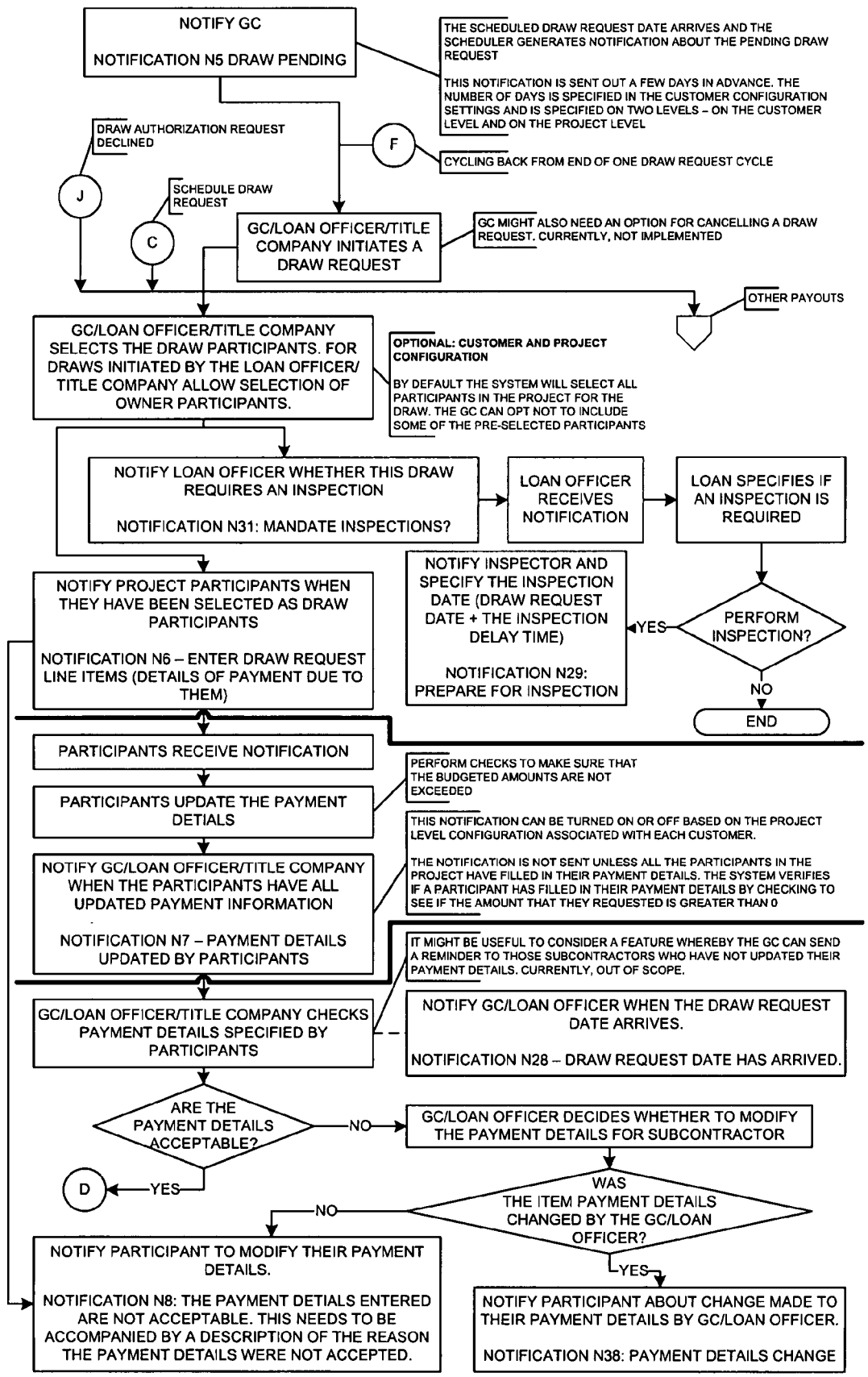
Figure 151:
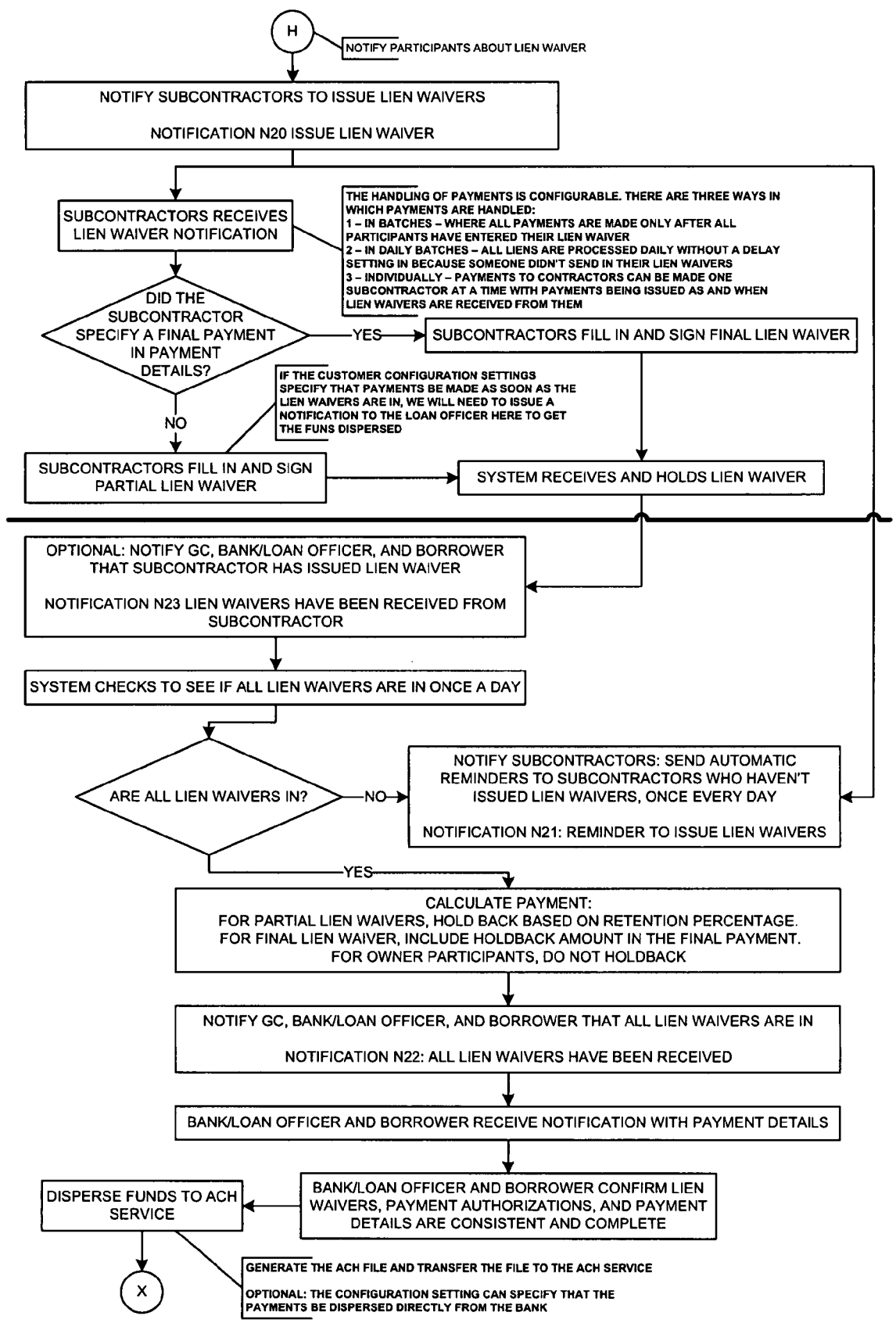
Figure 152:
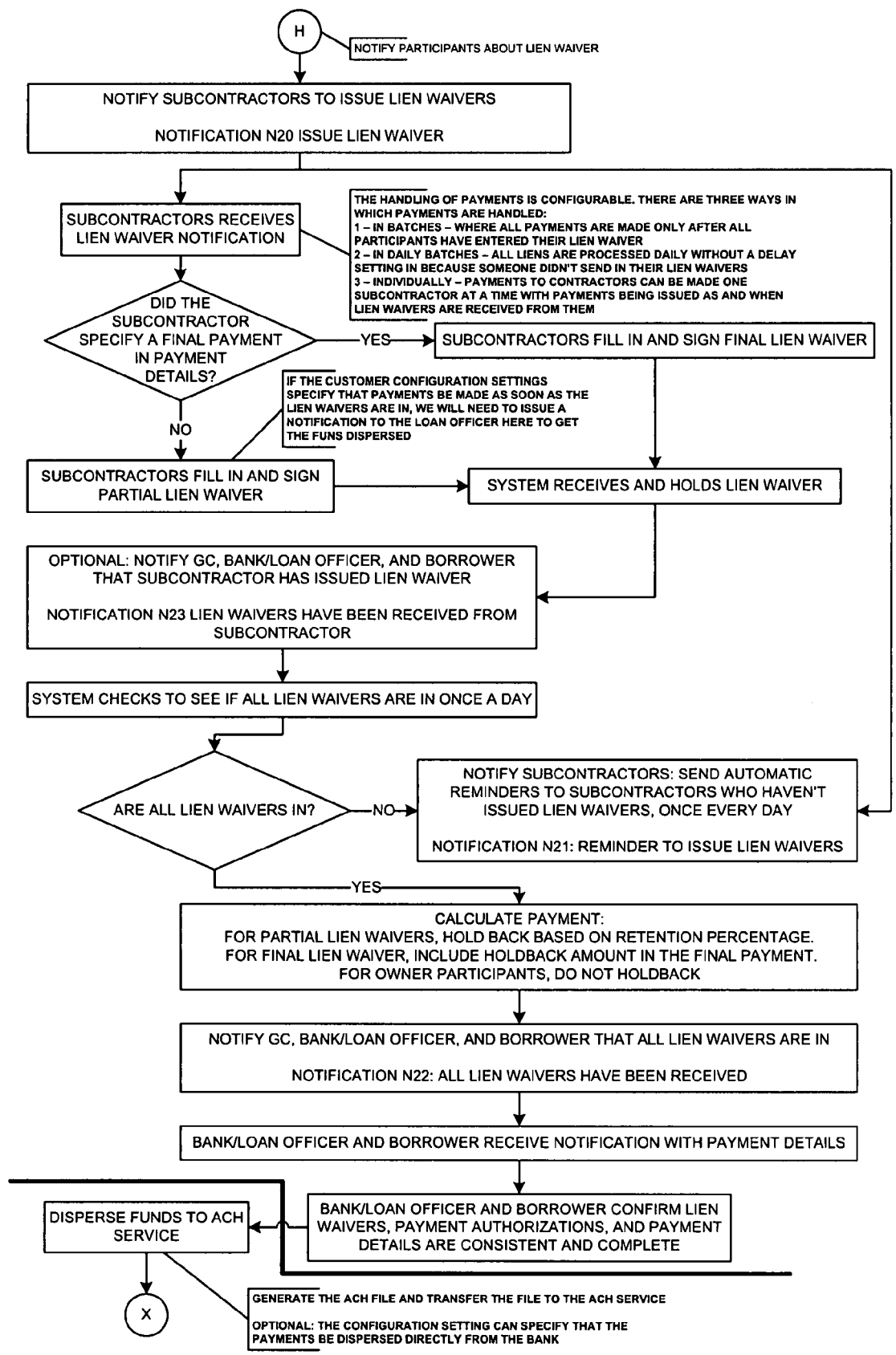
Figure 153:
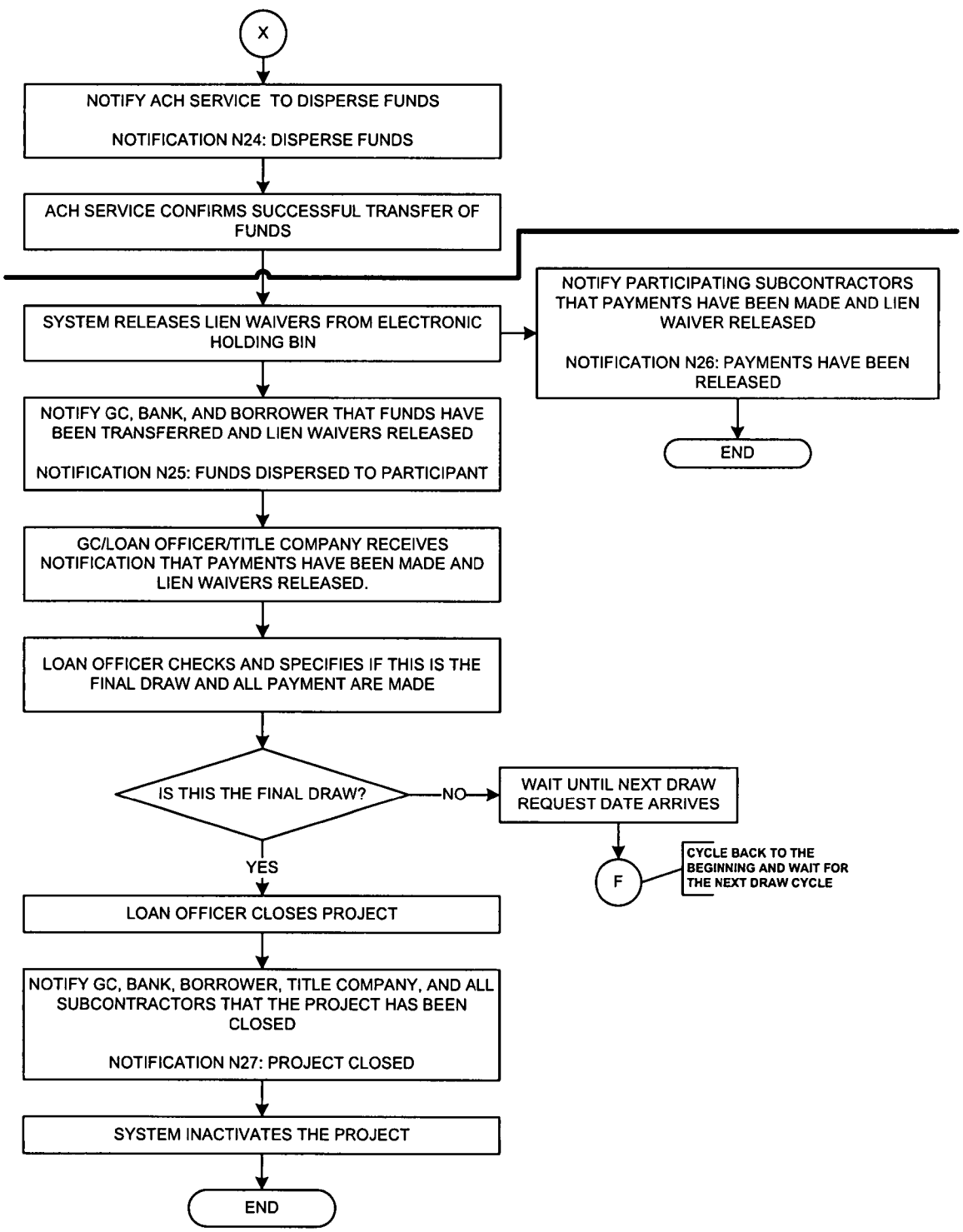
Figure 154:
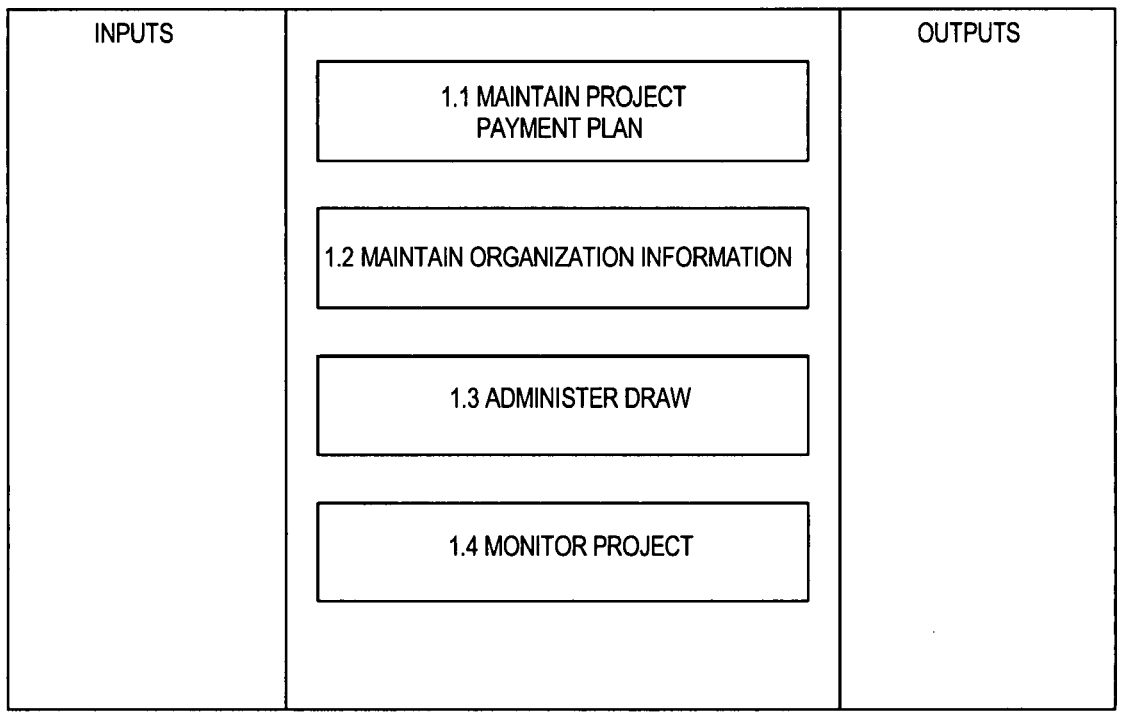

FIG. 136 is an illustration of a status message screen.

FIGS. 137-153 are flow charts illustrating a method of managing a construction payment process according to another embodiment of the invention.

FIGS. 154-179 are input/output diagrams illustrating a method of managing a construction payment process according to still another embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

Figure 1:
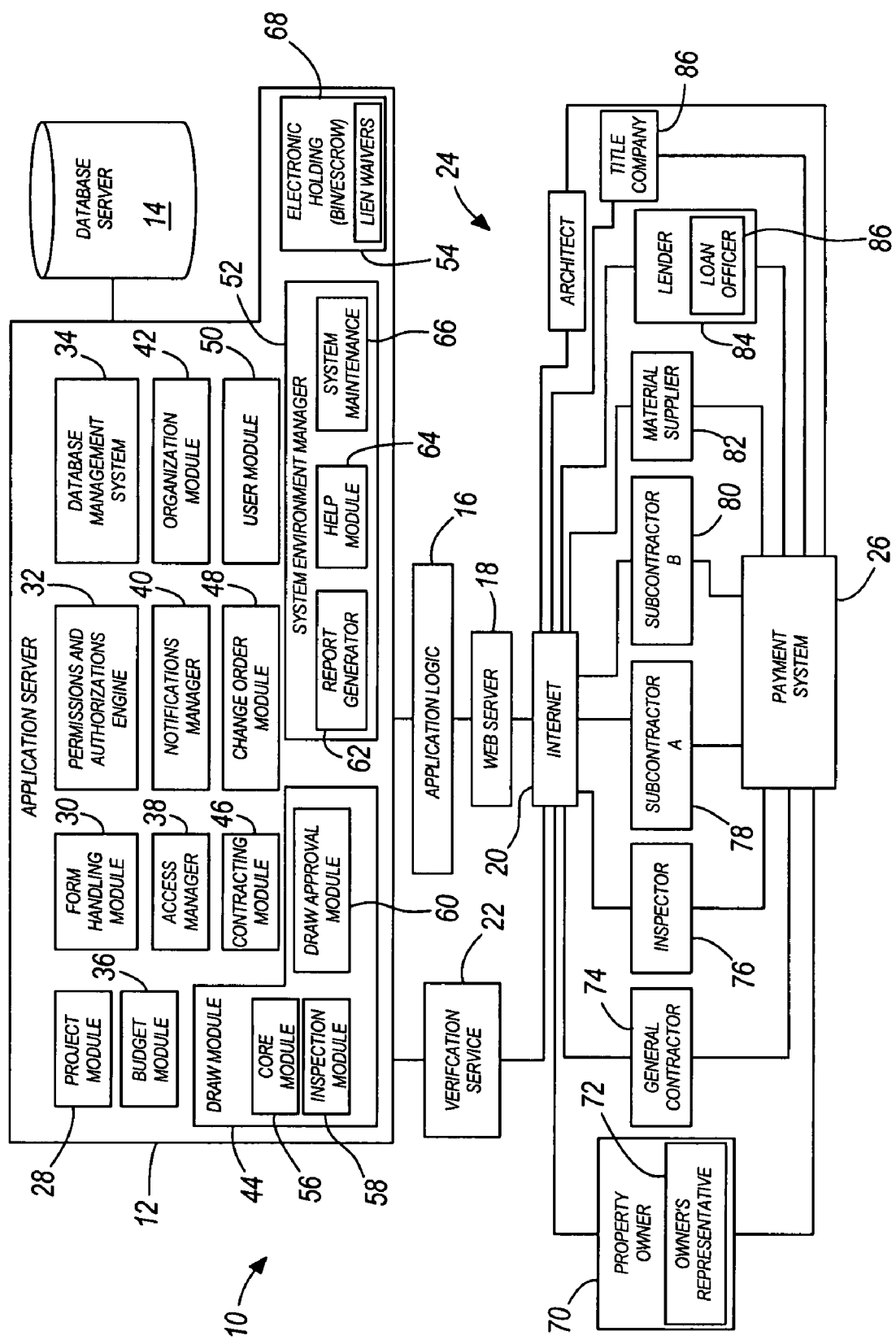
FIG. 1 is a schematic illustration of a construction payment management system according to one embodiment of the invention.

FIG. 1 illustrates a construction payment management system (CPMS) 10 according to one embodiment of the invention. The CPMS 10 can include an application server 12, a database server 14, an application logic module 16, a web server 18, a network 20 (such as the Internet or other networks individually or in combination with the Internet), a verification service 22, participating organizations or individuals 24 (hereinafter "participant" or "organization"), and a payment system 26. The payment system 26 can include an automated clearing house (ACH) system, a wire transfer system, a debit card system, a credit card system, a check generating system that can generate checks, drafts, bills of exchange, promissory notes, IOUs, debit notes, or other negotiable instruments, or any other suitable electronic funds transfer (EFT) system.

The application server 12 can store and provide access to a project module 28, a form-handling module 30, a permissions and authorizations engine 32, a database management system 34, a budget module 36, an access manager 38, a notifications manager 40, an organization module 42, a draw module 44, a contracting module 46, a change order module 48, a user module 50, a system environment manager 52, and an electronic holding bin/escrow 54. The draw module 44 can include a core module 56, an inspection module 58, and a draw approval module 60. The system environment manager 52 can include a report generator 62, a help module 64, and a system maintenance module 66. The electronic holding bin/escrow 54 can store one or more lien waivers 68. It should be understood that the components of the application server 12 could be combined in a different manner than as shown and described with respect to FIG. 1. The software used to code the various modules, managers, and engines of the application server 12 can be combined or separated in any suitable manner and can be stored and accessed in any suitable manner.

The application server 12 can be connected to the database server 14, the application logic module 16, and the verification service 22. However, in some embodiments, the verification service 22 may only be connected to the network 20. The application logic module 16 can be connected to the web server 18 or, in some embodiments, directly to the network 20. The web server 18 can be connected to the network 20.

The participants 24 can include a property owner 70 (and/or the owner's representative 72), a general contractor (GC) 74, an inspector 76, one or more subcontractors (Subcontractor A 78, Subcontractor B 80, etc.), one or more material suppliers 82, one or more lenders 84 (and/or one or more loan officers 86), one or more title companies 86, and one or more architects 88. The participants 24 can also include one or more interior designers (and/or furniture manufacturers) and one or more real estate owners (i.e., the land owner who sells the construction site to the property owner 70). The participants 24 can include organizations and/or individuals that are either considered "above the line" (i.e., higher in the construction process than the GC) or "below the line" (i.e., employed by the GC). Participants 24 above the line can include lenders, architects, interior designers, property owners, property owners' representatives, title companies, and real estate owners. Participants 24 below the line can include subcontractors and material suppliers. The CPMS 10 can be used to facilitate the construction payment process between any of these types of participants 24, whether above or below the line of the GC. The CPMS 10 is often described herein as being used to facilitate payment between a GC and subcontractors. However, it should be understood that the CPMS 10 can be used to facilitate payment between any type of participant, not only between a GC and subcontractors.

In addition to classifying participants as being above or below the line of the GC, costs associated with the construction process can be classified as "soft" costs or "hard" costs. Soft costs can include inspector fees, architect fees, interior design fees, title company fees, permit fees, utility bills for the property during the construction process, furniture costs, audio/visual equipment, computers, etc. Hard costs can include all the costs incurred by the organizations or individuals employed by the GC, including all costs for subcontractors and material suppliers employed by the GC. Each construction project can include an overall budget (from the owner's perspective) that includes all of the soft and hard costs. Each construction project can also include a GC budget. The CPMS 10 can be used to facilitate all the payments made within the overall budget and the GC budget. However, in some embodiments of the invention, the CPMS 10 can be used only to facilitate payment of the hard costs managed by the GC (i.e., only the GC budget). It should be understood by one of ordinary skill in the art that the CPMS 10 can be used to facilitate payment for only hard costs by the GC, only soft costs by participants above the line of the GC, or a combination of hard and soft costs by participants above and below the line of the GC. The CPMS 10 is often described herein with respect to hard costs, but can also be used for soft costs or a combination of hard and soft costs.

Each one of the participants 24 can be connected to the payment system 26; however, some of the participants 24 may not be connected to the payment system 26 in some embodiments of the invention. In some embodiments, the payment system 26 can include an ACH system with one or more originating depository financial institutions (ODFI) and one or more receiving depository financial institutions (RDFI).

The participants 24 can access the application server 12 in order to use the various modules, managers, and engines to perform construction payment management methods according to several embodiments of the invention.

In some embodiments, the CPMS 10 can connect all project participants to a substantially uniform, web-based, real-time system; can organize the budgeting for the construction project; can facilitate the electronic submission and approval of invoices; and can automate and streamline the payment and lien waiver release process through the use of electronic payments and production of the matching electronic lien waiver releases.

While there can be variations in details (for instance, in a publicly financed project, initiation and oversight of the project might be done by a surety bond issuer, rather than a bank), one embodiment of the CPMS 10 can be used as follows. A loan officer can sign on to the Internet and enter the CPMS web site. After a security clearance, the loan officer can enter the lender's portfolio and access a series of screens to create a new project by entering all of the project details. The project details can include details of the participants for each project, for example, the owner, architect, general contractor and title insurance company. Each participant can receive email notification of their involvement in the project and can verify their profile details. The GC can add subcontractors and material suppliers. The subcontractors and material suppliers can receive notification that they have been added to the project and can go through the security and verification process. The GC can select the number of draws and the draw dates for the project. The CPMS 10 can notify participants of a pending draw date in real-time. Each participant can complete their draw request form by entering their material and labor invoice details. The GC can review the draw requests and authorize them, and the CPMS 10 can generate the sworn statement. A series of project site inspections, approvals, completion of lien waivers, generation of statements, etc. can follow, all of which can be prompted by the CPMS 10 through email notifications in real-time. Once all forms have been completed and verified, the CPMS 10 can facilitate payments. The payments can be deposited directly into a participant's banking account via an electronic payment system. This process can be repeated for all draws. The project budget can be kept in balance through the completion of pay outs, collection of lien waivers, and approved inspections. Project progress can be tracked through the CPMS 10 via graphical progress indicators.

The CPMS 10 can include the following features: one-time registration of participating organizations into the CPMS 10; real-time notification of a draw; automated invoice generation; automated sworn statement generation; automated lien waiver generation; coordinated payment/lien waiver release; and direct distribution of funds to participating organizations.

The one-time registration of participating organizations into the CPMS 10 can lower the cost of participating in the service because a participant has to register only once. The one-time registration also lowers the number of potential errors because the entry of registration information only has to be done once. This makes it more likely that potential participants will in fact participate and, when participants do participate, that they will have a good (error free) outcome. The one-time registration helps ensure that a party wishing to be a participant in the process and the online community using the process, only needs to register once to be able to participate in any of the projects whose payments are executed through the CPMS 10. The CPMS 10 can improve the efficiency of the registration of participating organizations into the construction payment process by creating a durable community that facilitates the process of participating on multiple projects over time by capturing organization and individual information once. The method allows organizations to be registered as a potential participant in any project that is being initiated by a member of the community of businesses using the CPMS 10. In addition to its value in participating in multiple projects, the one-time registration is also valuable for participants to access information regarding multiple GC's, owners, lenders, subcontractors, etc. For example, the one-time registration gives owners, lender, and GC's the opportunity to learn about new subcontractors through the CPMS 10. Also, an owner that has several projects pending each with different GC's can access information about each individual GC.

The real-time notification of the draw helps ensure that all participants in a draw are: 1) notified in a timely and uniform way; and 2) provided with a template to provide the information necessary to be paid. The CPMS 10 helps to eliminate the errors (not getting notified or mistaking which project the request is coming from) that delay the payment process. The CPMS 10 improves the efficiency of the real-time notification of the draw process by giving the GC the option of maintaining the schedule of draws on the CPMS 10, by reducing the effort of notifying the participants in the draw, by automating the process of building the list of participants for a draw, by automatically notifying draw participants of the draw once it has been declared, and by providing readily accessible links so that subcontractors can access the CPMS 10 to submit the documentation that is required by the draw.

The CPMS 10 can be used by an owner, owner's representative, lender, GC, or title company to create and maintain a project budget. As noted above, the project budget can include soft costs above the line of the GC, hard costs below the line of the GC, or a combination of hard and soft costs. Some embodiments of the CPMS 10 can also be used to create and manage change orders in which the budget is modified (generally by expanding the budget) and the modified budget is approved by the appropriate participants. The budget can include a total cost for the construction project, along with line item costs for each phase or job that must performed to complete the construction project. The CPMS 10 can structure the budget to facilitate the payment of subcontractors, to allow efficient progress tracking, and to allow automated invoicing.

The CPMS 10 can create automated invoices that correspond precisely to the overall project budget and that also correspond precisely to the lien waivers and sworn statements. The CPMS 10 creates automated invoices that are a snap-shot in time of the activity that has already occurred against the overall project budget. The CPMS 10 can be used to create automated invoices that correspond precisely to the line items in the overall budget. This results in invoices and reports that are consistent with the way in which the construction project is broken down for financial purposes, tracking purposes, etc. Using the CPMS 10, an invoice screen can be used to capture information necessary to create the invoice; however, not all of the information necessary to create the invoice must be re-entered, because the information can be gathered by referring to the overall project budget. This also guarantees that the invoices (and the G702/703 documents) will be consistent with the overall project budget and will be consistent between draws or between any other time periods (unless a participant such as the owner wants the invoices to change). The CPMS 10 can also be used to customize the automated invoices (or the G702/703 documents) according to the requirements of the lender, the owner, the owner's representative, the GC, etc.

The budget and the automated invoices can be used to uniformly collect and continually reference information that will be used throughout the construction payment management process. The information collected does not have to be re-entered again in the payment process helping to ensure that errors (either key-stroke or due to a misinterpretation of the data) are not introduced. In general, participants have visibility into the payment process conducted using the CPMS 10. This helps to lower the effort necessary to determine the project status and to understand what work each participant must to do to facilitate the payment process. It also helps to highlight organizations or individuals who may habitually cause delays or errors in the process, making it easier to correct the behavior or eliminate the participant. Accurate invoicing minimizes invoice review and issue resolution effort, promotes complete and accurate sworn statements, minimizes discrepancies between sworn statements and inspections, and enables timely payment. The CPMS 10 can improve the efficiency of several activities later in the construction payment process by capturing complete and consistent invoice information in a timely manner.

The CPMS 10 can be used to generate automated sworn statements and automated lien waivers. Using the CPMS 10, the GC knows who was notified of the draw and who has responded by providing an invoice. Once the invoices are approved by the GC (and any other participant above the line of the GC, such as the owner, the owner's representative, the lender, the title company, etc., that must approve the invoices), the CPMS 10 can use the approved invoices to automatically generate the sworn statement and the lien waivers. The CPMS 10 can automatically generate the sworn statement and the lien waivers from the invoices submitted by subcontractors and material suppliers, helping to ensure that no typographical errors will be introduced and that the sworn statement and lien waivers will only include line items that have been submitted by the subcontractors and material suppliers. The CPMS 10 can help reduce the risk of inaccuracies in the sworn statement and the lien waivers by drawing on the invoice details already stored in the system to automatically create the content of the sworn statement and the lien waivers. This processing helps eliminate errors that are possible due to nonstandard, inconsistent, and untimely invoices and typographical errors that can occur during transcription. Overall, this lowers the risk profile of the construction payment process by increasing the accuracy and timeliness of critical construction project information. The CPMS 10 can create the automated lien waivers according to the legal standards of the state in which the construction site is located.

The CPMS 10 can generate sworn statements that correspond precisely to the invoices. Invoices are often broken down by the type of work being performed (e.g., electrical, plumbing, etc.), while sworn statements are often broken down by the participant performing the work (e.g., GC, subcontractors, and material suppliers). The CPMS 10 can be used to ensure that the sum of the invoice amounts equals the total amount on the sworn statement. Also, the CPMS 10 can also be used to ensure that the amounts on the lien waivers equal the amounts on the invoices, because the information for the automated lien waivers is gathered from the approved invoices that have been stored in the CPMS 10. In addition, the lien waivers will be consistent with the sworn statement because the sworn statement was also generated by the CPMS 10 using the information from the approved invoices. This is particularly valuable when GC's and subcontractors (or owners, lender, and GC's) have disputed the invoice amount and have negotiated a final amount over a period of time. The final amount will be reflected in the automated and approved invoice that is stored in the CPMS 10 and used to generate the lien waivers and sworn statement. The CPMS 10 assures that only the approved invoice amount will be reflected in the lien waiver and sworn statement documents. By also using the stored budget as a framework for all automated documents, the CPMS 10 further assures that the invoices, lien waivers, and sworn statements will be precise and consistent. The CPMS 10 can also be used to customize the sworn statements and lien waivers based on the requirements of the lender, the owner, the owner's representative, the GC, etc.

The CPMS 10 also helps improve the efficiency of generating sworn statements and lien waivers by migrating storage of the invoice, sworn statement, and lien waiver documents to an electronic medium, reducing the time and effort necessary to store and access them. This improves the overall efficiency of the construction payment process by making these documents available to authorized parties needing them to carry out their responsibilities. The database of the CPMS 10 can store a library of electronically signed invoices, sworn statements, and lien waivers. If necessary, participants can use the CPMS 10 to generate hard copies of any of the electronically signed documents.

In one embodiment, the CPMS 10 can create the automated invoices, sworn statement, and lien waivers once all information has been entered and all issues have been resolved. In other embodiments, the CPMS 10 can create the automated invoices first, ensure the invoices are approved, create the automated sworn statement second, ensure the sworn statement is signed, and create the automated lien waivers third.

Once all of the information (invoices, inspection reports, banking information, etc.) has been entered and all issues have been resolved, the owner, the owner's representative, the lender, the title company, or the GC can pay the participants in the draw. The sub-contractors, material suppliers, or any other participants can provide their lien waivers in exchange for payment. The CPMS 10 can organize this process and can automatically execute the exchange without risk that either party will do their part without the other doing theirs. The CPMS 10 also helps eliminate the need for expensive and time consuming in-person meetings to affect the exchange of lien waivers for payment. The CPMS 10 (which rigorously tracks the documents) also helps to ensure that all of the lien waivers are collected. This reduces the risk that bad record keeping will result in lien waivers that have not been released at the conclusion of the construction project. The CPMS 10 can improve the efficiency of the payment/lien waiver release process by implementing the method in a network-enabled computer system. This allows all parties to securely prepare both payment and lien waiver release in a trusted environment. The CPMS 10 facilitates an efficient exchange of payment for lien waiver, because the CPMS 10 allows both the payment and lien waiver to be staged in preparation for an automated exchange thereby reducing the risk associated with the project. The GC can be assured that it will receive the appropriate lien waivers coincident with payment, and the subcontractors do not bear the risk associated with lengthy delays in payment.

The CPMS 10 can facilitate an exchange of lien waivers and payment instructions. In some embodiments, the CPMS 10 can release the lien waiver(s) substantially simultaneously with an acknowledgement from the payment system 26 that the participant(s) have received payment. The term "substantially simultaneously" as used herein and in the appended claims includes any time period less than the time necessary to request, process, and transfer funds with an automated clearing house (ACH) payment (which can take up to about 72 hours). For example, the "substantially simultaneously" release of lien waivers can include an immediate release of lien waivers, a release of a batch of lien waivers at the end of a business day, or a release of lien waivers after the typical time period that it takes to transfer funds via an ACH system. In one embodiment, the CPMS 10 can receive and store the lien waivers in the electronic holding bin/escrow 54 until all lien waivers from the participants in the draw have been received. Once all the lien waivers have been received, the CPMS 10 can send instructions for the payment system 26 to transfer funds to each participant in the draw. For example, once all the subcontractors electronically sign and submit their lien waivers to the CPMS 10, the CPMS 10 can instruct the payment system 26 to pay each subcontractor. The CPMS 10 can release the lien waivers either when the payment instruction is transmitted to the payment system 26 or only after receiving an acknowledgement that the participants have actually received funds.

If the payment system 26 includes an ACH system, the payment instructions are generally processed in batches so that the participants will not receive the funds immediately. In an ACH system, the payment instruction can generally be returned by the RDFI during a 48 hour period. During this 48 hour period, the RDFI can notify the CPMS 10 and the ODFI that the funds cannot be transferred (e.g., due to insufficient funds, an invalid account number, etc.). After this 48 hour period, the CPMS 10 can assume that the RDFI has processed the payment instruction if the CPMS 10 has not been notified otherwise. The ODFI generally has a 24 hour front window to collect the payment instructions from the RDFI and to release payment to the accounts of the participants in the draw. As a result, it can take about 72 hours from the time the CPMS 10 transmits the payment instructions until the ODFI transfers funds into the accounts of the participants.

In some embodiments, the CPMS 10 can flag certain participants to remove those participants from the batch processing of the ACH system and can pay those participants separately by another method, such as by a direct wire transfer of funds or another immediate type of electronic funds transfer. In other embodiments, most participants can be paid by an immediate type of electronic funds transfer (such as a direct wire transfer), but some participants can be combined for one or more ACH batch transfers. In still other embodiments, the CPMS 10 can transmit each payment instruction to the payment system 26 as the CPMS 10 receives each lien waiver from each participant and funds can be transferred immediately to the participant from which the lien waiver was received. In general, the CPMS 10 can group the payment instructions in any suitable manner and can use any suitable type of payment method.

In each embodiment of the invention, the CPMS 10 can establish a connection between the current lien waiver and the current payment corresponding to the current draw, rather than exchanging the previous lien waiver for the current payment of the current draw. For example, the CPMS 10 can release the lien waiver for the current month for the current draw, rather than releasing the lien waiver for the previous month for the current draw. In this manner, the subcontractor is not exposed to liability if the CPMS 10 releases its lien waiver before payment is made, and the owner (or GC, title company, lender, etc.) is not exposed to liability if the CPMS 10 makes payment before the lien waivers are released.

Rather than paying the GC who pays its subcontractors who then pay their subcontractors, participants in the CPMS 10 can be paid directly using an electronic distribution of funds (e.g., any suitable type of EFT, ACH, or wire transfer of funds). This speeds up the payment process (lowering costs) and reduces the risk that parties (in the hierarchy) will not be paid. The direct distribution of funds is made possible by the CPMS 10 being used to collect all of the information that is necessary to make payments. The information collected using the CPMS 10 can be trusted, because of the rigor with which the methods can be implemented with software. As a result, the direct distribution of funds can be efficient (no reworking or reentry of information necessary) and error free. The CPMS 10 can improve the efficiency of the subcontractor/material supplier payment process by reducing the elapsed time necessary to complete the payment process. The CPMS 10 can reduce transaction costs by replacing a hierarchical payment process with direct payments, while improving fiscal and management control. The CPMS 10 can replace the use of checks by an electronic transfer of funds, reducing communications costs and improving visibility into the status of payments and reducing the risk of untimely or incomplete payment to all parties involved in the construction process (especially those lower on the supply chain).

Figure 2:
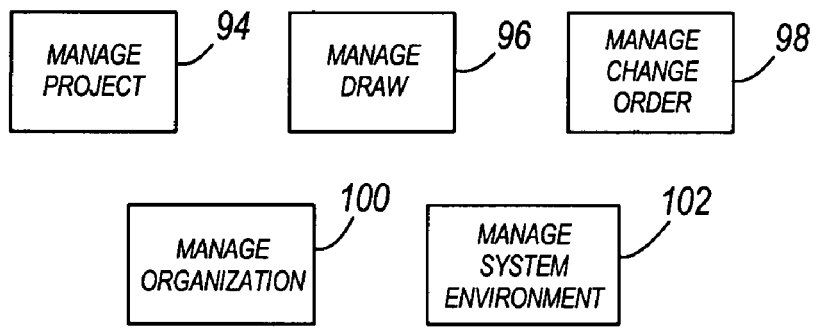
FIG. 2 is a schematic illustration of construction payment management processes that can be performed using the system of FIG. 1.

FIGS. 2-7 illustrate an overview of the construction payment management processes that can be performed by the participants 24 using the various modules, managers, and engines stored in the application server 12. FIG. 2 illustrates a manage project process 94 (which can be performed by the project module 28 and/or the budget module 36), a manage draw process 96 (which can be performed by the draw module 44), a manage change order process 98 (which can be performed by the manage change order module 48), a manage organization process 100 (which can be performed by the organization module 42 and/or the user module 50), and a manage system environment process 102 (which can be performed by the access manager 38, the notifications manager 40, and/or the system environment manager 52).

Figure 3:
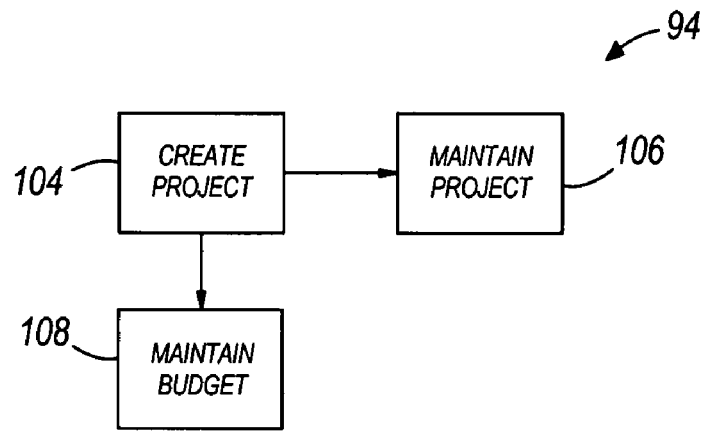
FIG. 3 is a schematic illustration of a manage project process.
Figure 4:
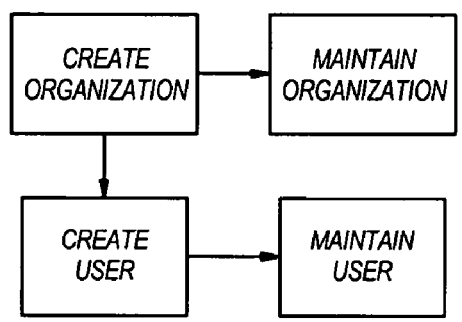
FIG. 4 is a schematic illustration of a manage organization process.
Figure 5:
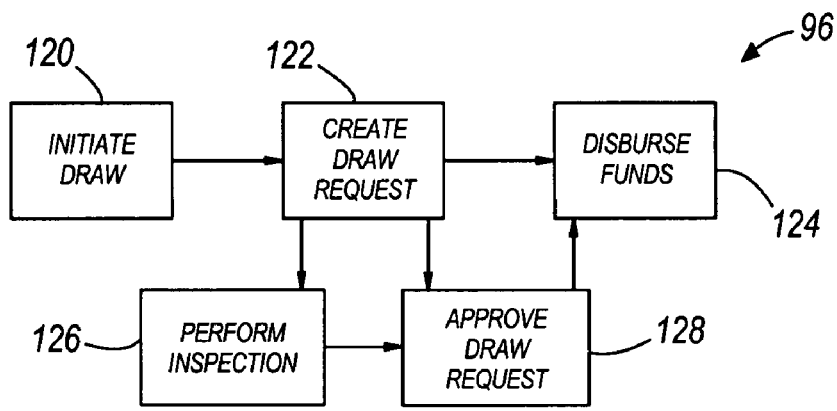
FIG. 5 is a schematic illustration of a manage draw process.
Figure 6:
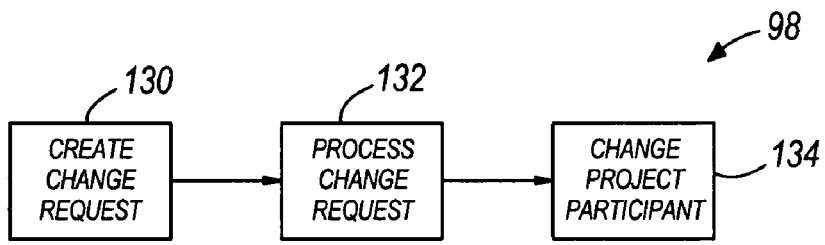
FIG. 6 is a schematic illustration of a manage change order process.
Figure 7:
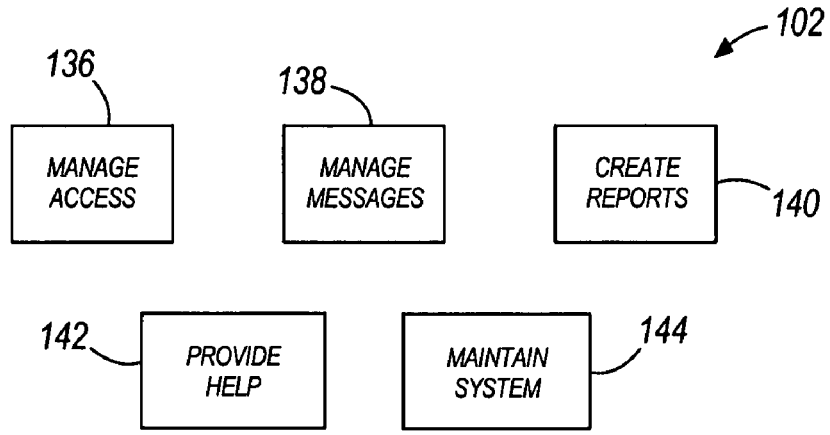
FIG. 7 is a schematic illustration of manage system environment tasks.

FIG. 3 illustrates the manage project process 94, which can include a create project task 104, a maintain project task 106, and a create budget task 108. FIG. 4 illustrates the manage organization process 100, which can include a create organization task 112, a maintain organization task 114, a create user task 116, and a maintain user task 118. FIG. 5 illustrates the manage draw process 96, which can include an initiate draw task 120, a create draw request task 122, a disburse funds task 124, a perform inspection task 126, and an approve draw request task 128. FIG. 6 illustrates the manage change order process 98, which can include a create change request task 130, a process change request task 132, and a change participant task 134. FIG. 7 illustrates manage system environment tasks 102, which can include a manage access task 136, a manage messages task 138, a create reports task 140, a provide help task 142, and a maintain system task 144. The create reports task 140 can be performed by any participant above or below the line of the GC in order to create customized reports regarding the progress of the construction project, including the ability to monitor portions of the construction project, particular participants, the overall project, etc.

Figure 8:
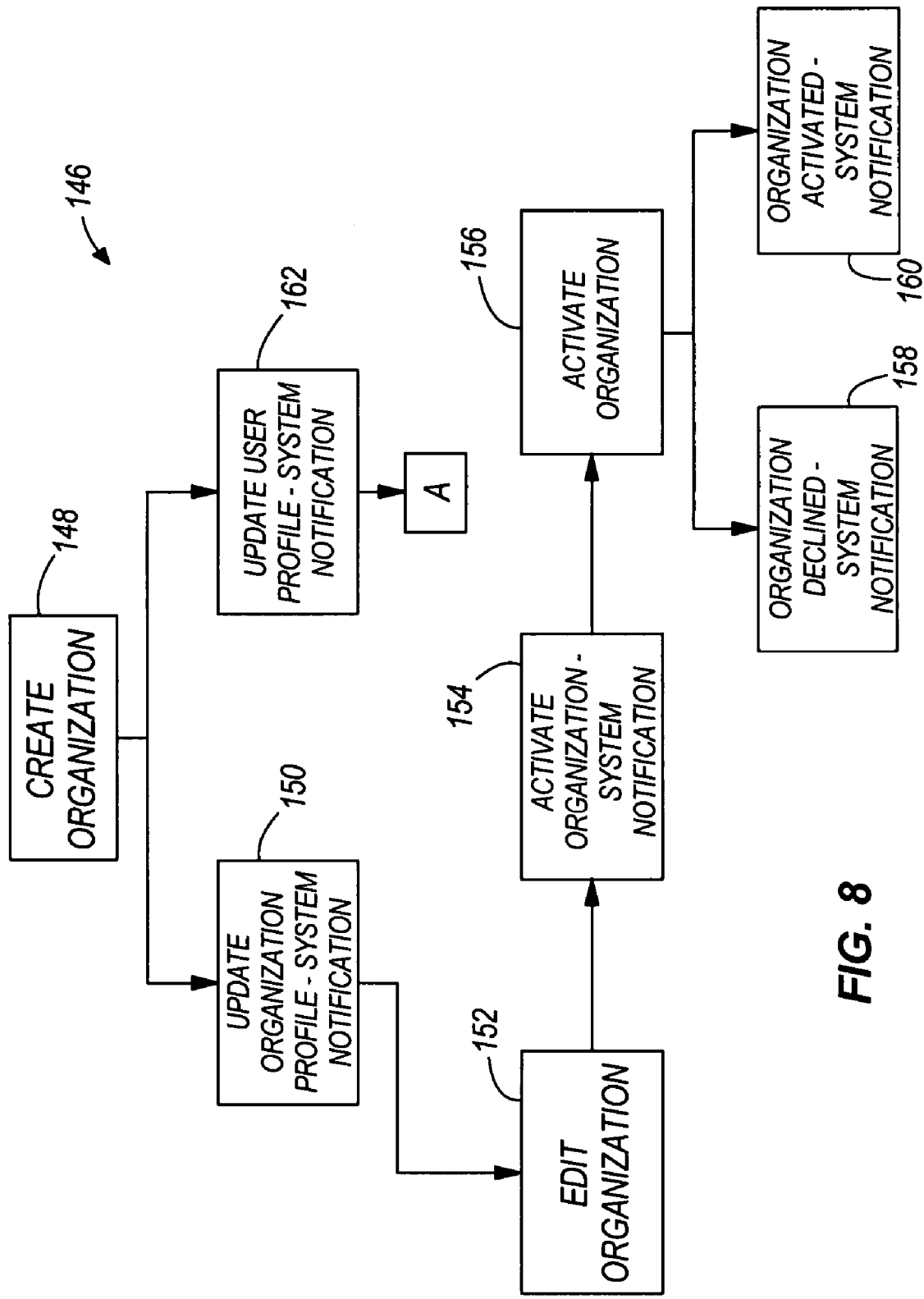
FIG. 8 is a schematic illustration of a create organization process.

FIGS. 8-136 illustrate construction payment management methods according to several embodiments of the invention. FIG. 8 illustrates a create organization process 146, which can be included in the manage organization process 100. The create organization process 146 can be performed by any of the participants 24 using the organization module 42. The create organization process 146 can include a create organization task 148, an update organization profile task 150, an edit organization task 152, an activate organization notification task 154, an activate organization task 156, and either an organization declined task 158 or an organization activated task 160. An update user profile task 162 can also be performed, as further described with respect to FIG. 22.

Figure 9:
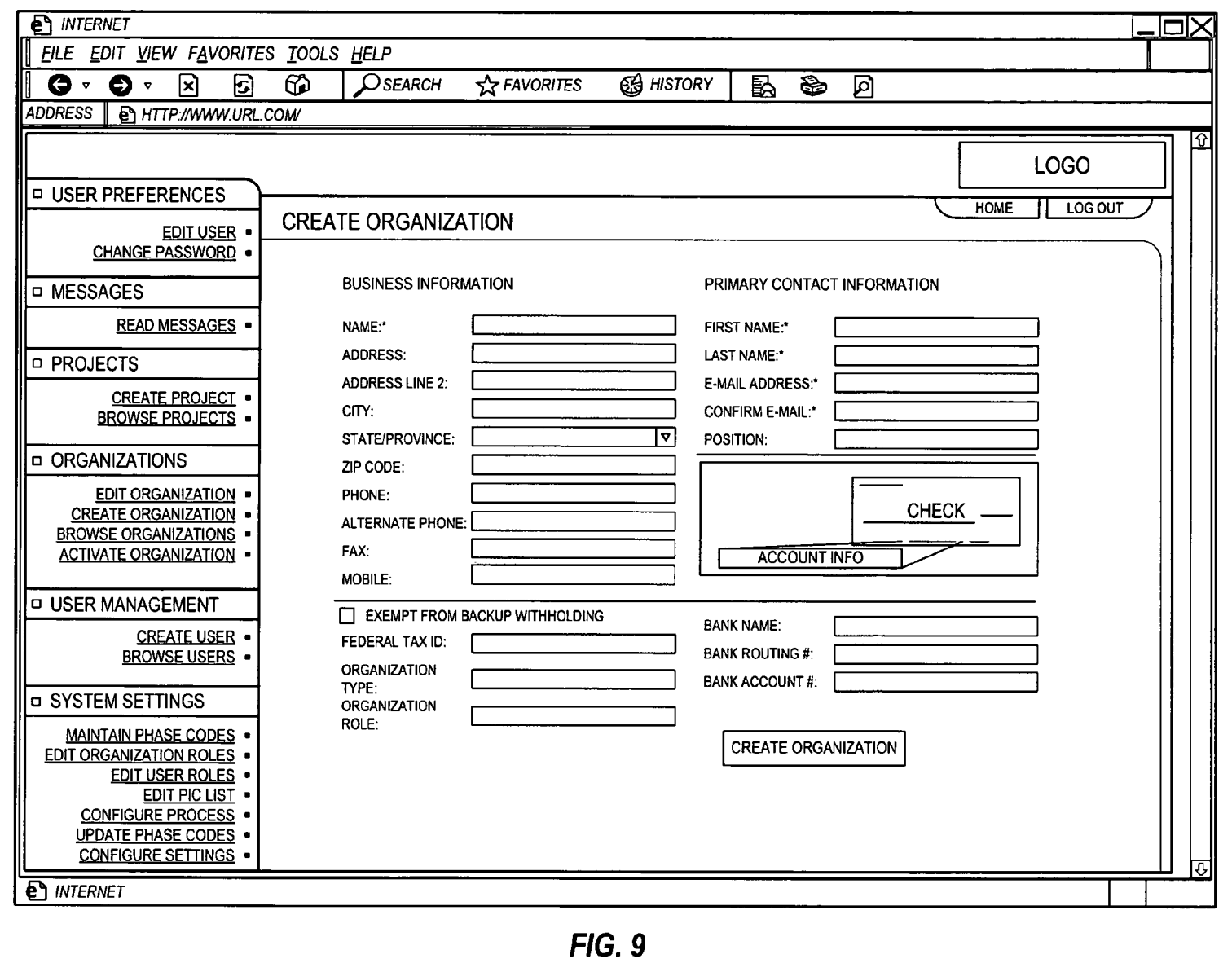

FIG. 9 illustrates a create organization form that can be associated with the create organization task 148. Each participant 24 can access the create organization form through the organization module 42. The participant 24 can enter the requested information, such as business information, primary contact information, tax information, and banking information. In some embodiments, the first user of the participating organization 24 that enters his or her information as the primary contact information can be deemed an administrator for that participant 24 and can be given more access to the information for the participant than subsequent users. The CPMS 10 can use comprehensive role-based security so that project participants only see information tailored to their specific needs in the project. Once an organization is registered in the CPMS 10, the organization can receive payments for any projects managed by the CPMS 10.

Figure 10:
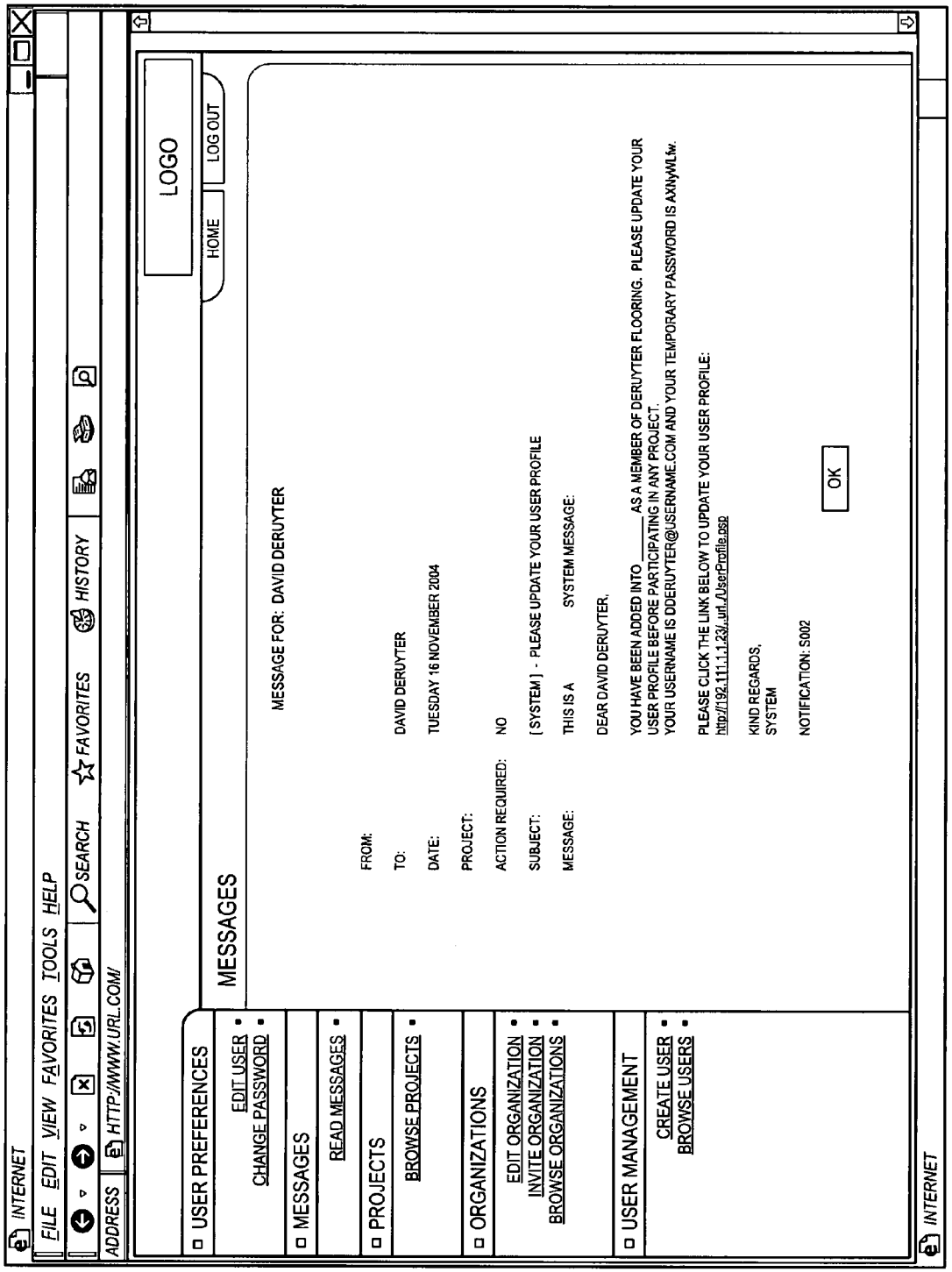
FIG. 10 is an illustration of an update user system notification.

FIG. 10 illustrates a notification that can be transmitted during the update user profile task 162. The terms "system notification," "notification," or "system message" as used herein and in the appended claims refer to any form of communication with a participant 24, such as an email message, a screen notice, a text message, a voice message, etc. The system notification of FIG. 10 can include a username and a temporary password for the first user of the participant 24.

Figure 11:
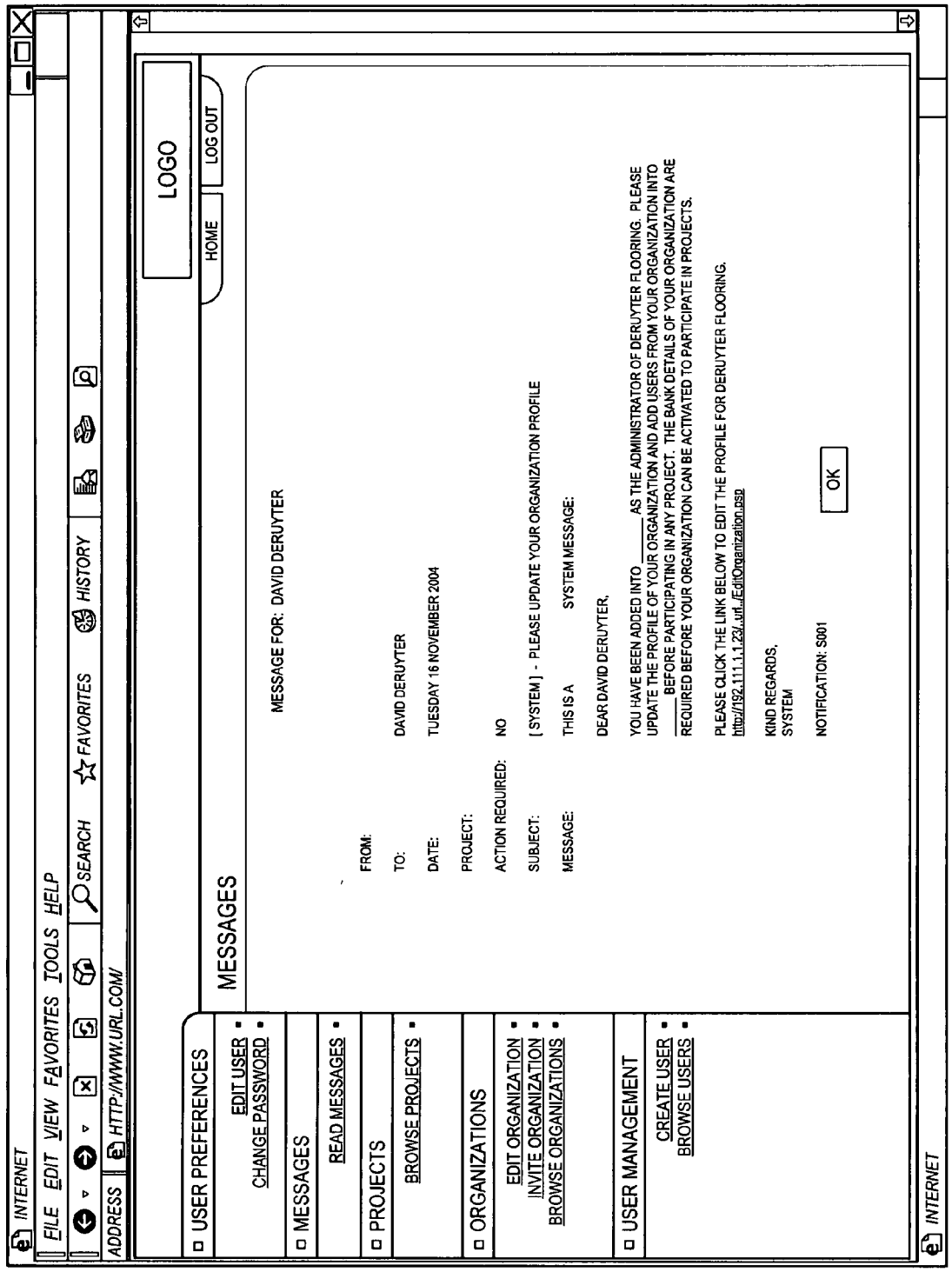
FIG. 11 is an illustration of a system notification.

FIG. 11 illustrates a notification that can be transmitted during the update organization profile task 150. The notification of FIG. 11 can be sent to the administrator for the participant 24. The notification can include a statement requesting the recipient to update the organization profile, add users before participating in a project, and provide bank details.

FIG. 12 illustrates an edit organization form that can be associated with the edit organization task 152. Each participant 24 can access the edit organization form through the organization module 42. The participant 24 can modify the existing information, such as business information, primary contact information, tax information, and banking information. In some embodiments, the first user of the participating organization 24 that entered his or her information as the primary contact information is the only user given access to the edit organization form.

Figure 13:
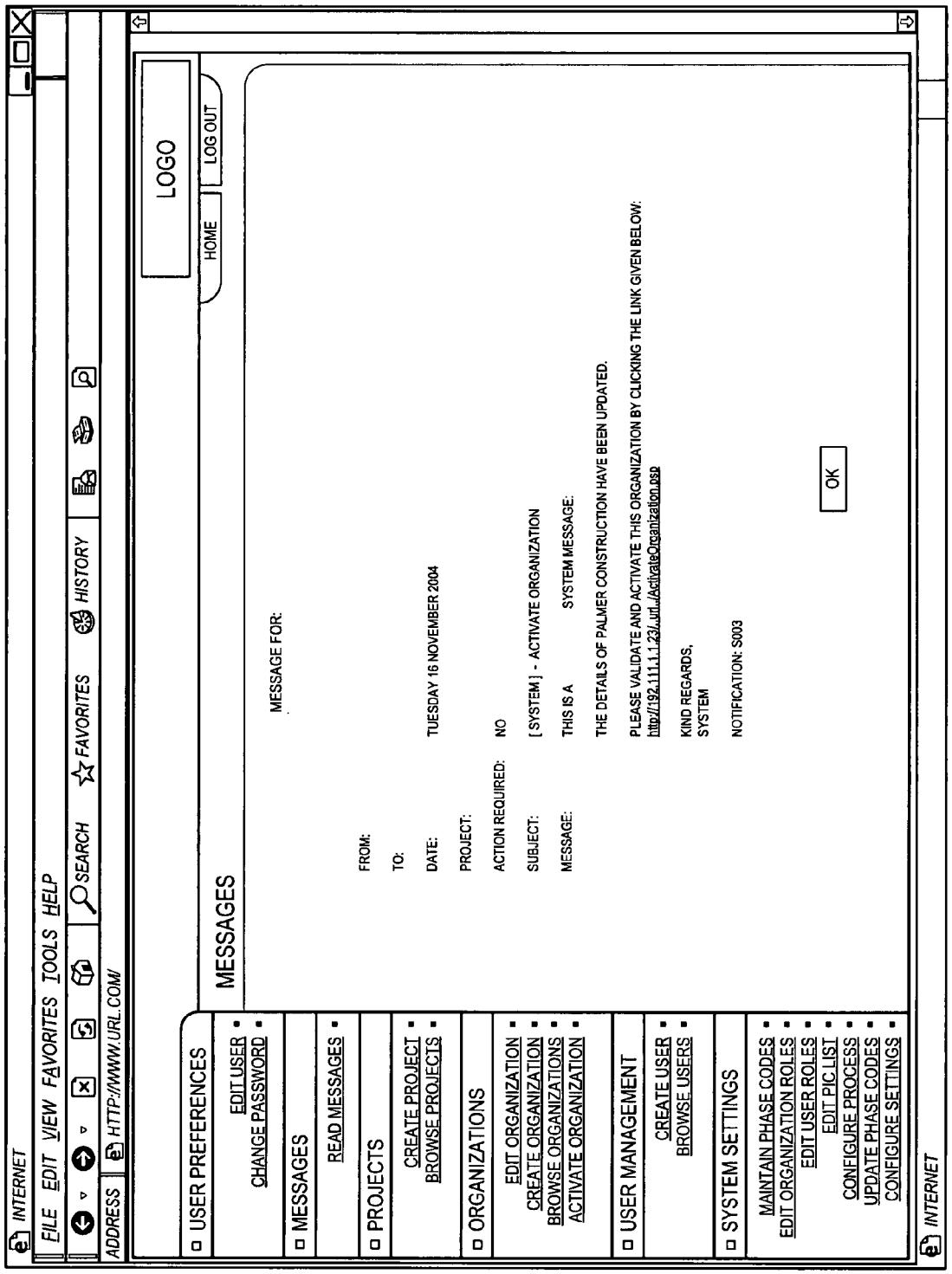
FIG. 13 is an illustration of an activate organization notification.

FIG. 13 illustrates an activate organization notification that can be transmitted during the activate organization notification task 156. The notification of FIG. 13 can include a statement that the details of the organization have been updated and a request that the organization be validated and activated.

Figure 14:
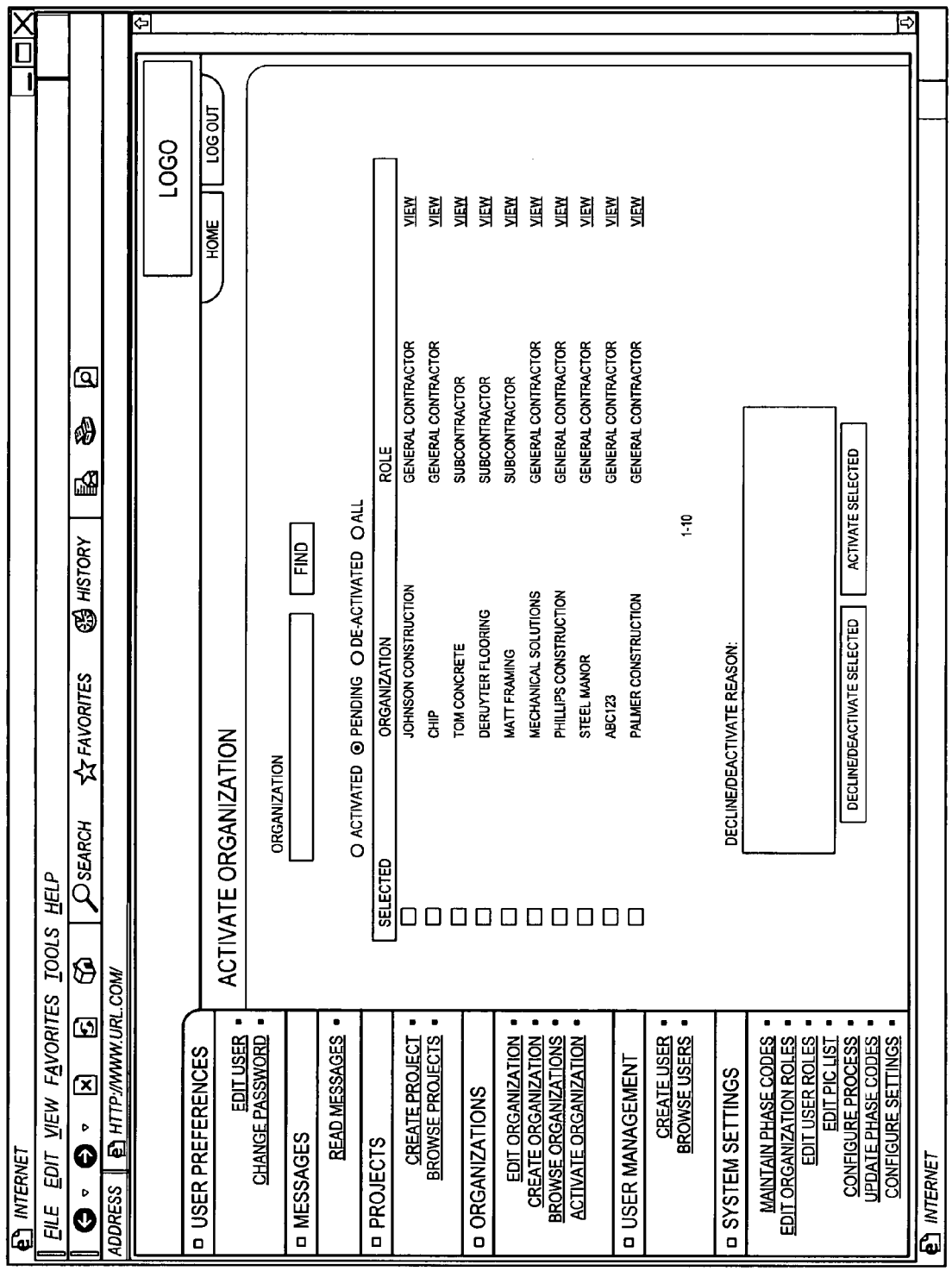
FIG. 14 is an illustration of an activate organization form.

FIG. 14 illustrates an activate organization form that can be associated with the activate organization task 156. The form of FIG. 14 can include a listing of participants 24 (e.g., including the organization name, its role in the construction process, the ability to select participants 24, and the ability to view information for the participants 24). The form of FIG. 14 can also include a "Find" feature, the ability to specify the type of participant 24, and the ability to decline/deactivate selected organizations and to provide a reason for the decline/deactivation.

Figure 15:
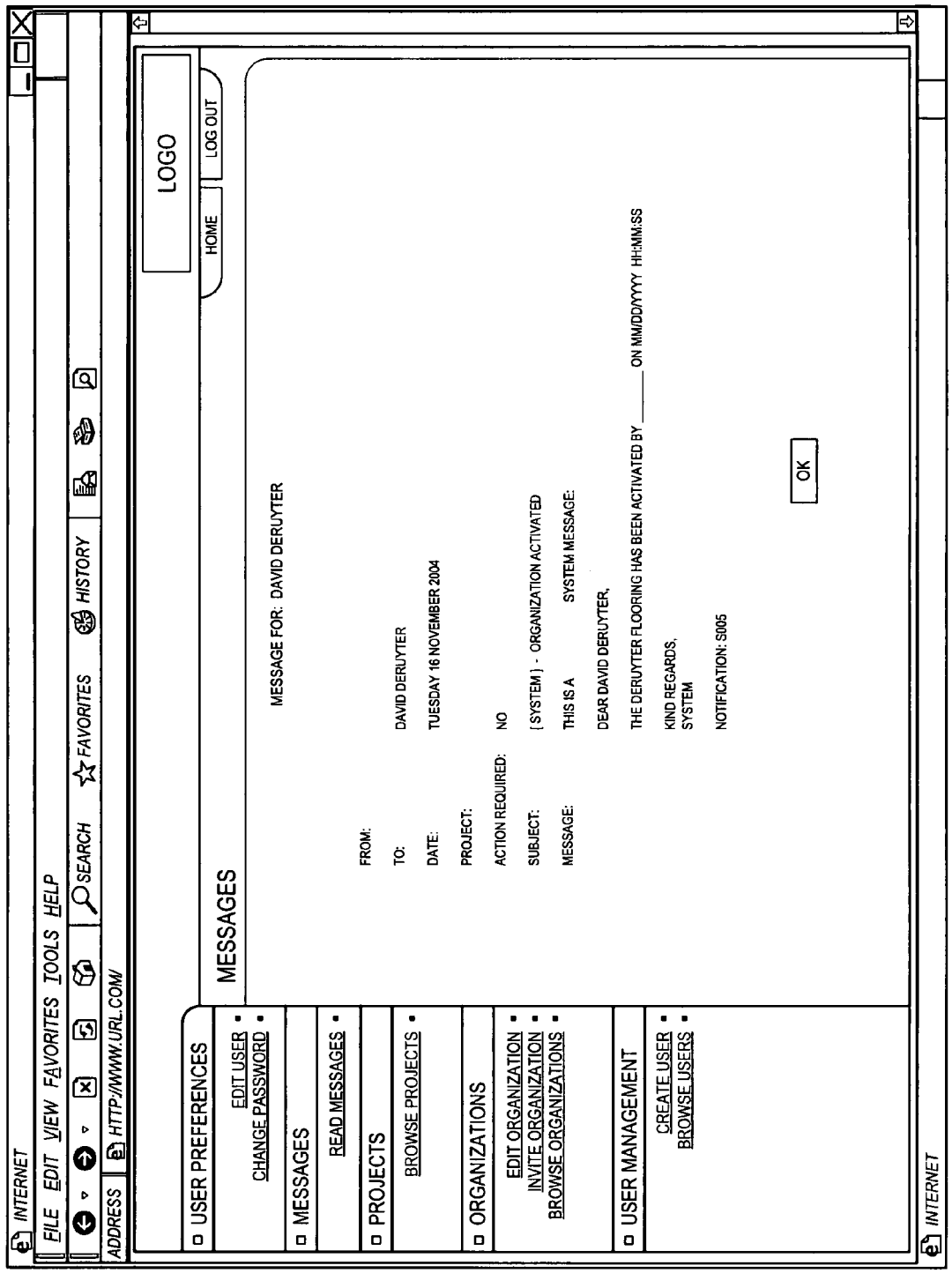
FIG. 15 is an illustration of an organization activated notification.
Figure 16:
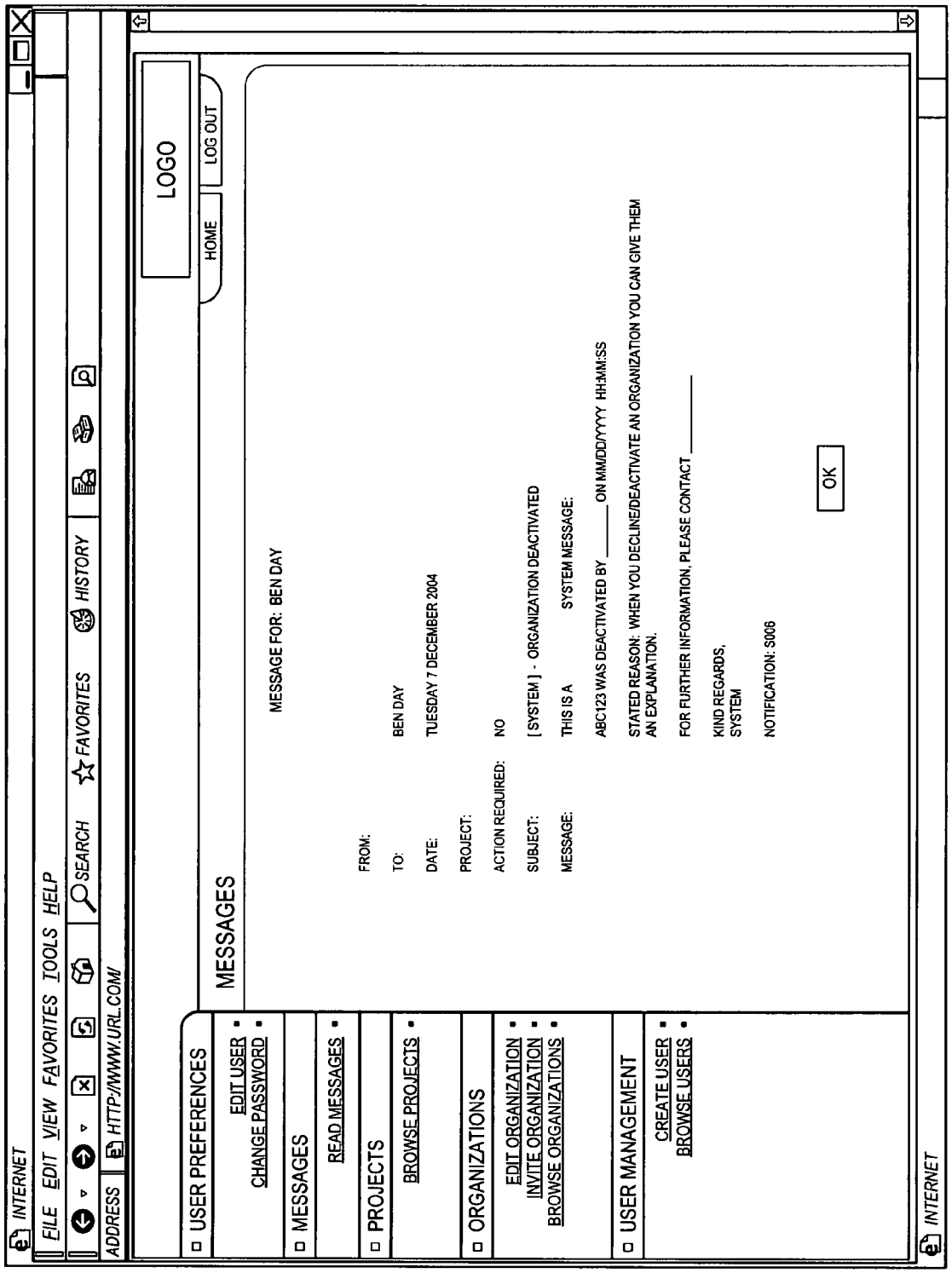
FIG. 16 is an illustration of an organization deactivation notification.

FIG. 15 illustrates an organization activated notification that can be transmitted during the organization activated task 160. Similarly, FIG. 16 illustrates an organization declined notification that can be transmitted during the organization declined task 158.

Figure 17:
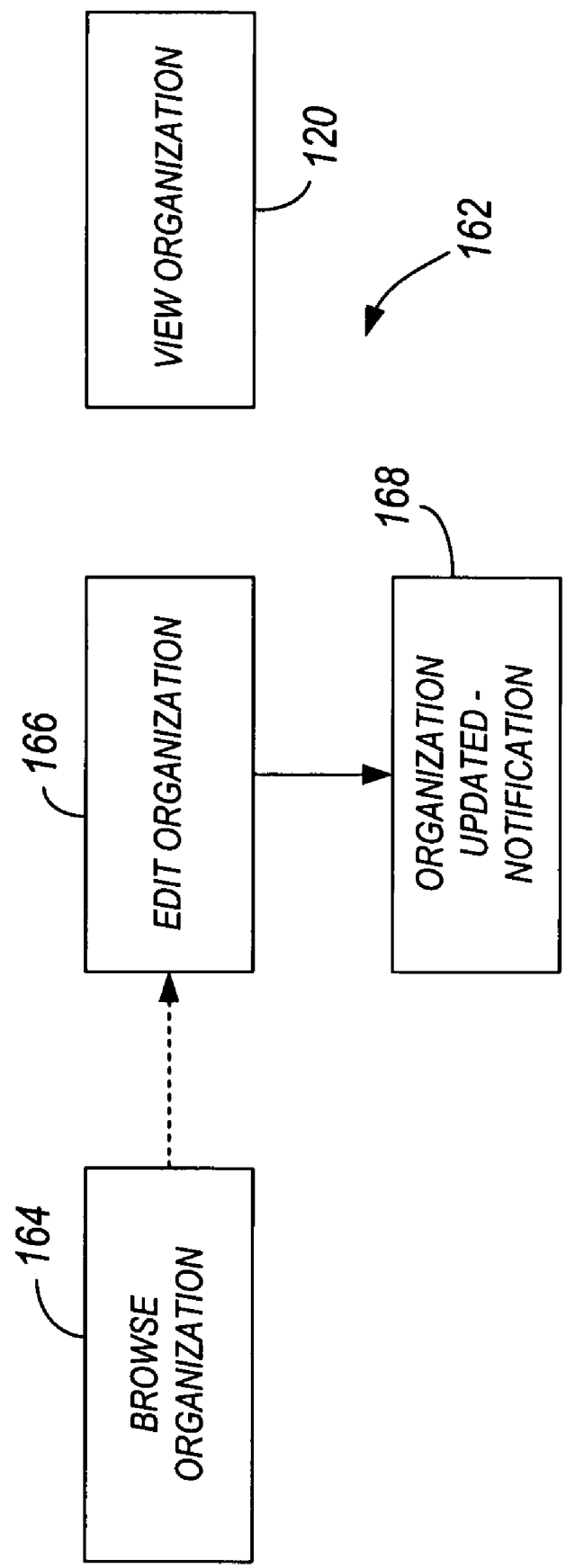
FIG. 17 is a schematic illustration of a maintain organization process.

FIG. 17 illustrates a maintain organization process 162, which can be included in the manage organization process 100. The maintain organization process 162 can be used by the organizations themselves or by other participants to maintain the accuracy of the contact information, bank account information, or any other type of information necessary for the construction payment process. The maintain organization process 162 can be performed by any of the participants using the organization module 42. The maintain organization process 162 can include a browse organization task 164, an edit organization task 166, an organization updated task 168, and a view organization task 170.

Figure 18:
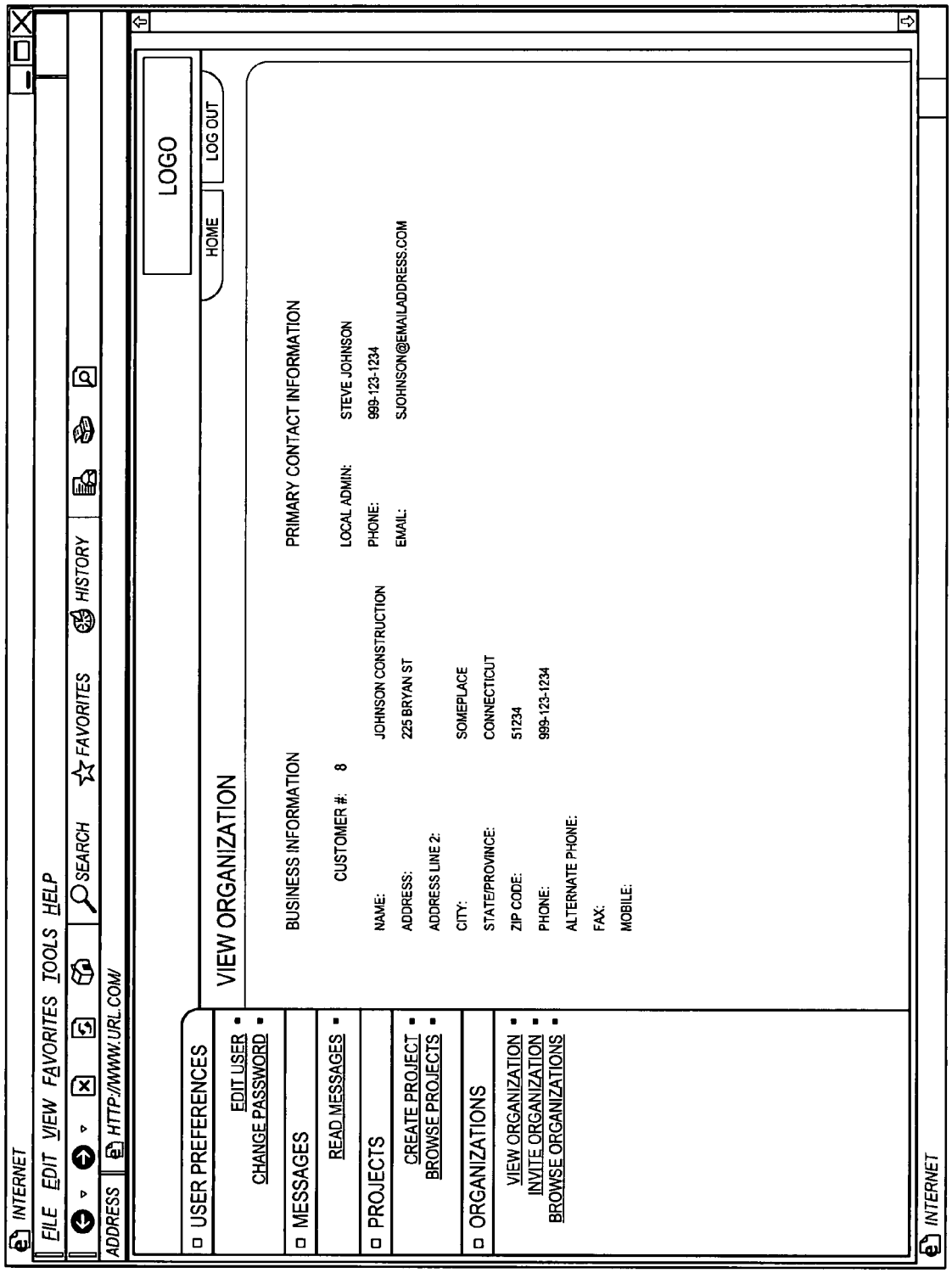
FIG. 18 is an illustration of a view organization screen.

FIG. 18 illustrates a view organization screen that can be associated with the view organization task 170. The view organization screen can include business information and primary contact information for an organization.

Figure 19:
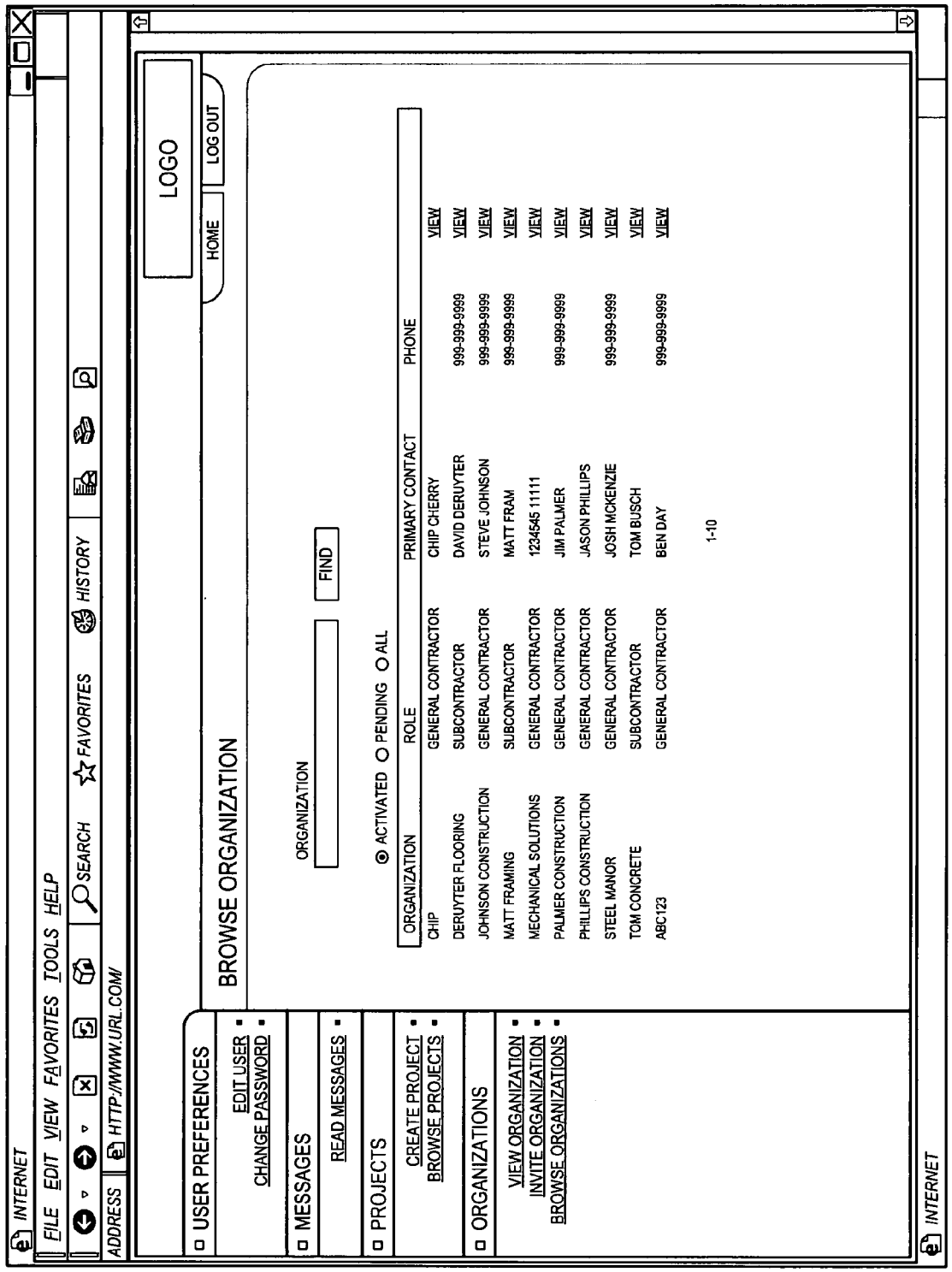
FIG. 19 is an illustration of a browse organization screen.

FIG. 19 illustrates a browse organization screen that can be associated with the browse organization task 164. The browse organization screen can include a list of participants, including the organization name, the organization role in the construction process, the primary contact, and the phone number. The browse organization screen can include a "Find" feature and links for viewing additional information about each participant. In one embodiment, the browse organization screen can be used by a GC to view its preferred subcontractors or material suppliers.

Figure 20:
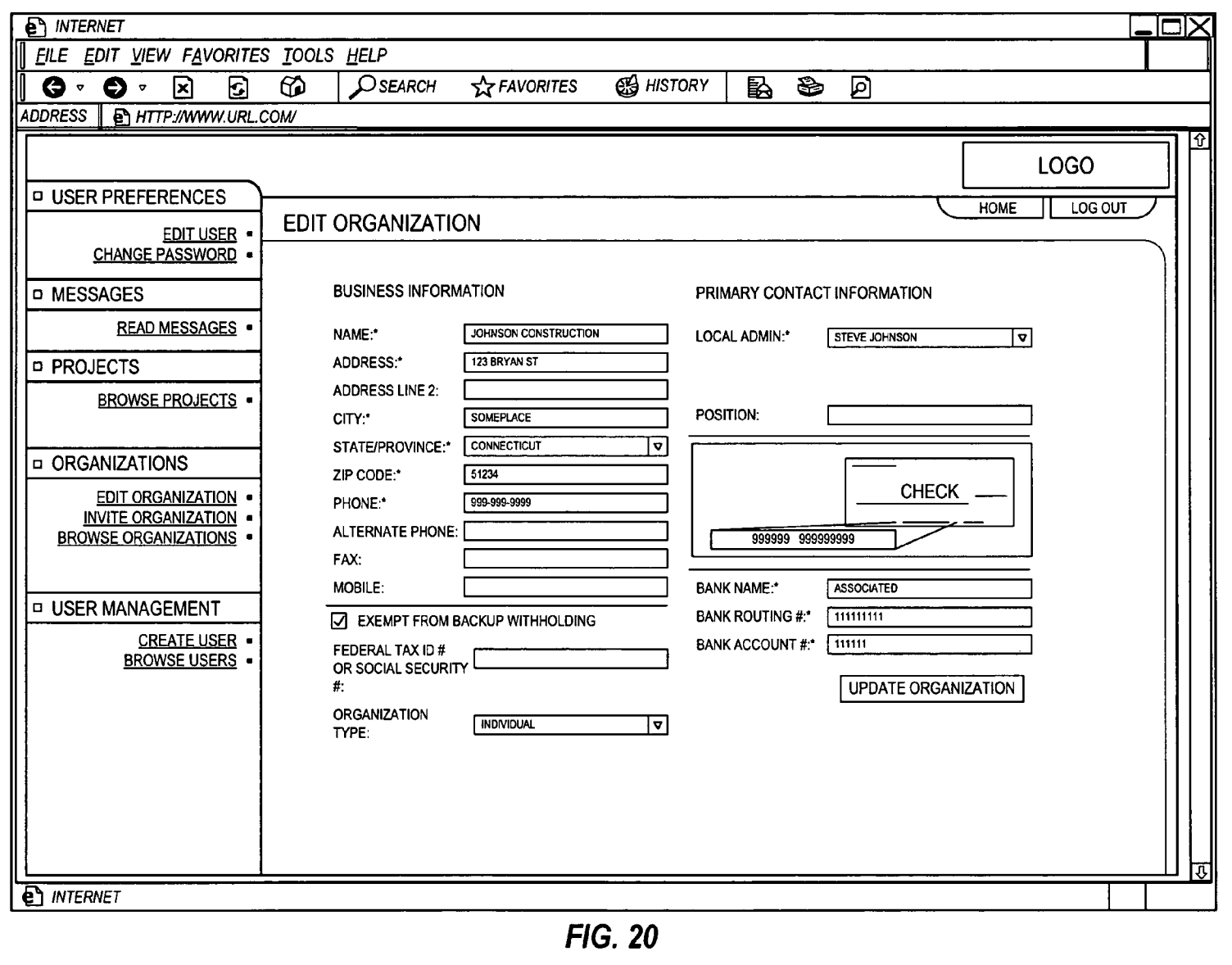

FIG. 20 illustrates an edit organization form that can be associated with the edit organization task 166. The participant can edit the existing information, such as business information, primary contact information, tax information, and banking information. In some embodiments, the first user of the organization that entered his or her information as the primary contact information is the only user given access to the edit organization form.

Figure 21:
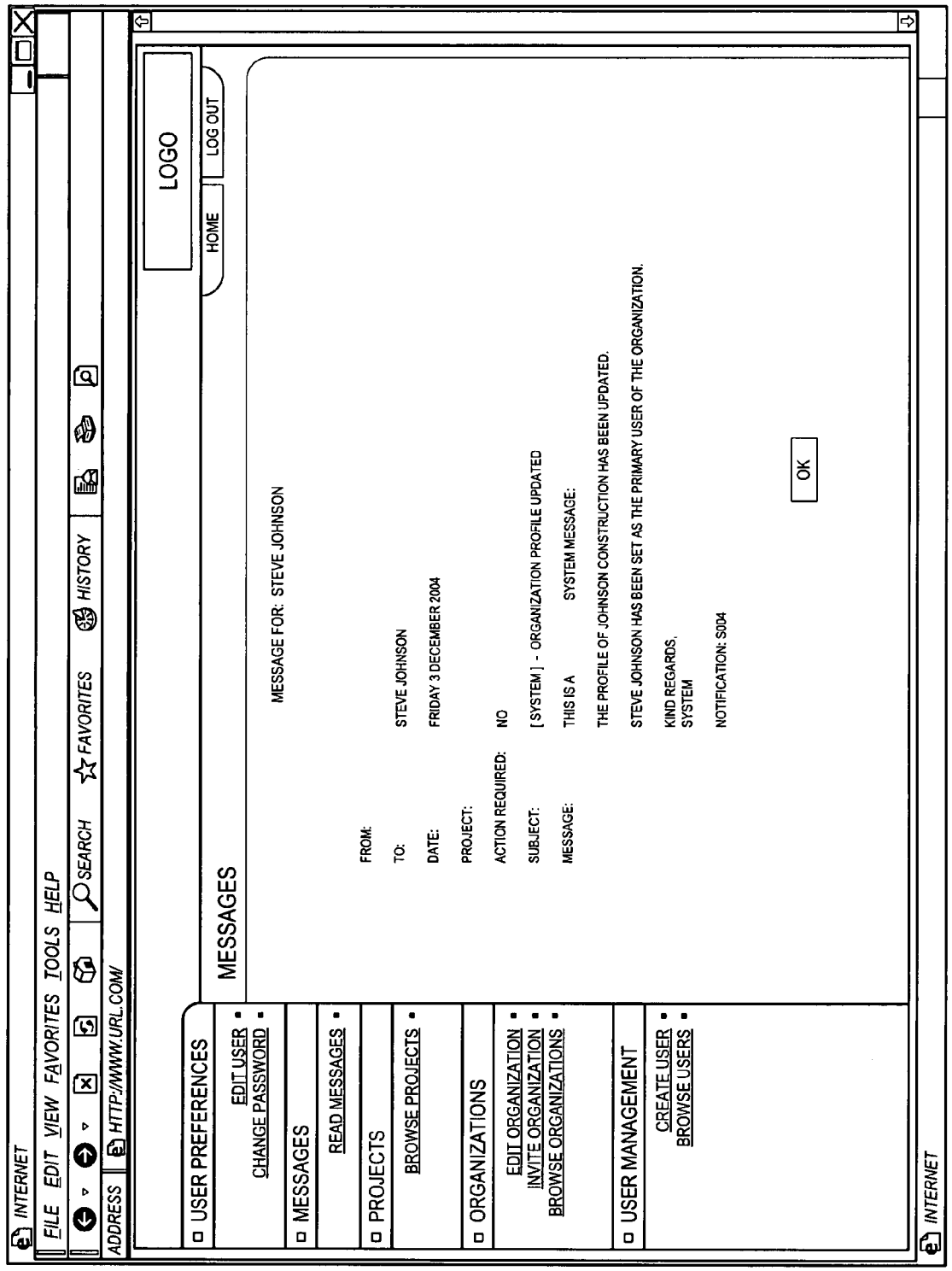
FIG. 21 is an illustration of an organization profile updated notification.

FIG. 21 illustrates an organization profile updated notification that can be transmitted during the organization updated task 168. The notification of FIG. 21 can include information regarding the updated profile for the participant along with a name of the primary user or administrator for the participant.

Figure 22:
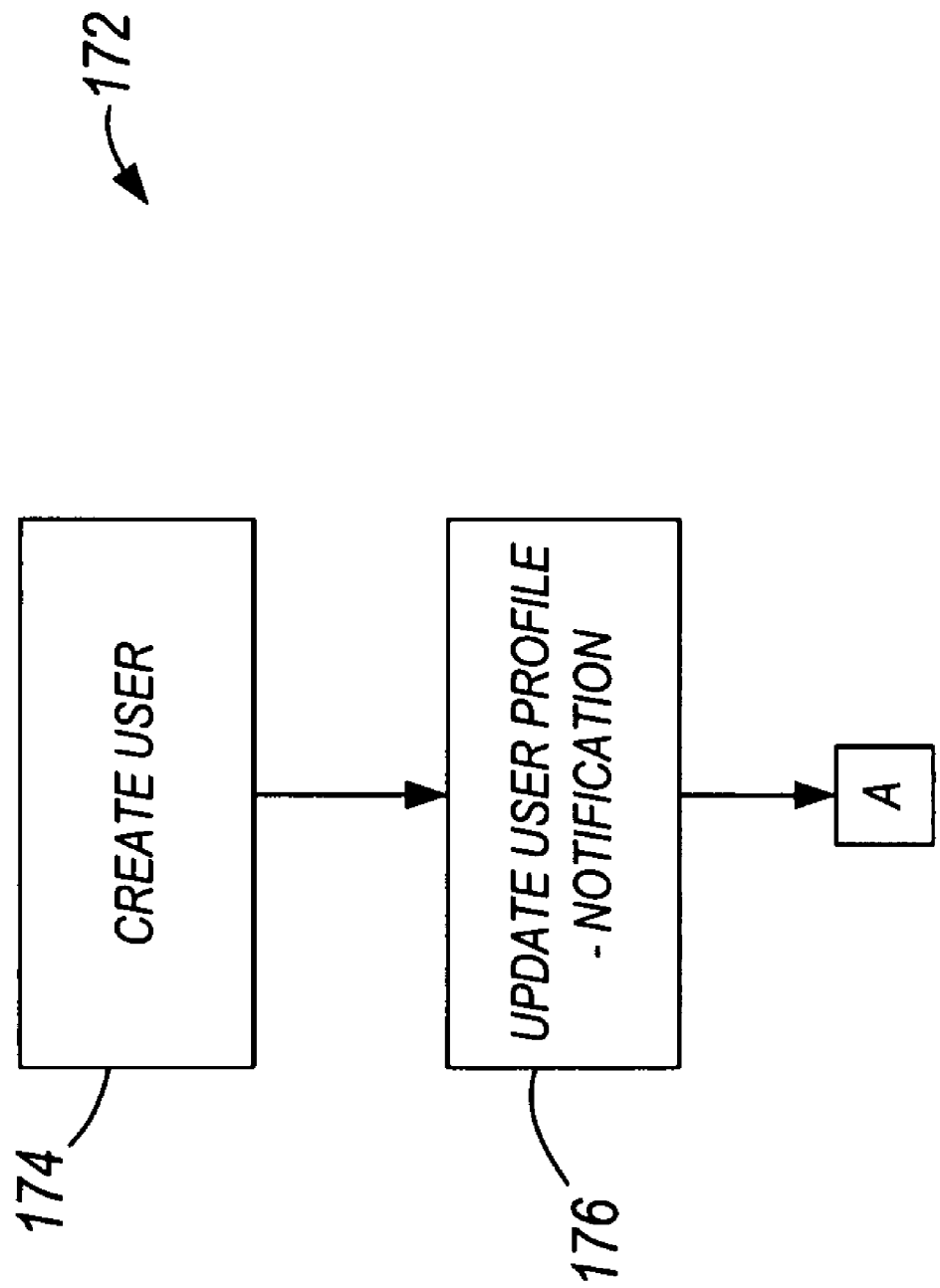
FIG. 22 is a schematic illustration of a create user process.

FIG. 22 illustrates a create user process 172, which can be included in the manage organization process 100. The create user process 172 can be used each time a new user at an existing organization is created in order to give the new user the appropriate access to the CPMS 10 (e.g., the appropriate security levels with a user identification and password). The create user process 172 can also be used to update user profiles. The create user process 172 can be performed by any of the participants 24 using the organization module 42. The create user process 172 can include a create user task 174 and an update user profile task 176.

Figure 23:
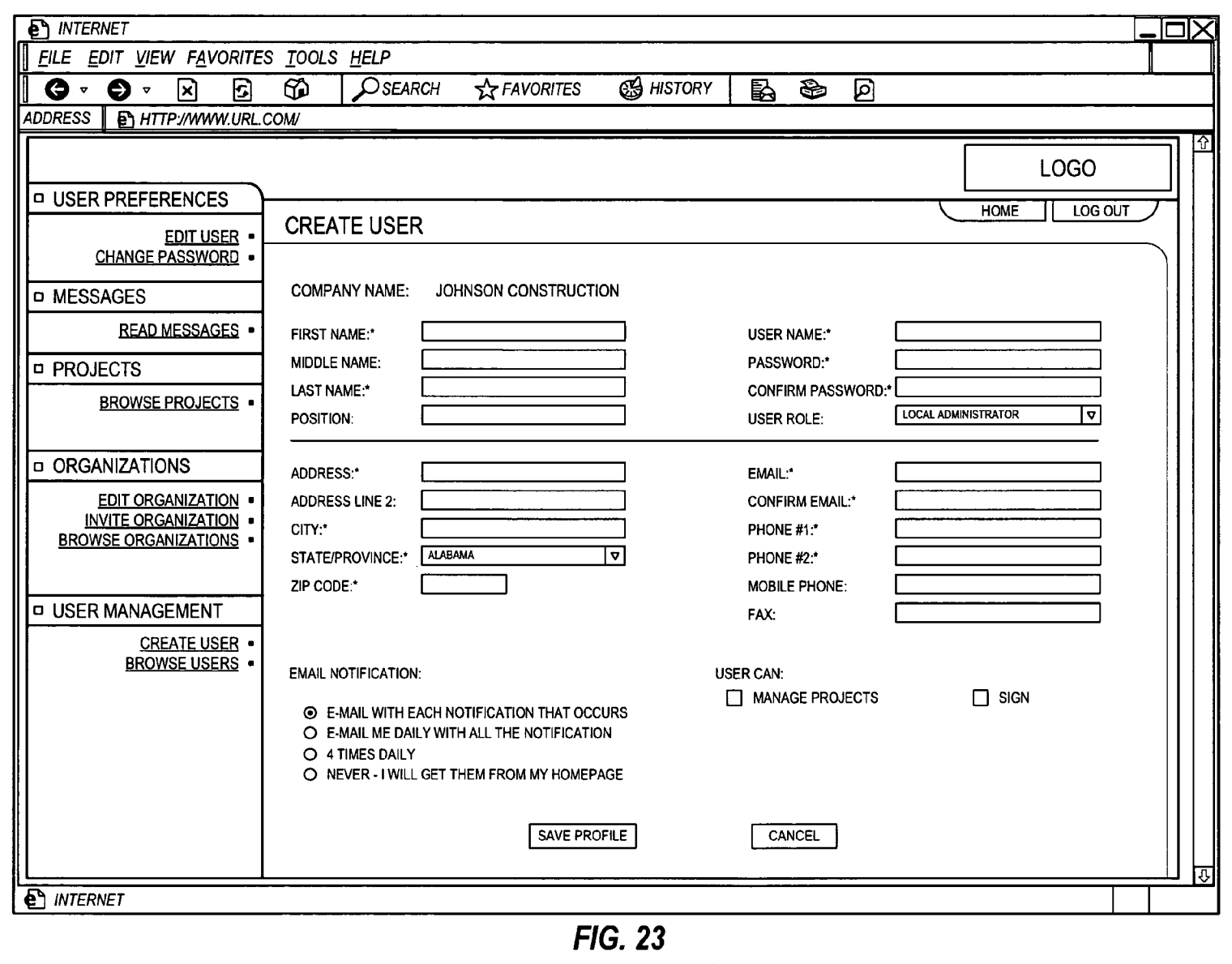

FIG. 23 illustrates a create user form that can be associated with the create user task 174. In some embodiments, the create user form can be used to add users after the primary user or administrator has already been created for the participant. The new user can enter personal information, security information (e.g., user name and password), email notification preferences, and security clearance levels (e.g., whether the user can manage projects and/or sign documents).

Figure 24:
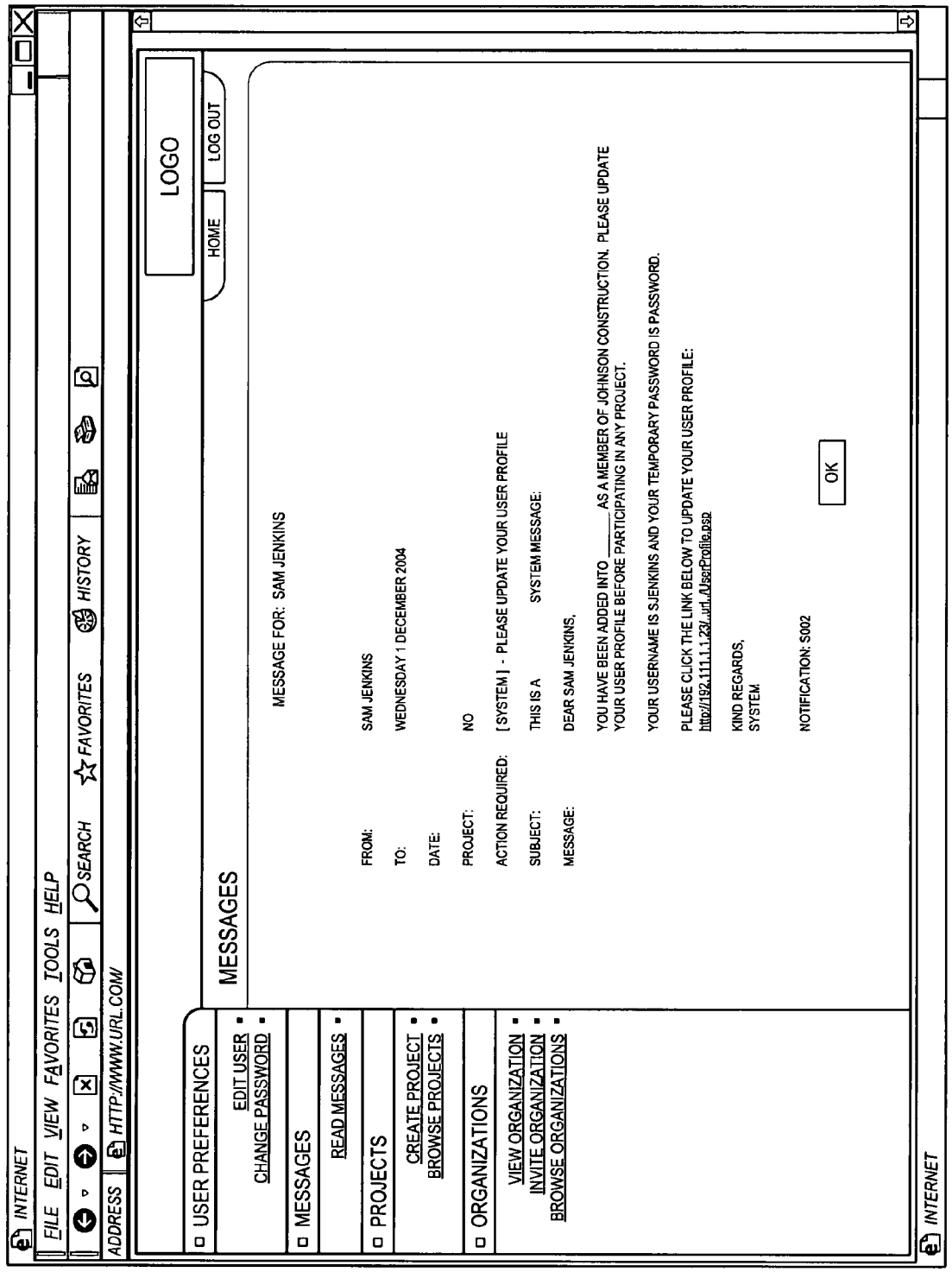
FIG. 24 is an illustration of an update user profile notification.

FIG. 24 illustrates an update user profile notification that can be transmitted during the update user profile task 176. The notification of FIG. 24 can include a statement that the user has been added as a member of the organization, along with the user's security information (e.g., user name and a temporary password).

Figure 25:
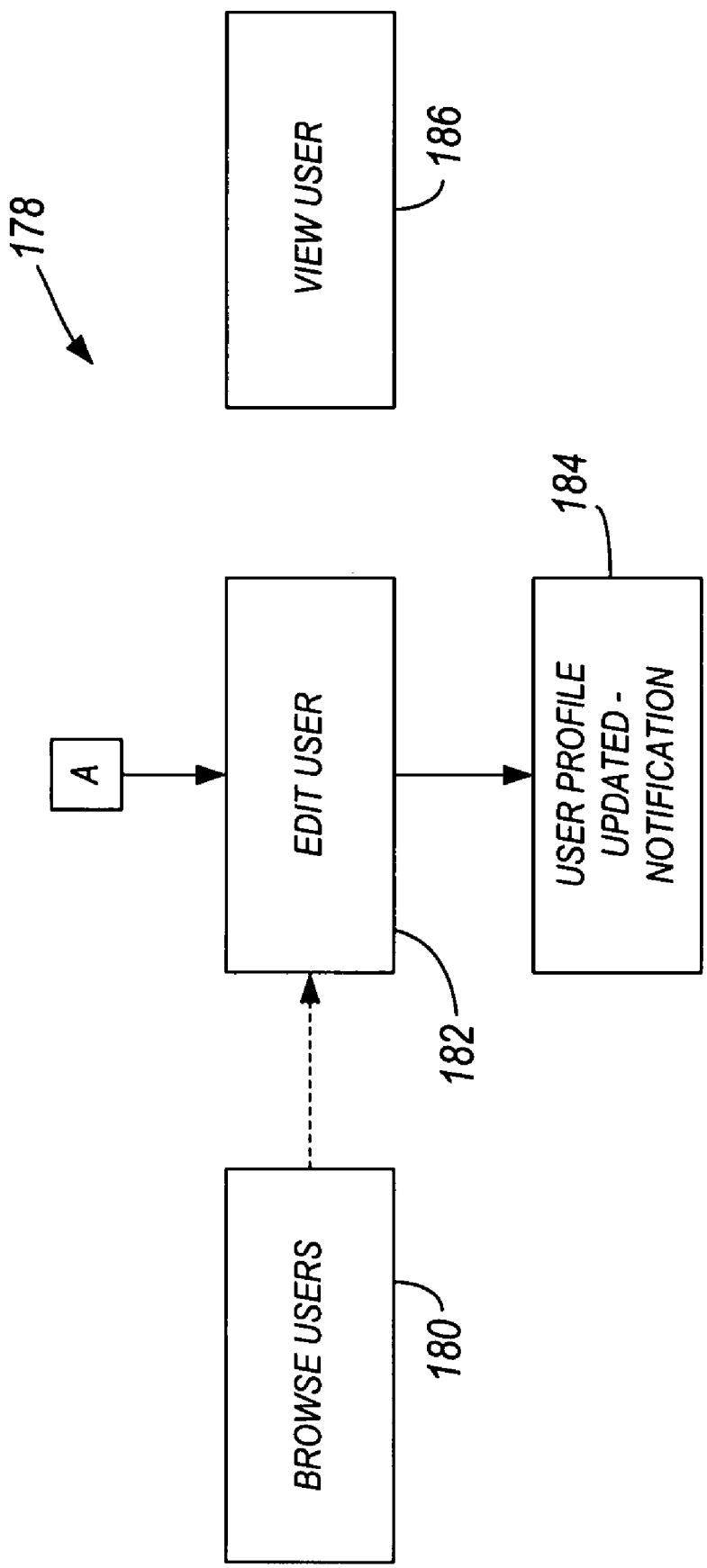
FIG. 25 is a schematic illustration of a maintain user process.

FIG. 25 illustrates a maintain user process 178, which can be included in the manage organization process 100 and can continue from FIG. 22. The maintain user process 178 can be used to browse the users in each organization and to view, edit, and update the users in each organization. The maintain user process 178 can be performed by any of the participants using the organization module 42. The maintain user process 178 can include a browse users task 180, and edit user task 182, a user profile updated task 184, and a view user task 186.

Figure 26:
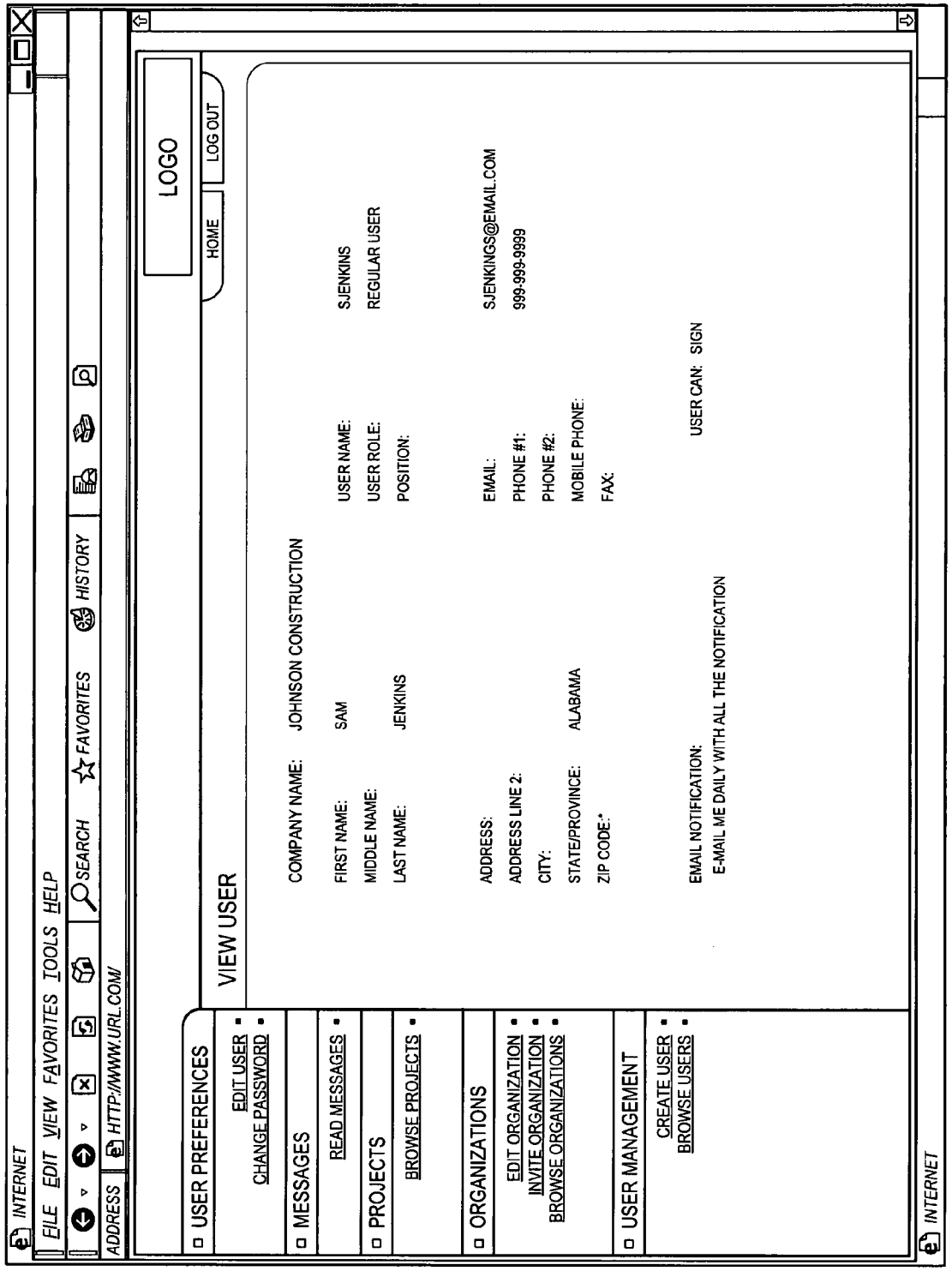
FIG. 26 is an illustration of a view user screen.

FIG. 26 illustrates a view user screen that can be associated with the view user task 186. The view user screen of FIG. 26 can include the user's personal information, email notification preference, and security clearance level.

Figure 27:
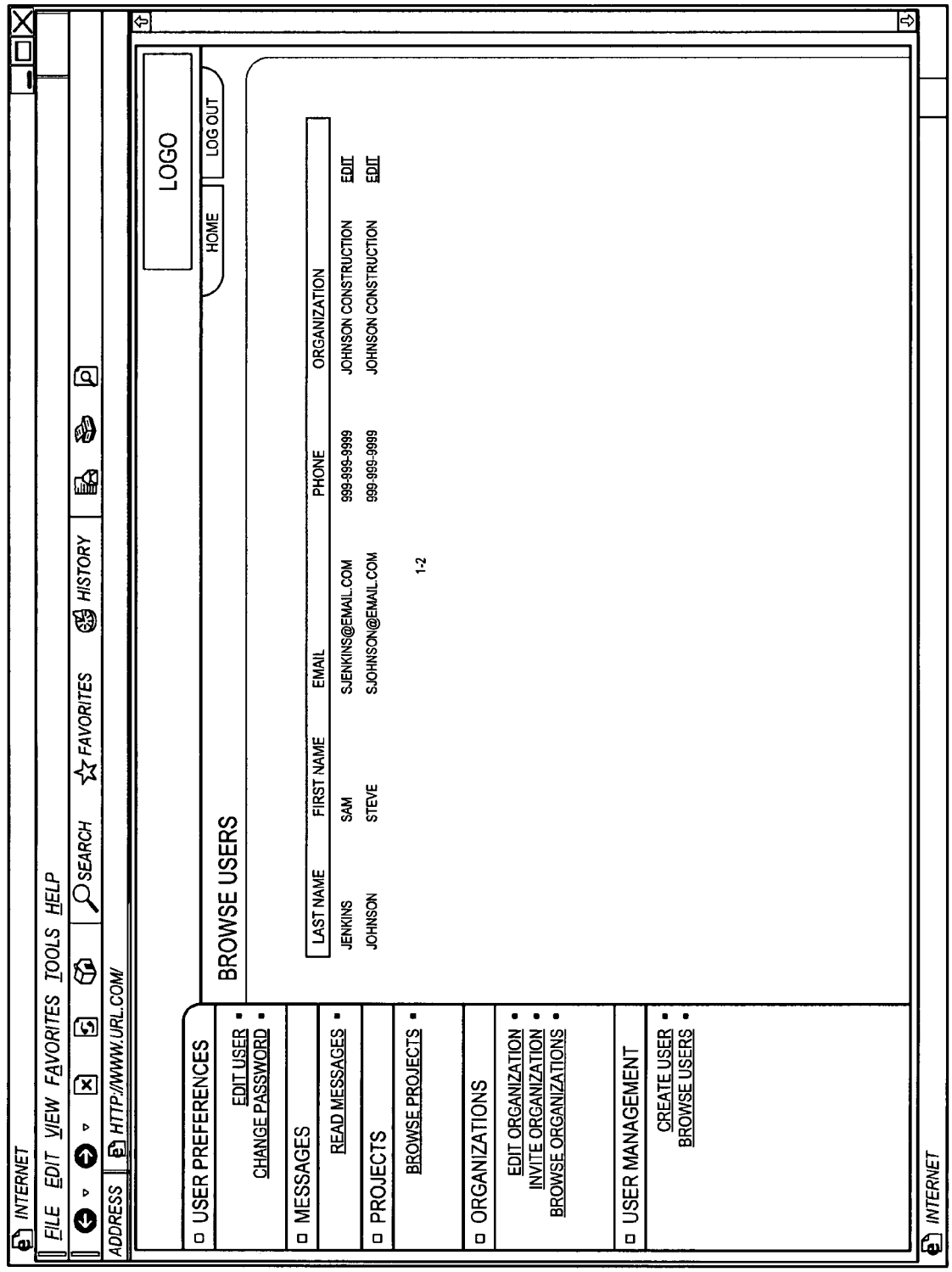
FIG. 27 is an illustration of a browse users screen.

FIG. 27 illustrates a browse users screen that can be associated with the browse users task 180. The browse users screen of FIG. 27 can include a list of one or more users for each participant, and can include the users' names, email addresses, and phone numbers. The browse users screen can also include links to edit the information for each user.

Figure 28:
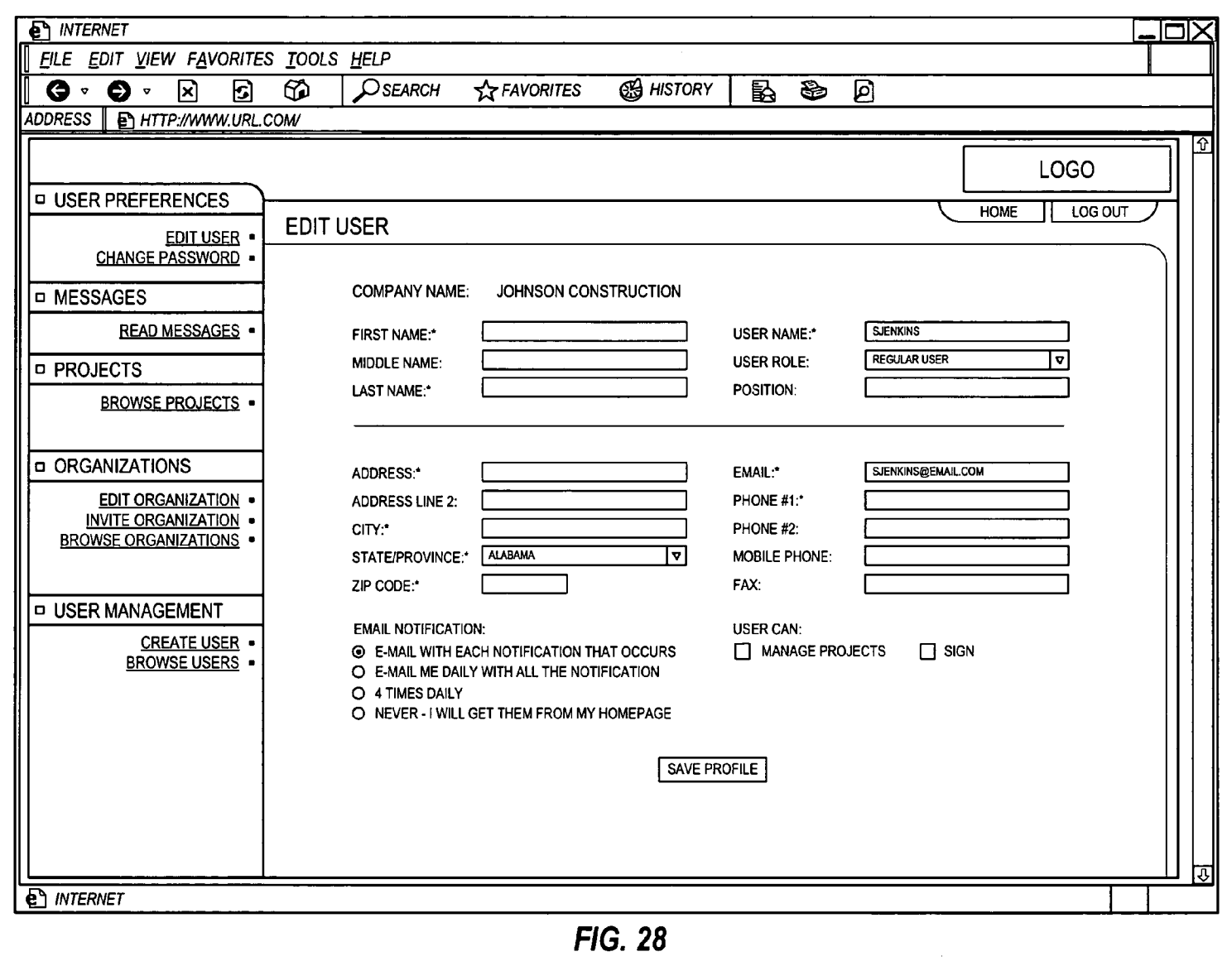

FIG. 28 illustrates an edit user form that can be associated with the edit user task 182. A user can provide personal information, email notification preferences, and security clearance levels.

Figure 29:
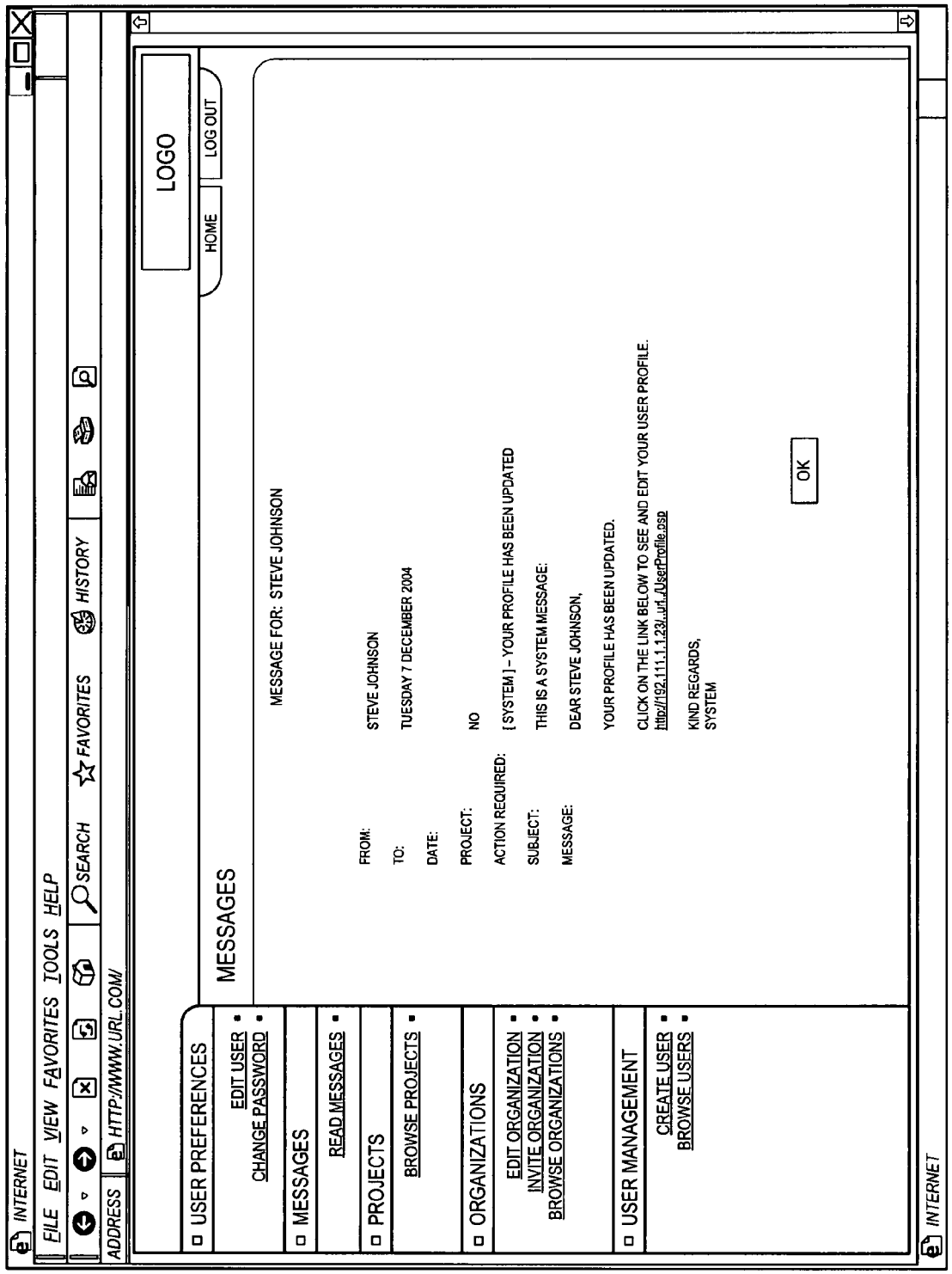
FIG. 29 is an illustration of a user profile updated notification.

FIG. 29 illustrates a user profile updated notification that can be transmitted during the user profile updated task 184.

Figure 30:
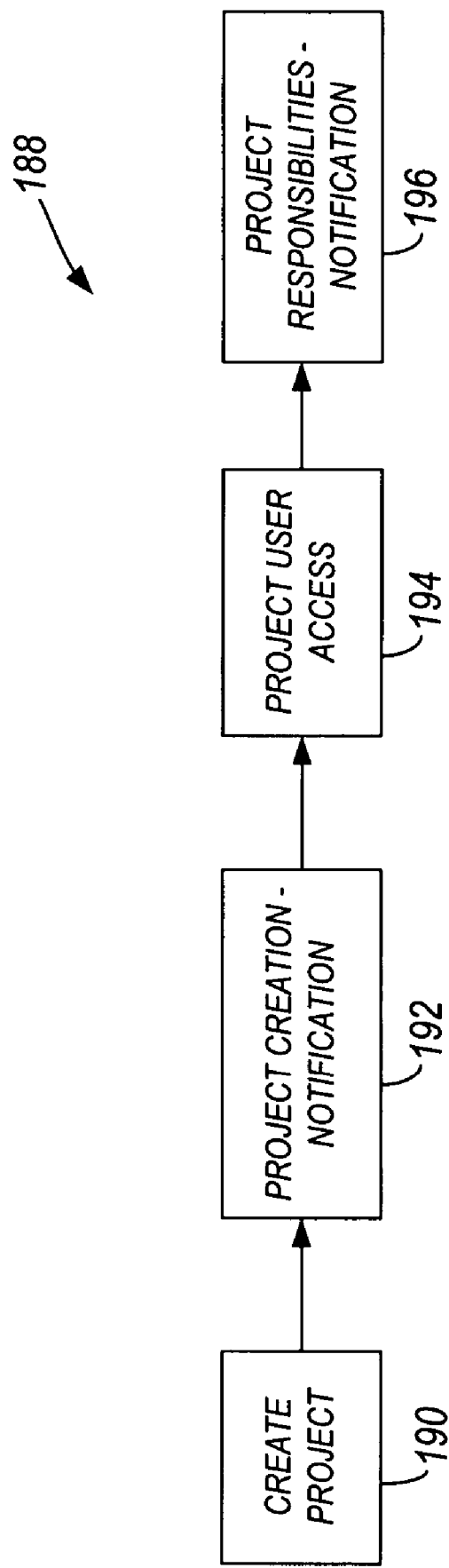
FIG. 30 is a schematic illustration of a create project process.

FIG. 30 illustrates a create project process 188, which can be included in the manage project process 94. The create project process 188 can be performed by a GC, a lender, an owner, or an owner's representative using the project module 28 to initiate a new project in the CPMS 10. The create project process 188 can include a create project task 190, a project creation task 192, a project user access task 194, and a project responsibilities task 196.

Figure 31:
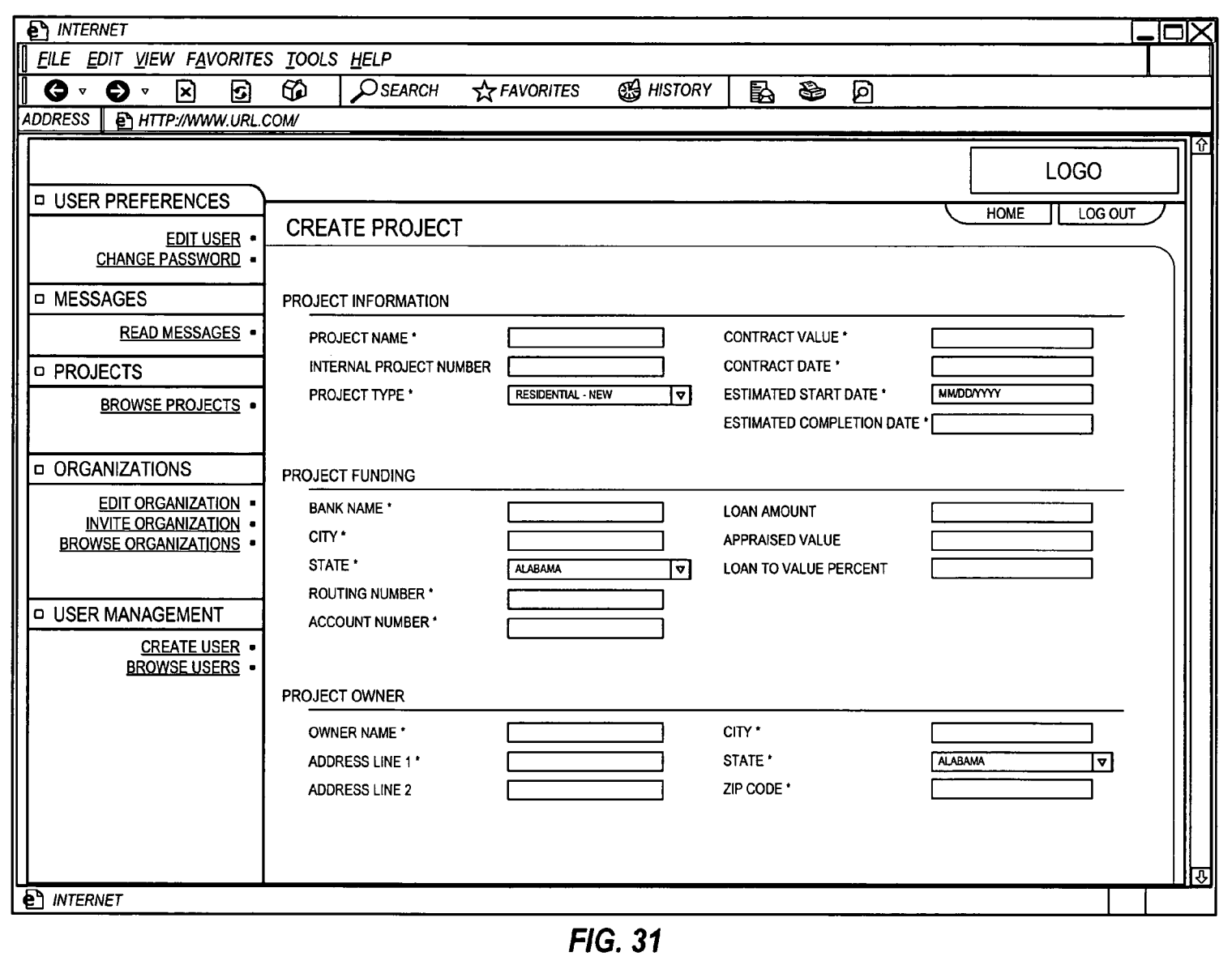
Figure 32:
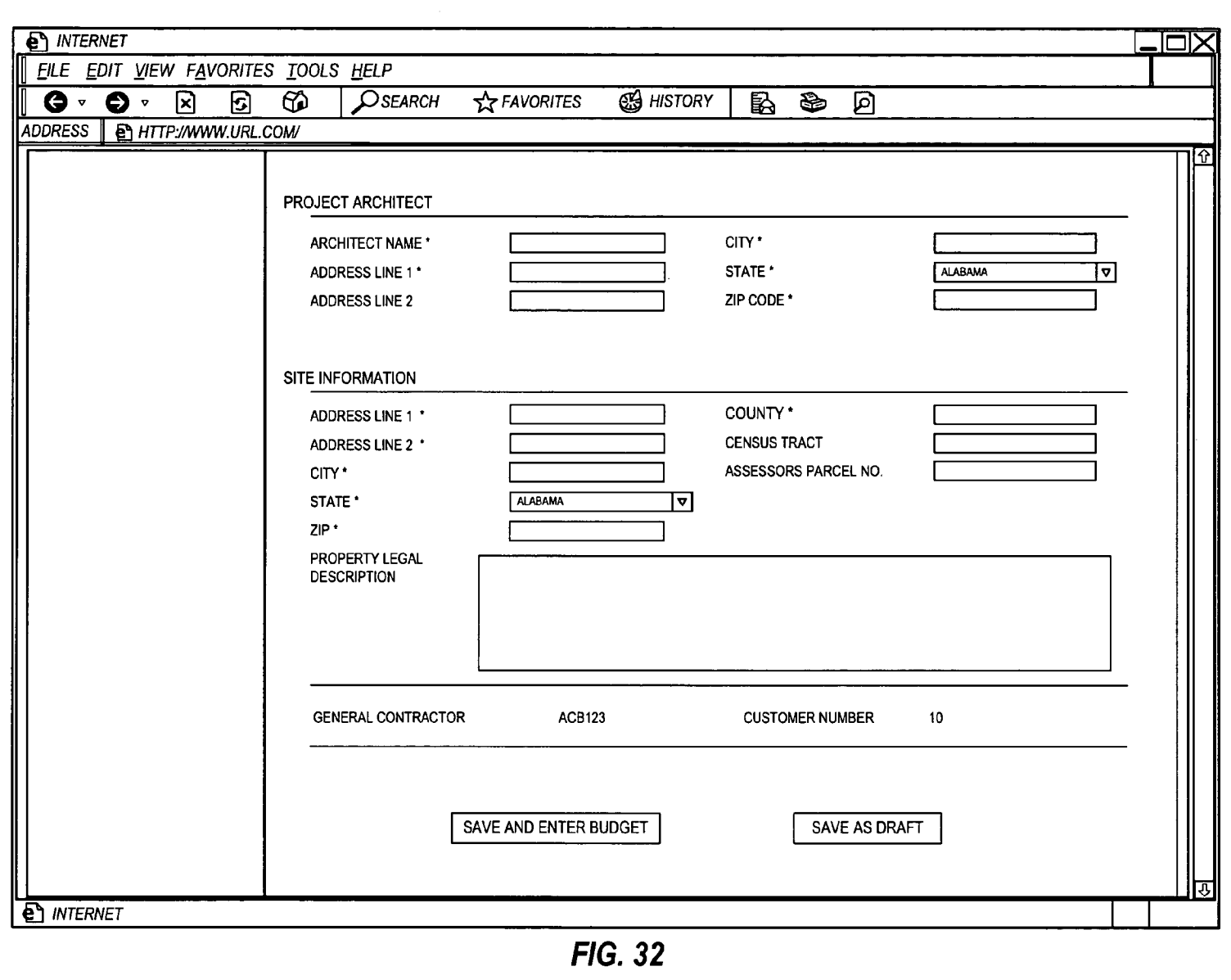

FIGS. 31 and 32 illustrate a create project form that can be associated with the create project task 190. A GC, a lender, an owner, or an owner's representative can provide project identification information, project funding information, project owner information, project architect information, and site information.

Figure 33:
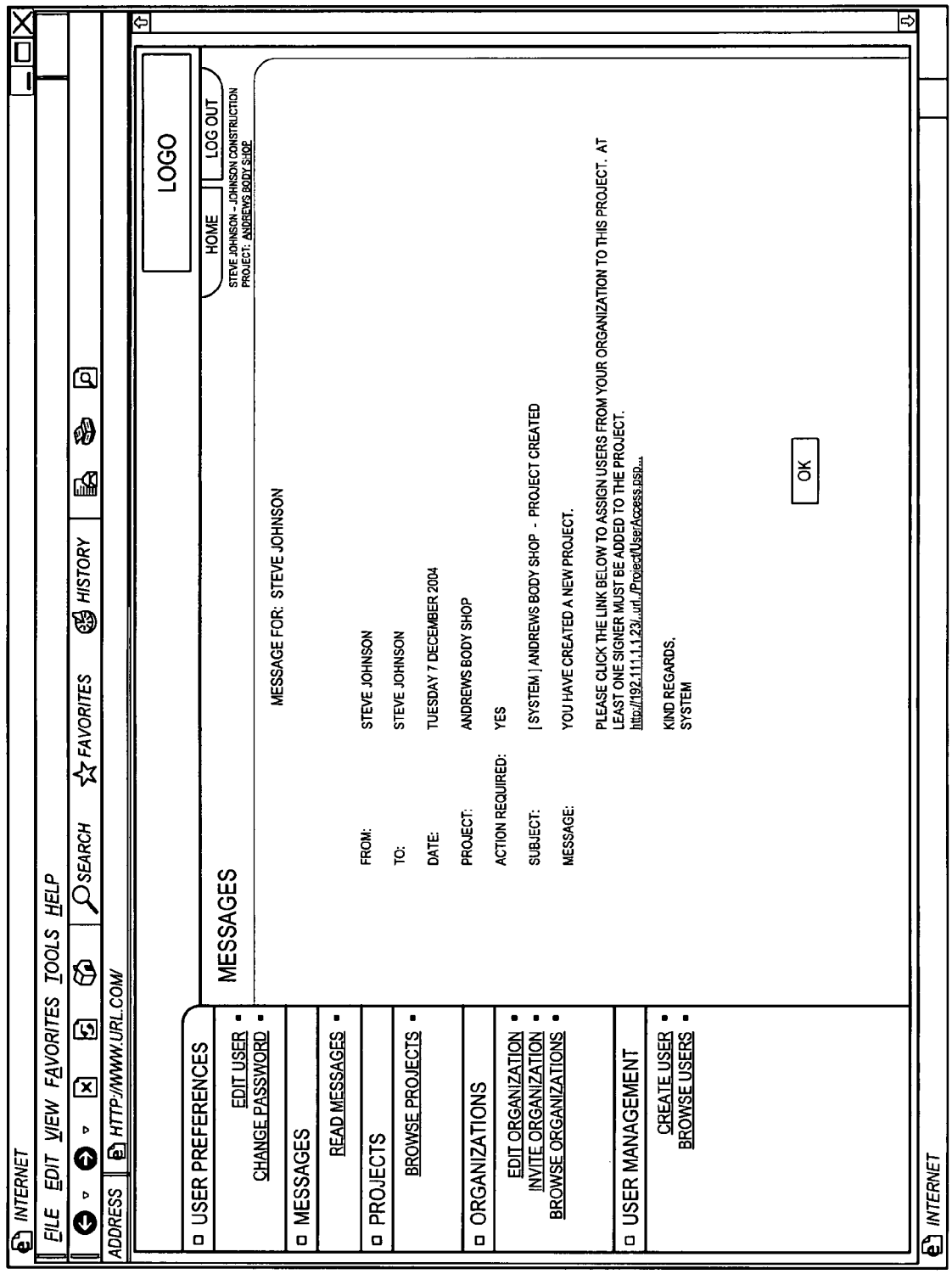
FIG. 33 is an illustration of a project created notification.

FIG. 33 illustrates a project created notification that can be transmitted during the project creation task 192. The notification of FIG. 33 can include a statement that the GC, lender, owner, or owner's representative has created a new project, along with a link to a screen that allows users from the participants to be assigned to the project.

Figure 34:
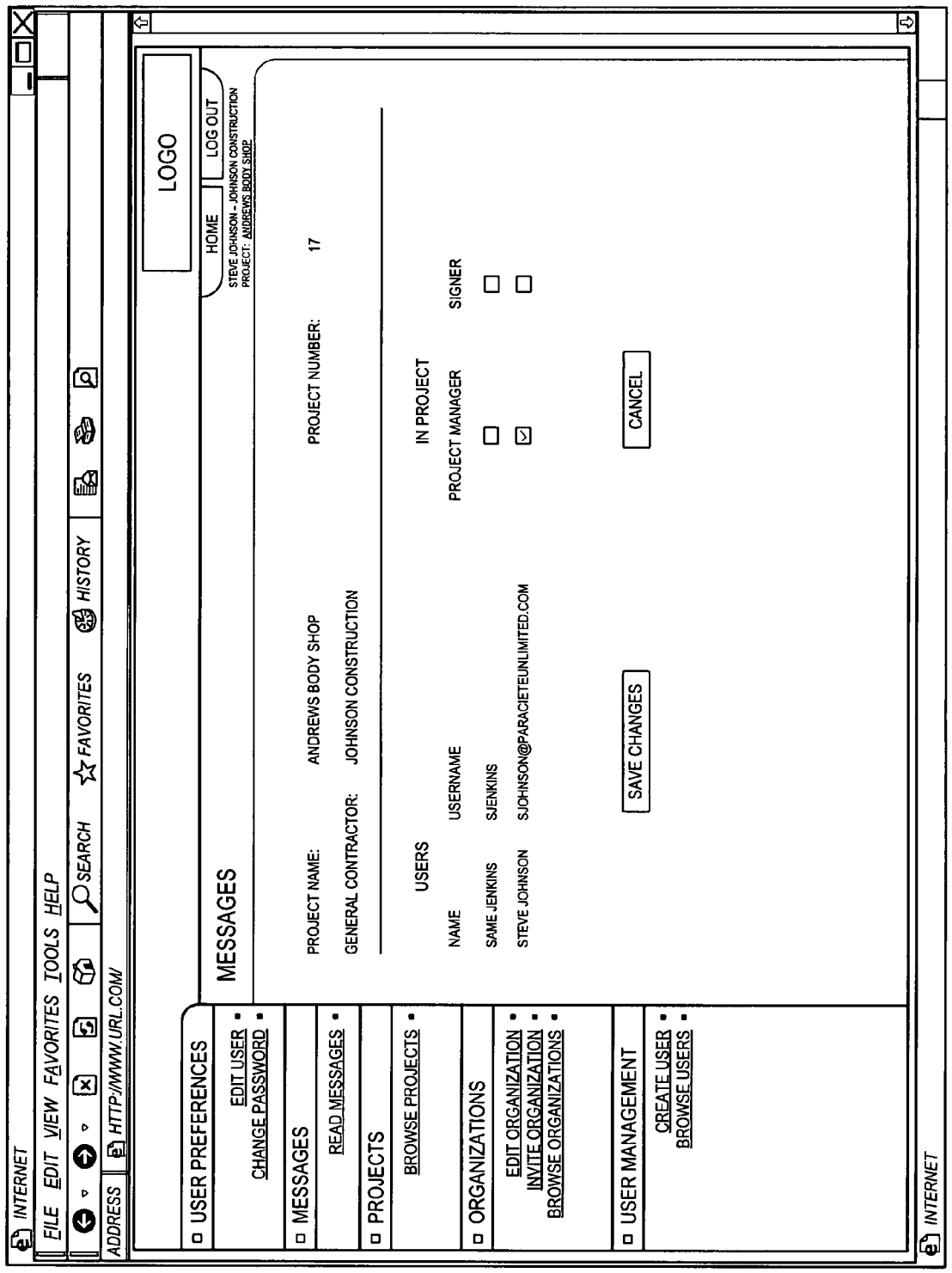
FIG. 34 is an illustration of a project user access screen.

FIG. 34 illustrates a project user access screen that can be associated with the project user access task 194. The project user access screen can include the project name, the project number, the GC name, and a list of users for a particular project and/or a particular organization. The users can be identified by name and username, and can be deemed a project manager or a signer.

Figure 35:
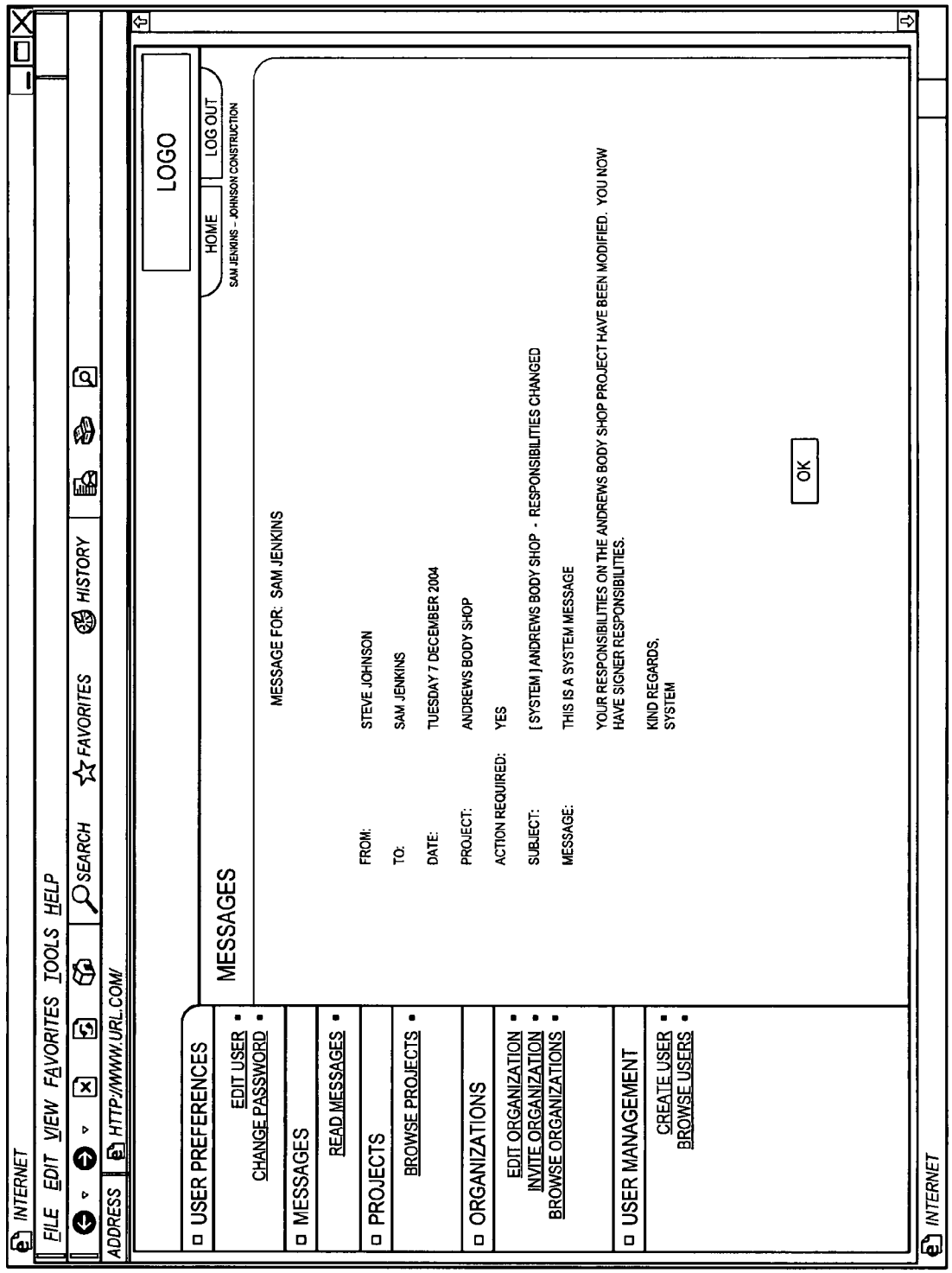
FIG. 35 is an illustration of a project responsibilities notification.

FIG. 35 illustrates a project responsibilities notification that can be transmitted during the project responsibilities task 196. The notification of FIG. 35 can include a statement that a user's responsibilities with respect to a project have been modified.

Figure 36:
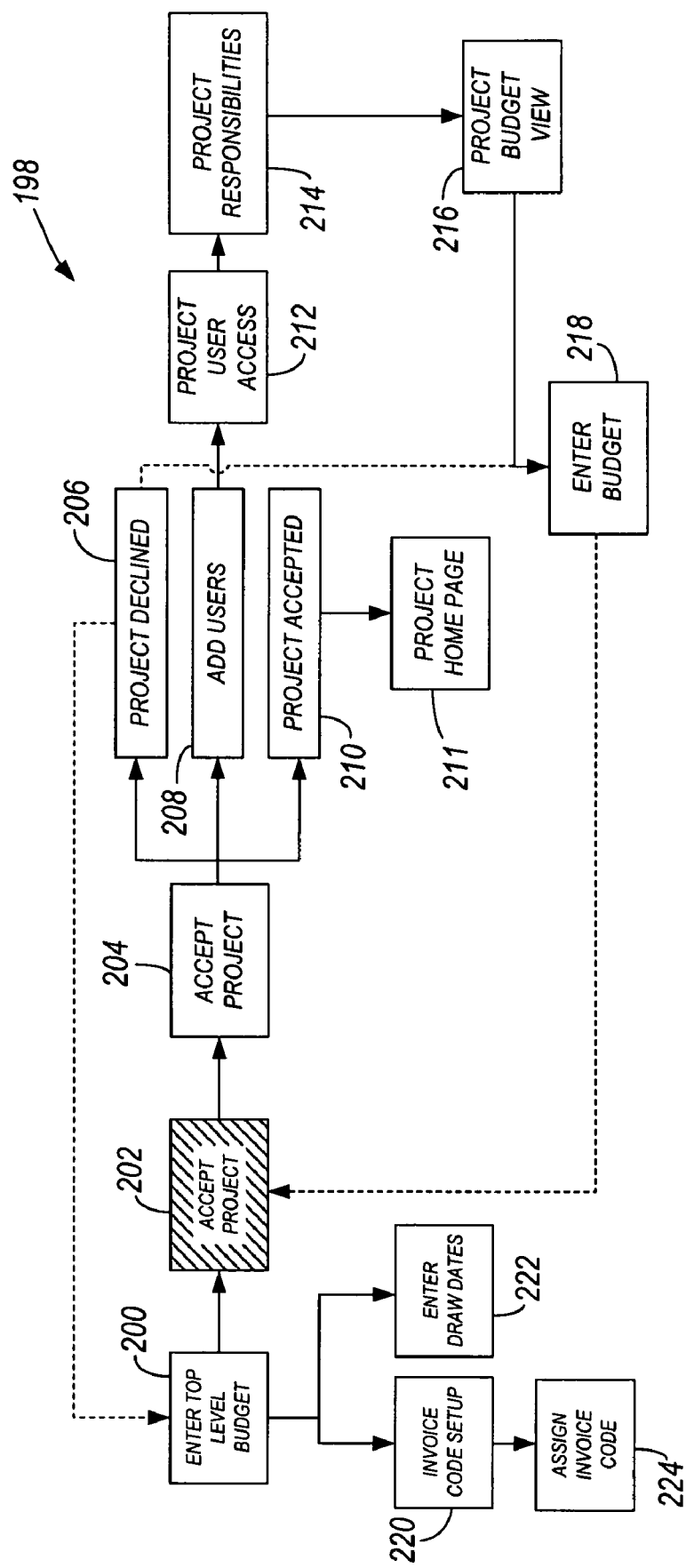
FIG. 36 is a schematic illustration of a maintain budget process.

FIG. 36 illustrates a maintain budget process 198, which can be included in the manage project process 94. The maintain budget process 198 can be used to create and view a top level budget for the construction project, to assign line items to participants, and to assign responsibilities to participants. Using the budget module 36, the maintain budget process 198 can be performed by a GC for subcontractors or by a subcontractor for a second-level subcontractor or a material supplier. The maintain budget process 198 can include an enter top level budget task 200, an accept project task 202, an accept project form task 204, a project declined task 206, an add users task 208, a project accepted task 210, a project home page task 211, a project user access task 212, a project responsibilities task 214, and a project budget view task 216. If the project is declined, the maintain budget process 198 can include an enter budget task 218 and can return to the accept project task 202. After the enter top level budget task 200, the maintain budget process 198 can include an invoice code setup task 220, an enter draw dates task 222, and an assign invoice code task 224.

Figure 37:
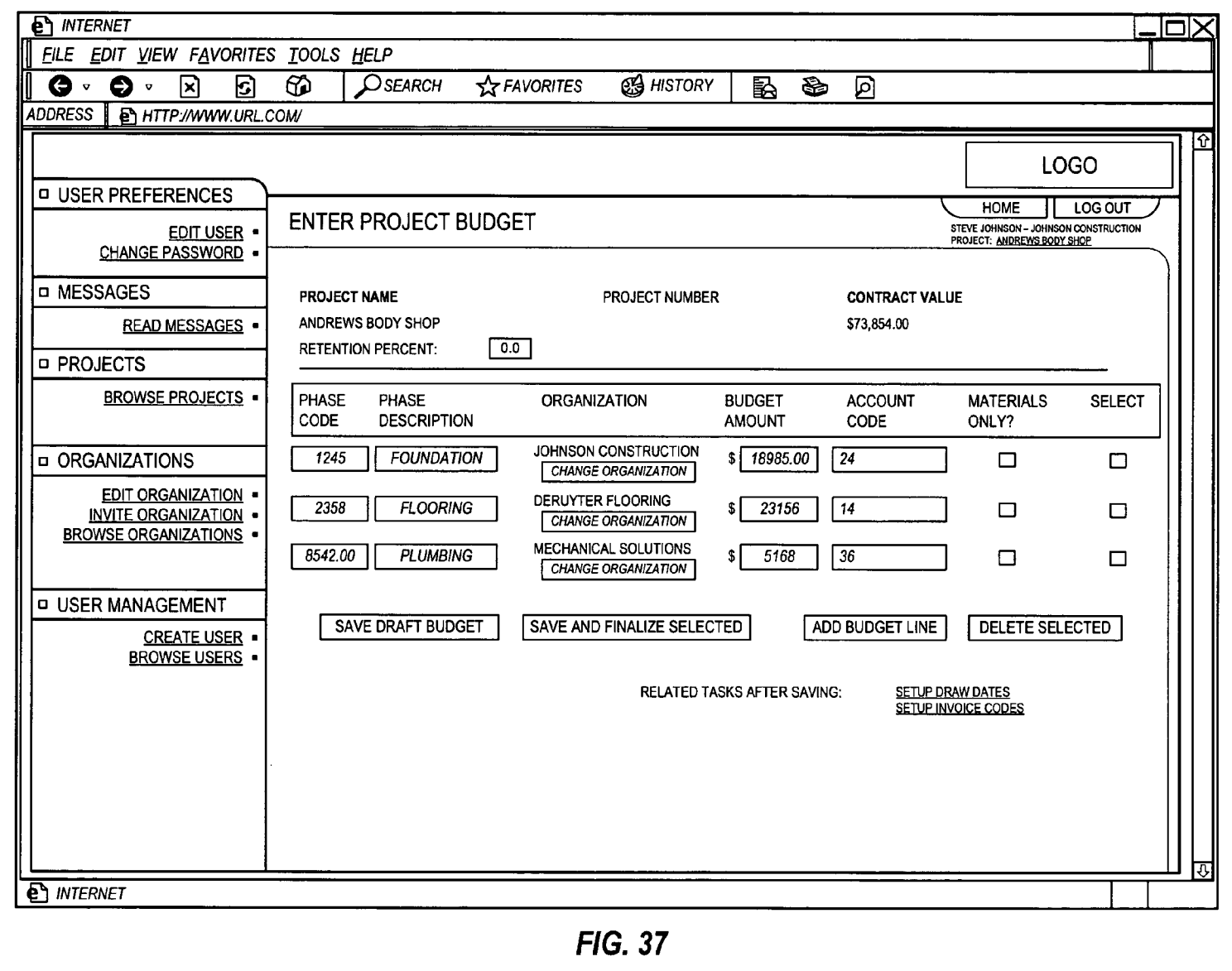

FIG. 37 illustrates an enter top level budget form that can be associated with the enter top level budget task 200. The enter top level budget form can include the project name, the project number, and the contract value. A GC or a subcontractor can provide a retention percentage value, phase codes, phase code descriptions, organization names, budget amounts, and account codes. A GC or subcontractor can specify whether the organization is only providing materials. The enter top level budget form can also include links to setup draw dates and setup invoice code screens/forms. The phase codes and phase code descriptions can be used to define the contracting requirements of each particular job that must be completed in order to complete the project. The phase codes and phase descriptions can be provided, for example, by the American Institute of Architects (AIA), by the Construction Specifications Institute (CSI), or by customizing the AIA or CSI phase codes and phase descriptions. In some embodiments, the phase codes and phase descriptions can be completely customized by the participants. The top level budget can also be referred to as the schedule of values, the committed costs (after the GC has received bids from subcontractors), or the project estimate. In some embodiments, the phase codes included in the top level budget provide the basis for the draw requests, in that each draw request includes specific line items associated with specific phase codes. In some embodiments, the GC can use an external software program to generate a budget and the budget module 36 can interface with the external software program to import the budget into the application server 12 or the database server 14.

Figure 38:
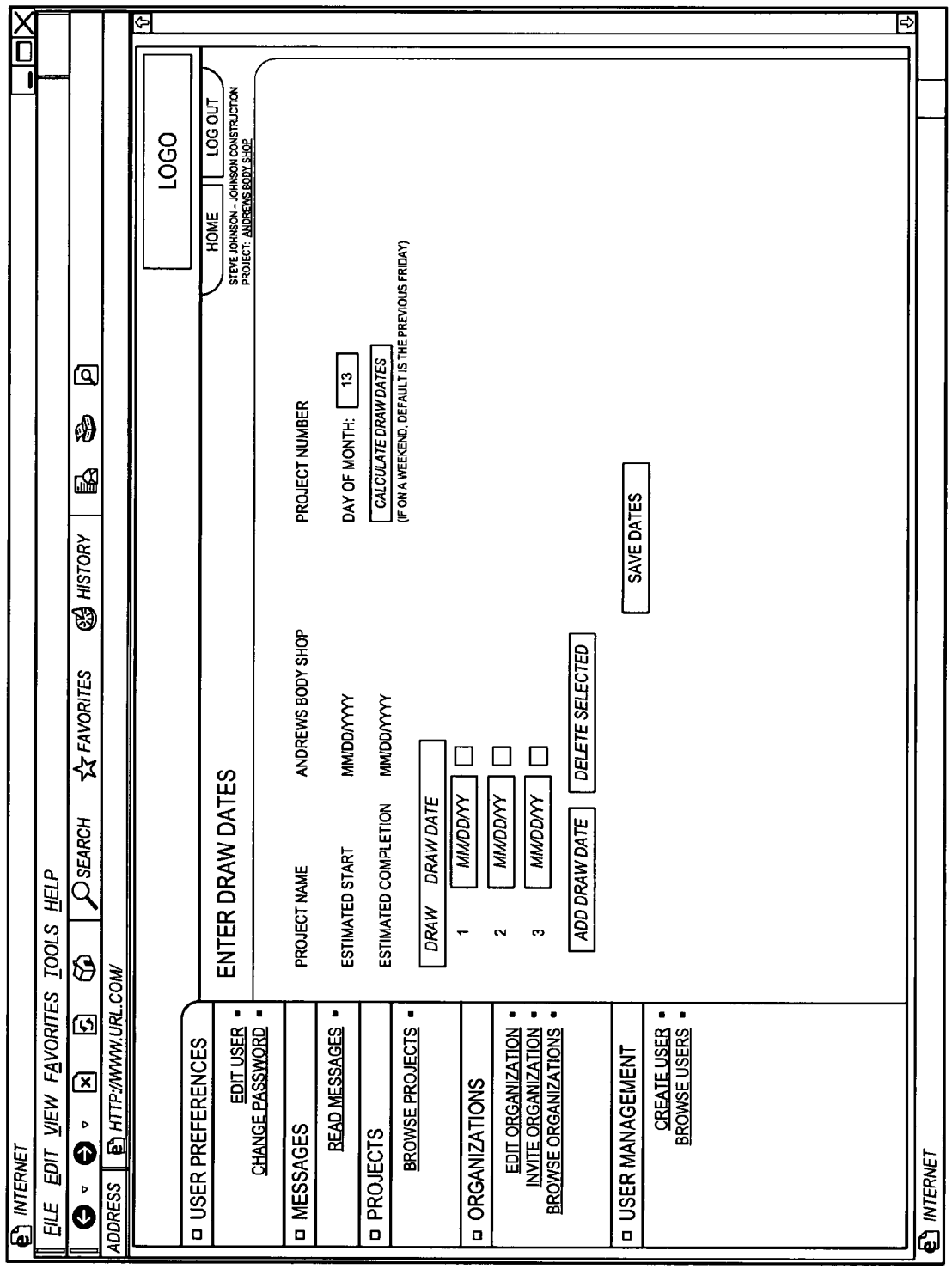
FIG. 38 is an illustration of an enter draw dates form.

FIG. 38 illustrates an enter draw dates form that can be associated with the enter draw dates task 222. A GC or subcontractor can enter the day of the month on which draws are to take place, along with the specific dates for the draws (e.g., each month on a particular day). The enter draw dates form can also include a Calculate Draw Dates button for automatic calculation of the draw dates and/or an Add Draw Date button for manual entering of the draw dates.

Figure 39:
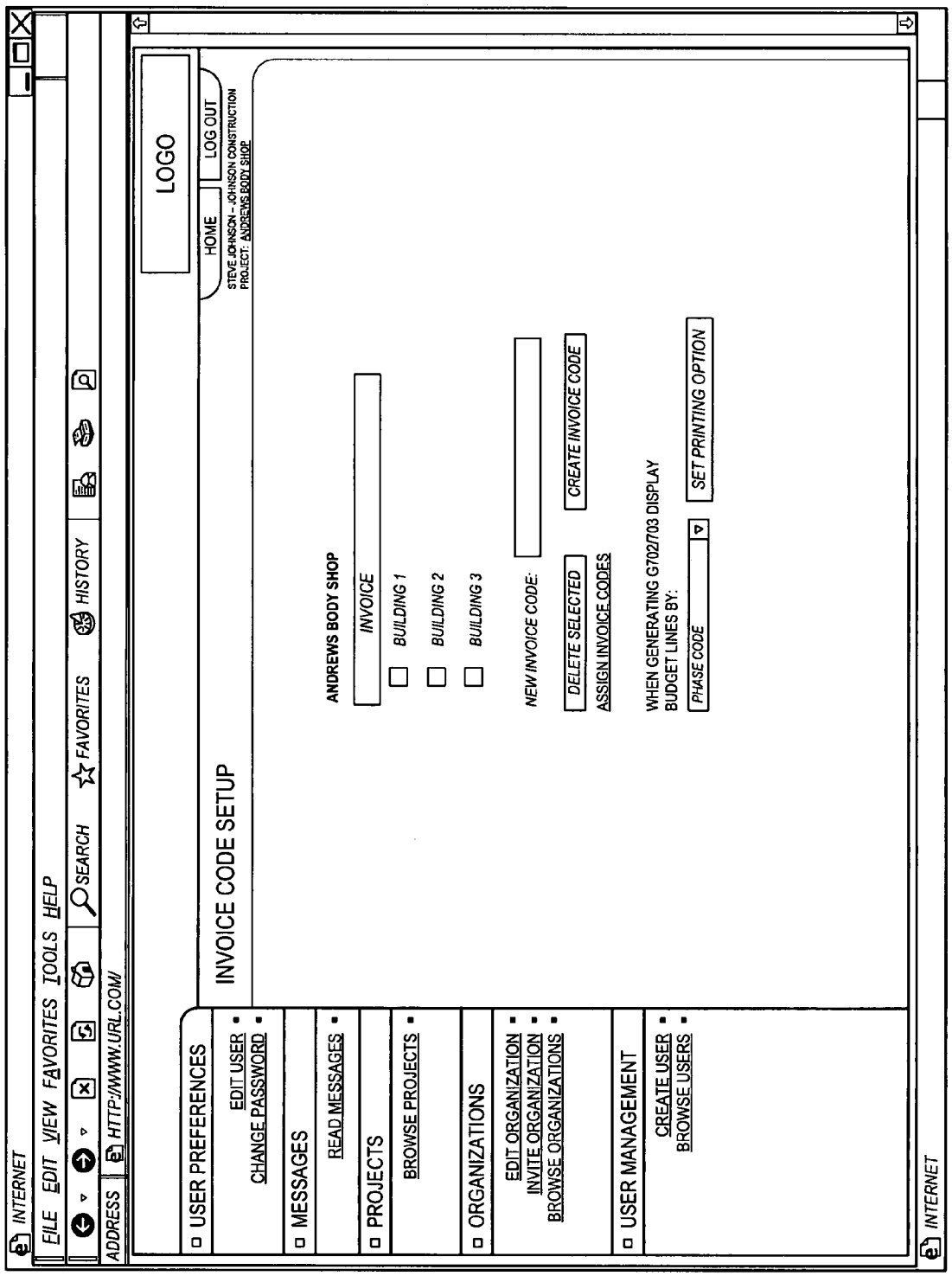
FIG. 39 is an illustration of an invoice code setup form.

FIG. 39 illustrates an invoice code setup form that can be associated with the invoice code setup task 220. A GC or subcontractor can select an invoice code (e.g., codes by building—Building 1, 2, or 3), enter a new invoice code, create an invoice code, enter a preference for the display of budget lines (e.g., by phase code), and enter a preference for printing options. The invoice code setup form can facilitate the automated generation of invoices and sworn statements by the CPMS 10. The invoice codes can be used for customized reports or for interfacing with other types of existing software. The invoice codes can allow participants to sort budget line items based on the requirements of the architect, the owner, etc. The CPMS 10 can also use account codes in the budget to interface with existing accounting systems. The account codes can be used to maintain the budget, to record results of the draw, and to facilitate invoicing and payment.

Figure 40:
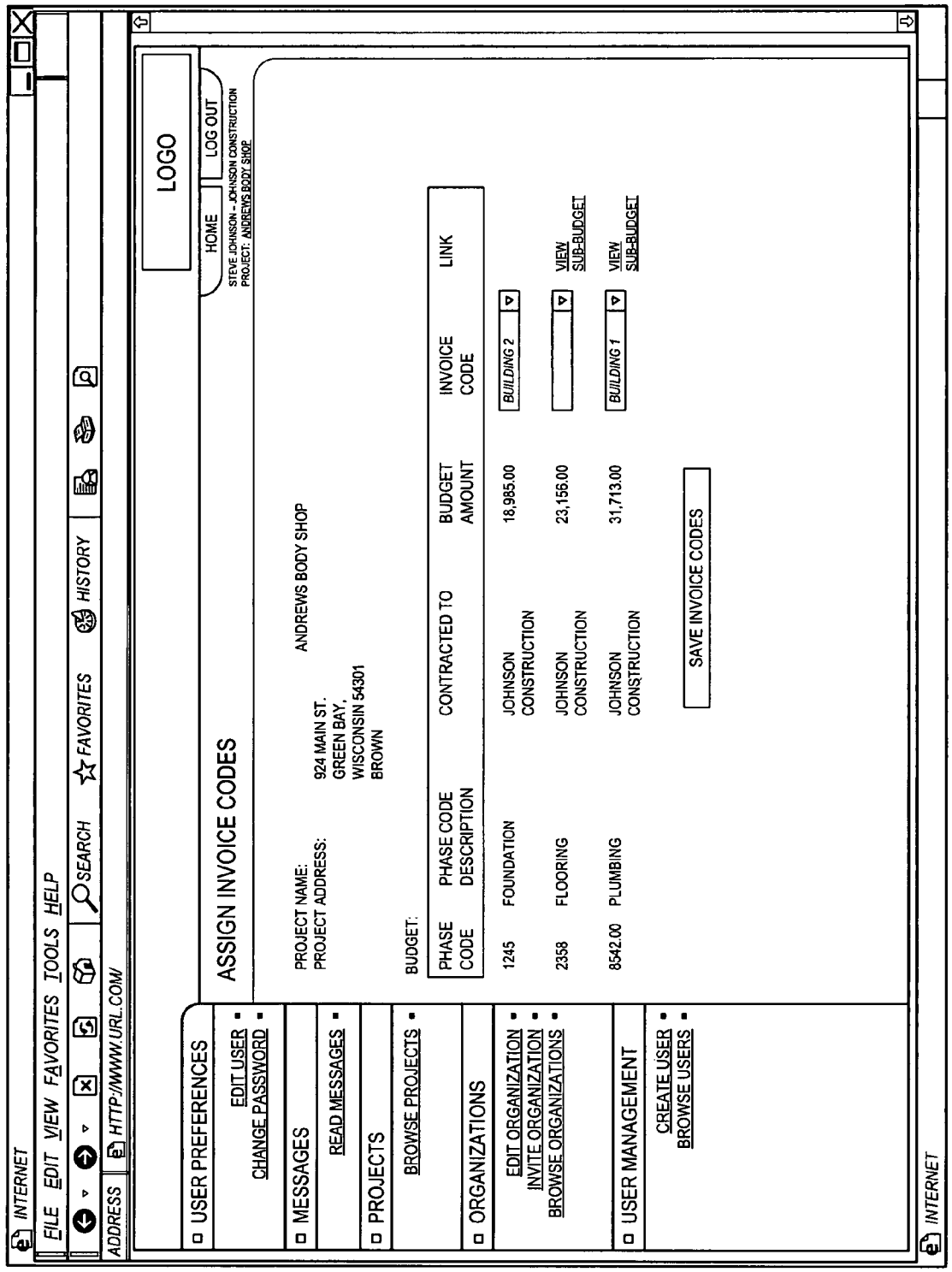
FIG. 40 is an illustration of an assign invoice codes form.

FIG. 40 illustrates an assign invoice codes form that can be associated with the assign invoice code task 224. A GC or subcontractor can provide the invoice code (e.g., Building 1, 2, or 3) and can use links to access sub-budgets for each phase code. The assign invoice codes form can include the project name, the project address, the phase codes, the phase code descriptions, the organization to which the job is contracted to, and the budget amount. The assign invoice codes form can also facilitate the automated generation of invoices and sworn statements by the CPMS 10.

Figure 41:
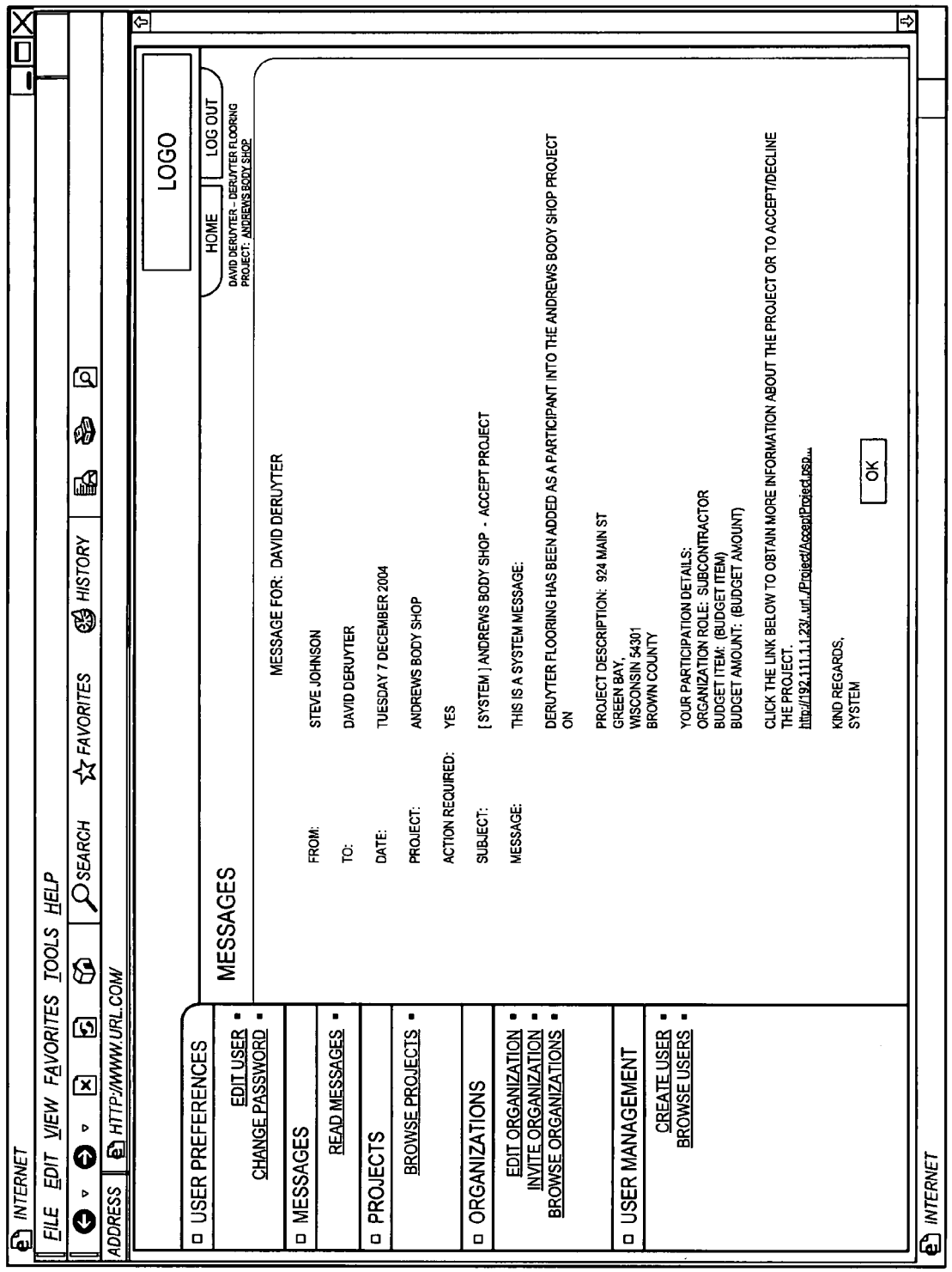
FIG. 41 is an illustration of an accept project notification.

FIG. 41 illustrates an accept project notification that can be associated with the accept project task 202. The notification of FIG. 41 can include a statement that the subcontractor or material supplier has been added as a participant on a project, a project description, and the subcontractor's or material supplier's participation details. The subcontractor or material supplier can use a link to access an accept project form as shown in FIG. 42 to accept or decline the project.

Figure 42:
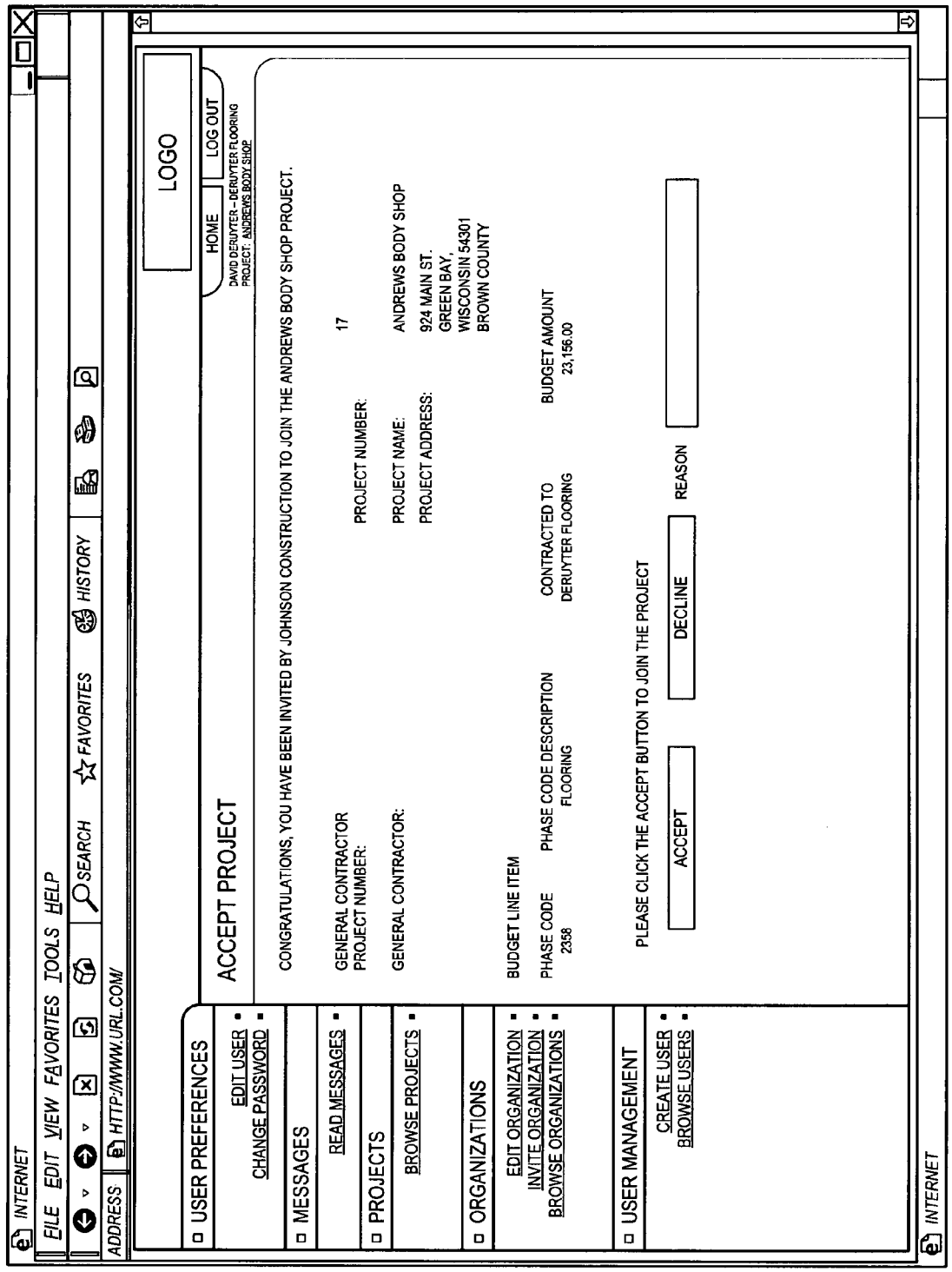
FIG. 42 is an illustration of an accept project form.

FIG. 42 illustrates an accept project form that can be associated with the accept project form task 204. The accept project form can include the GC project number, the system project number, the GC name, the project name, the project address, and a budget line item. The accept project form can provide the subcontractor or the material supplier with project information and a budget line item. The subcontractor or the material supplier can use the Accept or Decline buttons to accept or decline the project associated with the budget line item. The subcontractor or the material supplier can also provide a reason for declining the project. The line items from the accept project forms can also be used to facilitate automated generation of invoices and sworn statements by the CPMS 10.

Figure 43:
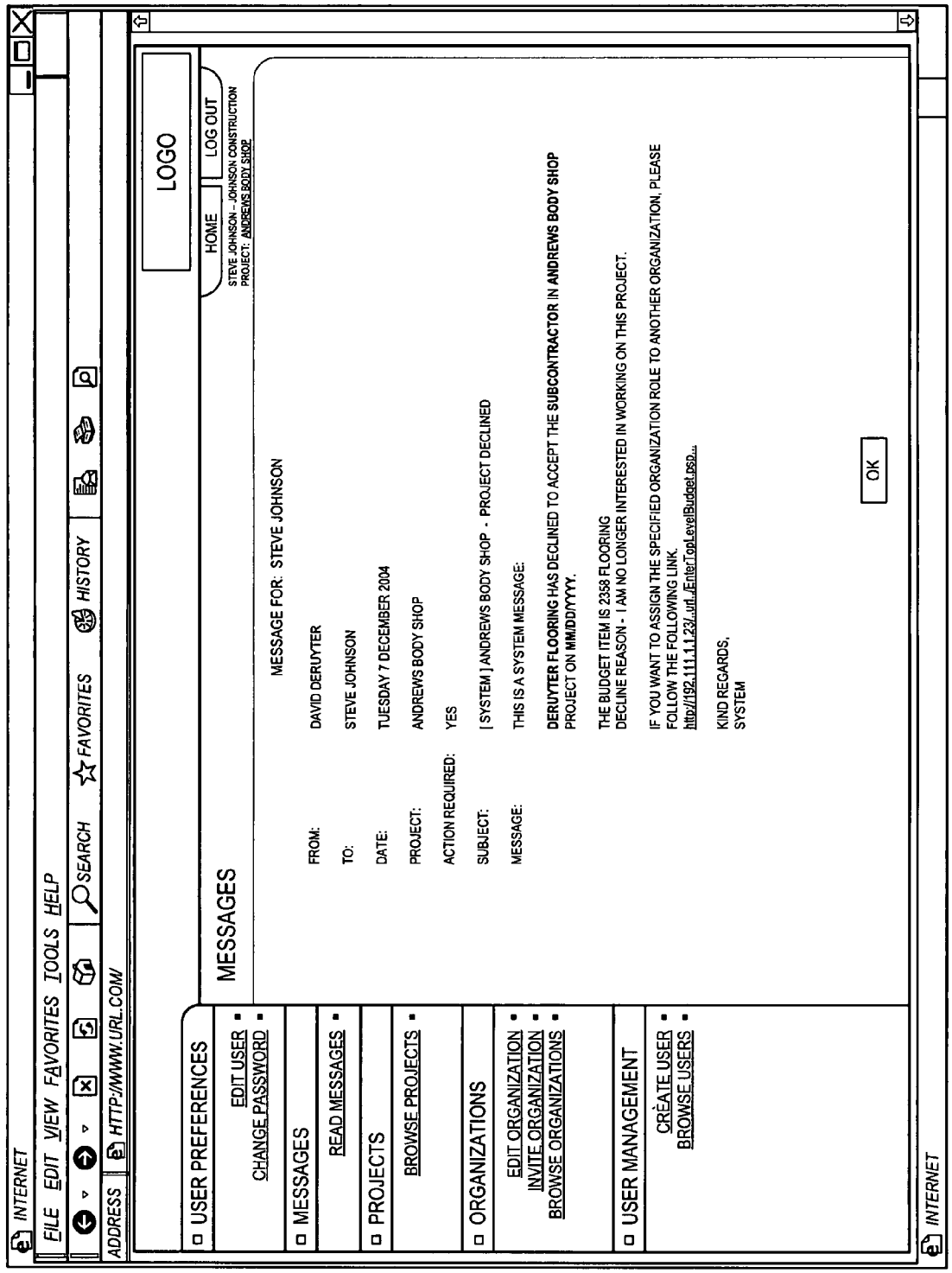
FIG. 43 is an illustration of a project declined notification.

FIG. 43 illustrates a project declined notification that can be transmitted during the project declined task 206. The notification of FIG. 43 can include the name of the subcontractor or material supplier that has declined the project, the budget item declined, and the reason for the decline. The notification of FIG. 43 can provide the ability to assign the organizational role to another participant.

Figure 44:
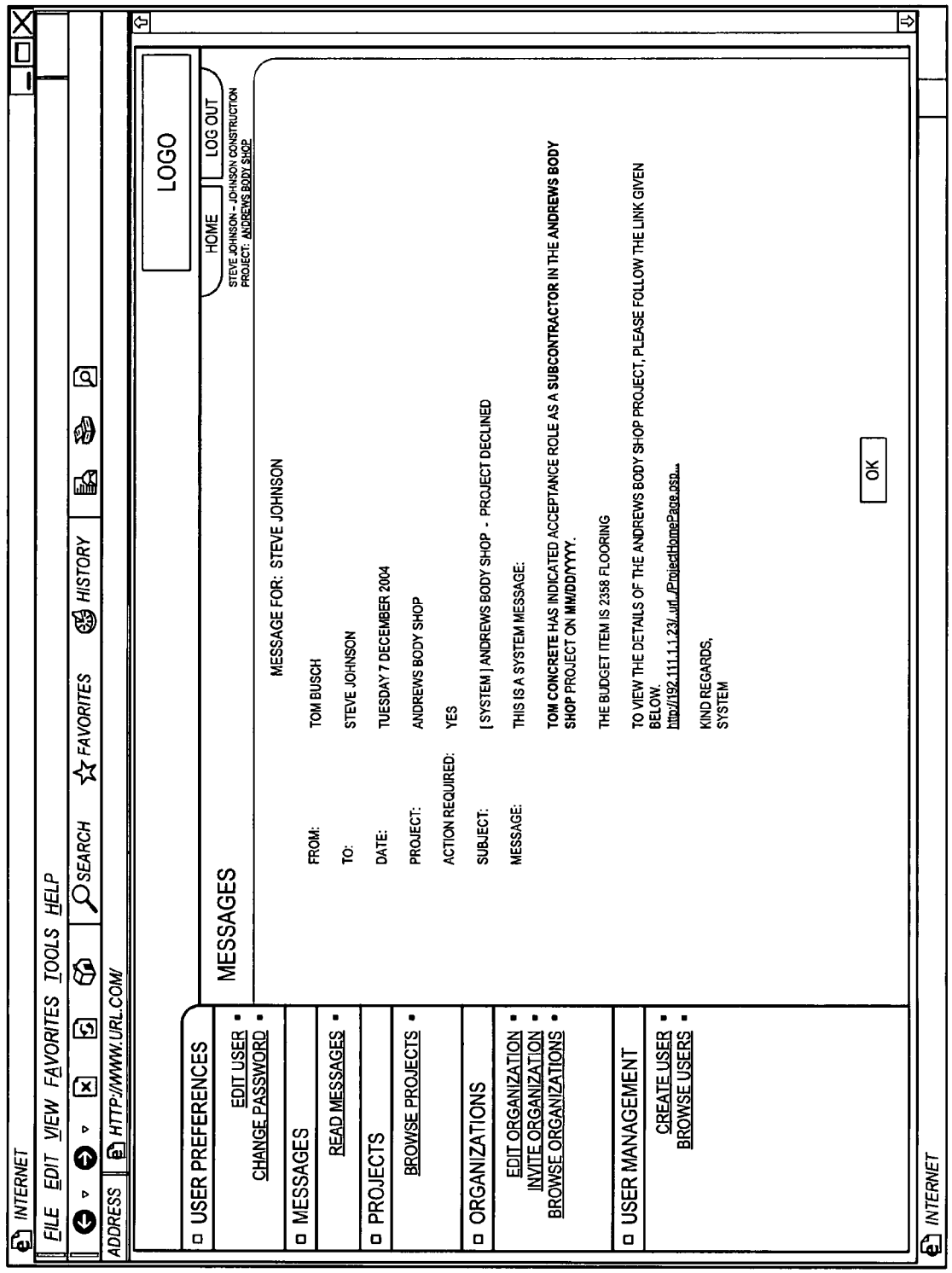
FIG. 44 is an illustration of a project accepted notification.

FIG. 44 illustrates a project accepted notification that can be transmitted during the project accepted task 210. The notification of FIG. 44 can include the name of the subcontractor or material supplier that has accepted the project and the budget item accepted. The notification of FIG. 43 can provide the ability to access the project details.

Figure 45:
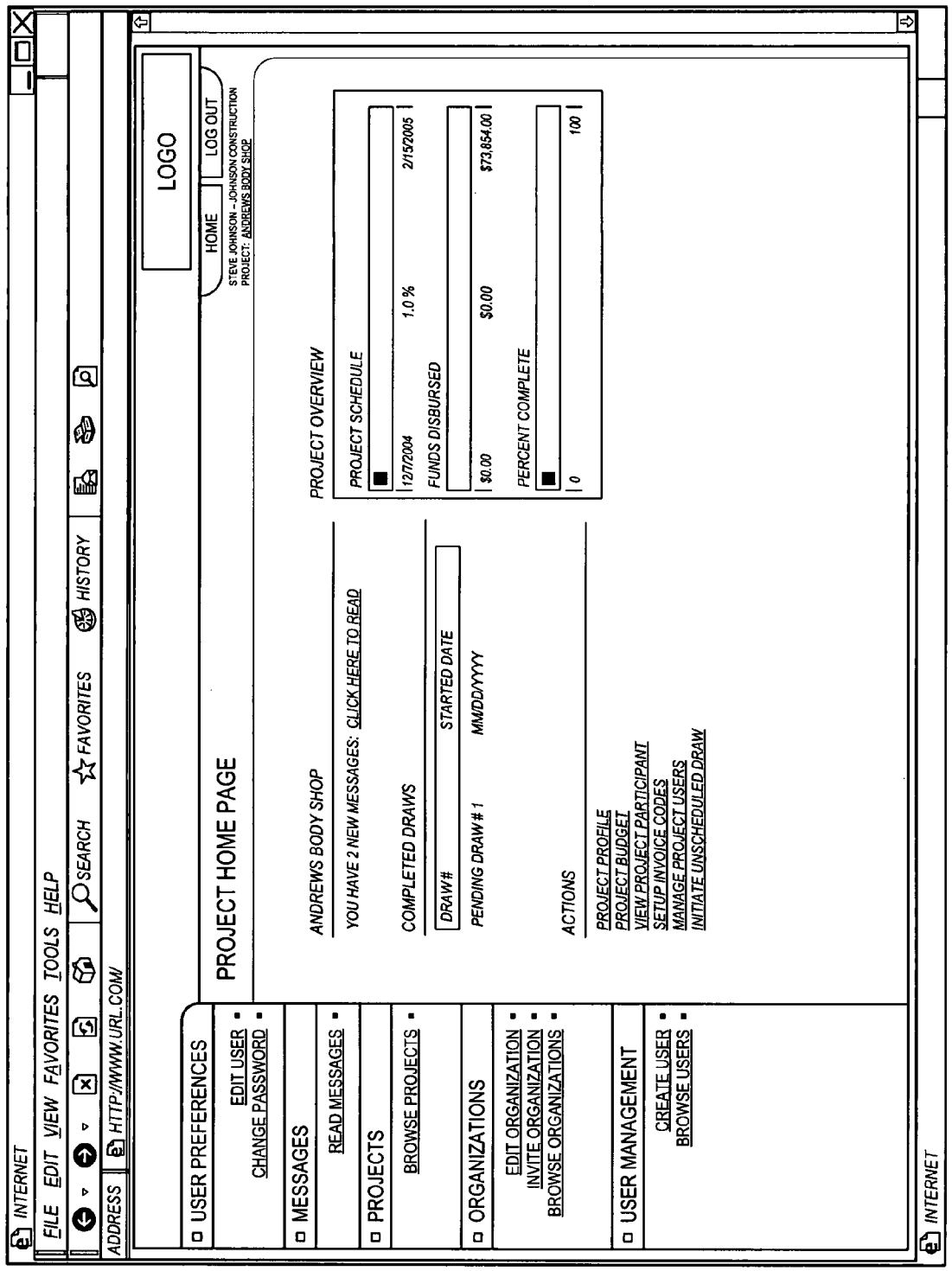
FIG. 45 is an illustration of a project home page.

FIG. 45 illustrates a project home page that can be associated with the project home page task 211. The project home page can include the project name, completed draws information, and pending draws information. The project home page can include a project overview with a project schedule progress bar, a funds disbursed progress bar, and a percent complete progress bar. The project home page can include one or more links to particular actions that can be performed with respect to the project (e.g., project profile, project budget, view project participants, setup invoice codes, manage project users, initiate unscheduled draws, etc.).

Figure 46:
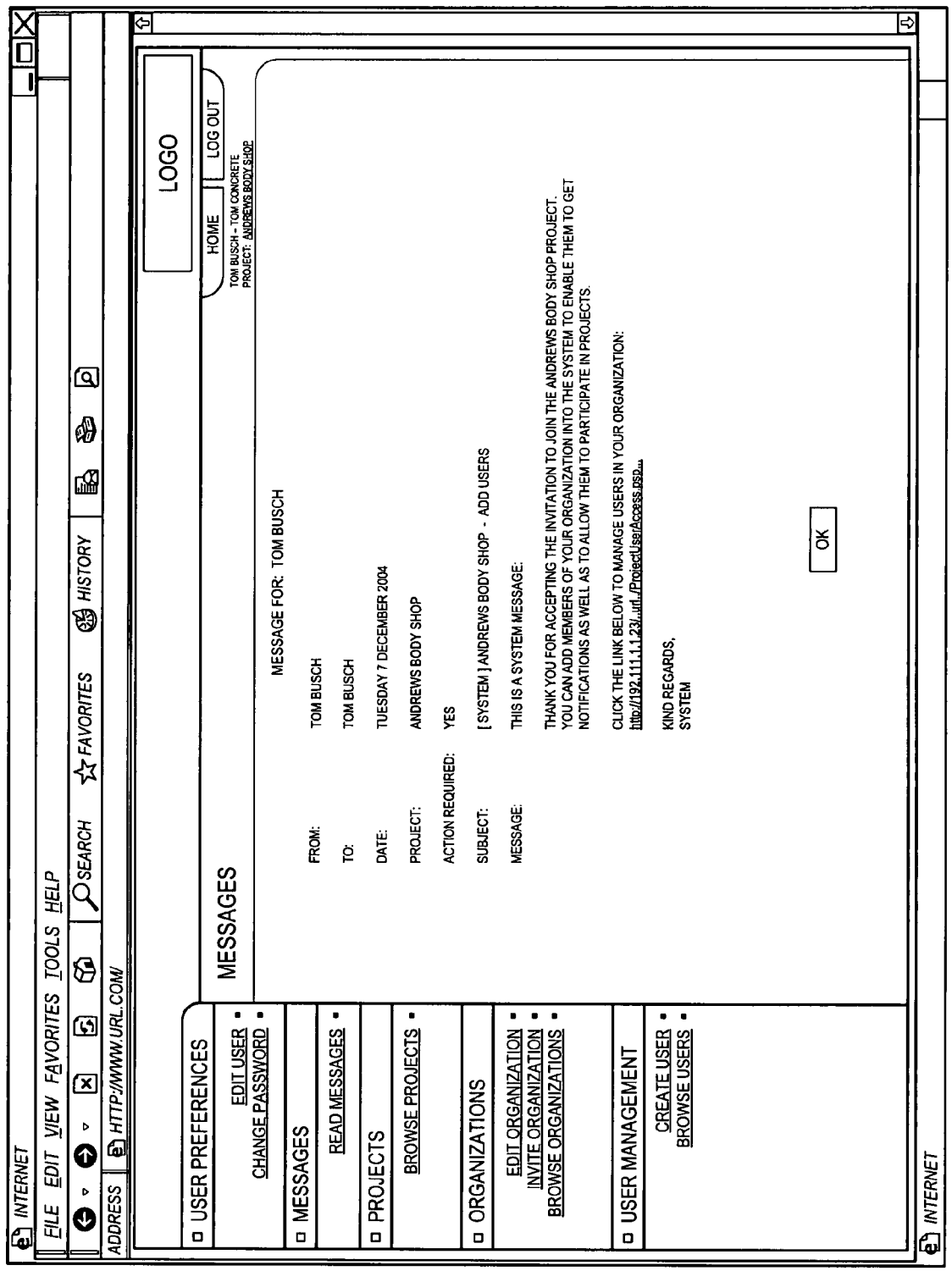
FIG. 46 is an illustration of an add users notification.

FIG. 46 illustrates an add users notification that can be transmitted during the add users task 208. The notification of FIG. 46 can include a statement confirming that the subcontractor or material supplier has joined the project. The notification of FIG. 46 can include a request for the subcontractor or material supplier to add users (e.g., members of the organization) to the system.

Figure 47:
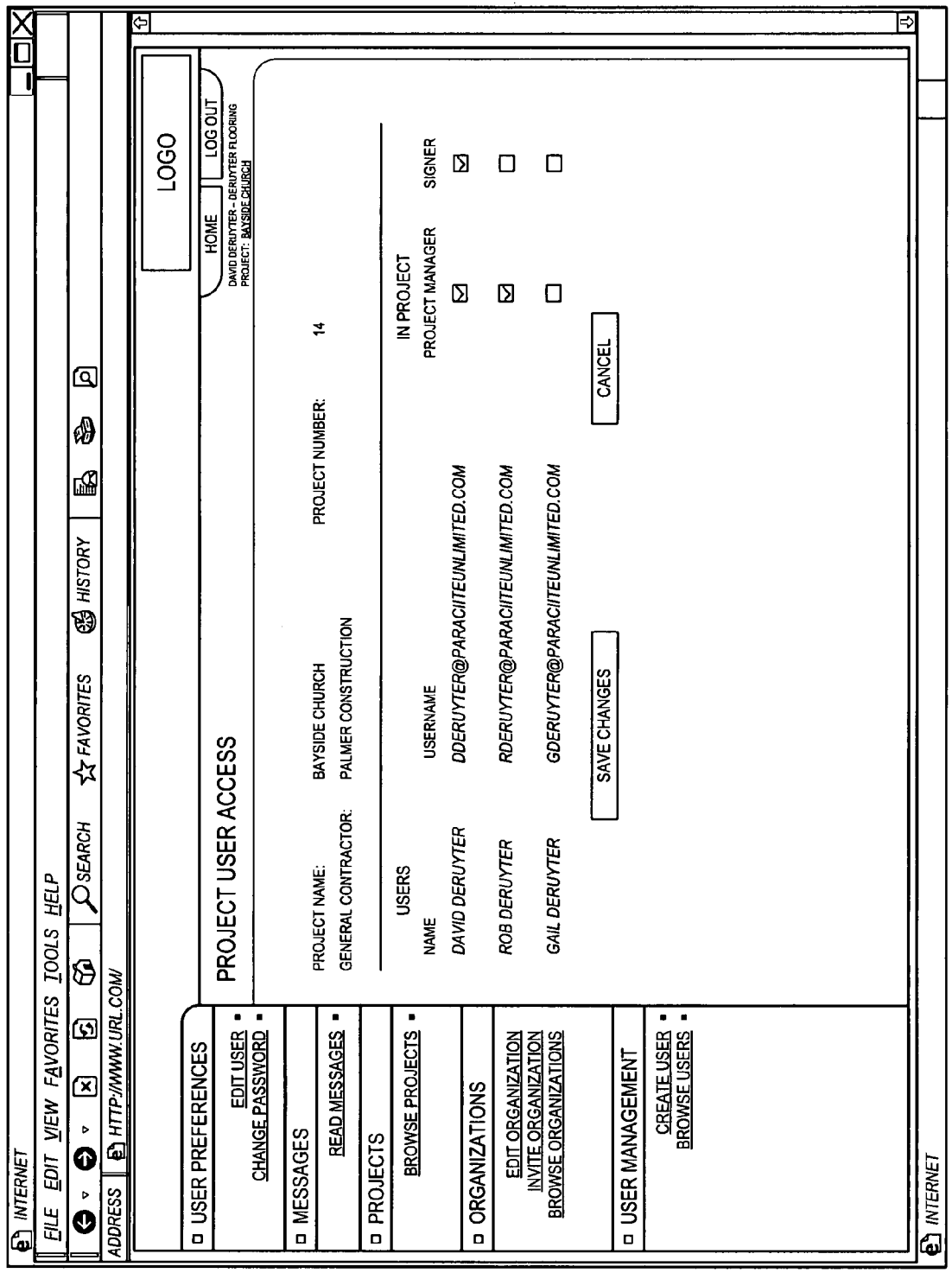
FIG. 47 is an illustration of a project user access form.

FIG. 47 illustrates a project user access form that can be associated with the project user access task 212. The subcontractor or material supplier can select each user's security clearance (e.g., a project manager or a signer). The project user access form can include the project name, the GC name, and a list of users at the subcontractor or material supplier organization.

Figure 48:
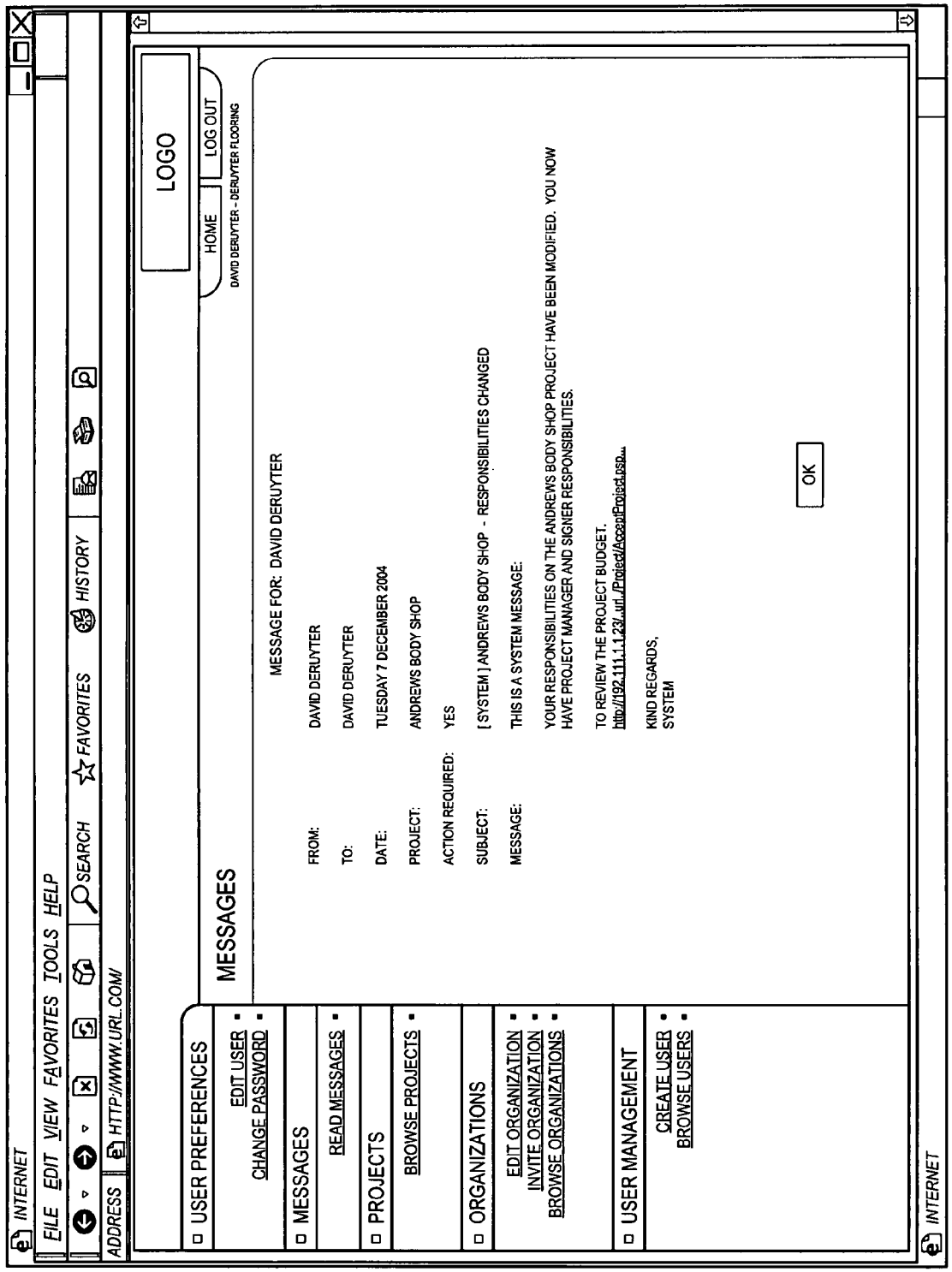
FIG. 48 is an illustration of a project responsibilities notification.

FIG. 48 illustrates a project responsibilities notification that can be associated with the project responsibilities task 214. The notification of FIG. 48 can include a statement that the user's responsibilities have been modified, along with the new security clearances. The notification of FIG. 48 can include a link to access the project budget.

Figure 49:
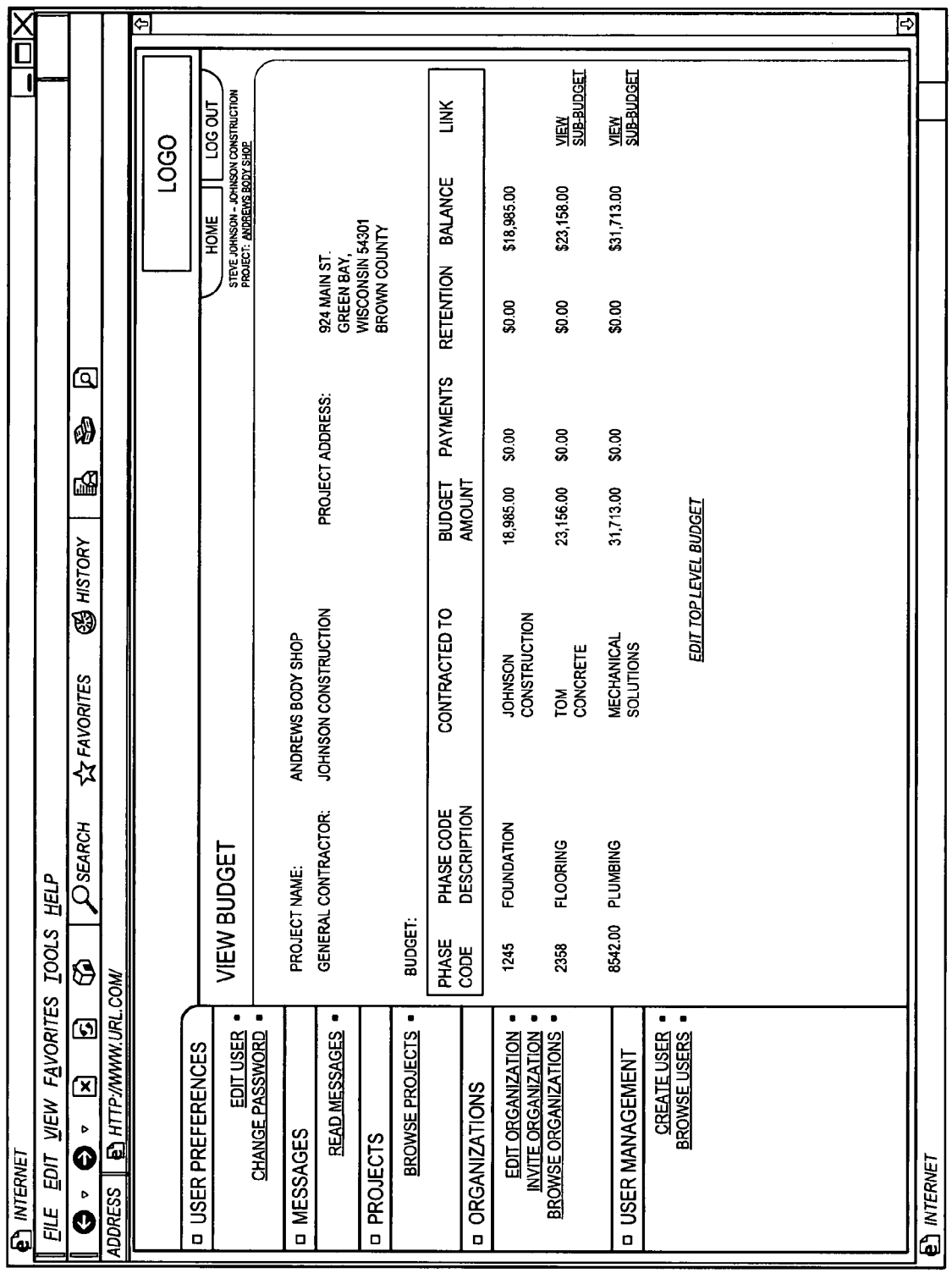
FIG. 49 is an illustration of a project budget view screen.

FIG. 49 illustrates a project budget view screen that can be associated with the project budget view task 216. A GC or subcontractor can access the project budget view screen through the budget module 36. The project budget view screen can include the project name, the GC name, the project address, and a list of the budget items. The list of budget items can include the phase codes, the phase code descriptions, the subcontractor or material supplier to which the budget item is contracted, the budget amount, the payments, the retention, the balance, and a link to any sub-budgets.

Figure 50:
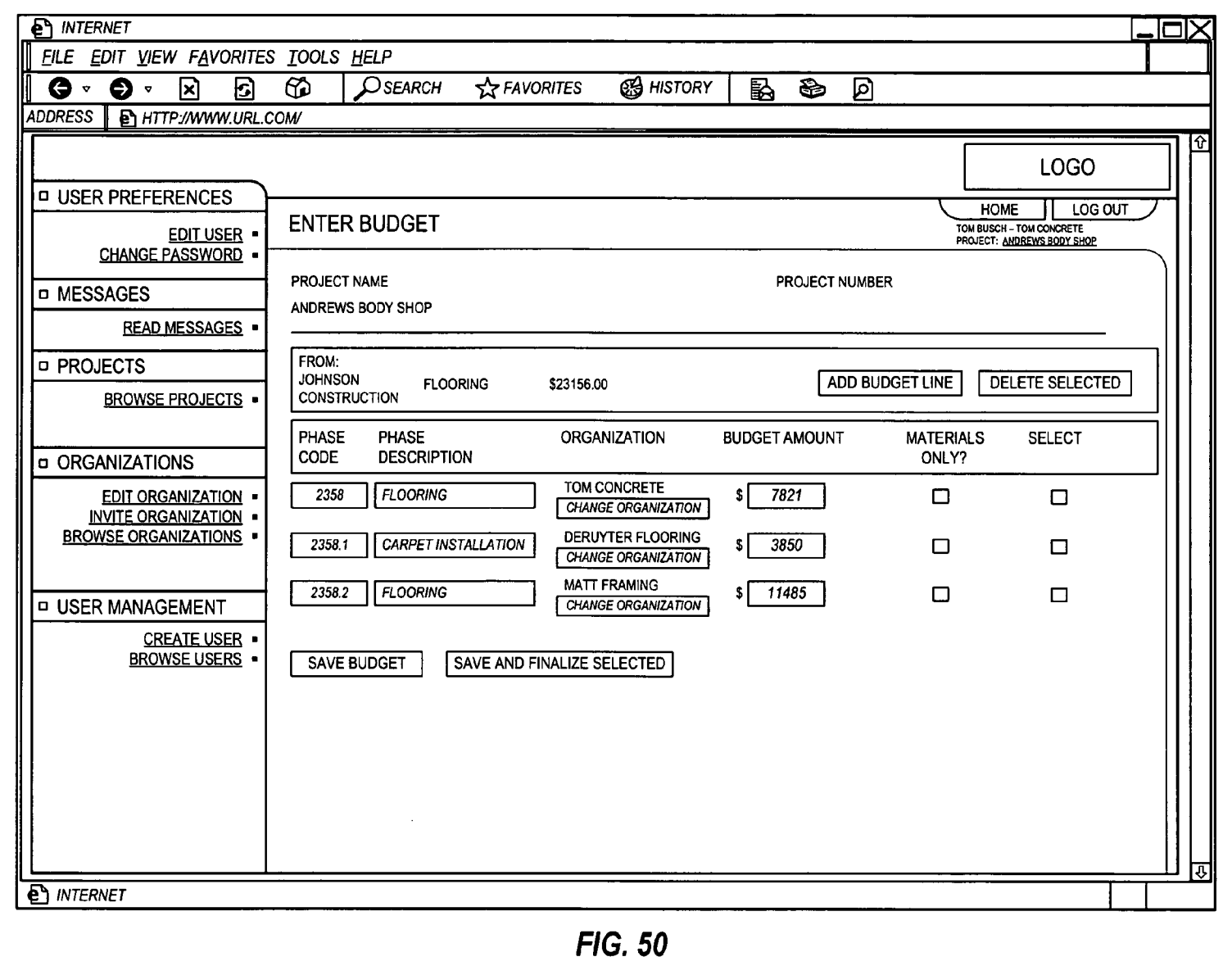

FIG. 50 illustrates an enter budget form that can be associated with the enter budget task 218. A GC or subcontractor can access the enter budget form through the budget module 36. The GC or subcontractor can enter the requested information, such as the phase codes, the phase code descriptions, and the budget amount. The GC or subcontractor can change the organization associated with a particular budget line item. The GC or subcontractor can select whether the organization is providing materials only.

Figure 51:
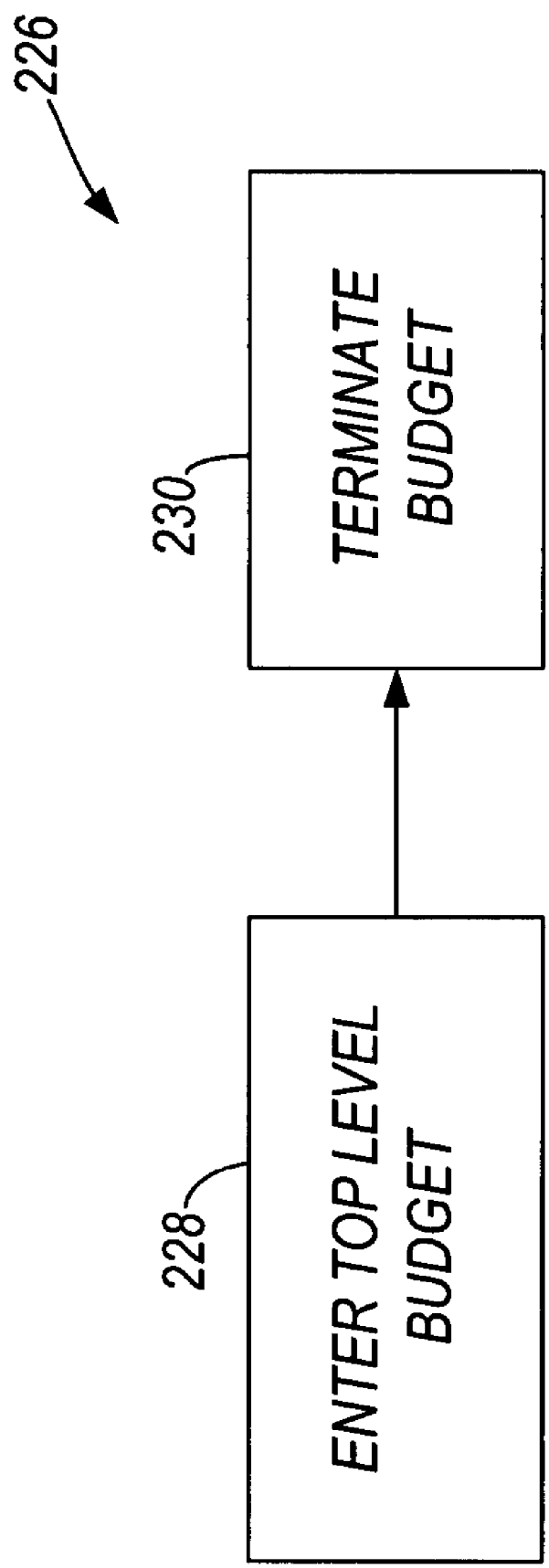
FIG. 51 is a schematic illustration of a terminate budget item process.

FIG. 51 illustrates a terminate budget item process 226, which can be included in the manage project process 94. The terminate budget item process 226 can be performed by a GC or subcontractor. The terminate budget item process 226 can include an enter top level budget task 228 and a terminate budget task 230.

FIG. 52 illustrates an enter top level budget form that can be associated with the enter top level budget task 228. A GC or subcontractor can access the enter top level budget form through the budget module 36. The enter top level budget form can include the project name, the project number, the contract value, and a list of organizations. The GC or subcontractor can enter the requested information, such as a retention percentage, phase codes, phase code descriptions, an account code, and whether the organization is only supplying materials. The GC or subcontractor can also choose to add new line items or to terminate a particular line item. The enter top level budget form can include links to a setup draw dates form and/or a setup invoice codes form.

Figure 53:
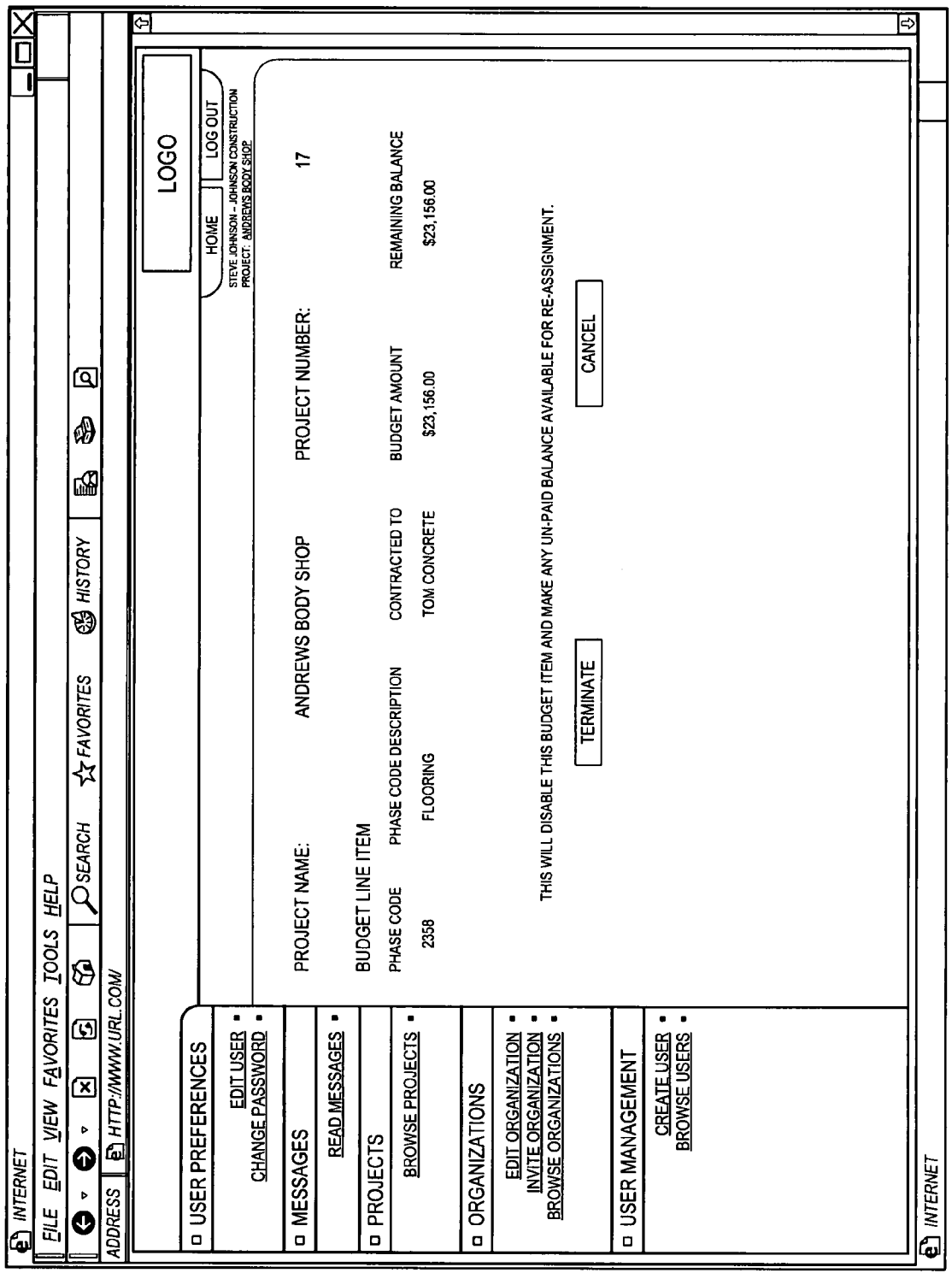
FIG. 53 is an illustration of a terminate budget screen.

FIG. 53 illustrates a terminate budget screen that can be associated with the terminate budget task 226. After a GC or subcontractor selects a line item to terminate, the terminate budget screen provides a confirmation and a statement that any un-paid balance can be made available for re-assignment.

Figure 54:
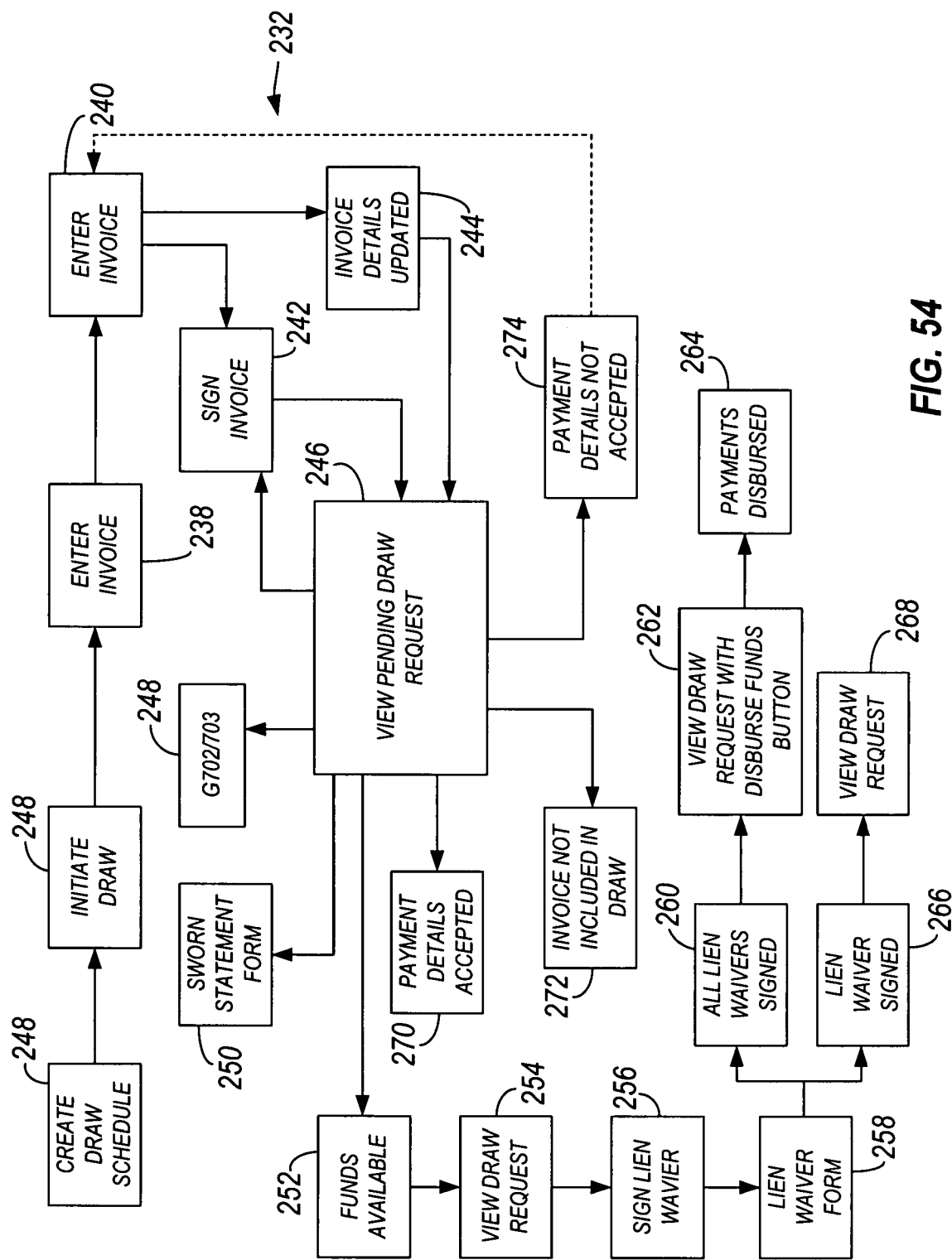
FIG. 54 is a schematic illustration of a draw process.

FIG. 54 illustrates a draw process 232, which can be included in the manage draw process 96. The draw process 232 can be used to create a schedule for the project's draws; to initiate each draw; to enter and sign invoices; to view pending draws; to generate invoices, sworn statements, and lien waivers; to determine if funds are available; and to disburse funds. The draw process 232 can be performed by several of the participants using the draw module 44. The draw process 232 can include a create draw schedule task 234, an initiate draw task 236, an enter invoice task 238, an enter invoice form task 240, a sign invoice task 242, an invoice details updated task 244, a view pending draw requests task 246, a generate invoice task 248, a sworn statement form task 250, a funds available task 252, a view draw request task 254, a sign lien waiver task 256, a lien waiver form task 258, an all lien waivers signed task 260, a view draw request with disburse funds button task 262, a payments disbursed task 264, a lien waiver signed task 266, and a view draw request task 268. The draw process 232 can also include a payments details accepted task 270, an invoice not included in draw task 272, and a payment details not accepted task 274. The draw process 232 can be performed so that the lien waivers will be released for the current draw, not for the previous draw.

Figure 55:
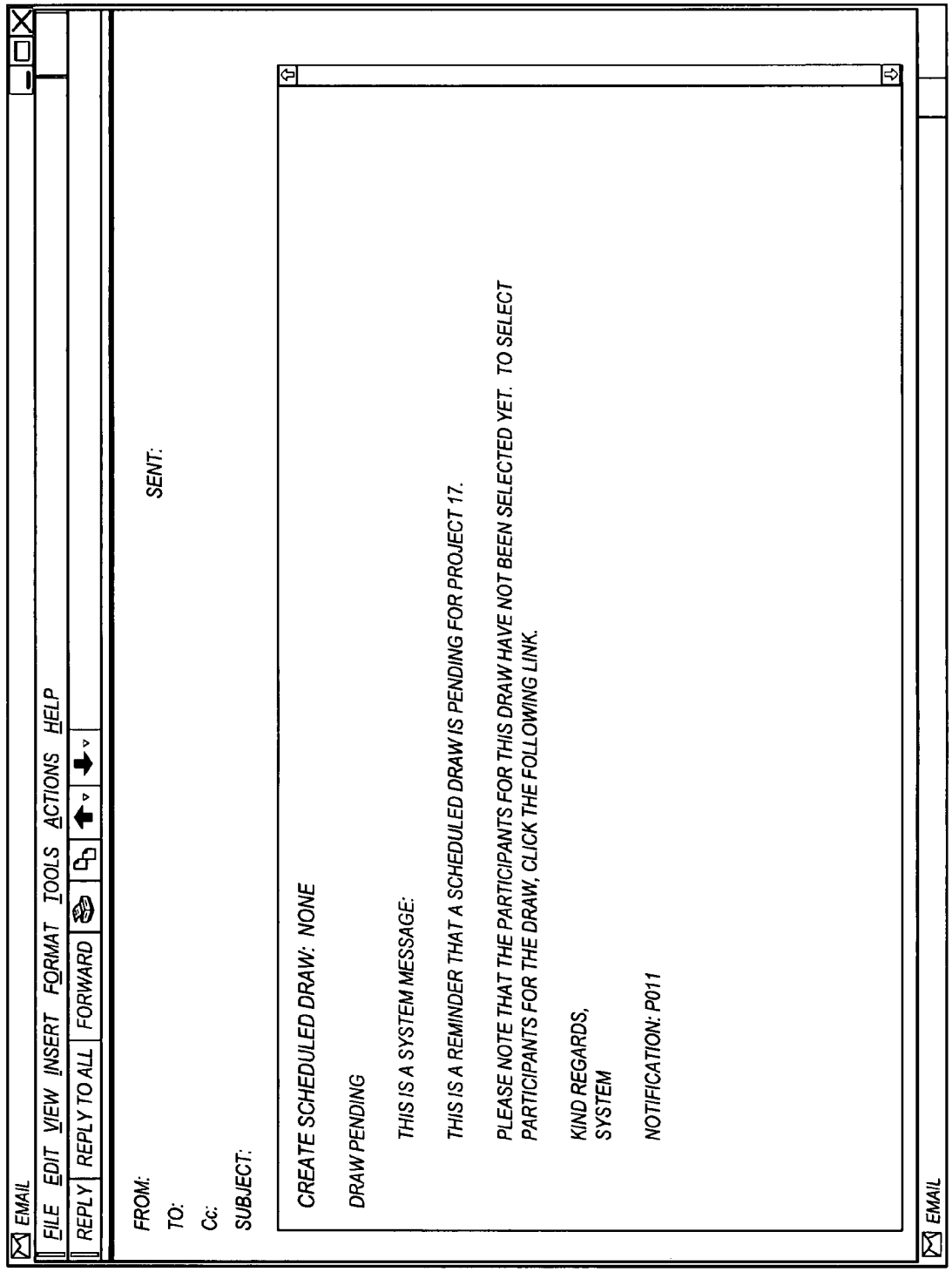
FIG. 55 is an illustration of a create scheduled draw notification.

FIG. 55 illustrates a create scheduled draw notification that can be transmitted during the create draw schedule task 234. The notification of FIG. 55 can be transmitted in real-time to all draw participants and can include a statement that a scheduled draw is pending and that participants for the draw have not yet been selected.

Figure 56:
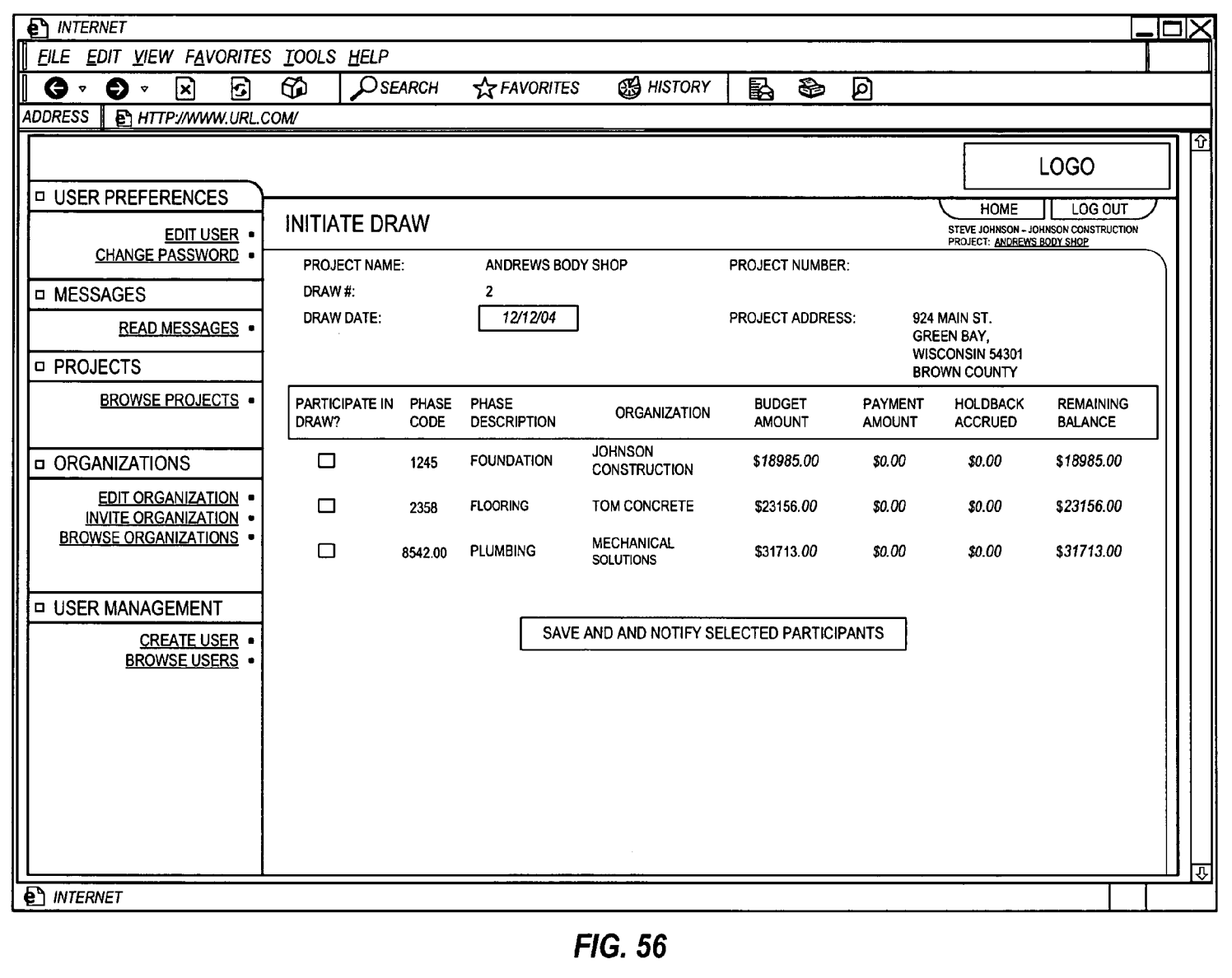

FIG. 56 illustrates an initiate draw form that can be associated with the initiate draw task 236. A GC can access the initiate draw form through the draw module 44. The initiate draw form can include the project name, the project number, the project address, the draw number, the draw date, and a list of the potential participants for the draw. The list of potential participants can include the phase codes, the phase code descriptions, the organization name, the budget amount, the payment amount, the holdback accrued, and the remaining balance. The GC can select each of the participants for the draw.

Figure 57:
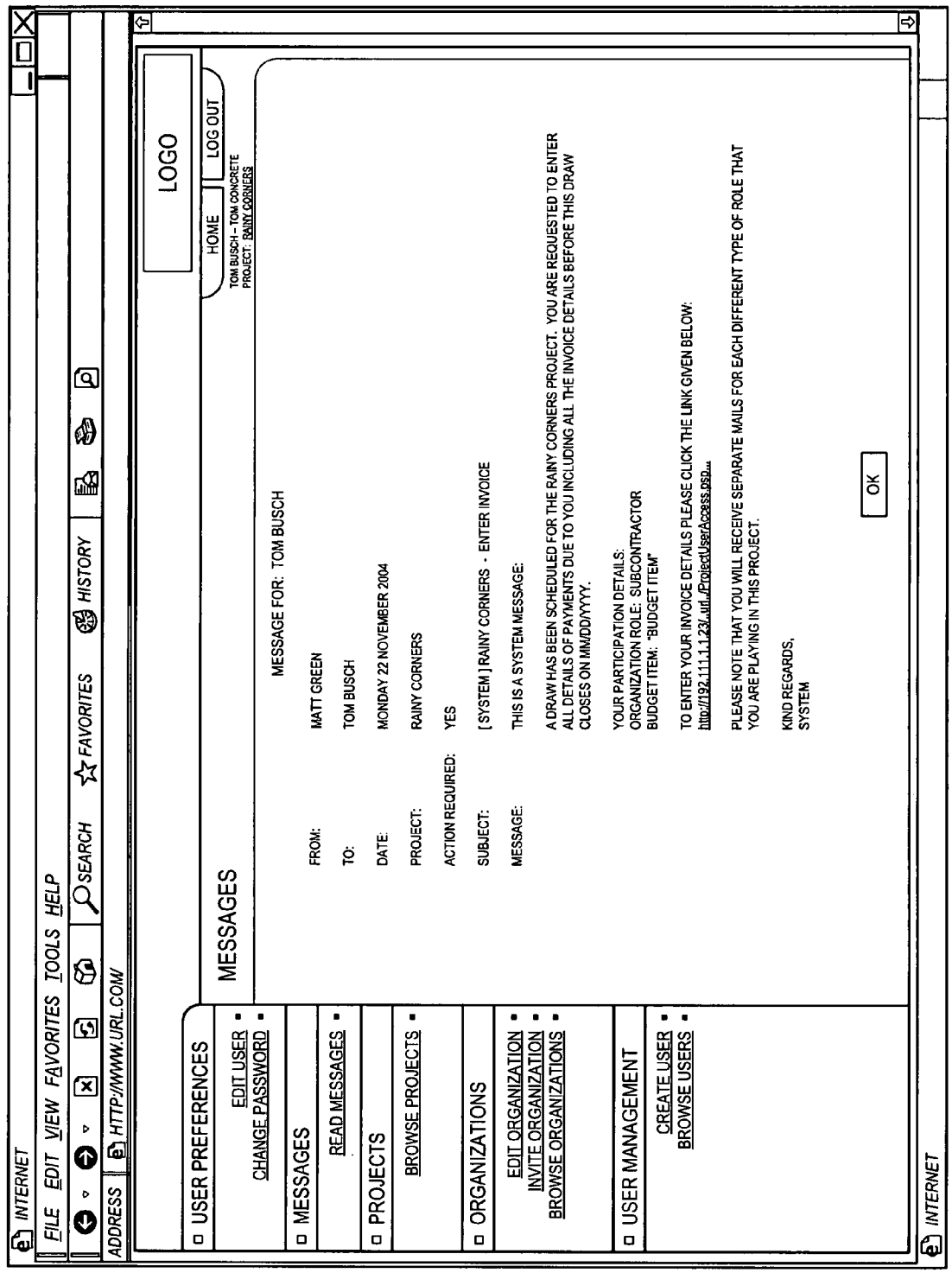
FIG. 57 is an illustration of an enter invoice notification.

FIG. 57 illustrates an enter invoice notification that can be transmitted during the enter invoice task 238. The notification of FIG. 57 can include a statement that a draw has been scheduled for a project and that the subcontractor or material supplier can enter the details of the payments due. The notification can also include the organization role and the particular budget item for the subcontractor or material supplier. The notification can be transmitted in real-time to all draw participants.

FIG. 58 illustrates an enter invoice form that can be associated with the enter invoice form task 240. The subcontractor or material supplier can use the enter invoice form to provide the invoice amount for the draw. The enter invoice form can also include the project name, the project number, the project address, the draw number, the draw date, and the particular line item for that subcontractor or material supplier.

Figure 59:
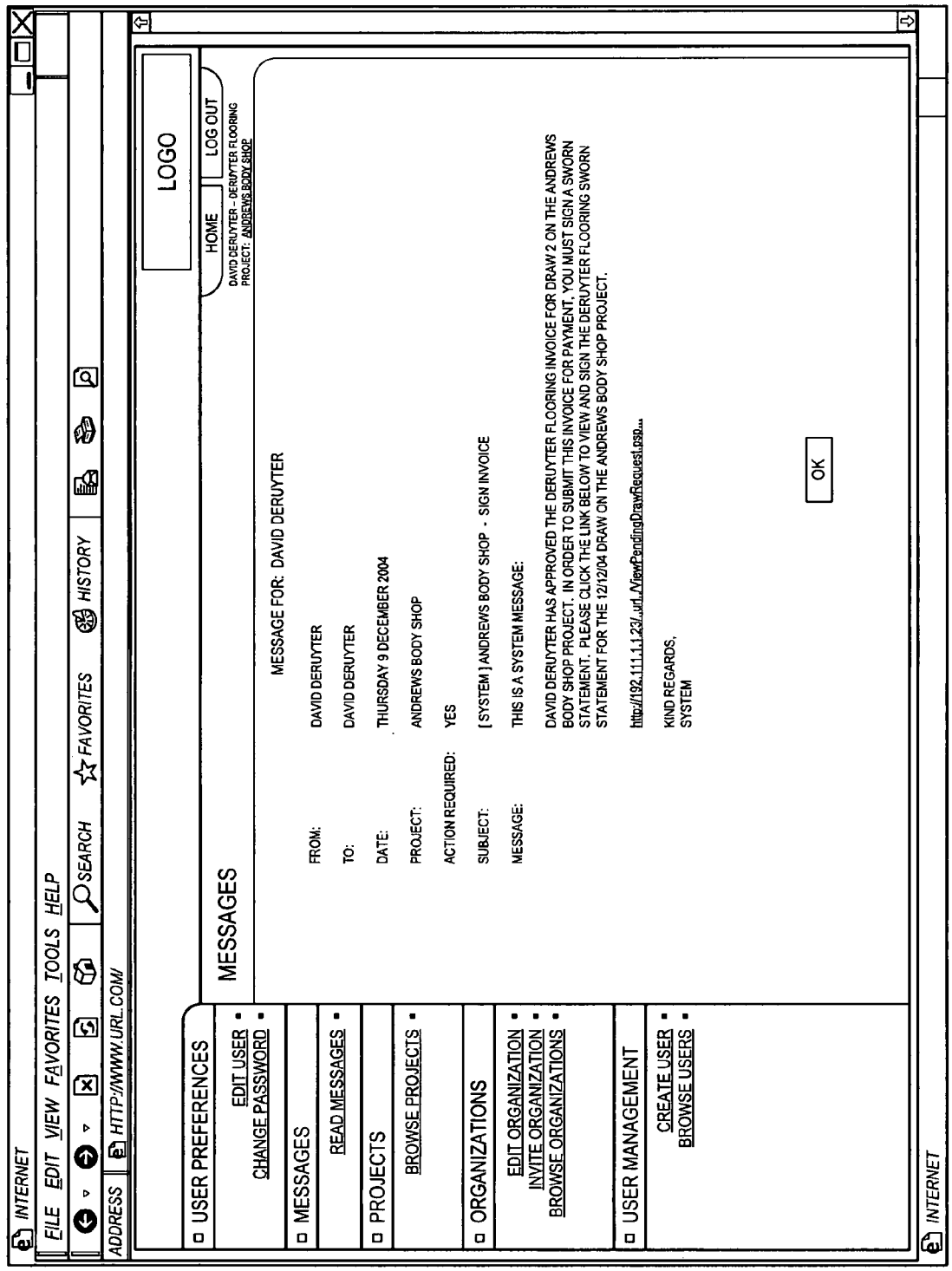
FIG. 59 is an illustration of a sign invoice notification.

FIG. 59 illustrates a sign invoice notification that can be transmitted to the GC during the sign invoice task 242. The notification of FIG. 59 can include a statement that the subcontractor or material supplier has approved the invoice for a particular draw and that a sworn statement must be signed. The CPMS 10 can be used to assign security/authority roles to each user, such as management, accounting, or authorized to sign. The CPMS 10 can notify a user with the authority to sign the sworn statement so that an officer of the organization signs the sworn statement, if necessary. The CPMS 10 can be used to change the security/authority roles that are necessary to sign a sworn statement (e.g., a lender can require that an officer signs the sworn statement, rather than an administrator for the organization).

Figure 60:
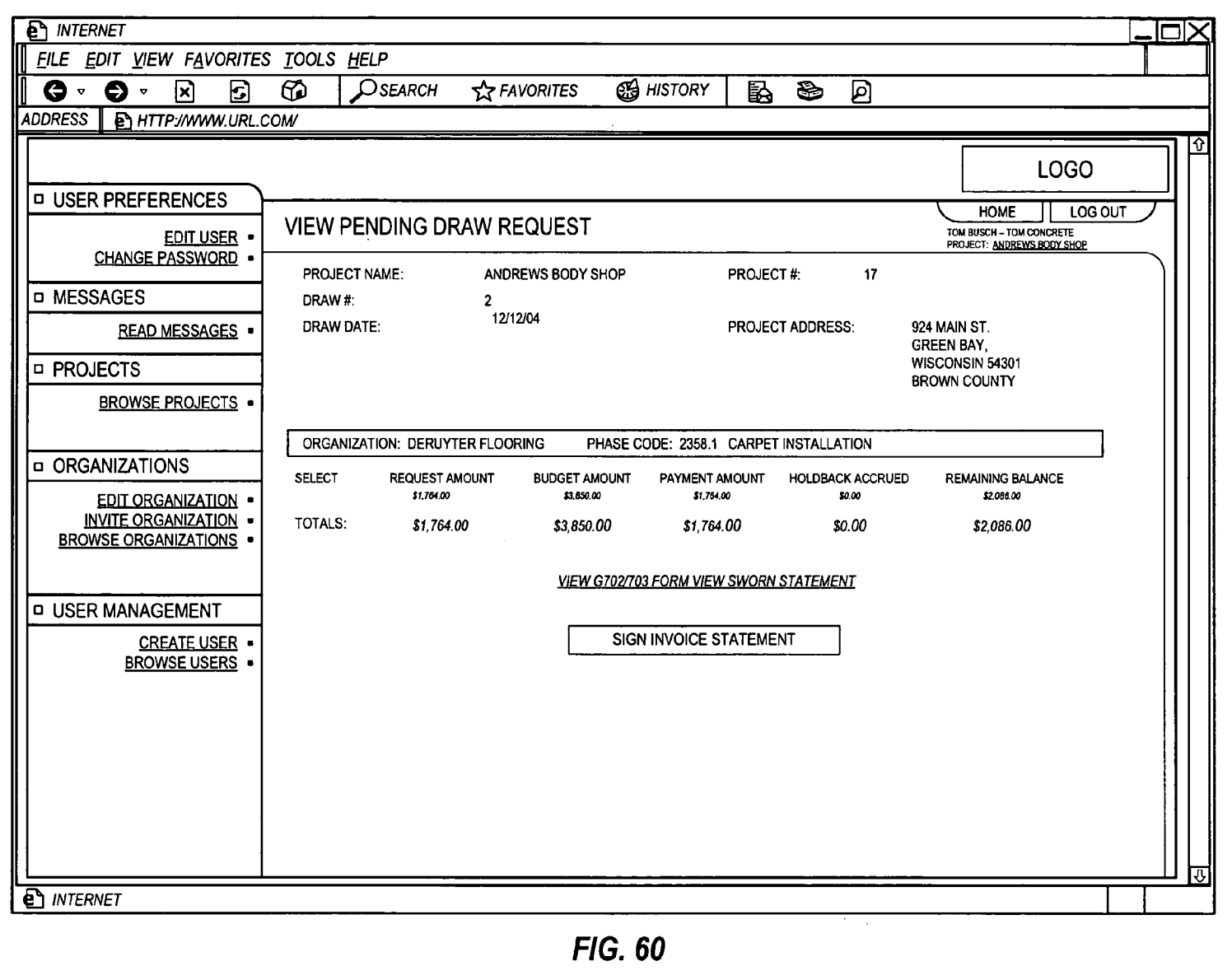

FIG. 60 illustrates a sign invoice form that can be associated with the sign invoice task 242. The GC can access the sign invoice form through the draw module 44. The GC can review the details of the invoice, such as the particular organization, the request amount, the budget amount, the payment amount, the holdback accrued, and the remaining balance. The GC can then choose to sign the invoice statement. The sign invoice form can include a link to an automated sworn statement form.

Figure 61:
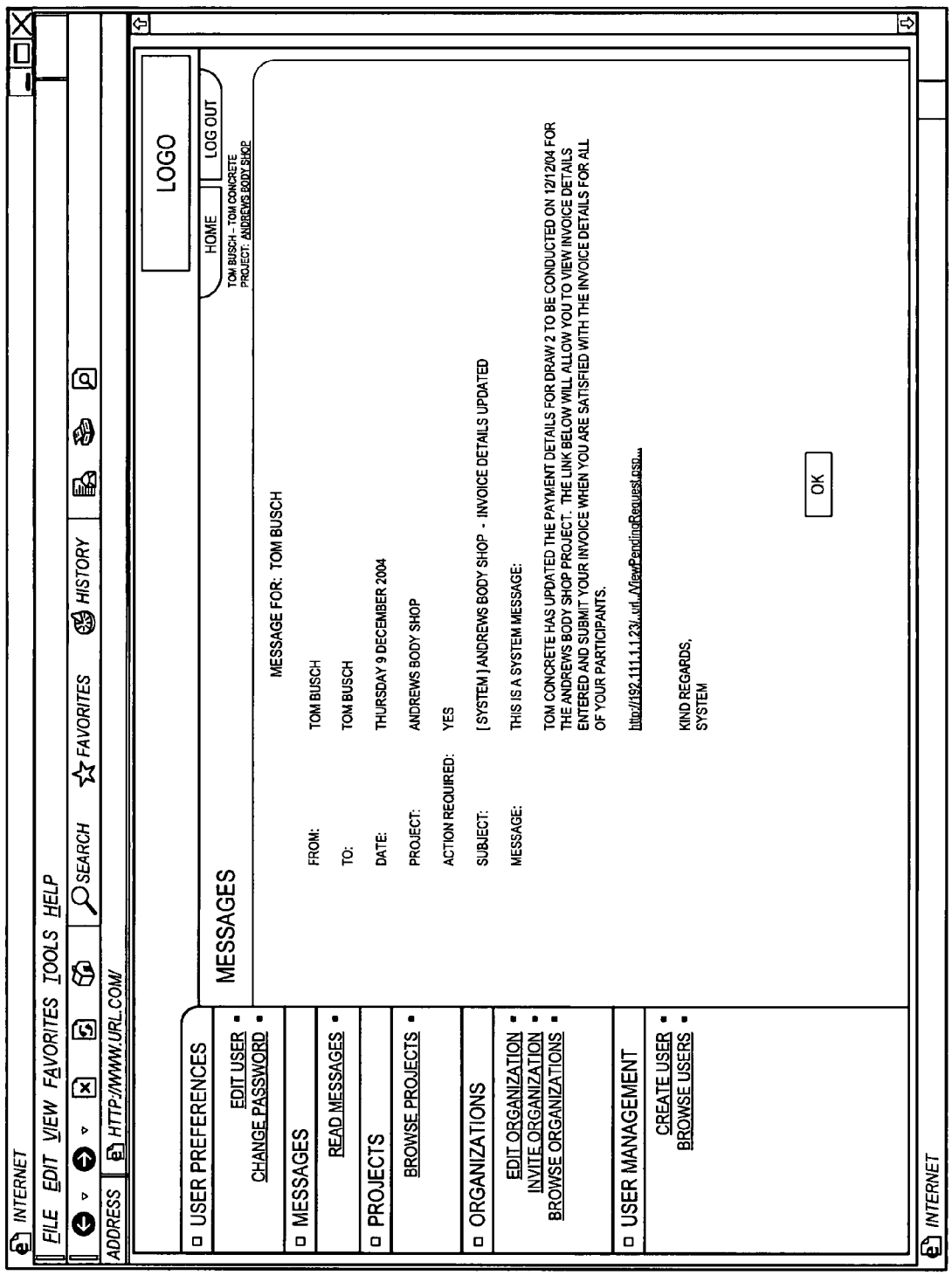
FIG. 61 is an illustration of an invoice details updated notification.

FIG. 61 illustrates an invoice details updated notification that can be transmitted to the GC during the invoice details updated task 244. The notification of FIG. 61 can include a statement that a subcontractor or material supplier has updated the payment details for a draw on a particular date for a particular project. The notification can provide a link in order to view the invoice details.

Figure 62:
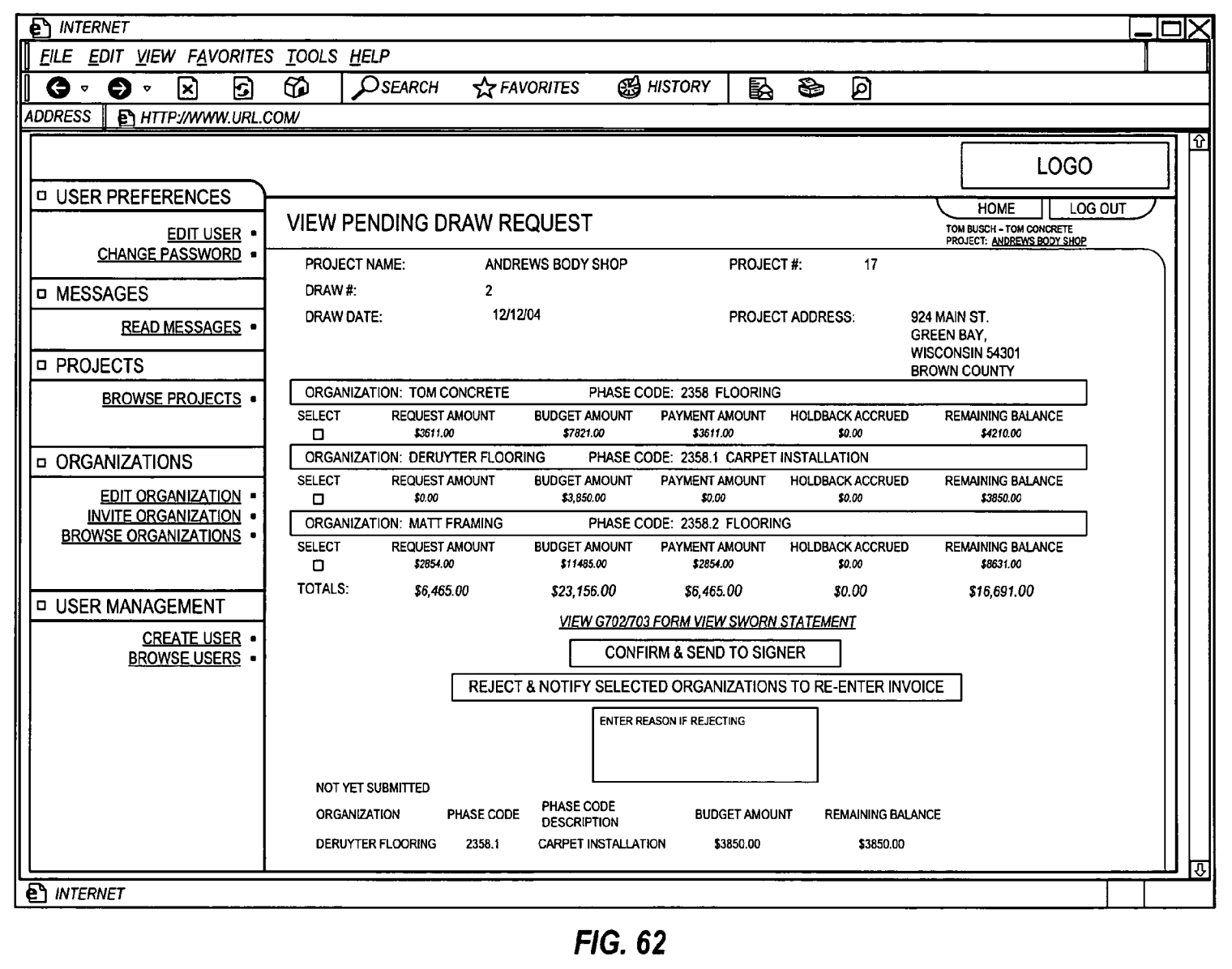

FIG. 62 illustrates a view pending draw request screen that can be associated with the view pending draw request task 246. A GC can access the view pending draw request screen through the draw module 44. The GC can select each participant to include in the draw, confirm the draw, and send a notification in real-time to the signer of each organization. However, the GC can also reject the pending draw request, notify selected participants to re-enter an invoice, and provide a reason for rejecting the draw request. The view pending draw request screen can include the project name, the project number, the project address, the draw number, the draw date, a list of participants who have submitted invoices, and a list of participants who have not submitted invoices. The participants can be organized by phase codes. For each phase code, the view pending draw requests screen can include the requested amount, the budget amount, the payment amount, the holdback accrued, and the remaining balance.

Figure 63:
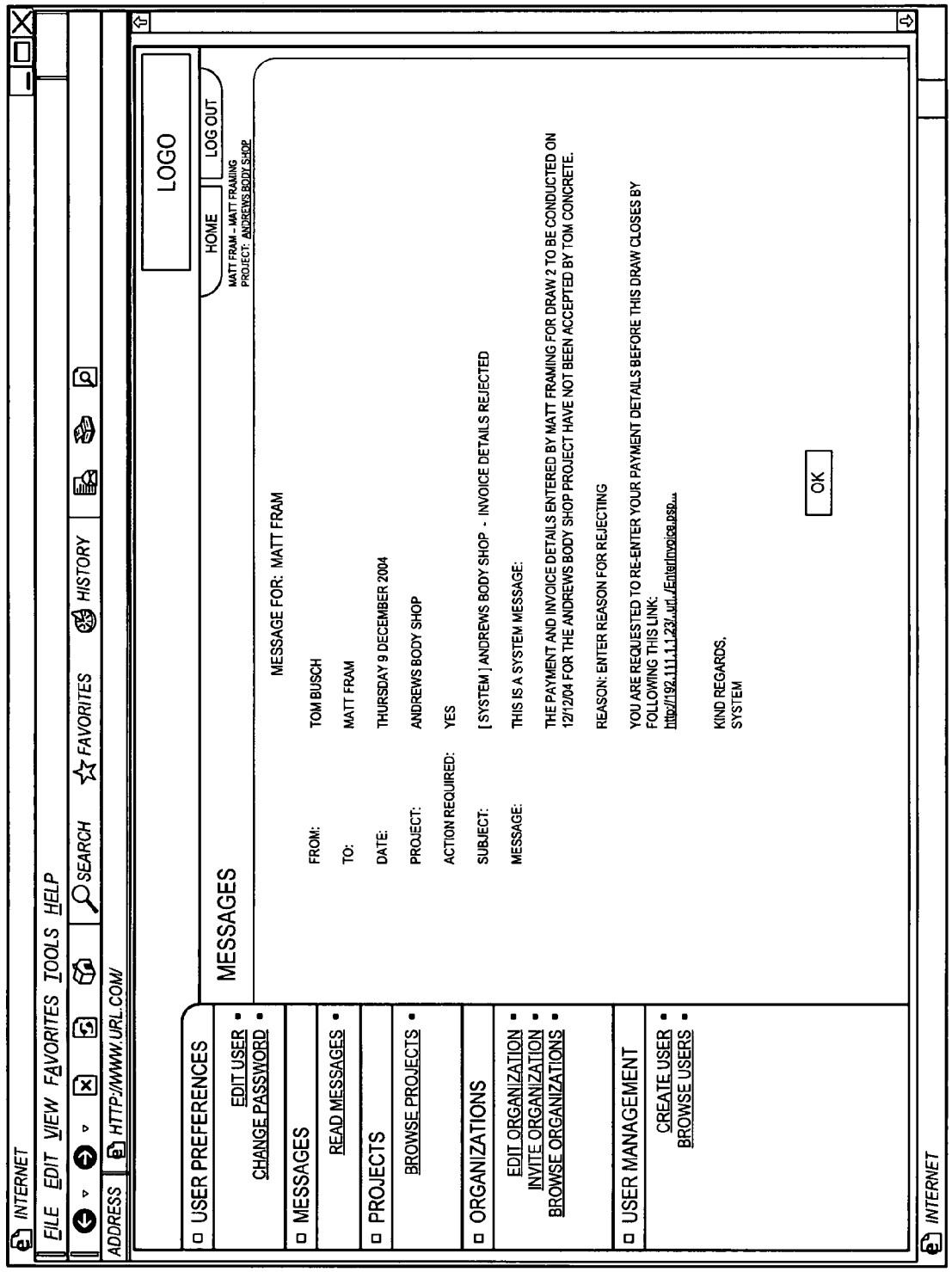
FIG. 63 is an illustration of an invoice details rejected notification.

FIG. 63 illustrates an invoice details rejected notification that can be transmitted during the payment details not accepted task 274. The notification of FIG. 63 can include a statement that the payment and invoice details entered by a particular user for a draw to be conducted on a date for a particular project have not been accepted and the reasons for the rejection. The notification can include a request for the subcontractor or the material supplier to re-enter the payment details before the draw closes.

Figure 64:
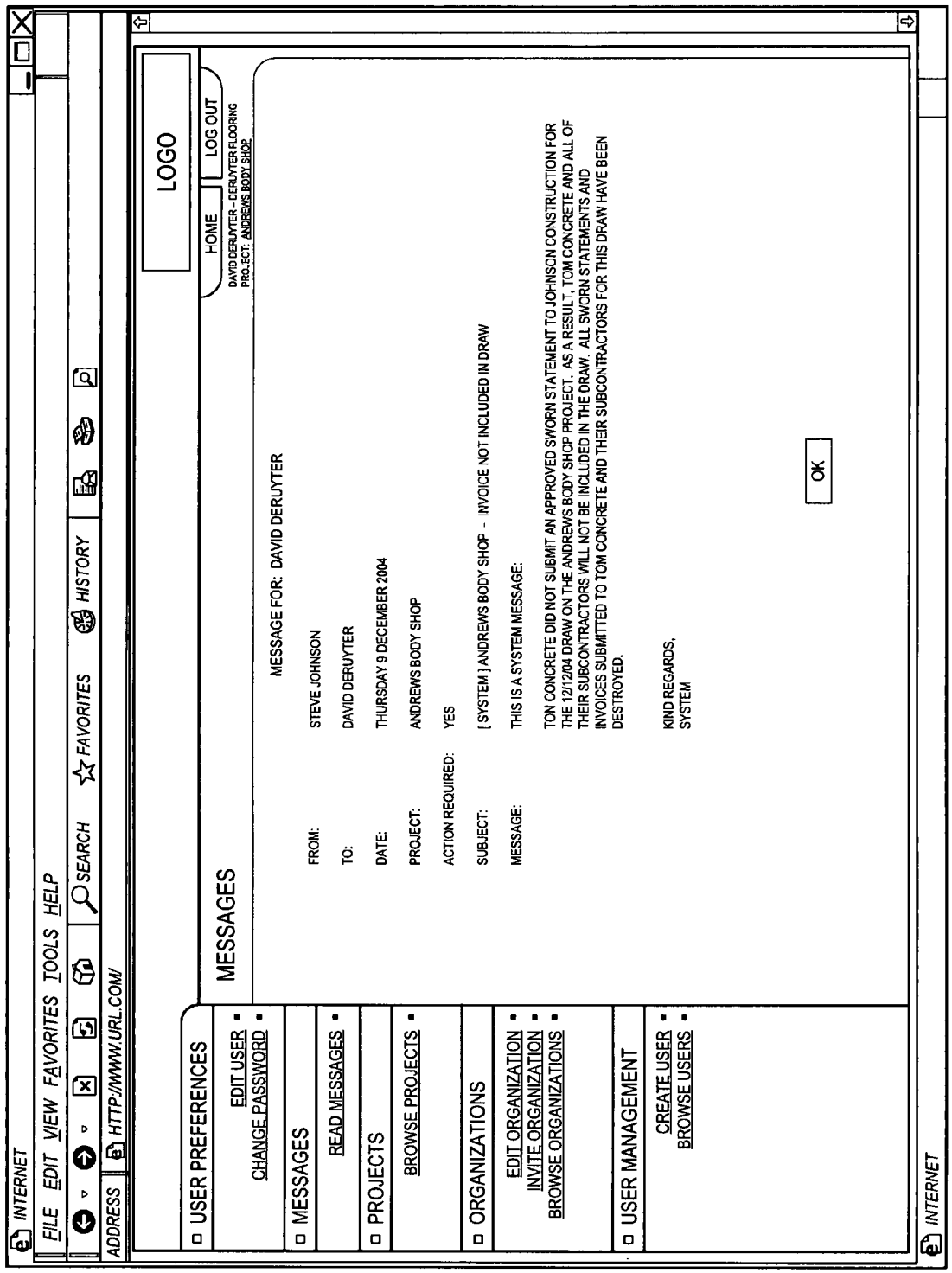
FIG. 64 is an illustration of an invoice not included in the draw notification.

FIG. 64 illustrates an invoice not included in the draw notification that can be transmitted during the invoice not included in draw task 272. The notification of FIG. 64 can include a statement that the participant did not submit an approved sworn statement for a draw for a project and that the participant and all of their subcontractors will not be included in the draw. The notification can state that all sworn statements and invoices that were submitted have been destroyed.

Figure 65:
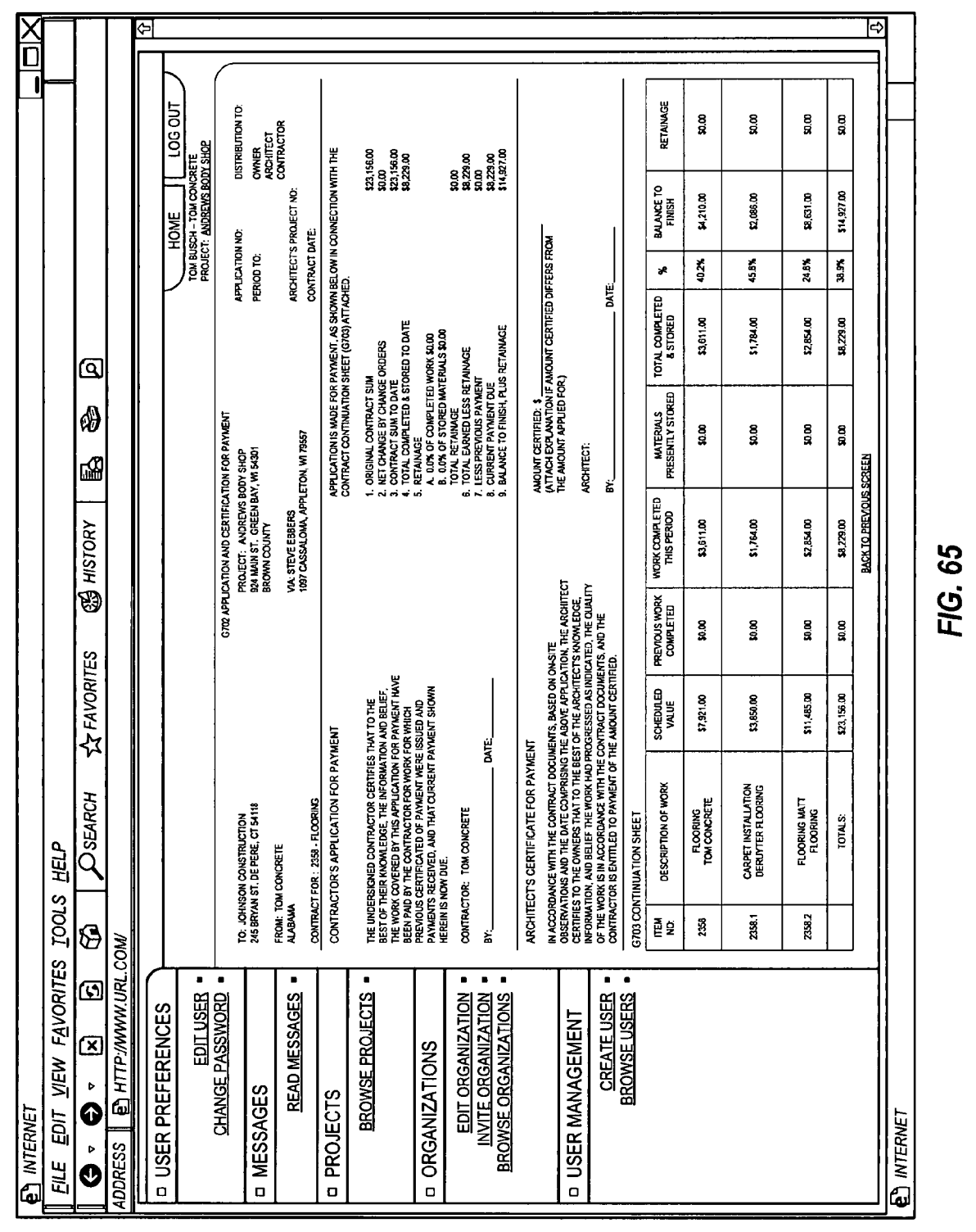

FIG. 65 illustrates an automatically-generated invoice form (e.g., a form that is consistent with industry practices, such as a G702/703 form) that can be associated with the generate invoice task 248 (labeled G702/703 in FIG. 54). A GC, subcontractors, and material suppliers can access the invoice forms through the draw module 44. The subcontractors, material suppliers, and/or architect can sign the invoice form electronically (e.g., using an electronic signature software provider, such as AlphaTrust Corporation).

FIG. 66 illustrates an automatically-generated sworn statement form that can be associated with the sworn statement form task 250. A GC can access the sworn statement form through the draw module 44. The GC can sign the sworn statement form electronically (e.g., using an electronic signature software provider, such as AlphaTrust Corporation).

Figure 67:
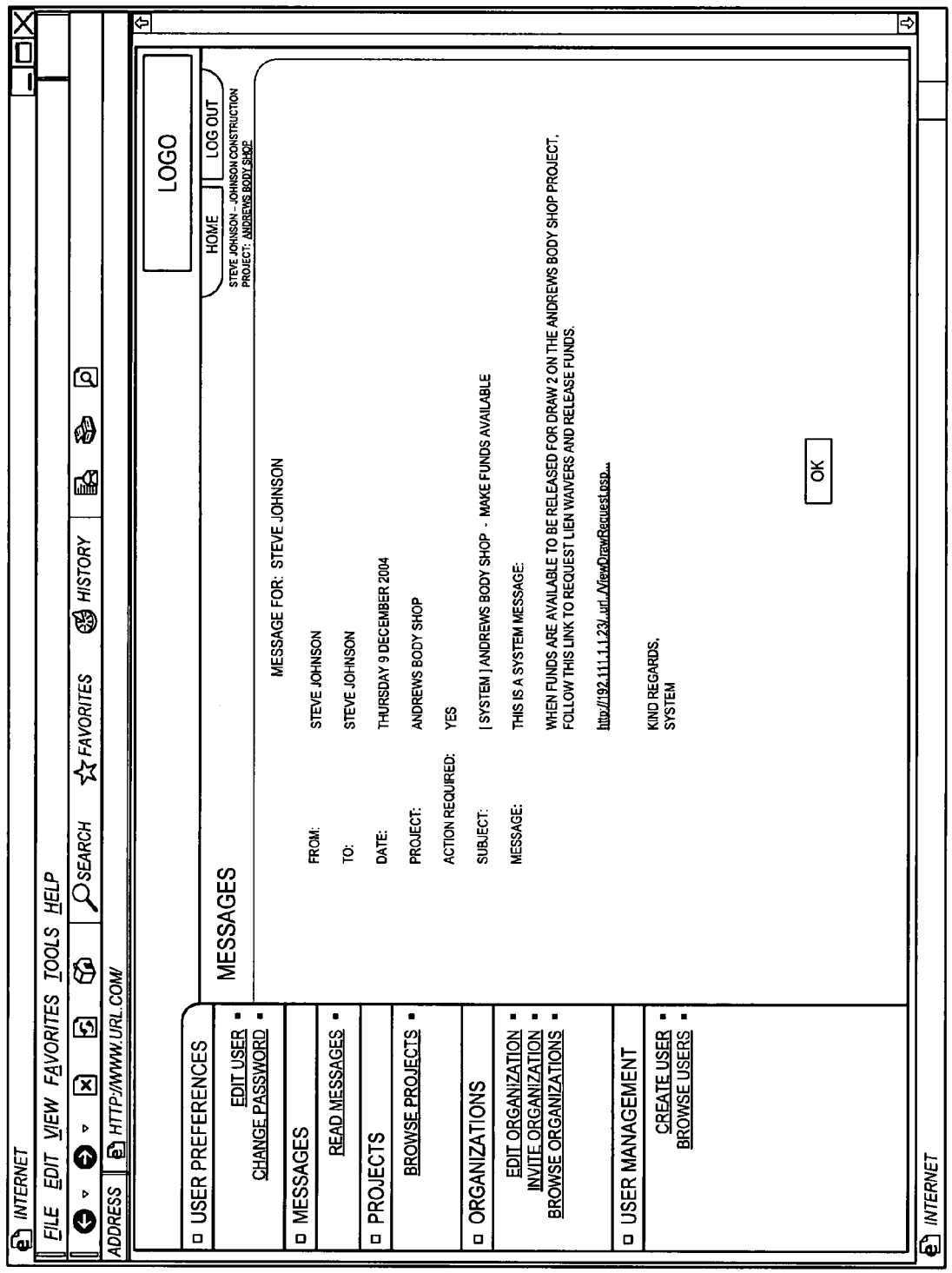
FIG. 67 is an illustration of a make funds available notification.

FIG. 67 illustrates a make funds available notification that can be transmitted during the funds available task 252. The notification of FIG. 67 can include instructions to follow a link to request lien waivers and release funds when funds are available to be released for a draw on a project.

Figure 68:
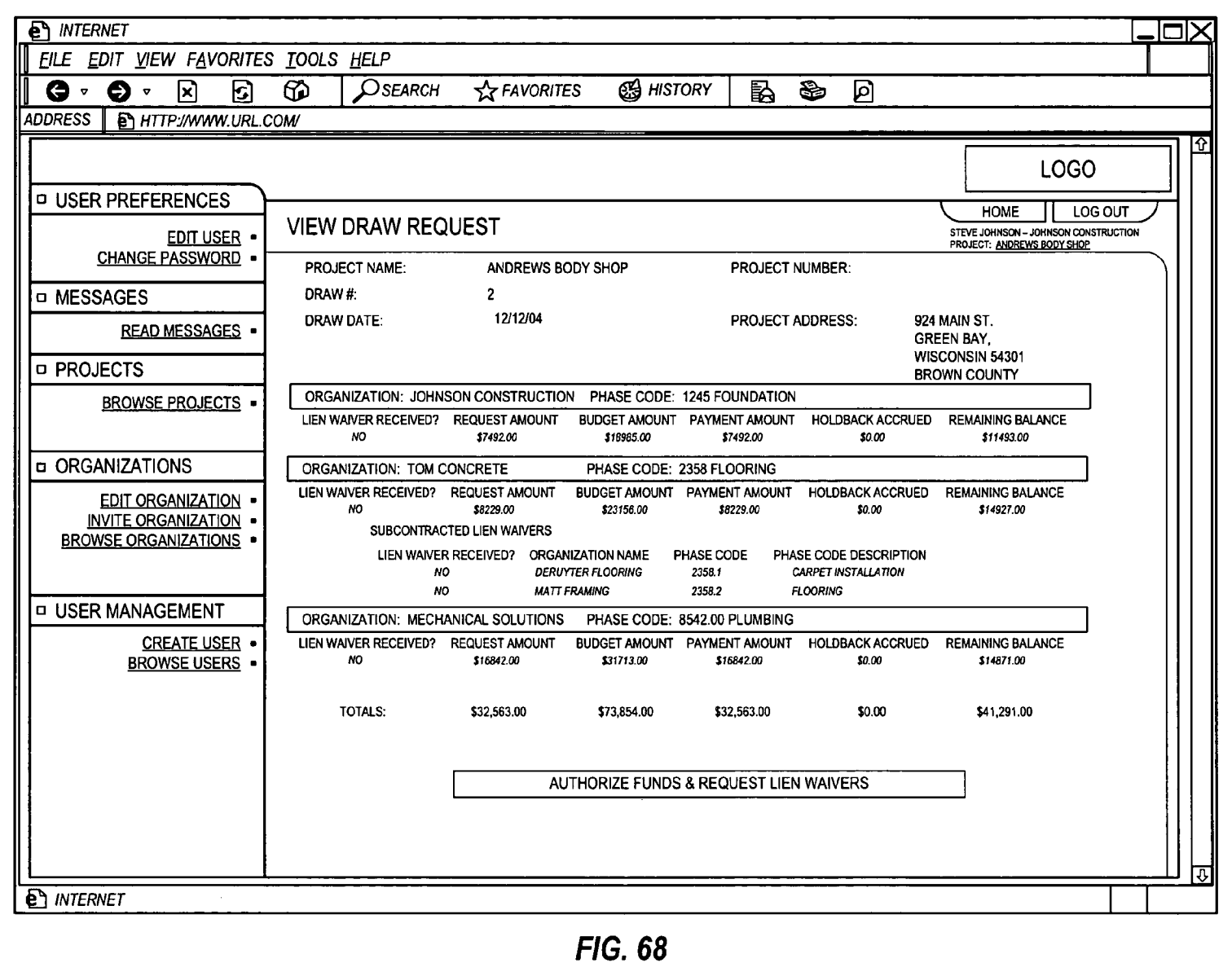

FIG. 68 illustrates a view draw request screen that can be associated with the view draw request task 254. A GC can access the view draw request screen through the draw module 44. The GC can review the details of the draw, authorize funds, and request lien waivers. The view draw request screen can include the project name, the project number, the project address, the draw number, the draw date, and a list of participants in the draw. The list of participants can include the participant name, phase code, whether a lien waiver has been received, the requested amount, the budget amount, the payment amount, the holdback accrued, and the remaining balance. The list of participants can also include any subcontractor and their lien waivers.

Figure 69:
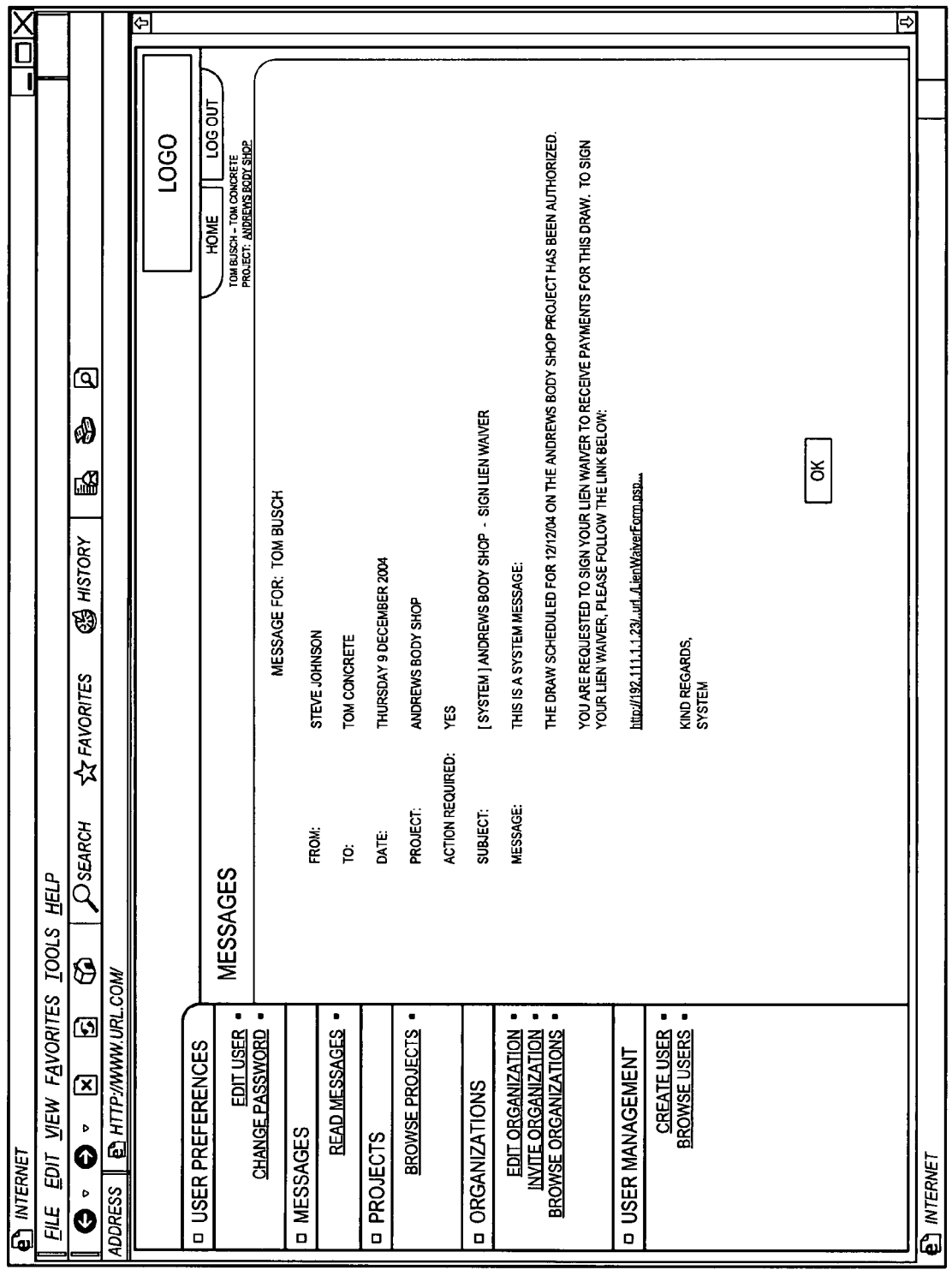
FIG. 69 is an illustration of a sign lien waiver notification.

FIG. 69 illustrates a sign lien waiver notification that can be transmitted during the sign lien waiver task 256. The notification of FIG. 69 can be transmitted in real-time to all draw participants and can include a statement that the draw scheduled for a project has been authorized and that the subcontractor or material supplier is requested to sign its lien waiver to receive payments for the draw.

Figure 70:
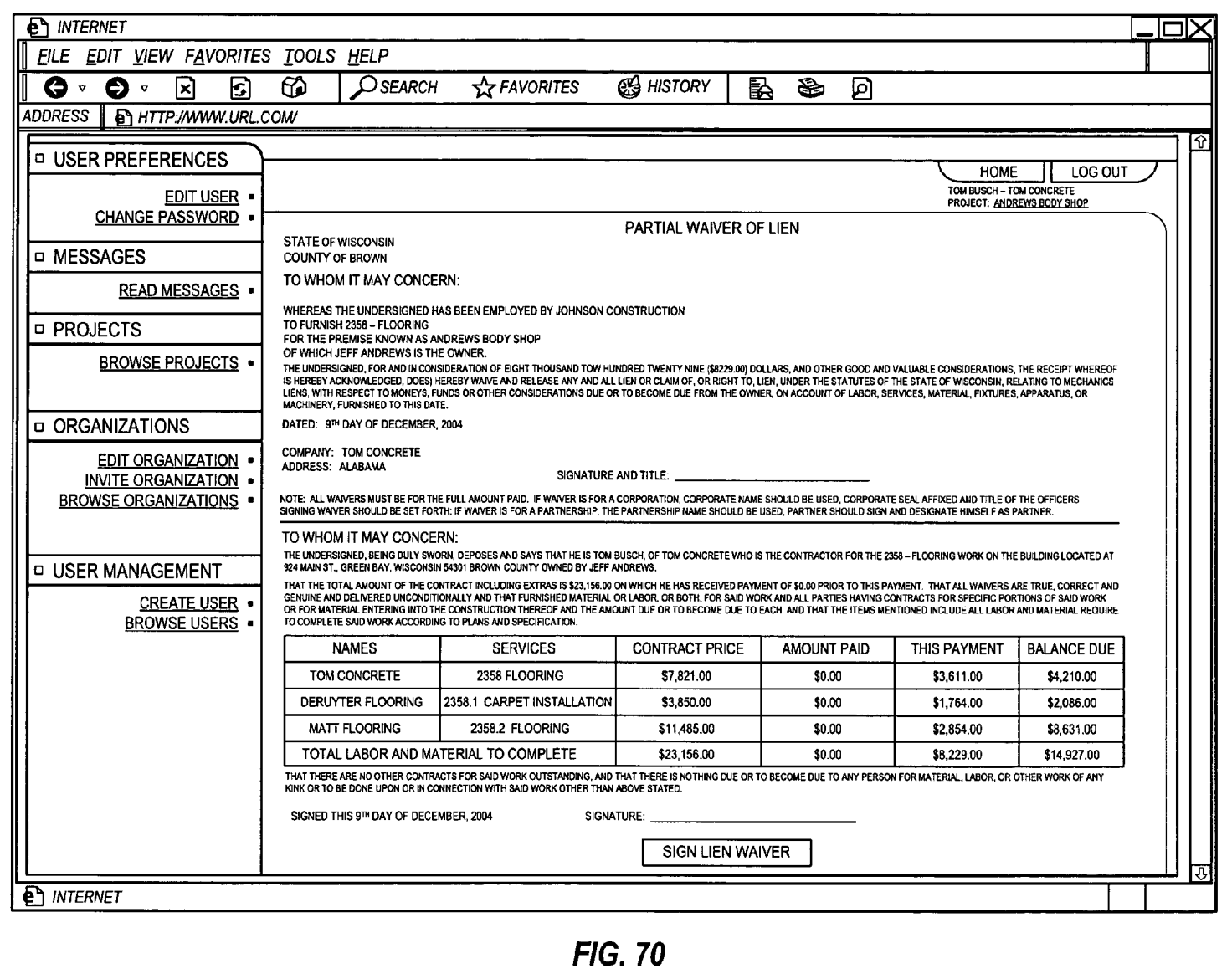

FIG. 70 illustrates an automatically-generated lien waiver form that can be associated with the lien waiver form task 258. Subcontractors and material suppliers can access the lien waiver form through the draw module 44. The lien waiver form can be automatically generated based on the budget, including the line items for each subcontractor or material supplier. The subcontractors and material suppliers can sign the lien waiver forms electronically (e.g., using the AlphaTrust Corporation electronic signature products). Once signed, the lien waivers 68 can be stored in the electronic holding bin/escrow 54.

Figure 71:
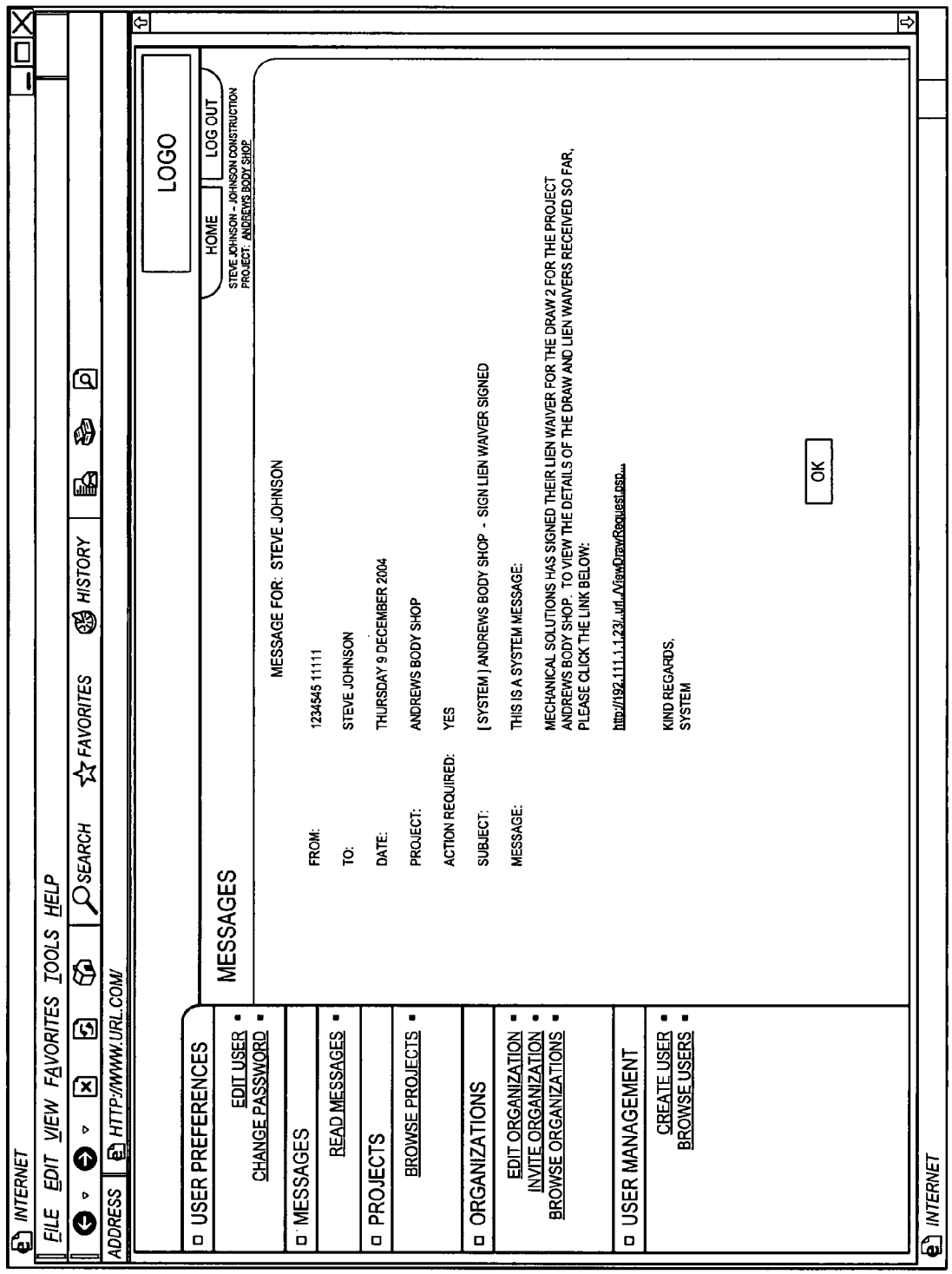
FIG. 71 is an illustration of a lien waiver signed notification.

FIG. 71 illustrates a lien waiver signed notification that can be transmitted during the lien waiver signed task 266. The notification of FIG. 71 can include a statement that a subcontractor or material supplier has signed their lien waiver for a draw for a project. The notification can include access to details of the draw and the lien waivers received so far.

Figure 72:
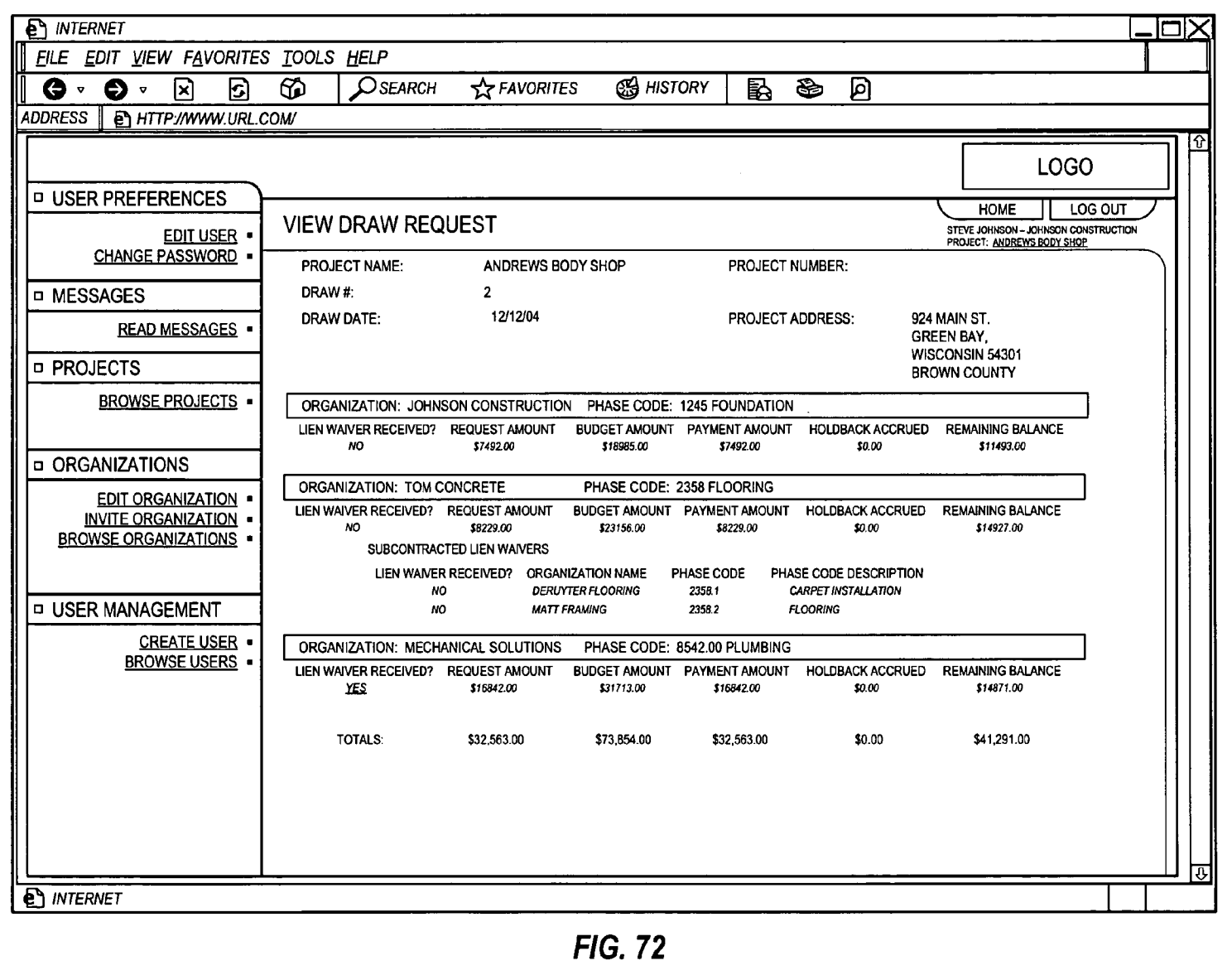

FIG. 72 illustrates a view draw request screen that can be associated with the view draw request task 268. A GC, subcontractor, or material supplier can access the view draw request screen through the draw module 44. The view draw request screen can include the project name, the project number, the project address, the draw number, the draw date, and a list of participants in the draw. The list of participants can include the participant name, phase code, whether a lien waiver has been received, the requested amount, the budget amount, the payment amount, the holdback accrued, and the remaining balance. The list of participants can also include any subcontractor and their lien waivers.

Figure 73:
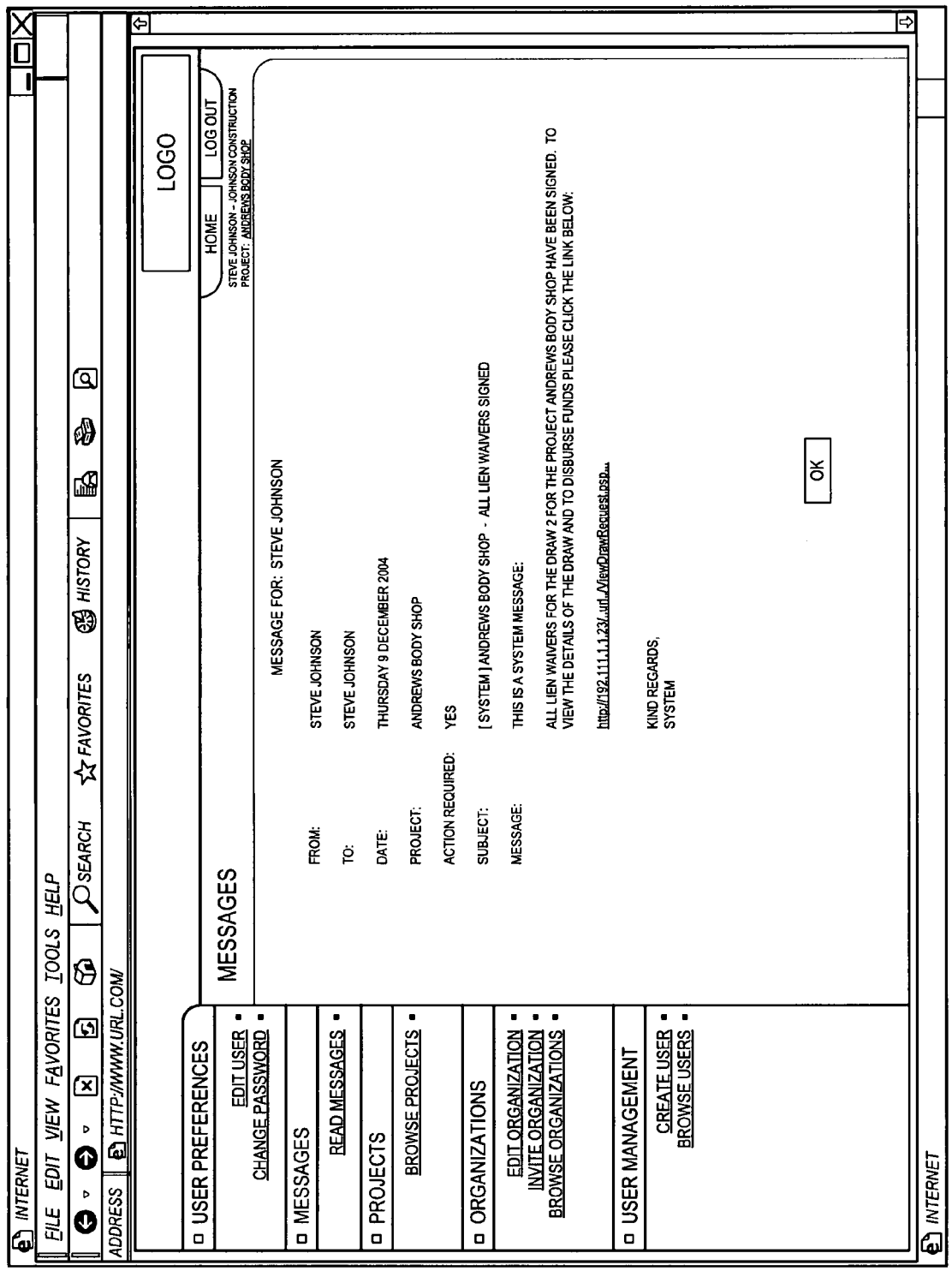
FIG. 73 is an illustration of an all lien waivers signed notification.

FIG. 73 illustrates an all lien waivers signed notification that can be transmitted during the all lien waivers signed 260. The notification of FIG. 73 can include a statement that all the lien waivers for the draw for a project have been signed. The notification can include a link to view the details of the draw and to disburse funds.

FIG. 74 illustrates a view draw request form that can be associated with the view draw request with disburse funds button task 262. A GC (or architect, owner, owner's representative, lender, or title company) can access the view draw request form and approve the draw through the draw module 44 and/or the draw approval module 60. The view draw request screen can include the project name, the project number, the project address, the draw number, the draw date, and a list of participants in the draw. The list of participants can include the participant name, phase code, whether a lien waiver has been received, the requested amount, the budget amount, the payment amount, the holdback accrued, and the remaining balance. The list of participants can also include any subcontractor and their lien waivers. When the GC disburses the funds, the lien waivers are substantially simultaneously released and the payment instruction is sent to the ACH system 26.

Figure 75:
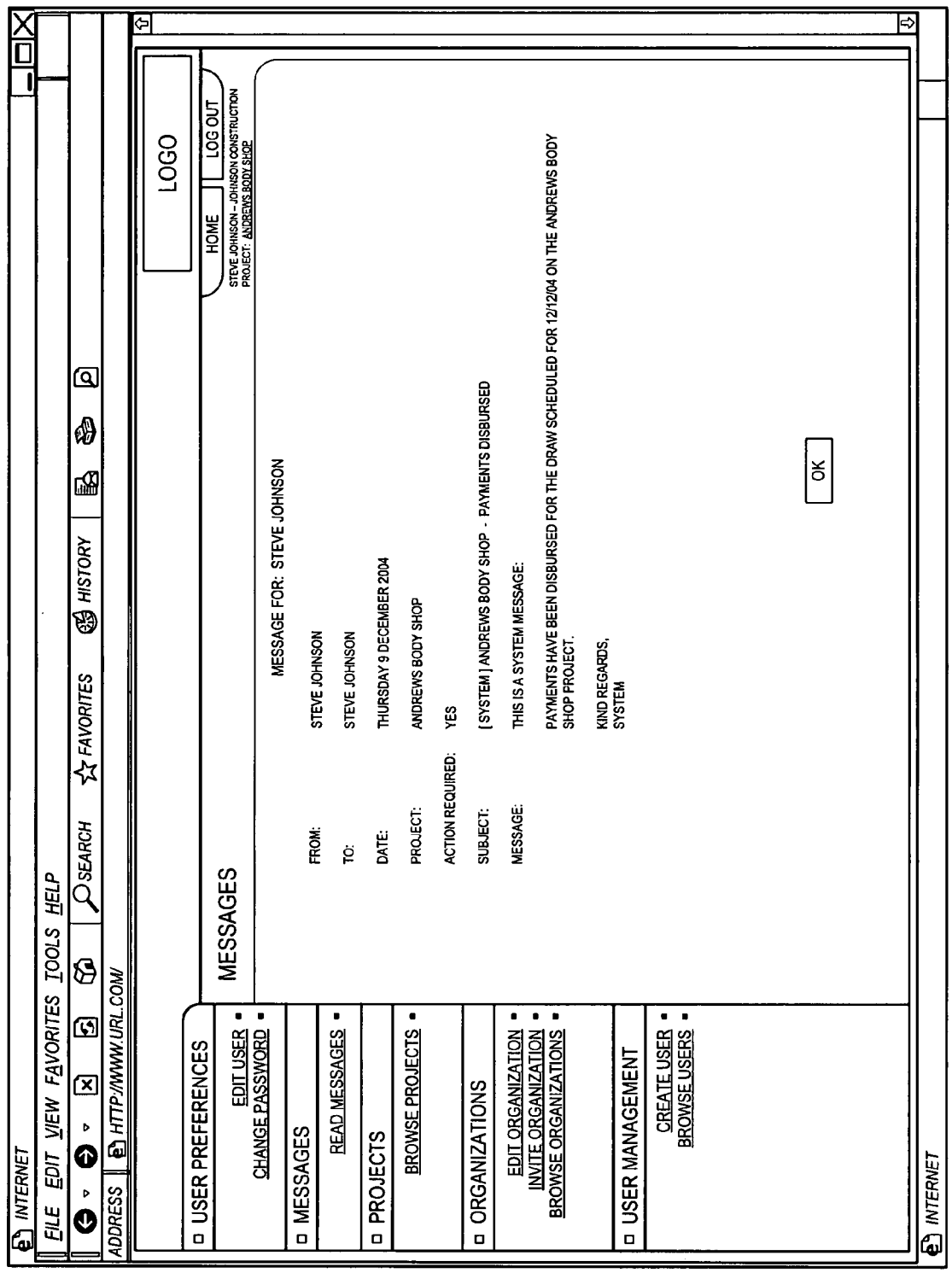
FIG. 75 is an illustration of a payment disbursed notification.

FIG. 75 illustrates a payment disbursed notification that can be transmitted during the payments disbursed task 264. The notification of FIG. 75 can be transmitted in real-time to all draw participants and can include a statement that the payments have been disbursed for the draw scheduled on a particular date on the project.

Figure 76:
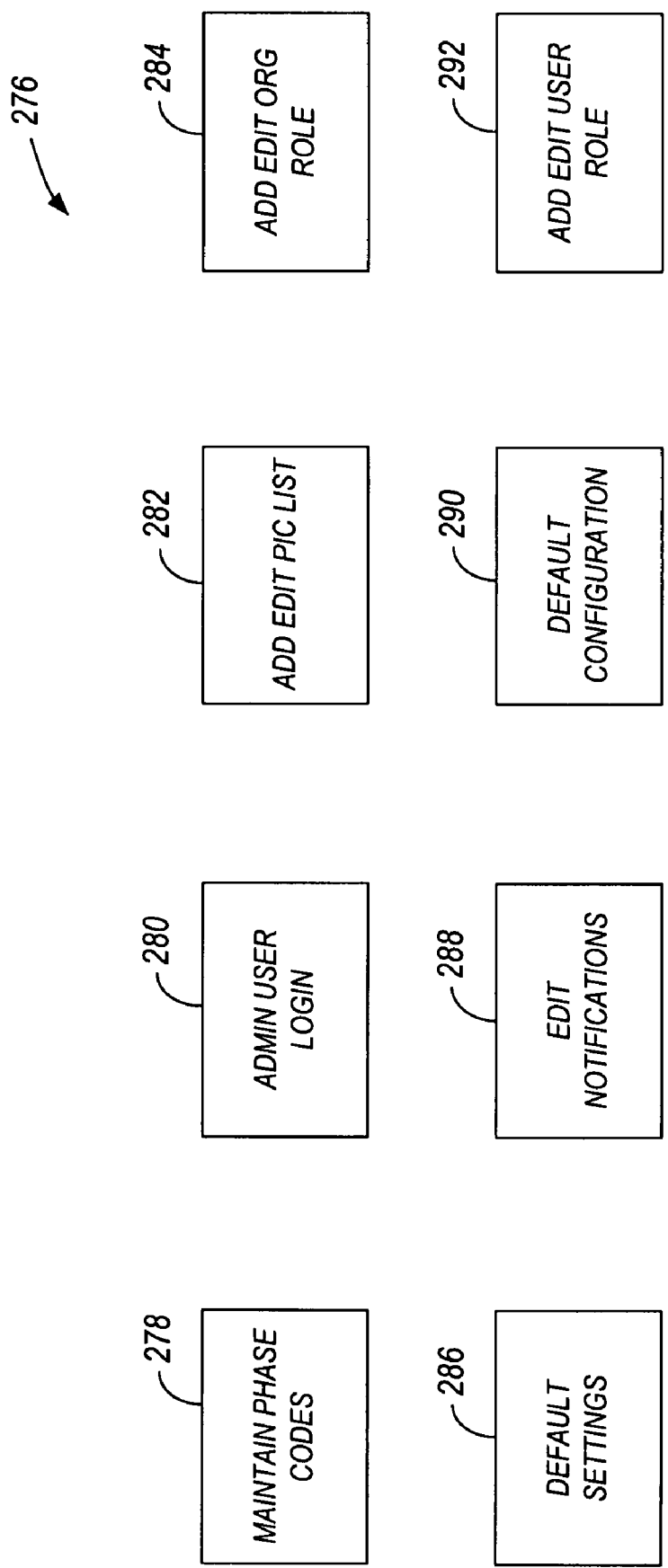
FIG. 76 is a schematic illustration of maintain system screens tasks.

FIG. 76 illustrates maintain system screens tasks 276, which can be included in the manage system environment process 102. The maintain system screens tasks 276 can be used by each user or each organization to customize the software environment according to particular needs. For example, an organization can customize phase codes for their projects. The maintain system screens tasks 276 can be performed by any of the participants using the system environment manager 52. The maintain system screens tasks 276 can include a maintain phase codes task 278, an administrator user login task 280, an add/edit picklist task 282, an add/edit organization role task 284, a default settings task 286, an edit notifications task 288, a default configuration task 290, and an add/edit user role task 292.

Figure 77:
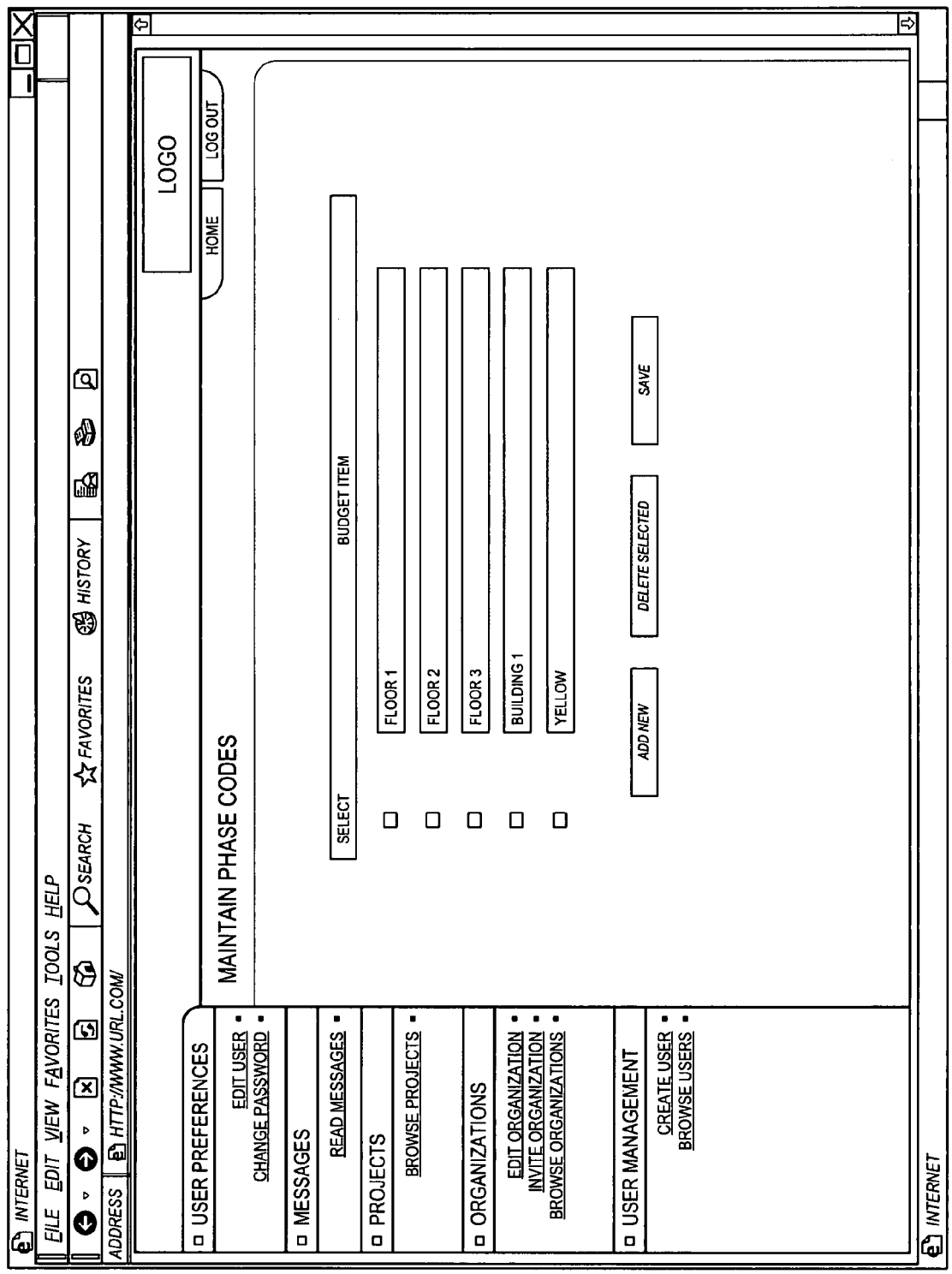
FIG. 77 is an illustration of a maintain phase codes form.

FIG. 77 illustrates a maintain phase codes form that can be associated with the maintain phase codes task 278. Each participant can access the maintain phase codes form through the system environment manager 52. The participant can add new or delete selected budget items.

Figure 78:
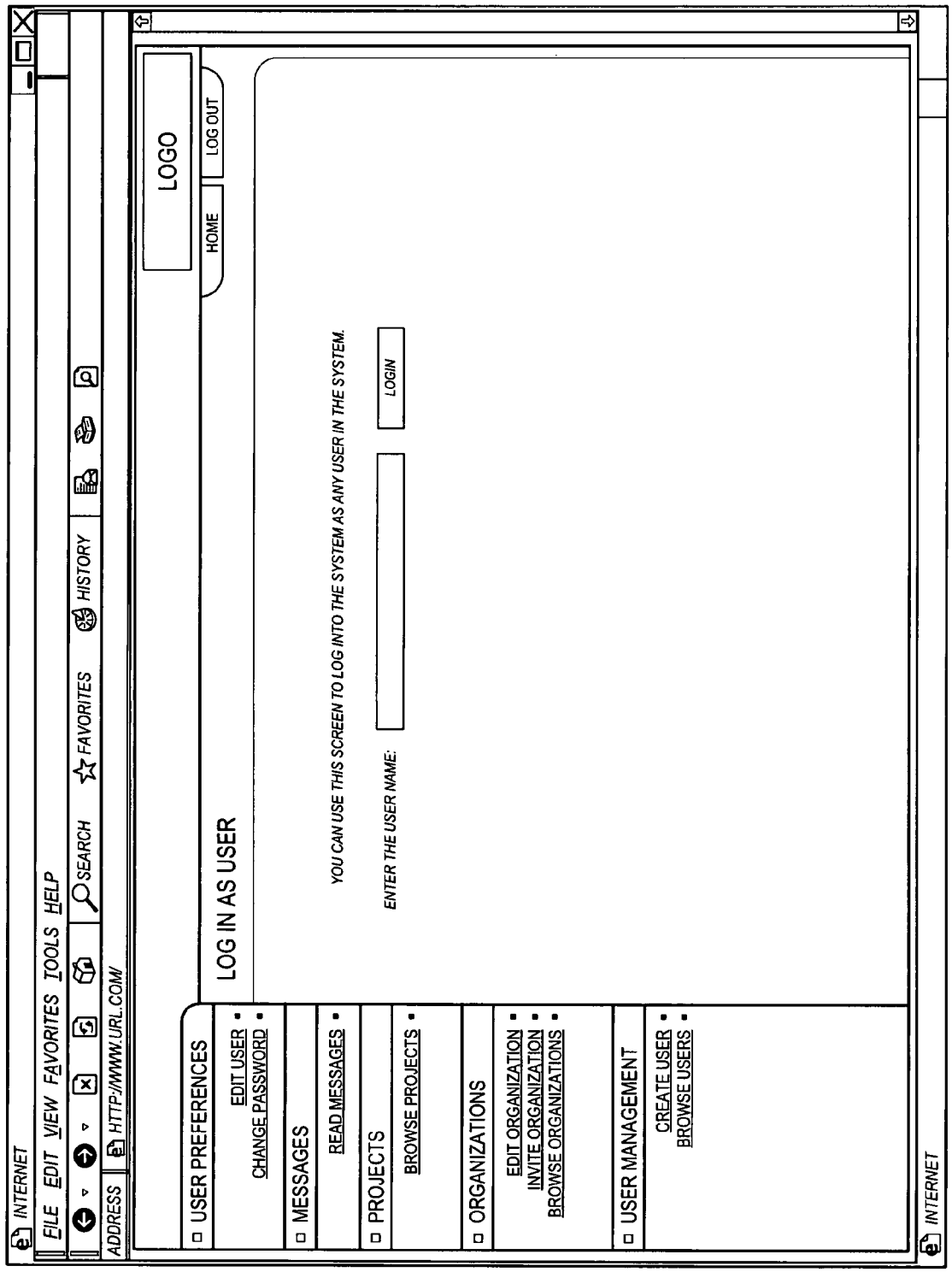
FIG. 78 is an illustration of an administration user login screen.

FIG. 78 illustrates an administration user login screen that can be associated with the administrator user login task 280. Each participant can access the administrator user login screen through the system environment manager 52. The user at the organization can enter a user name and use the screen to log onto the system as any user in the system.

Figure 79:
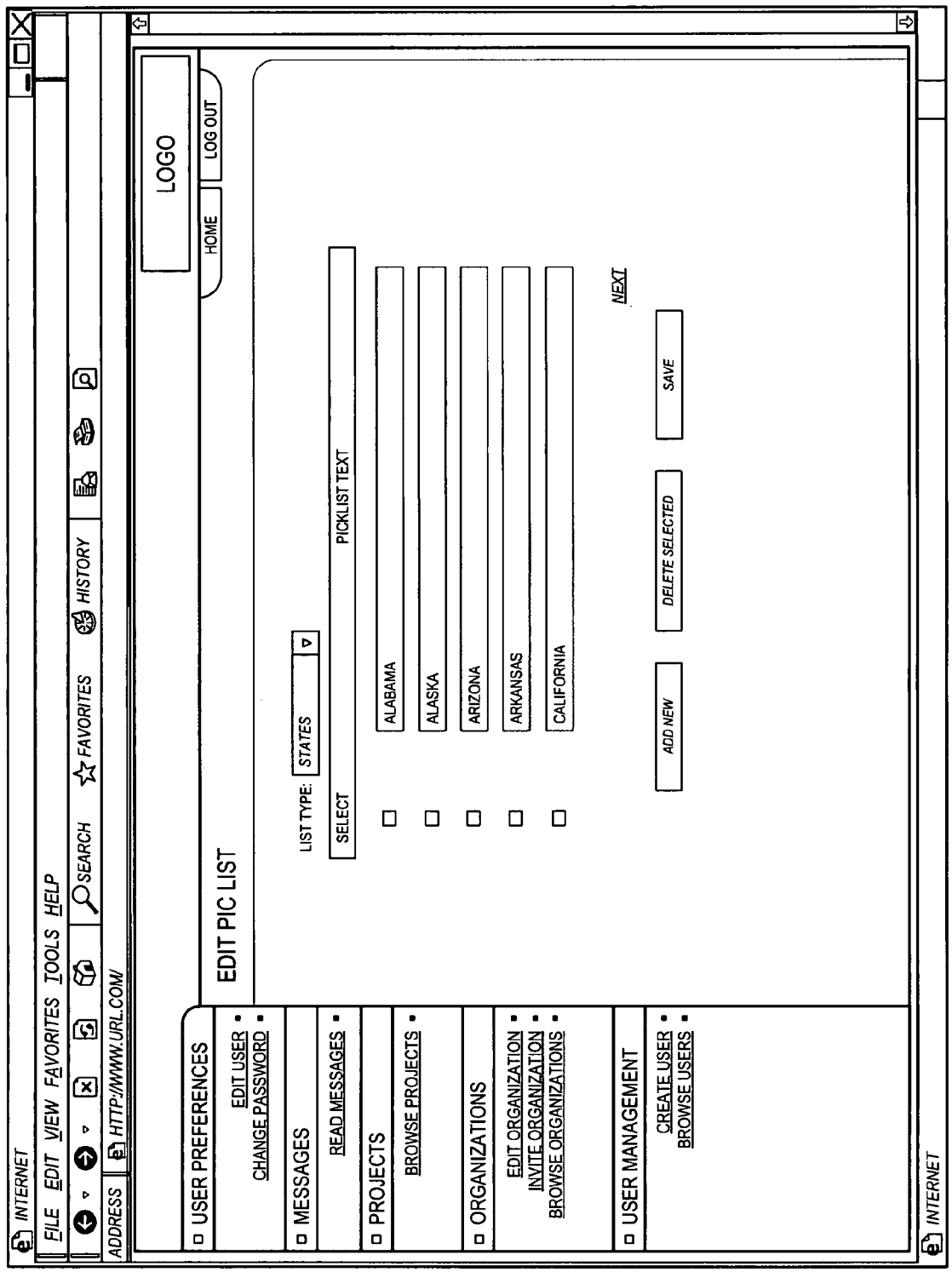
FIG. 79 is an illustration of an add/edit picklist form.

FIG. 79 illustrates an add/edit picklist form that can be associated with the add/edit picklist task 282. An administrator of the CPMS 10 can add new or delete selected picklist entries (e.g., lists of states, types of projects, etc.) for various drop-down menus provided by the CPMS 10.

Figure 80:
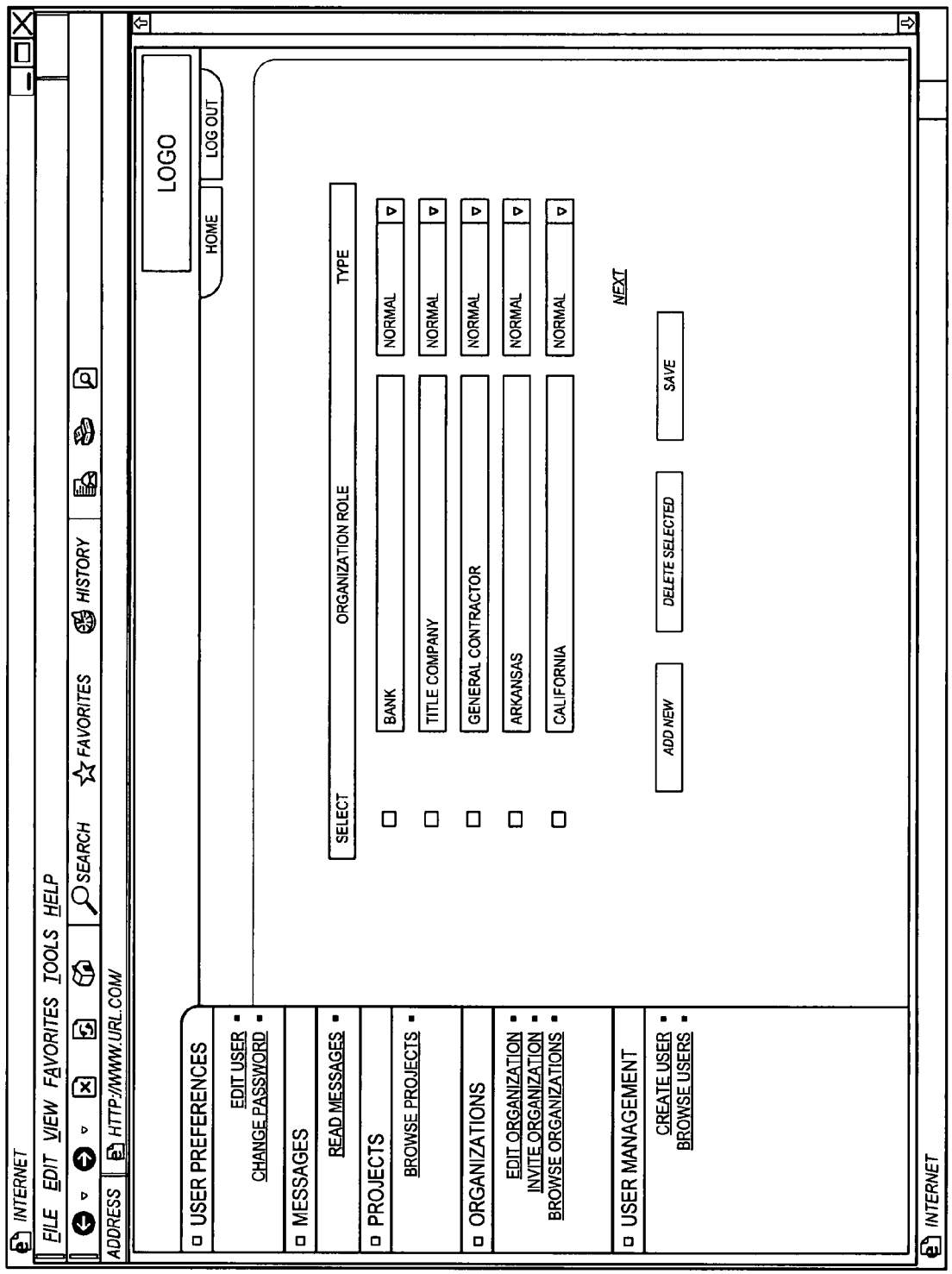
FIG. 80 is an illustration of an add/edit organization role form.

FIG. 80 illustrates an add/edit organization role form that can be associated with the add/edit organization role task 284. A GC can access the add/edit organization role form through the system environment manager 52. The GC can select the security clearance for each type of organization (e.g., bank, title company, GC, subcontractor, or architect).

Figure 81:
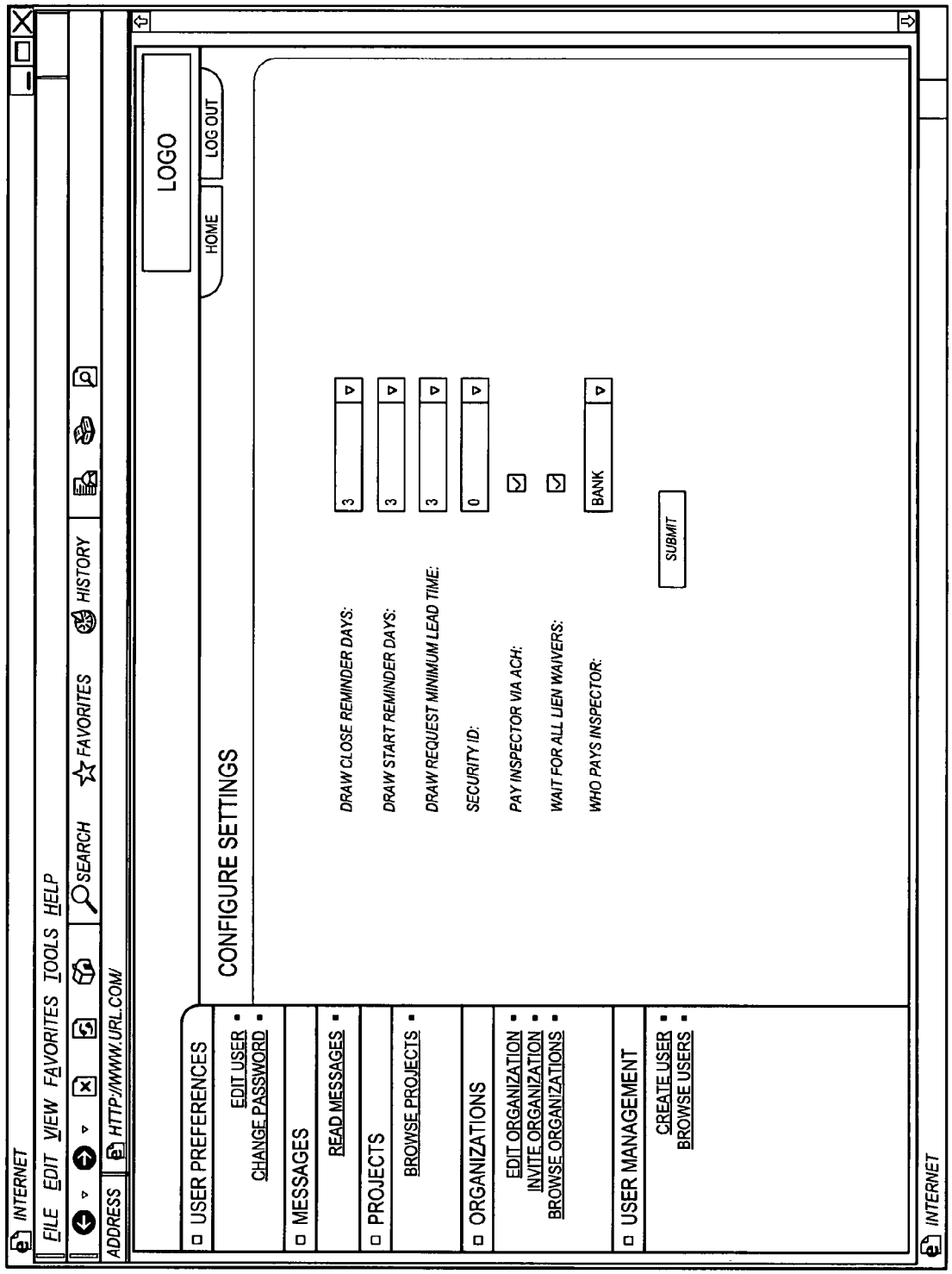
FIG. 81 is an illustration of a default/configure settings form.

FIG. 81 illustrates a default/configure settings form that can be associated with the default settings task 286. A GC can access the default/configure settings form through the system environment manager 52. The GC can enter its preferred settings, such as the draw close reminder days, the draw start reminder days, the draw request minimum lead time, the security identification, whether the inspector is to be paid via the ACH system, whether to wait for all lien waivers, and who pays the inspector (e.g., the bank, the title company, the owner, the owner's representative, or the GC).

Figure 82:
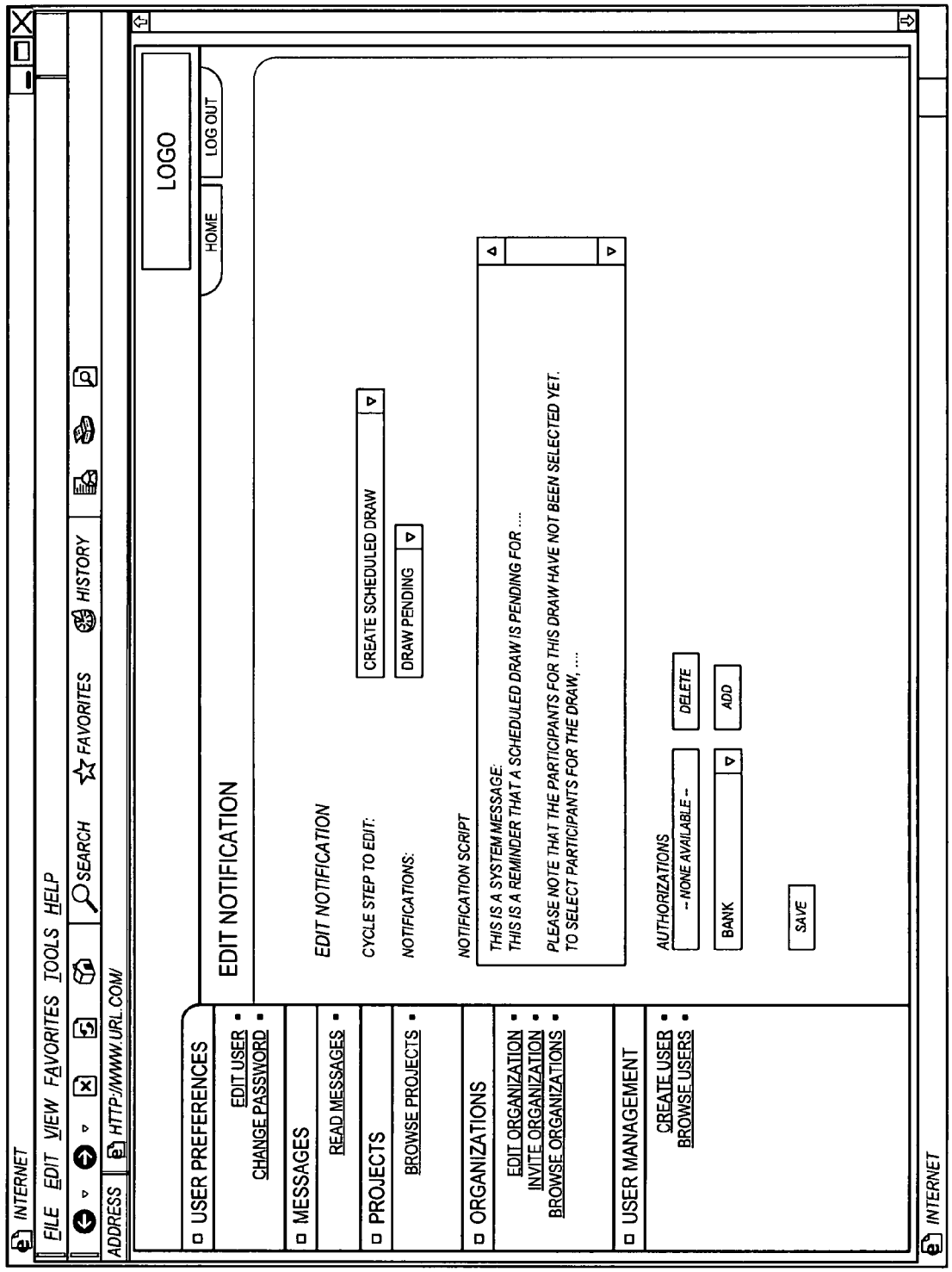
FIG. 82 is an illustration of an edit notification form.

FIG. 82 illustrates an edit notification form that can be associated with the edit notifications task 288. A GC can access the edit notification form through the system environment manager 52. The GC can modify the notifications that are transmitted during the various processes. The GC can select a particular notification and edit the default notification as necessary. The GC can also specify whether particular authorizations are necessary, such as an authorization by the bank to change the notification.

Figure 83:
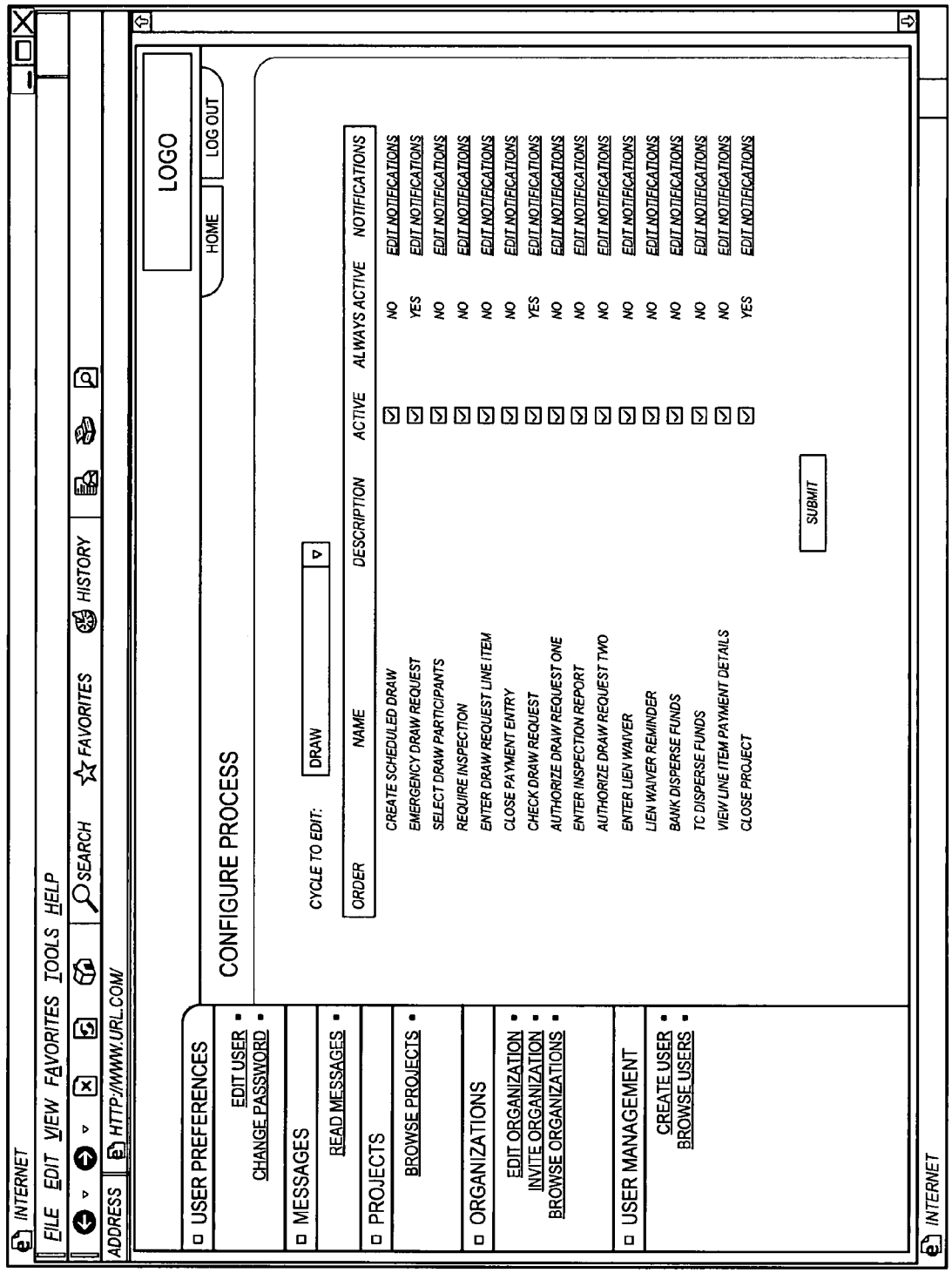
FIG. 83 is an illustration of a default/configure process form.

FIG. 83 illustrates a default/configure process form that can be associated with the default configurations task 290. A GC, owner, owner's representative, lender, etc. can access the default/configure process form through the system environment manager 52 in order to customize portions of the construction payment process or to change the rules for portions of the construction payment process. For example, a GC can define and store its own phase codes. The GC, owner, owner's representative, lender, etc. can choose whether to activate particular tasks in each process and can access a link to edit each one of the notifications associated with the tasks.

Figure 84:
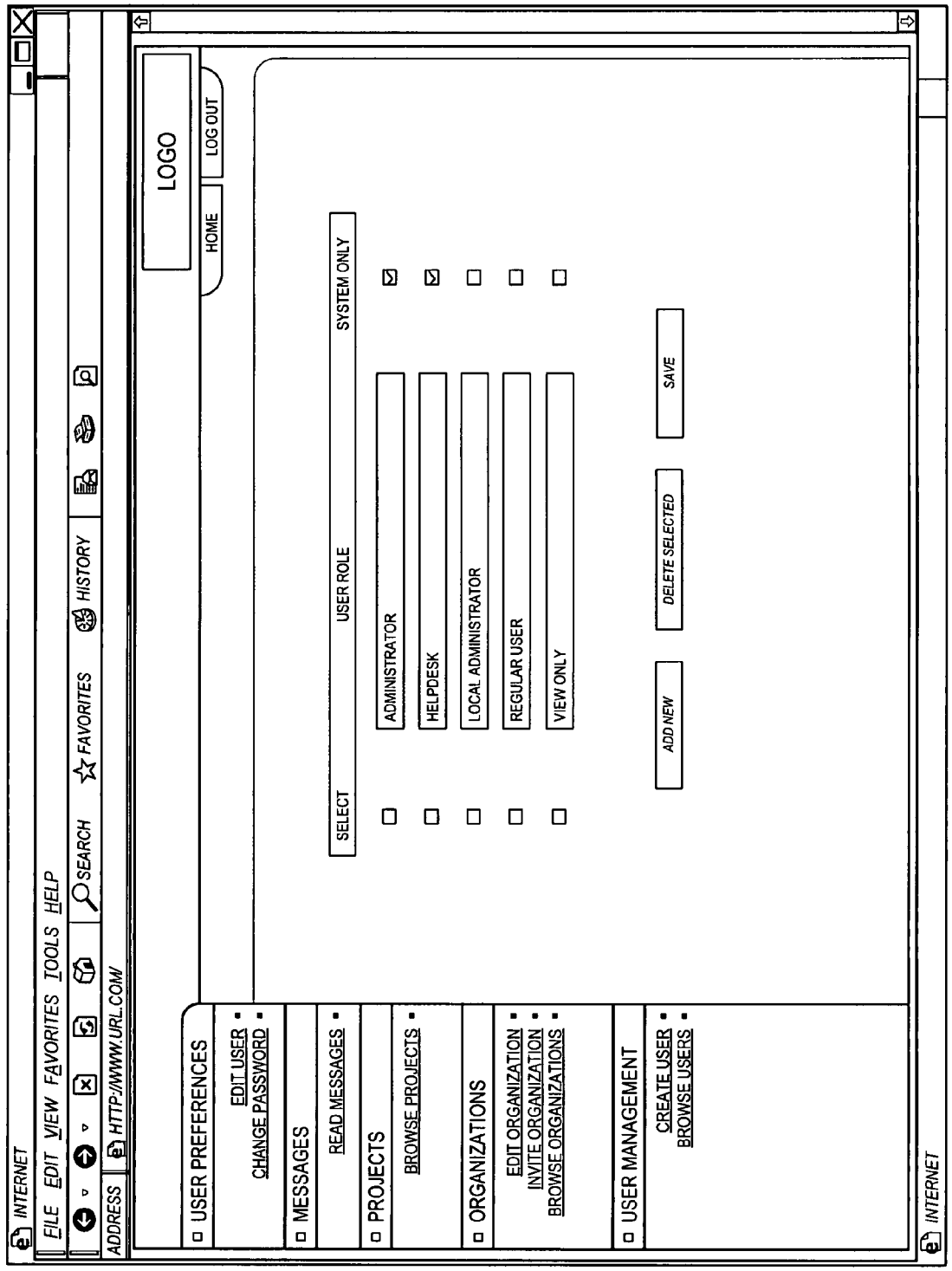
FIG. 84 is an illustration of an add/edit user role form.

FIG. 84 illustrates an add/edit user role form that can be associated with the add/edit user role task 292. A GC can access the add/edit user role form through the system environment manager 52. The GC can select roles for a particular user, such as a system administrator, a system helpdesk user, a local administrator, a regular user, and view only access. The GC can add new roles or delete selected roles.

Figure 85:
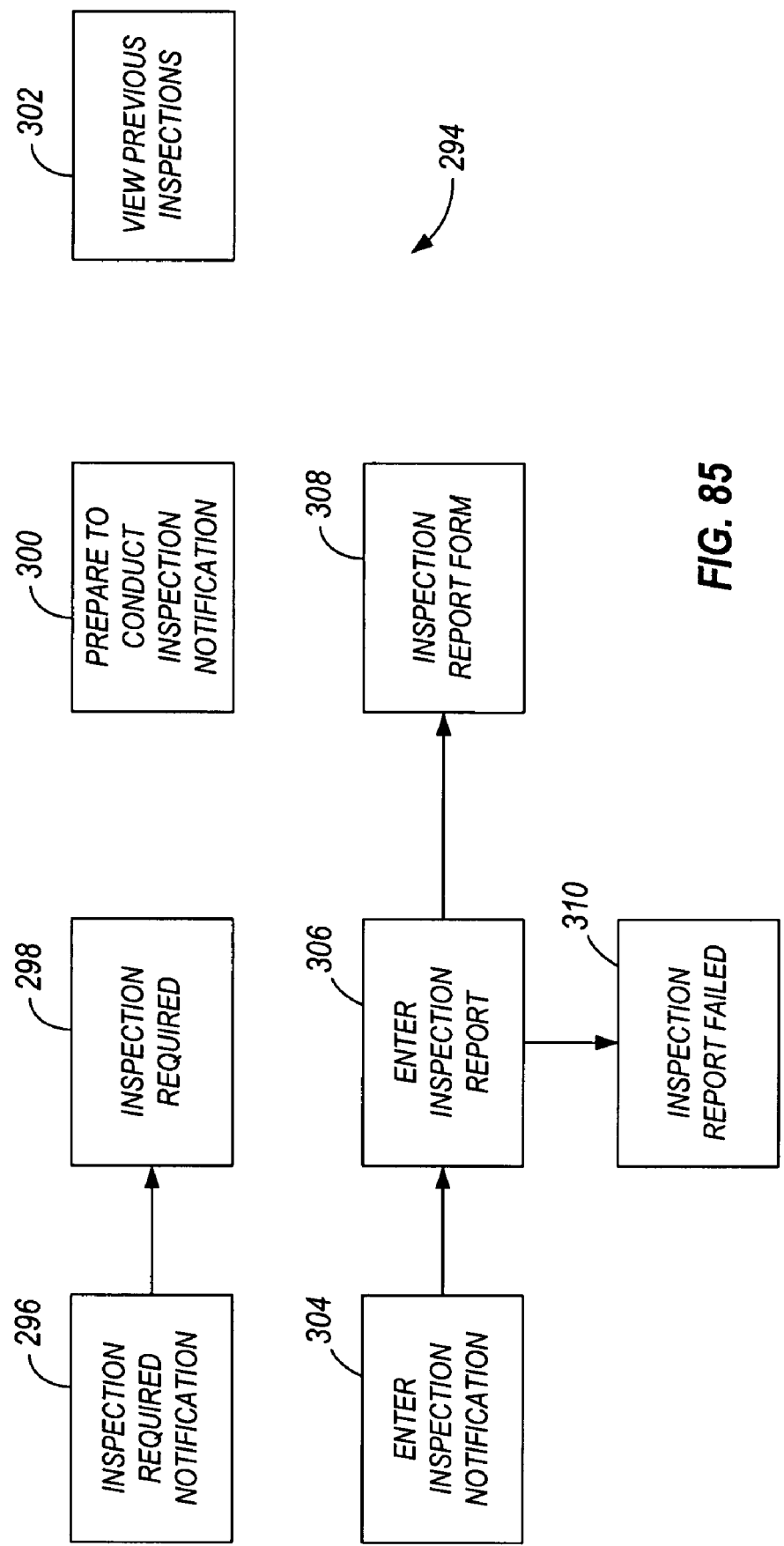
FIG. 85 is a schematic illustration of perform inspections processes and related tasks.

FIG. 85 illustrates perform inspections tasks 294, which can be included in the manage draw process 96. The perform inspection tasks 294 can be used to schedule and facilitate inspections of the construction project, if necessary before each draw. The perform inspections tasks 294 can be performed by the GC and the inspector using the inspection module 58 of the draw module 94. The perform inspections tasks 294 can include an inspection required task 296, an inspection required form task 298, a prepare to conduct inspection task 300, a view previous inspections task 302, an enter inspection task 304, an enter inspection report task 306, an inspection report form task 308, and an inspection report failed task 310.

Figure 86:
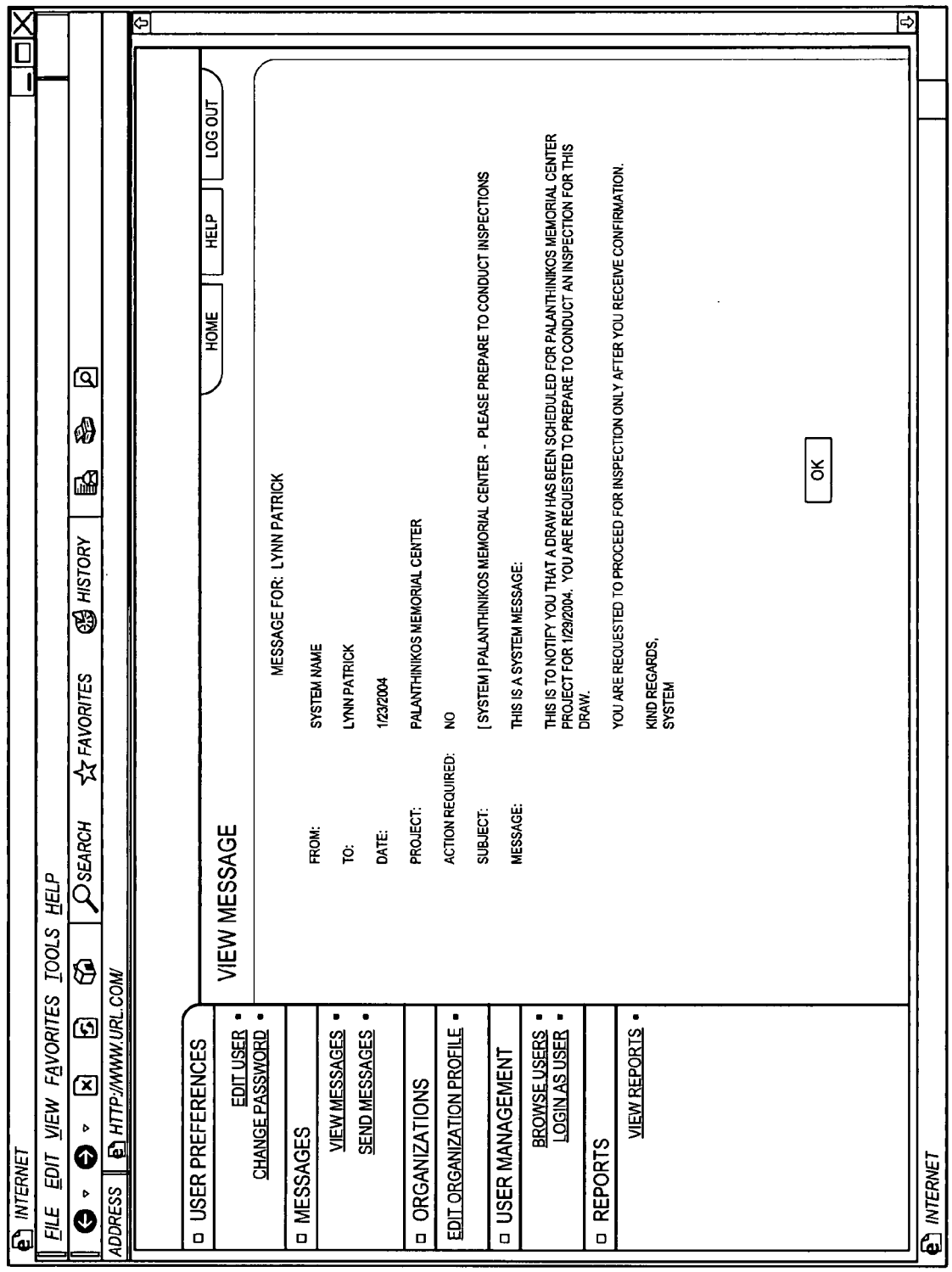
FIG. 86 is an illustration of a prepare to conduct inspection notification.

FIG. 86 illustrates a prepare to conduct inspection notification that can be transmitted during the prepare to conduct inspection notification task 300. The notification of FIG. 86 can include a statement that a draw has been scheduled for a project on a date and that the inspector is requested to prepare to conduct an inspection for the draw. The notification can state that the inspection should be conducted only after receiving confirmation.

Figure 87:
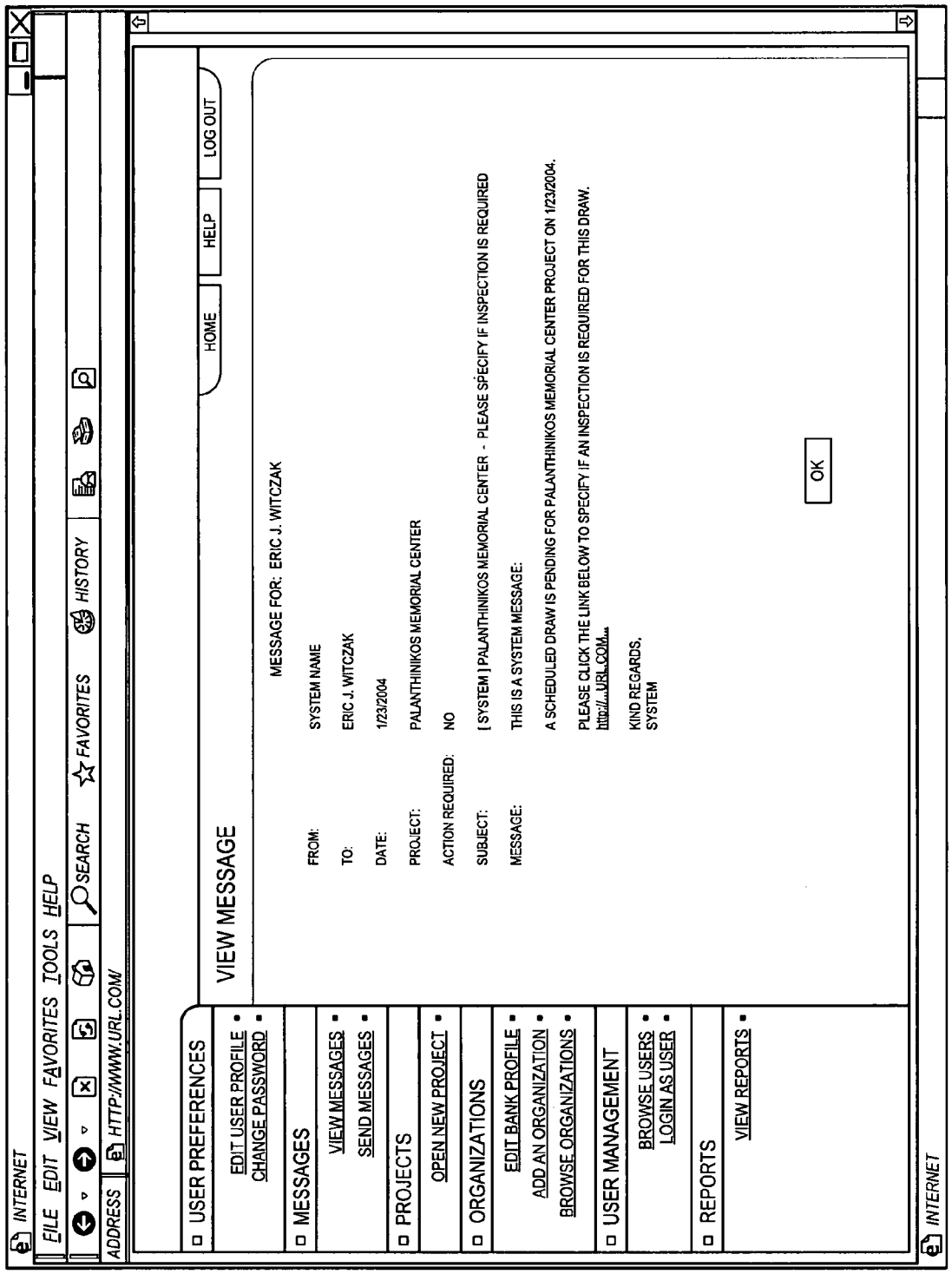
FIG. 87 is an illustration of an inspection required notification.

FIG. 87 illustrates an inspection required notification that can be transmitted during the inspection required notification task 296. The notification of FIG. 87 can include a statement a scheduled draw is pending for a project and a link to specify if an inspection is required for the draw.

FIG. 88 illustrates an inspection required screen that can be associated with the inspection required task 298. A GC (or owner, owner's representative, lender, or title company) can access the inspection required screen through the inspection module 58 of the draw module 44. The inspection required screen can include the project name, the project number, the draw number, the owner name, the draw date, the project address, and a list of participants. The list of participants can include the request amount, the organization name, the organization role, the budget item, the budget amount, the payment amount, the holdback accrued, and the remaining balance. The inspection required screen can also include general comments, comments to the inspector, and whether an inspection should be scheduled.

Figure 89:
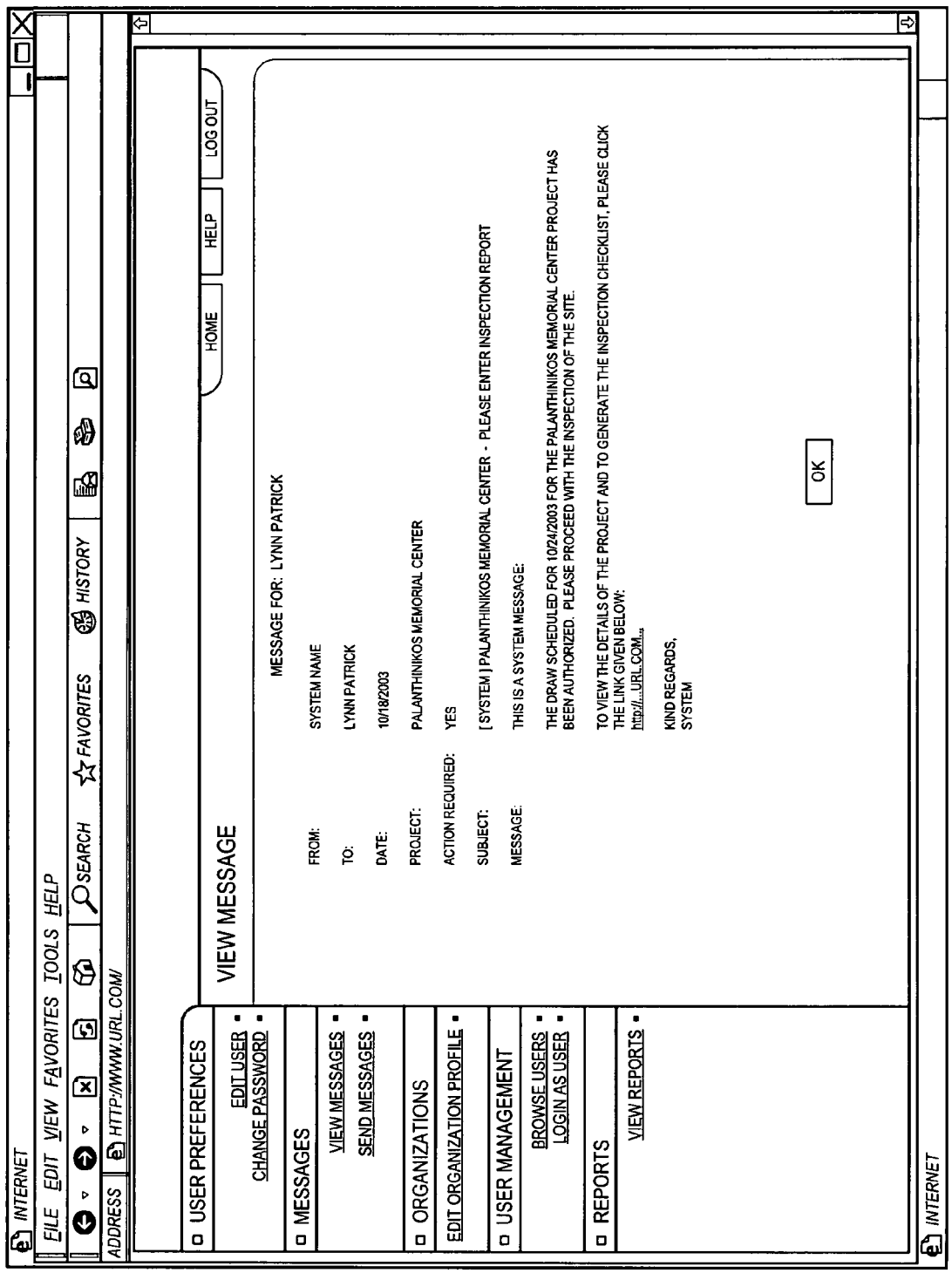
FIG. 89 is an illustration of an enter inspection report notification.

FIG. 89 illustrates an enter inspection report notification that can be transmitted during the enter inspection task 304. The notification of FIG. 89 can include a statement that the draw schedule on a date for a project has been authorized and that the recipient should proceed with the inspection. The notification can include a link to view the details of the project and to generate an inspection checklist.

Figure 90:
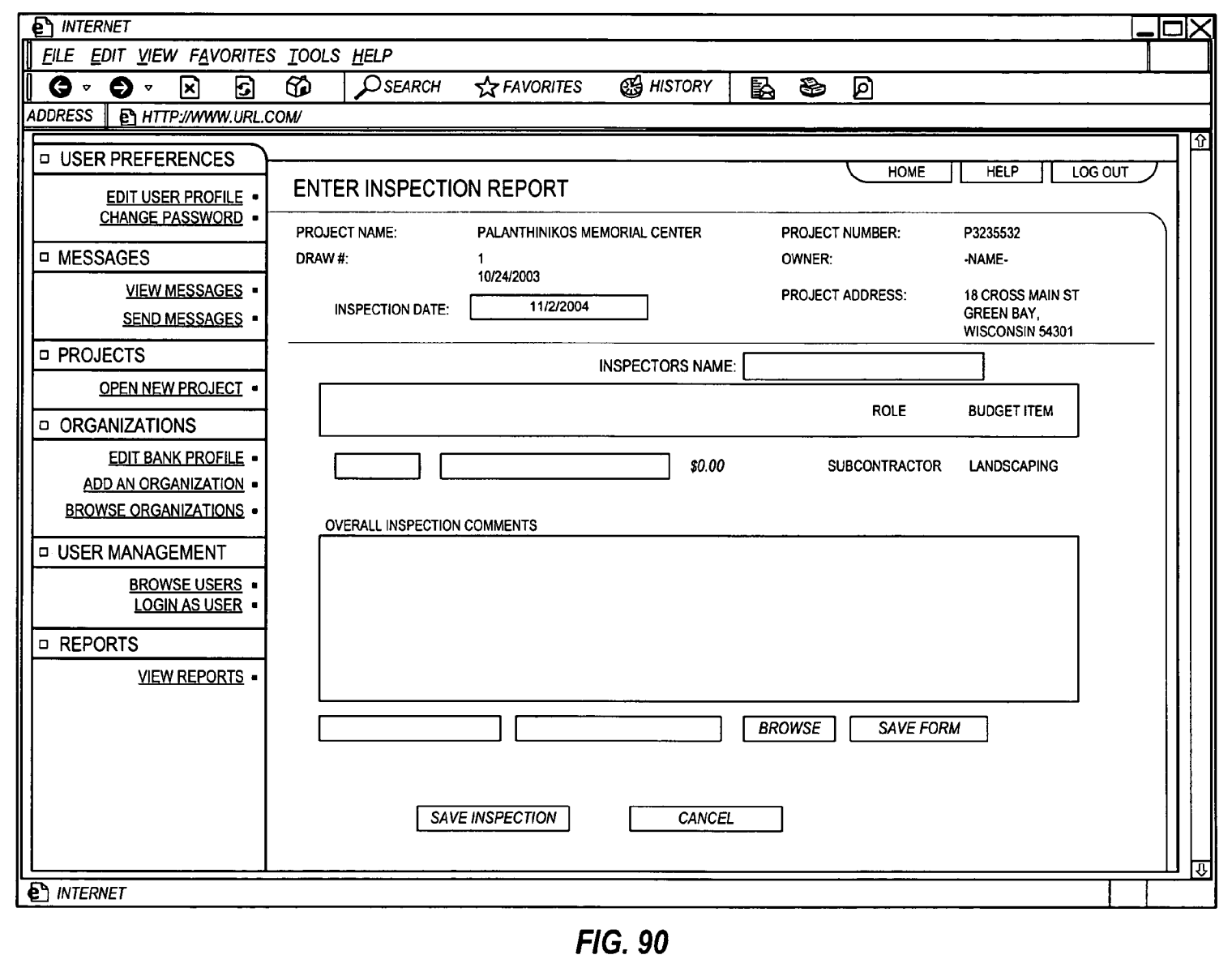

FIG. 90 illustrates an enter inspection report form that can be associated with the enter inspection report task 306. The inspector can enter the details of the inspection on the inspection report form. The inspection report form can include the project name, the project number, the draw number, the draw date, the owner name, the project address, the inspection date, and general inspection comments.

FIG. 91 illustrates an inspection report form screen that can be associated with the inspection report form task 308. A GC, owner, owner's representative, title company, or inspector can access the inspection report form screen through the inspection module 58 of the draw module 44.

Figure 92:
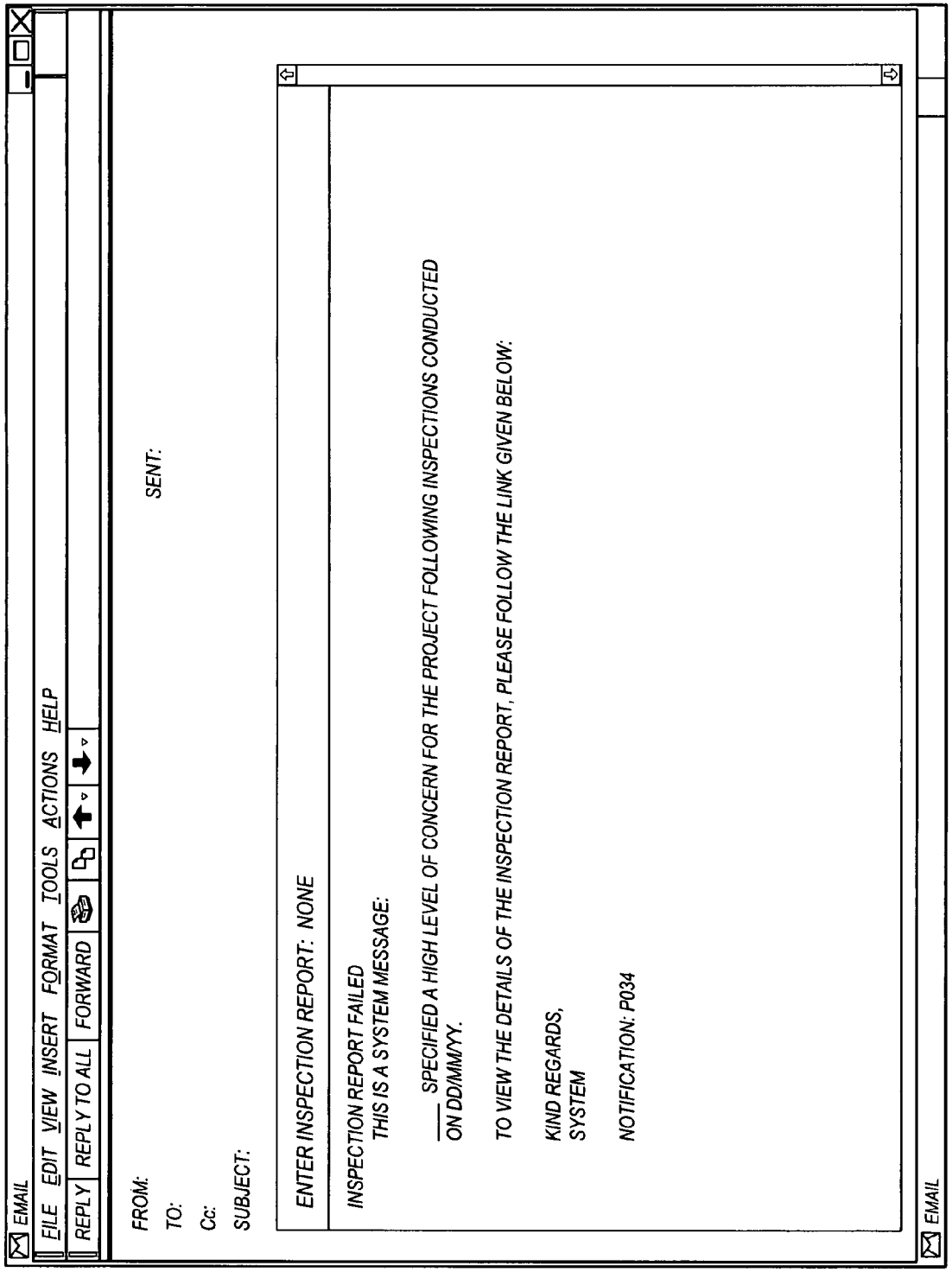
FIG. 92 is an illustration of an inspection report failed notification.

FIG. 92 illustrates an inspection report failed notification that can be transmitted during the inspection report failed task 310. The notification of FIG. 92 can include a statement that there is a high concern level for the project following the inspection conducted on a particular date. The notification can include a link to access the inspection report form.

Figure 93:
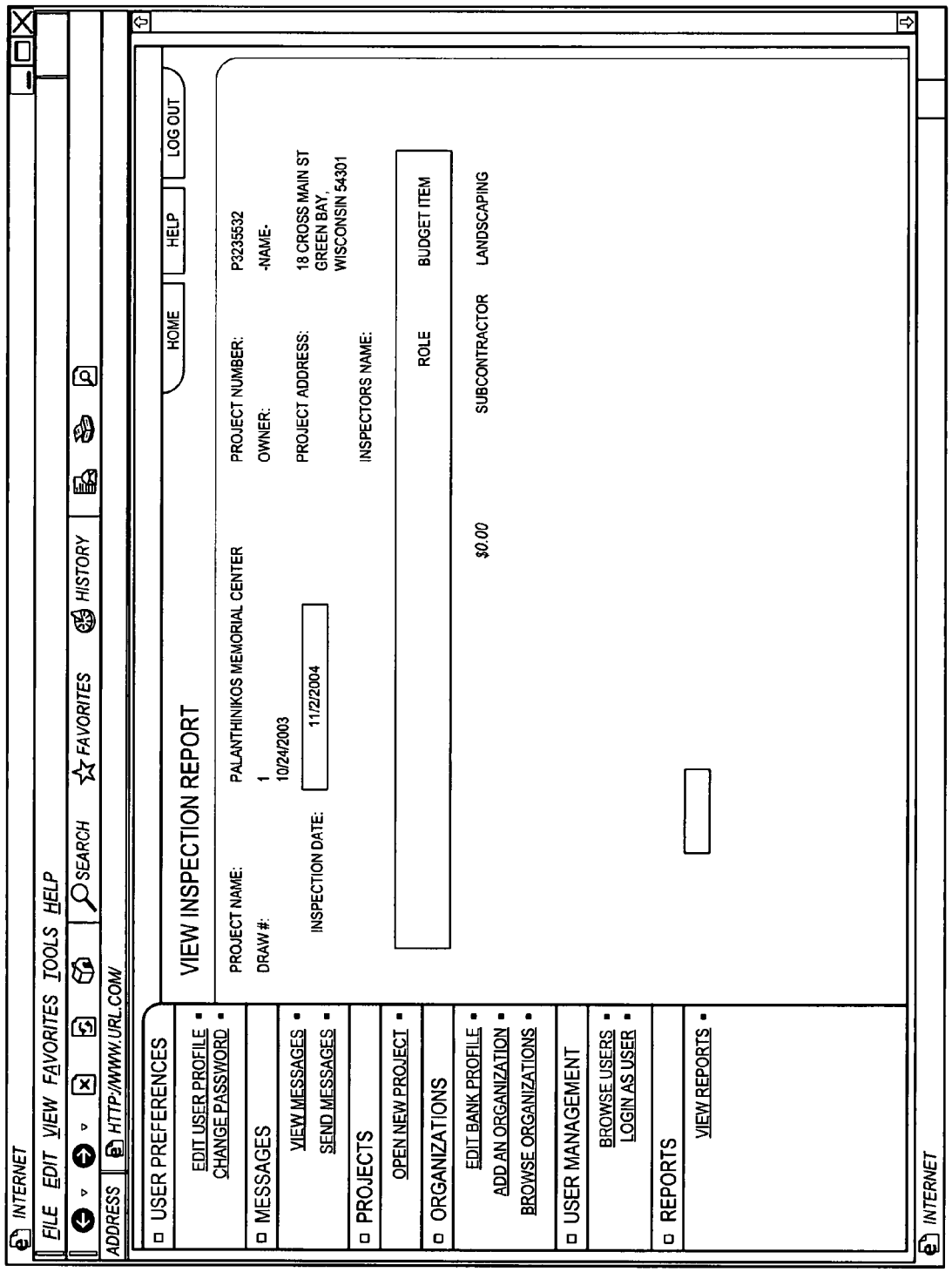
FIG. 93 is an illustration of a view previous inspections screen.

FIG. 93 illustrates a view previous inspections screen that can be associated with the view previous inspections task 302. A GC, owner, owner's representative, title company, or inspector can access the view previous inspections screen through the inspection module 58 of the draw module 44 and can select an inspection performed on a particular date.

Figure 94:
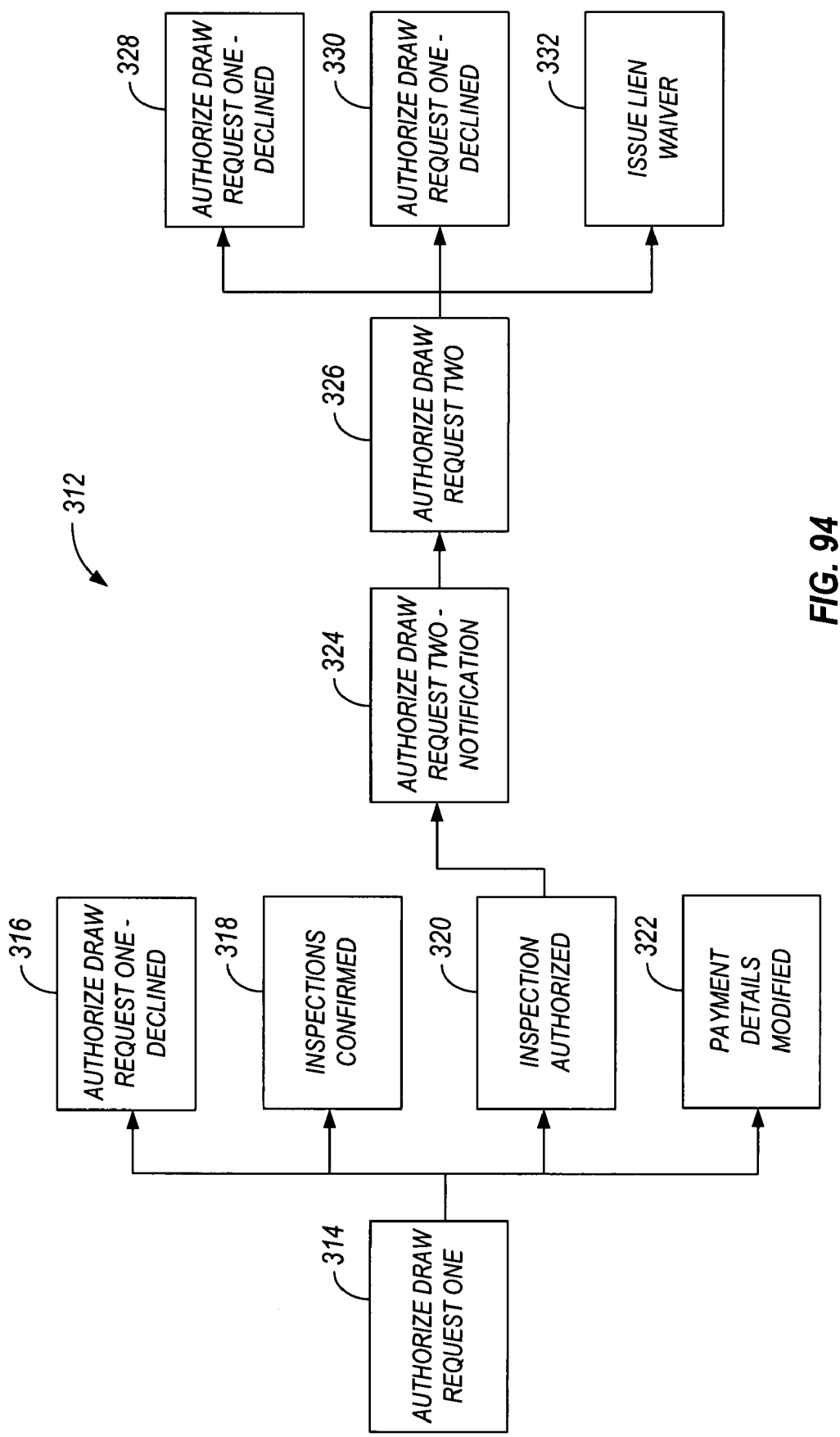
FIG. 94 is a schematic illustration of an approve draw request process.

FIG. 94 illustrates an approve draw request process 312, which can be included in the manage draw process 96. The approve draw request process 312 can be used to confirm that the necessary inspections have been performed, to approve each draw in the construction payment process, and to issue lien waivers. The approve draw request process 312 can be performed by a GC and/or any participant above the line of the GC (such as the owner, the owner's representative, the title company, the architect, etc.) using the draw approval module 60 of the draw module 44. Once the project has been initiated, the CPMS 10 can be used to approve any type of payment associated with the construction process. The CPMS 10 can facilitate parallel approvals (e.g., both the GC and the owner must approve the draw) or a sequence of approvals (e.g., the architect must approve the draw, then the owner, then the lender). The CPMS 10 can be used to configure the approval process for each project. The CPMS 10 can be used to approve change orders for the budget or particular amounts contracted between parties. For example, the CPMS 10 can be used to obtain approval from a GC and/or any participant above the line of the GC for a change order that exceeds a certain amount or to approve all change orders after a limit has been exceeded. The approve draw request process 312 can include an Authorize Draw Request One task 314, an Authorize Draw Request One—declined task 316, an inspections confirmed task 318, an inspection authorized task 320, a payment details modified task 322, an Authorize Draw Request Two—notification task 324, an Authorize Draw Request Two task 326, an Authorize Draw Request Two declined task 328, an Authorize Draw Request Two approved task 330, and an issue lien waiver task 332.

Figure 95:
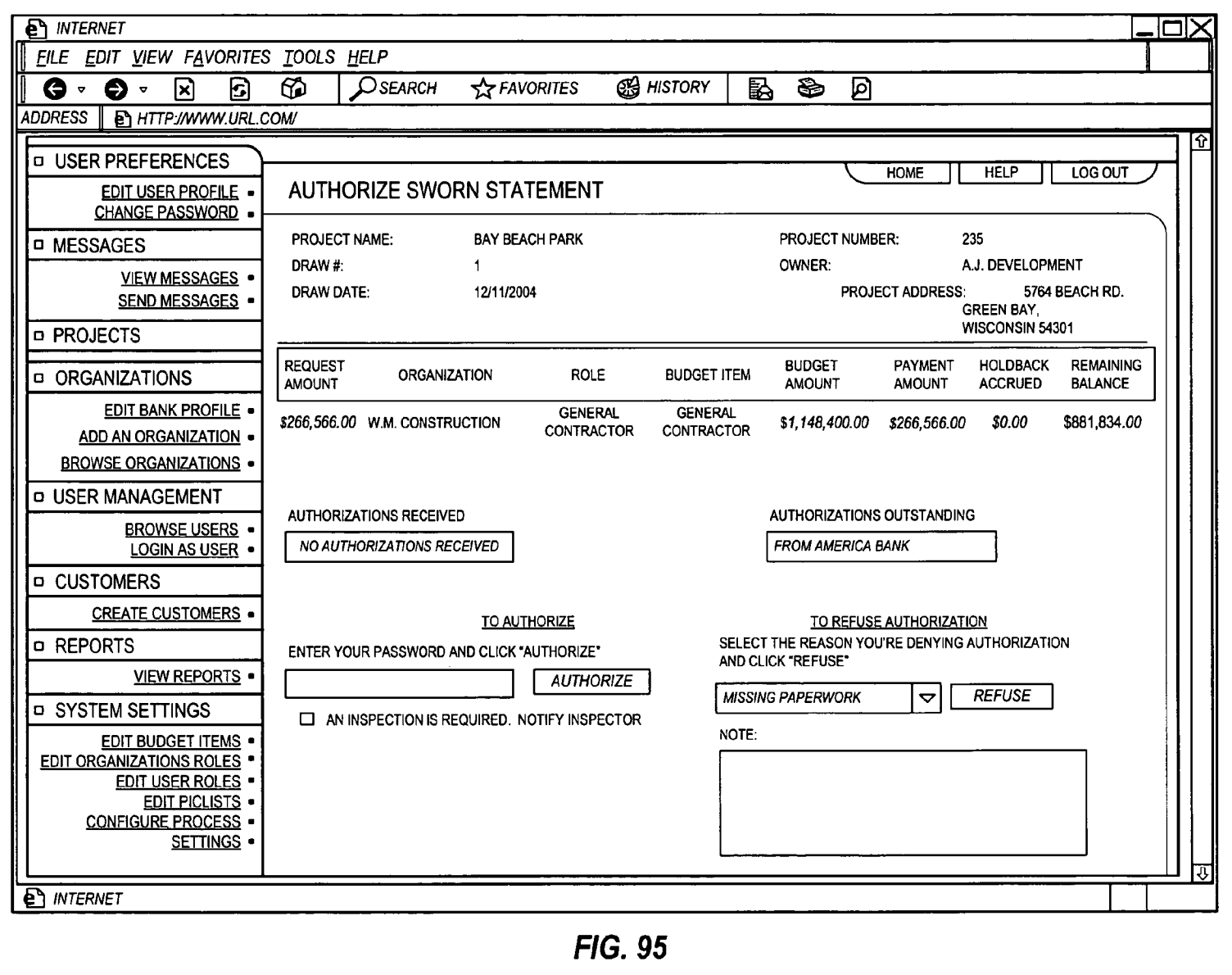

FIG. 95 illustrates an Authorize Draw Request One form or authorize sworn statement form that can be associated with the Authorize Draw Request One task 314. A GC, owner, owner's representative, or title company can access the Authorize Draw Request One form through the draw module 44. The Authorize Draw Request One form can include the project name, the project number, the owner, the project address, the draw number, and the draw date. The Authorize Draw Request One form can include any entry for each organization including the request amount, the organization name, the organization role, the budget item, the budget amount, the payment amount, the holdback accrued, and the remaining balance. The Authorize Draw Request One form can include the authorizations received, the authorizations outstanding, whether an inspection is required, the ability to enter a password for authorization, and the ability to deny authorization and specify a reason.

Figure 96:
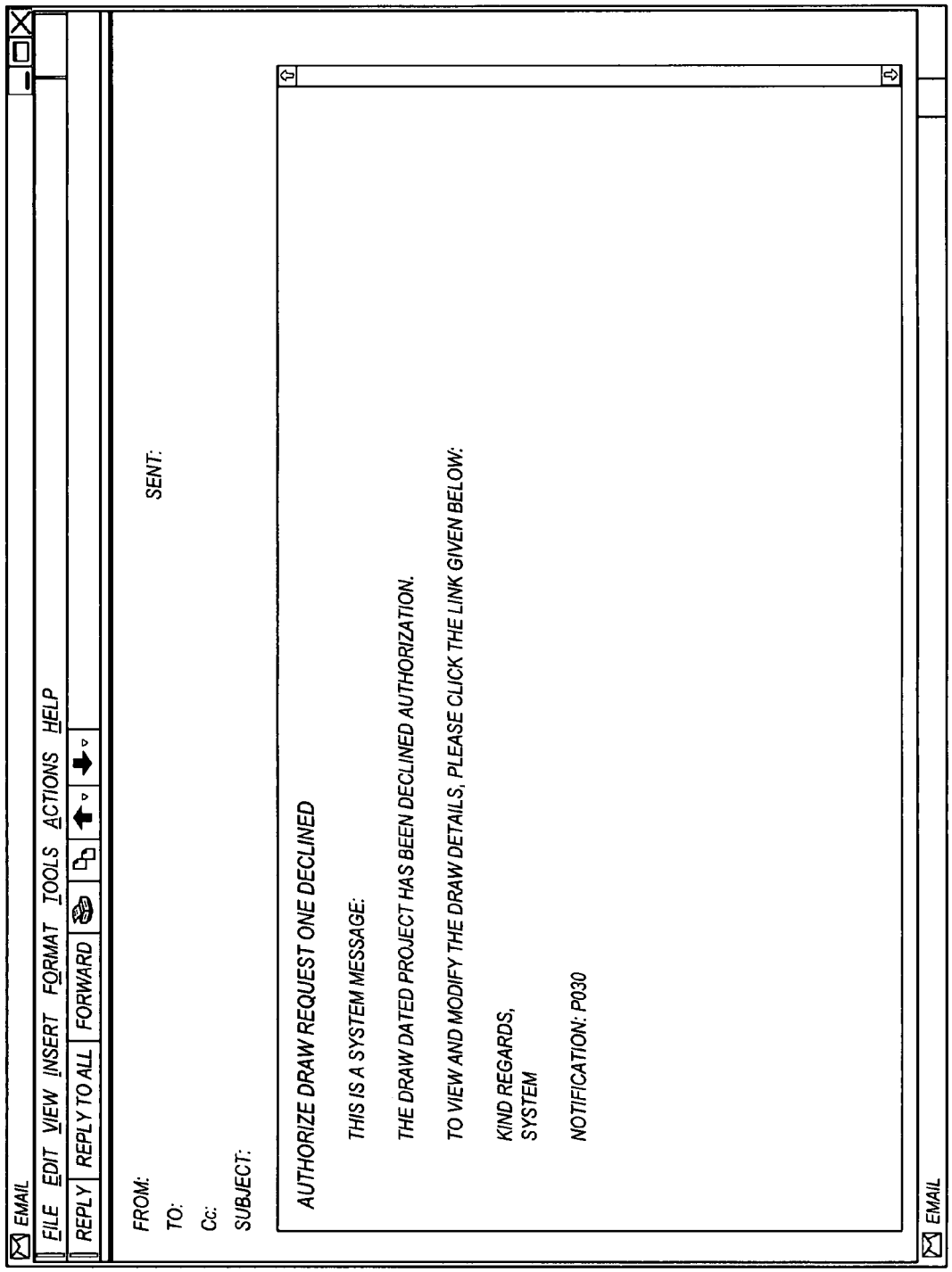
FIG. 96 is an illustration of an Authorize Draw Request One declined notification.

FIG. 96 illustrates an authorize first draw declined notification that can be transmitted during the Authorize Draw Request One—declined task 316. The notification of FIG. 96 can include a statement that the draw for a project has been denied authorization and a link to view and/or modify the draw details.

Figure 97:
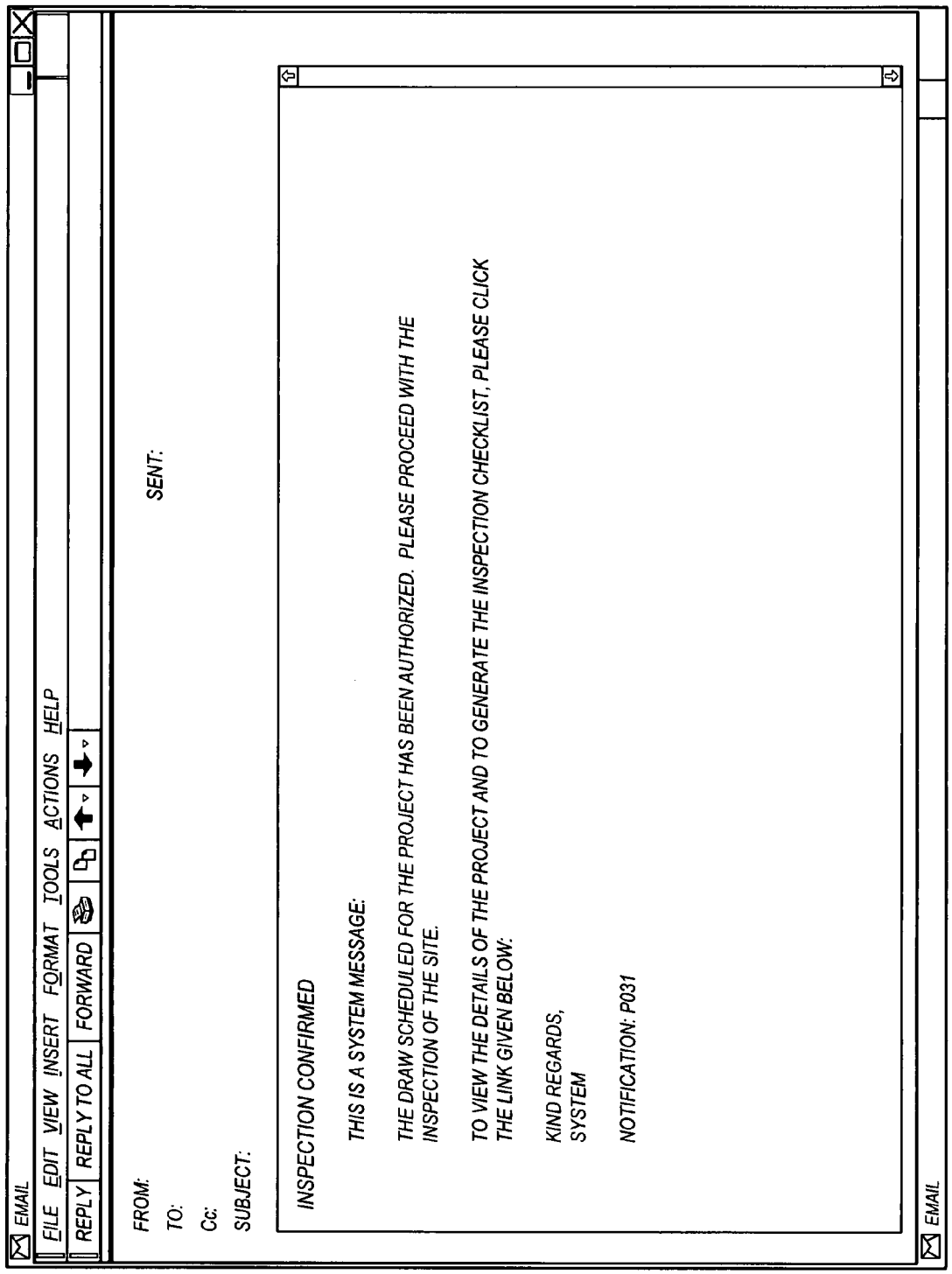
FIG. 97 is an illustration of an inspection confirmed notification.

FIG. 97 illustrates an inspection confirmed notification that can be transmitted during the inspections confirmed task 318. The notification of FIG. 97 can include a statement that the draw scheduled for a project has been authorized and instructions to proceed with inspection of the site, along with a link to view the details of the project and to generate an inspection checklist.

Figure 98:
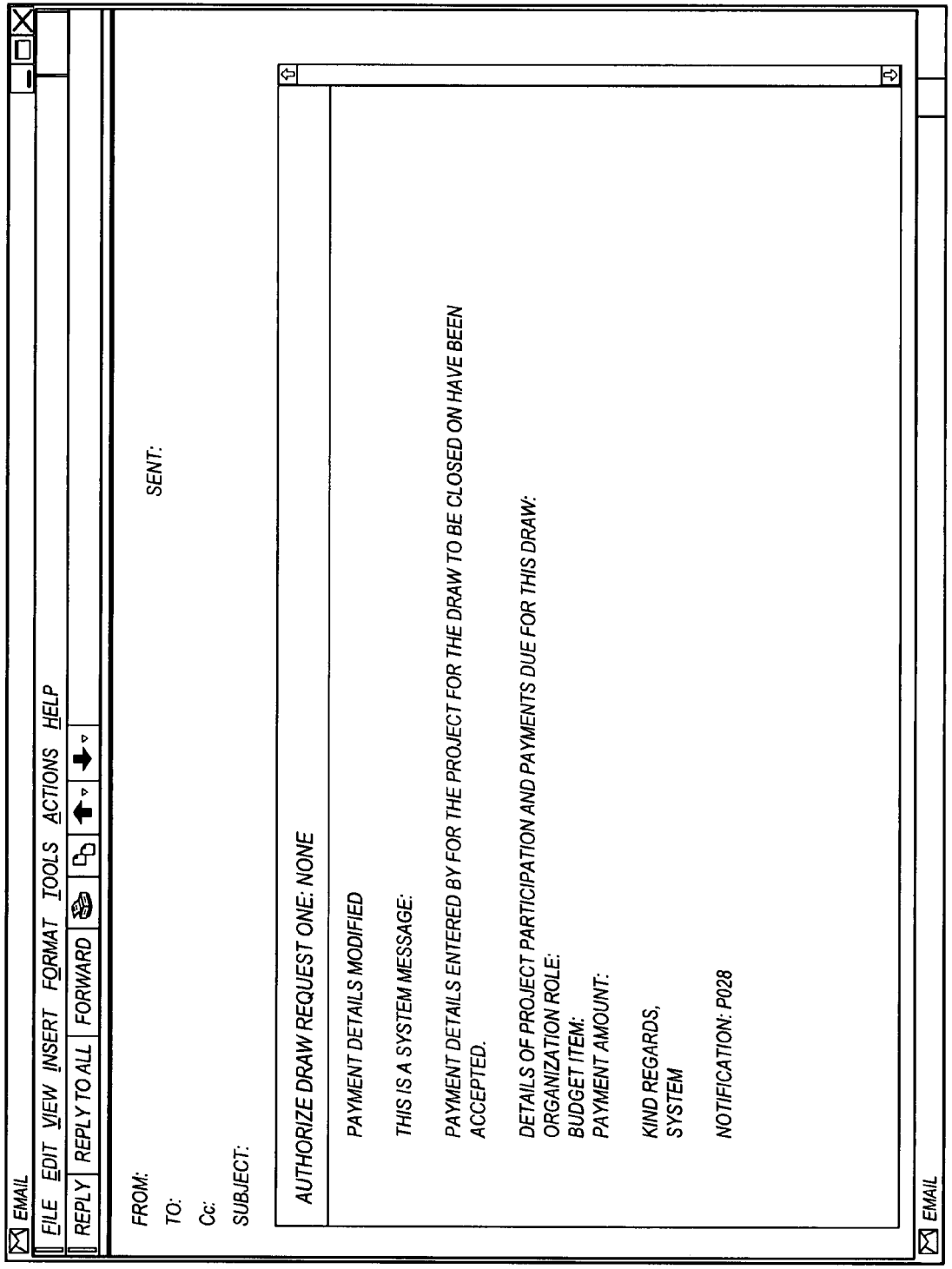
FIG. 98 is an illustration of a payment details modified notification.

FIG. 98 illustrates a payment details modified notification that can be transmitted during the payment details modified task 322. The notification of FIG. 98 can include a statement that the payment details for a project for a draw have not been accepted. The notification can list details of project participation and payments due for the draw, organization role, budget item, and payment amount.

Figure 99:
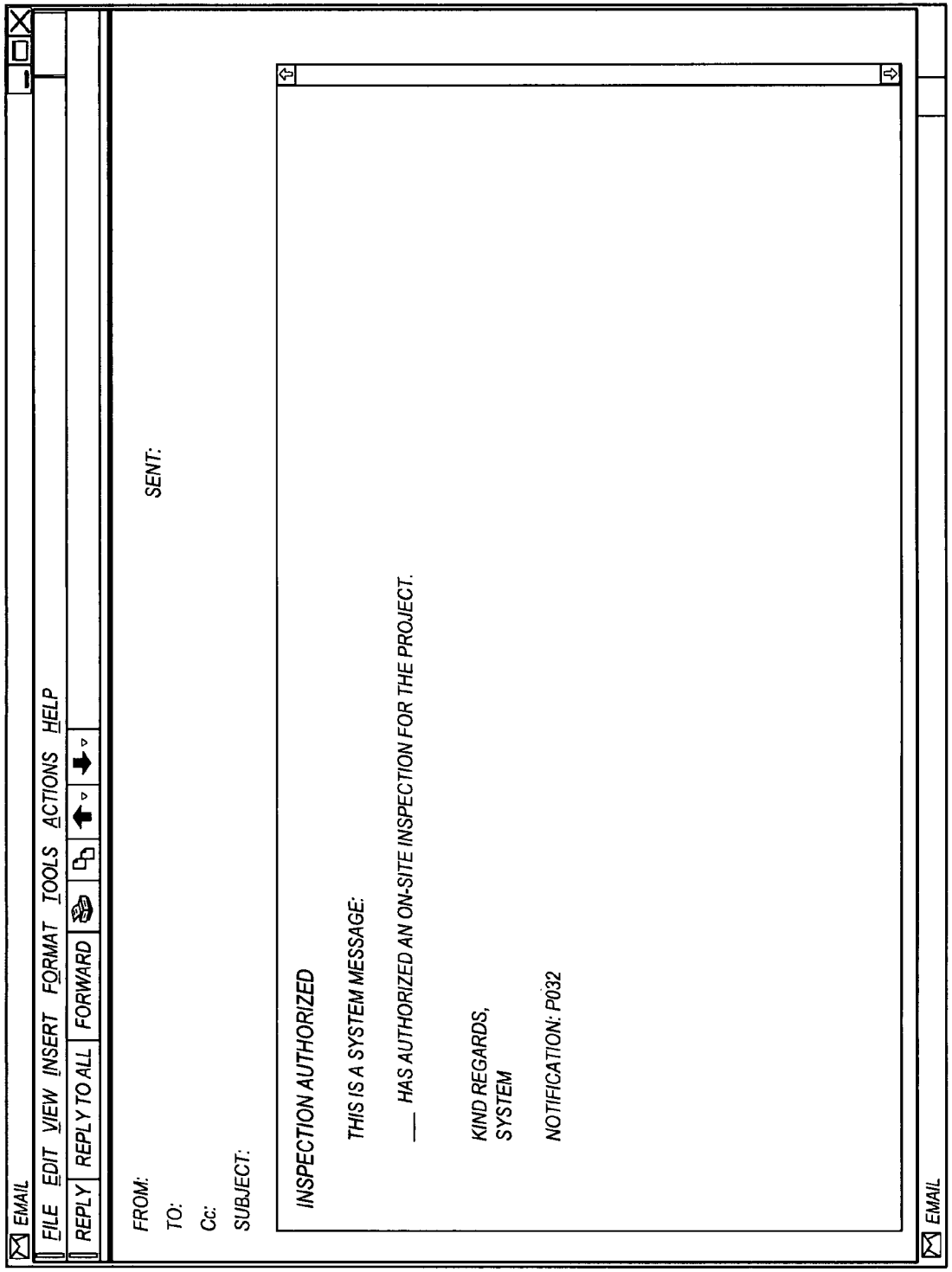
FIG. 99 is an illustration of an inspection authorized notification.

FIG. 99 illustrates an inspection authorized notification that can be transmitted during the inspection authorized task 320. The notification of FIG. 99 can include a statement that an on-site inspection for a project has been authorized.

FIG. 100 illustrates an Authorize Draw Request Two notification that can be transmitted during the Authorize Draw Request Two—notification task 324. The notification of FIG. 100 can include a statement that the recipient is requested to check the inspection report entered for a project, that the recipient's authorization is required before the draw can proceed to the next phase (e.g., asking draw recipients for lien waivers), and a link to view the inspection report and to grant or deny authorization for the draw.

Figure 101:
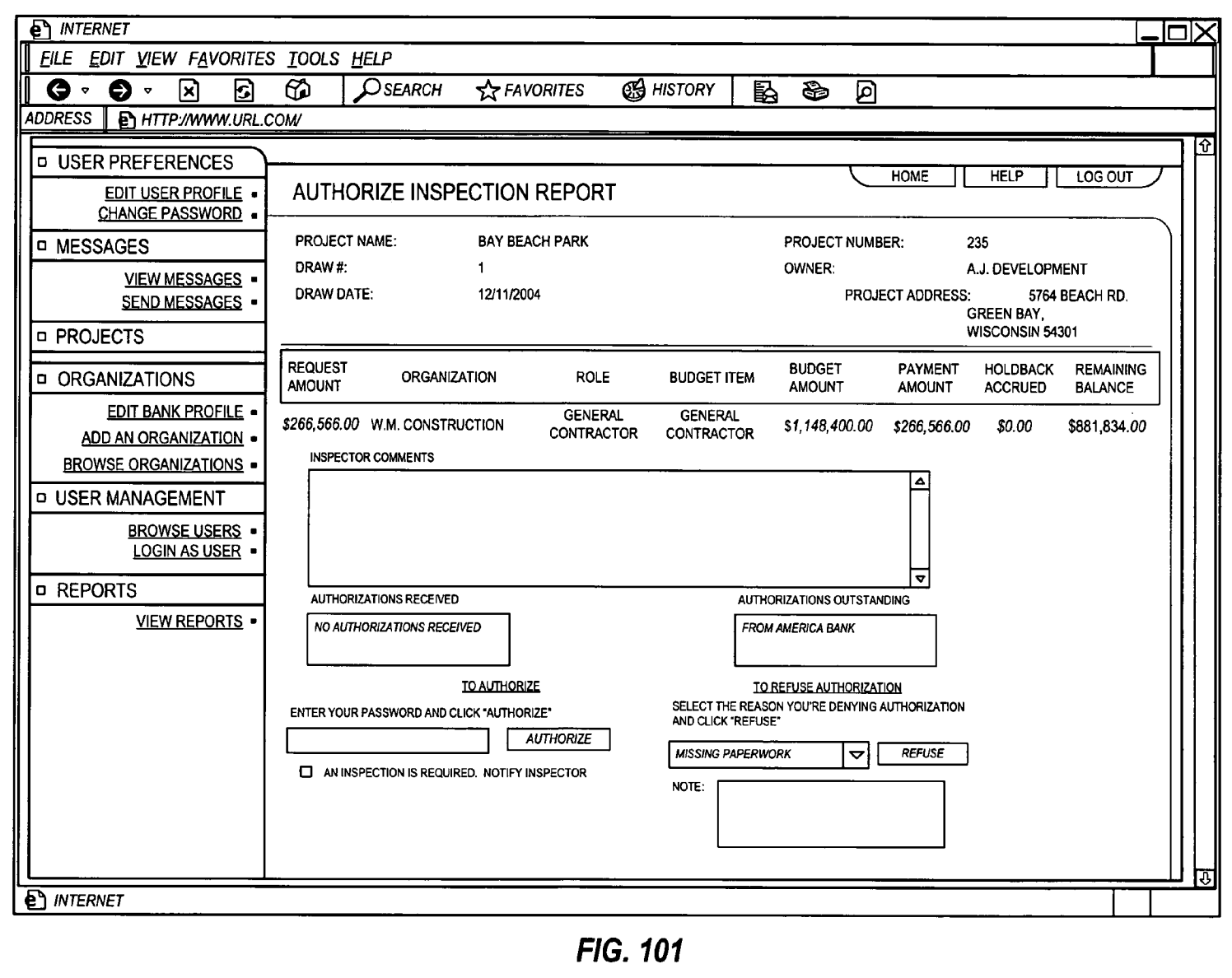

FIG. 101 illustrates an Authorize Draw Request Two form that can be associated with the Authorize Draw Request Two task 326. A GC, owner, owner's representative, or title company can access the Authorize Draw Request Two form through the draw approval module 60 of the draw module 44. The Authorize Draw Request Two form can include the project name, the project number, the owner, the project address, the draw number, and the draw date. The Authorize Draw Request Two form can include any entry for each organization including the request amount, the organization name, the organization role, the budget item, the budget amount, the payment amount, the holdback accrued, and the remaining balance. The Authorize Draw Request Two form can include the authorizations received, the authorizations outstanding, whether an inspection is required, the ability to enter a password for authorization, and the ability to deny authorization and specify a reason.

Figure 102:
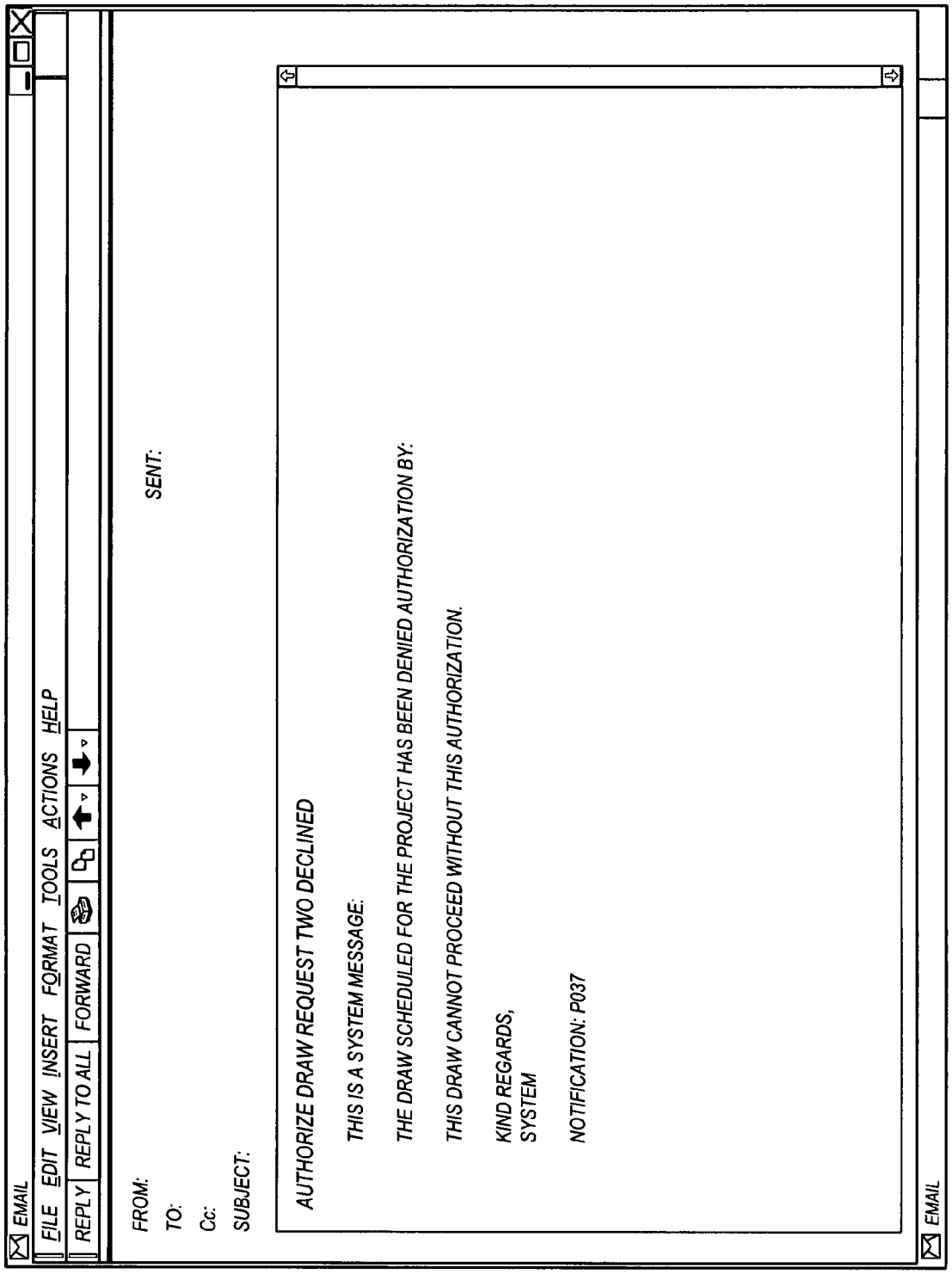
FIG. 102 is an illustration of an Authorize Draw Request Two declined notification.

FIG. 102 illustrates an Authorize Draw Request Two declined notification that can be transmitted during the Authorize Draw Request Two declined task 328. The notification of FIG. 102 can include a statement that the draw scheduled for a project has been denied authorization by a participant and that the draw cannot proceed without this authorization.

Figure 103:
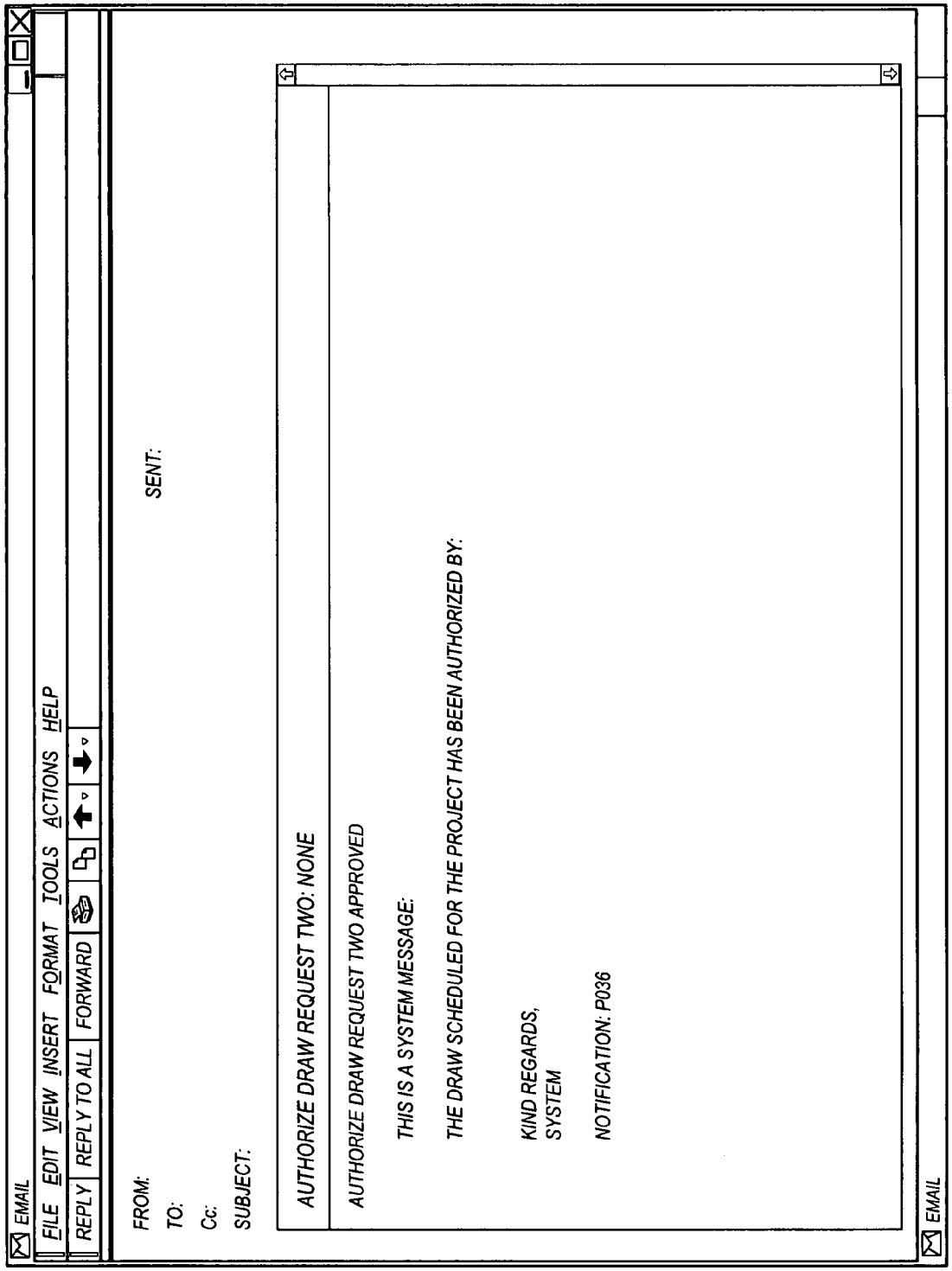
FIG. 103 is an illustration of an Authorize Draw Request Two approved notification.

FIG. 103 illustrates an Authorize Draw Request Two approved notification that can be transmitted during the Authorize Draw Request Two task 330. The notification of FIG. 103 can include a statement that a draw for a project has been authorized by a participant.

Figure 104:
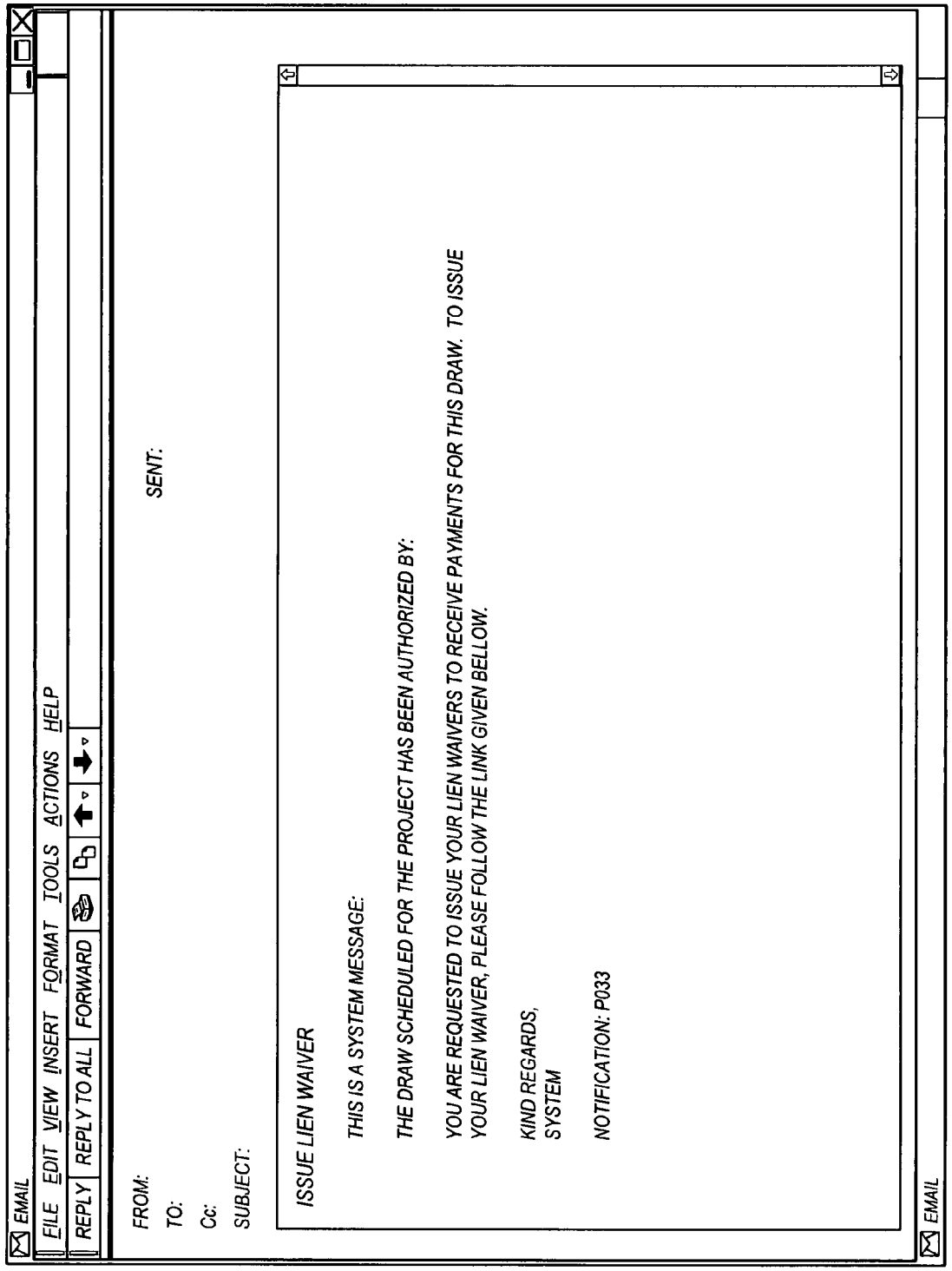
FIG. 104 is an illustration of an issue lien waiver notification.

FIG. 104 illustrates an issue lien waiver notification that can be transmitted during the issue lien waiver task 332. The notification of FIG. 104 can include a statement that a draw scheduled for a project has been authorized by a participant and that the recipient is requested to issue a lien waiver to receive payments for the draw, along with a link allowing the recipient to issue a lien waiver.

Figure 105:
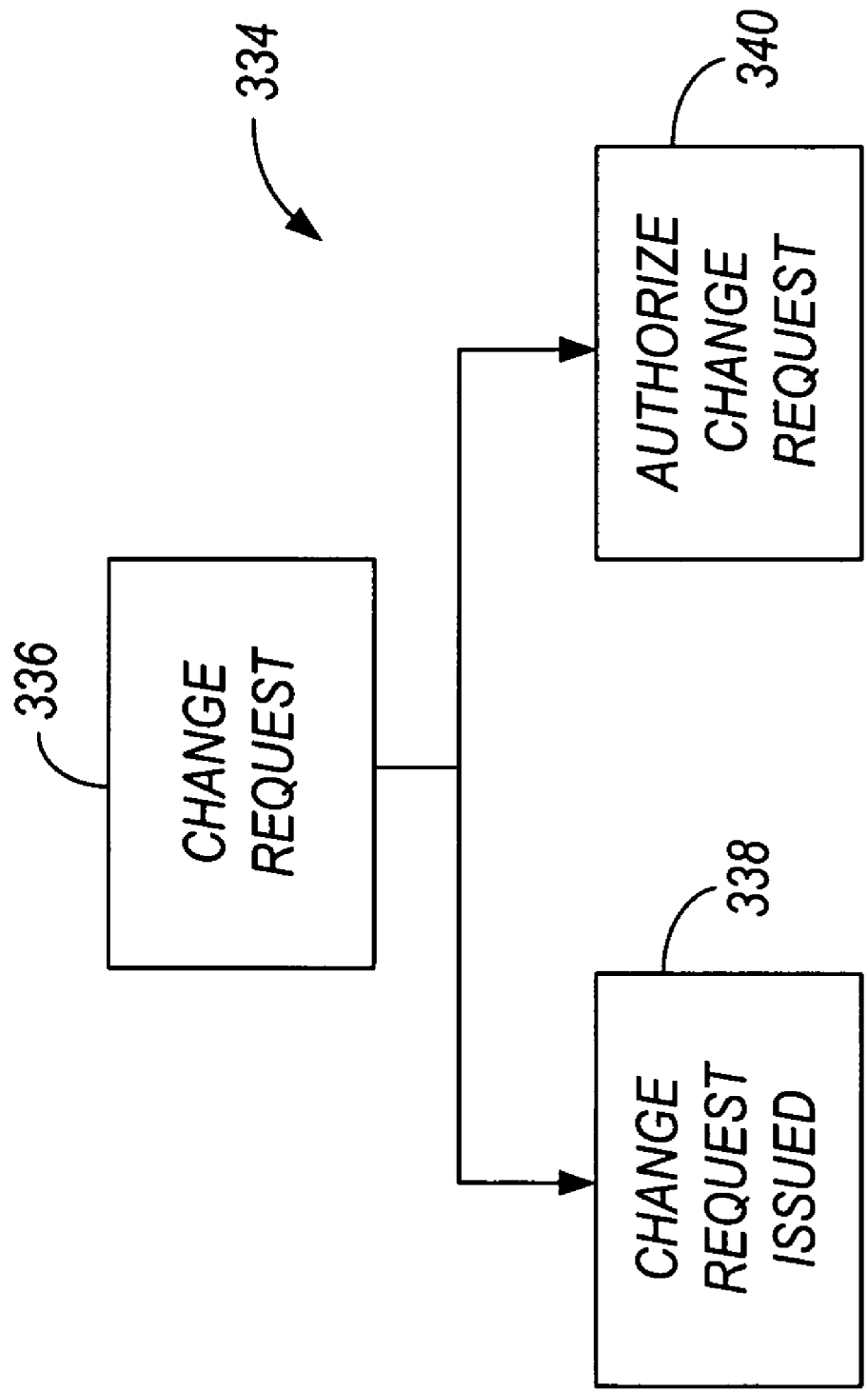
FIG. 105 is a schematic illustration of a change request process.

FIG. 105 illustrates a change request process 334, which can be included in the manage change order process 98. The change request process 334 can be used to modify the overall project budget (generally to expand the budget) by adding new line items, by changing existing line items, or by terminating subcontractors and making the remaining funds available to other participants. The change request process 334 can be performed by a GC, architect, owner, owner's representative, lender, or subcontractor using the change order module 48. The change request process 334 can include a change request task 336, a change request issued task 338, and an authorize change request task 340.

FIG. 106 illustrates a change request form that can be associated with the change request task 336. A GC or subcontractor can access the change request form through the change order module 48. The change request form can include the project name, the project number, the project address, the owner name, and a list of the amounts to change. The list of amounts to change can include the change amount, the organization name, the organization role, the budget item, the budget amount, the payment amount, and the remaining balance. The change request form can include a change description field. The change request form can include whether the payment form is loan or owner payment, and whether the payment method is loan, owner check, or credit card. The change request form can include the currently estimated completion date and a new estimated completion date.

Figure 107:
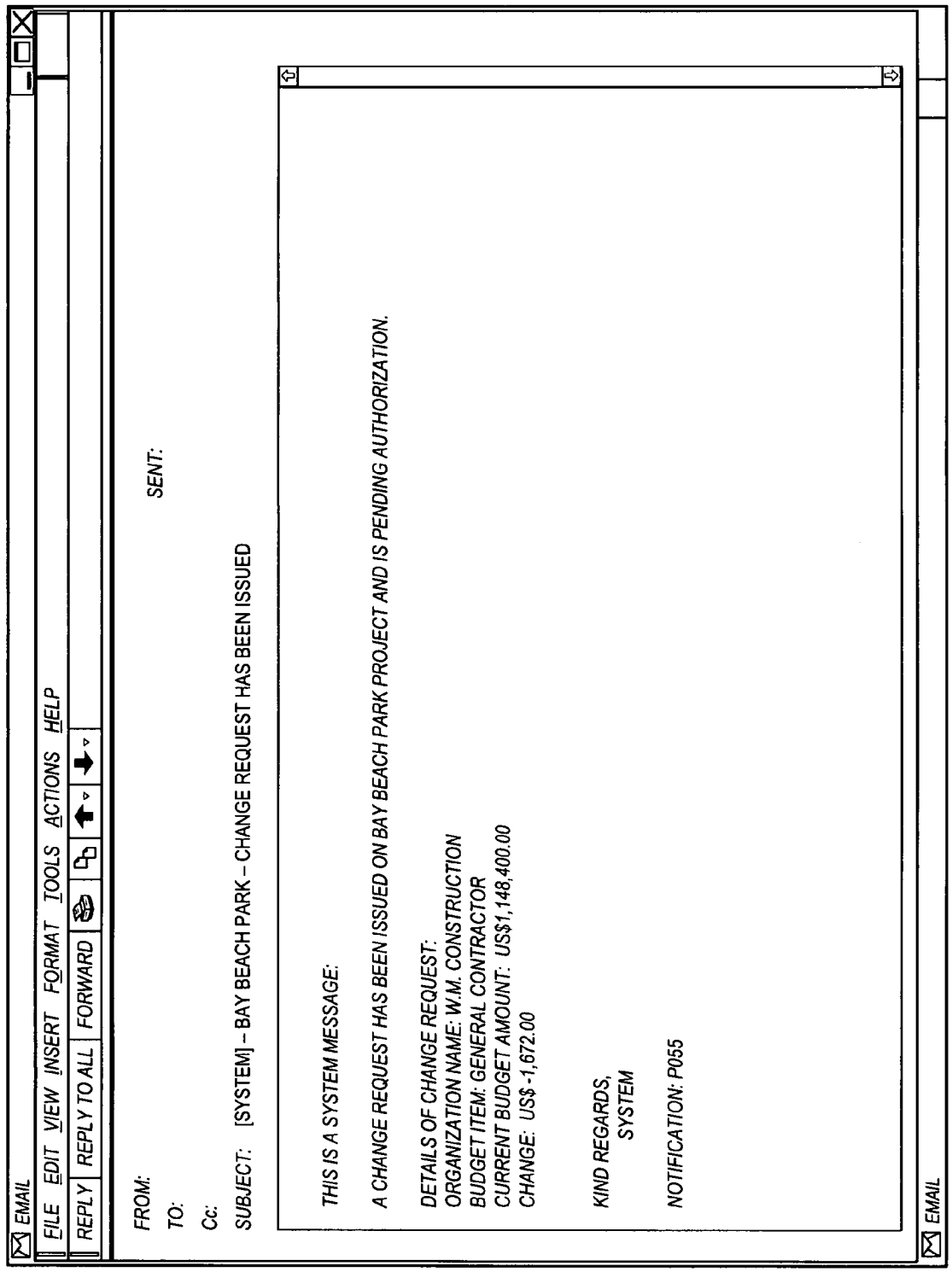
FIG. 107 is an illustration of a change request issued notification.

FIG. 107 illustrates a change request issued notification that can be transmitted during the change request issued task 338. The notification of FIG. 107 can include a statement that a change request has been issued on a project and is pending authorization. The notification can include the details of the change request, the organization name, the budget item, the current budget amount, and the change amount.

Figure 108:
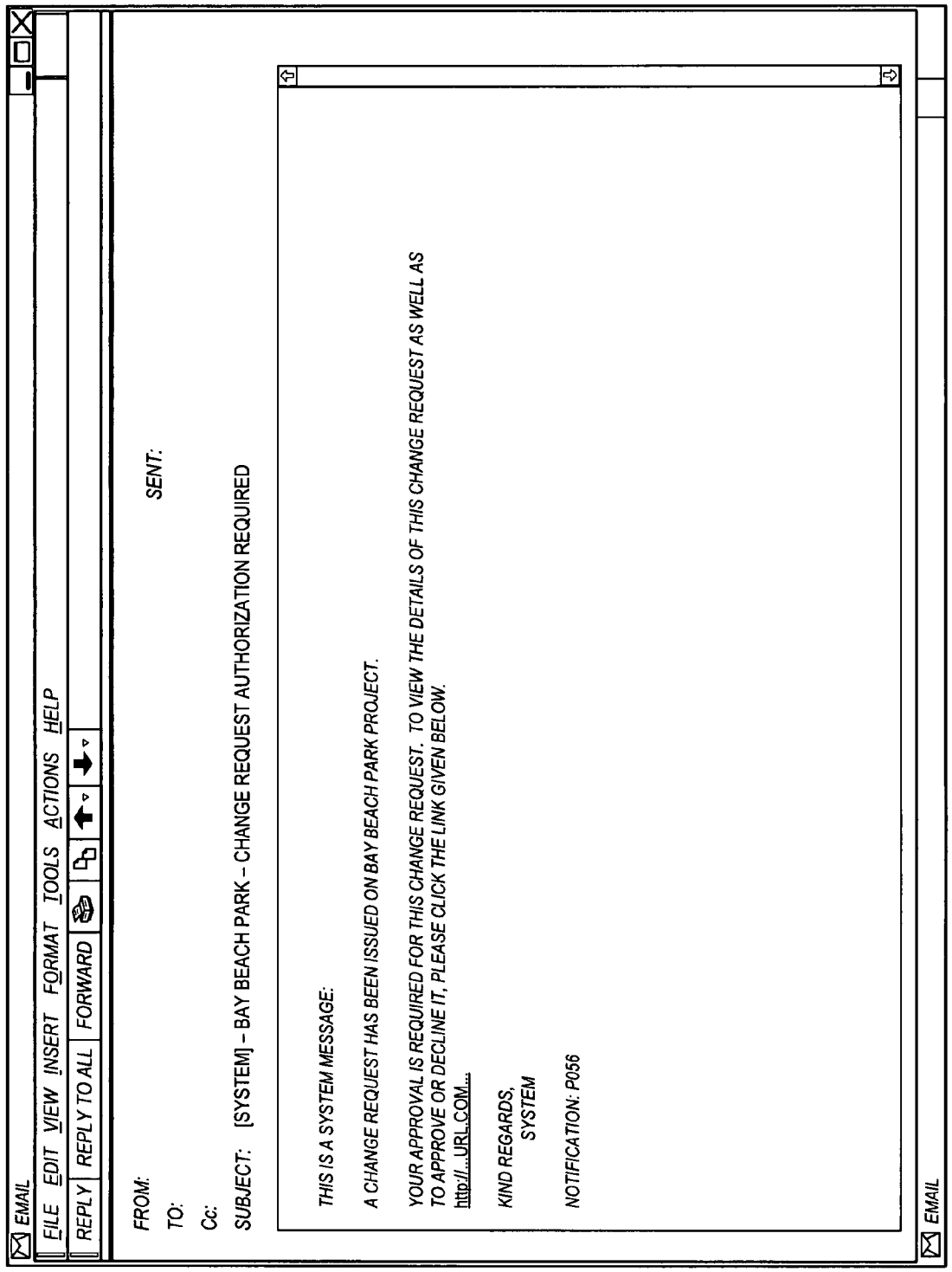
FIG. 108 is an illustration of an authorize change request notification.

FIG. 108 illustrates an authorize change request notification that can be transmitted during the authorize change request task 340. The notification of FIG. 108 can include a statement that a change request has been issued on a project and that the recipient's approval is required for the change request. The notification can include a link to view the details of the change request, as well as to approve or decline the change request.

Figure 109:
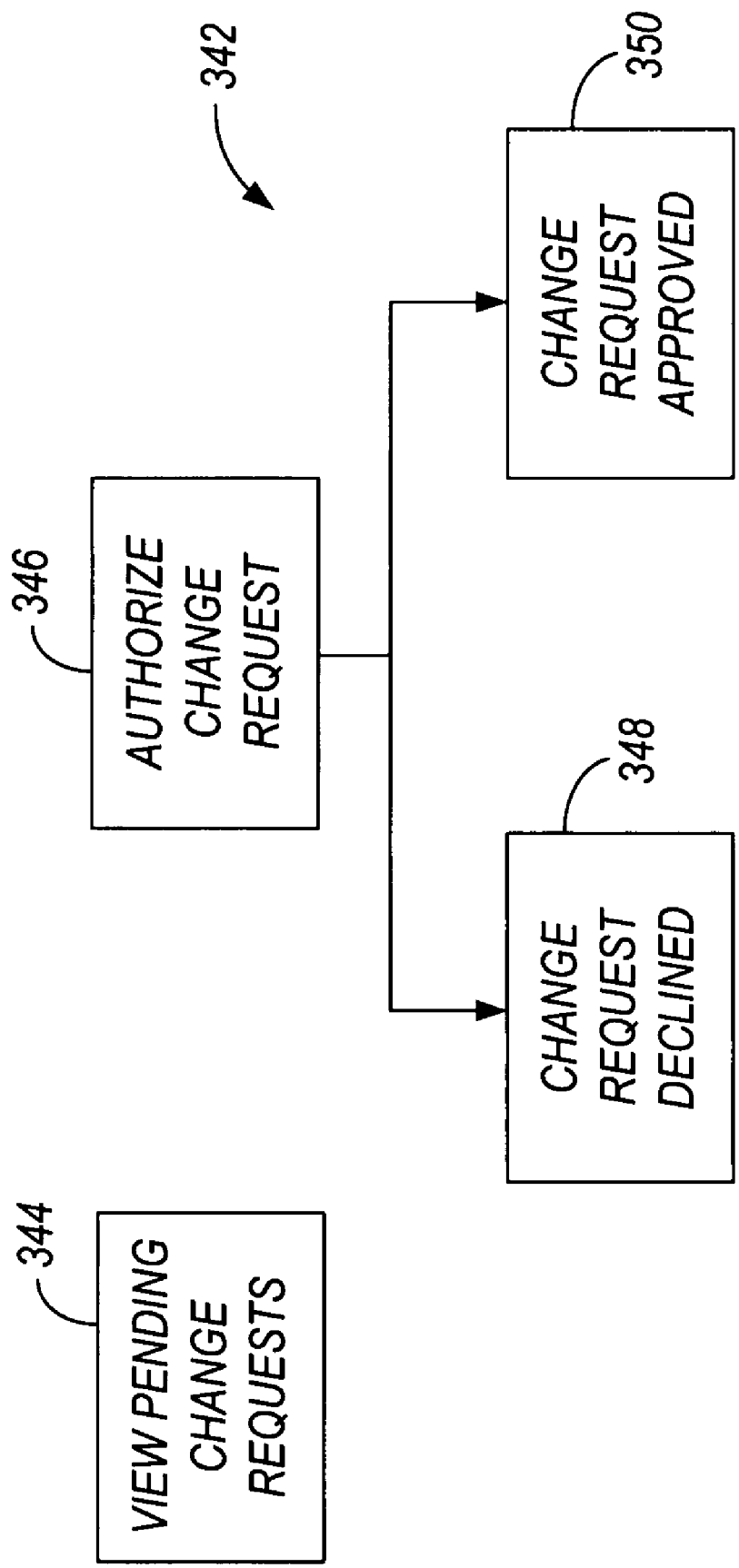
FIG. 109 is a schematic illustration of a process change request process.

FIG. 109 illustrates a process change request process 342, which can be included in the manage change order process 98. The process change request process 342 can be used to ensure that changes being made to the budget are authorized by the appropriate participant, such as the architect, the lender, the title company, the owner, the owner's representative, or the GC. The process change request process 342 can be performed by a GC, architect, owner, owner's representative, lender, or subcontractor using the change order module 48. The process change request process 342 can include a view pending change requests task 344, an authorize change request task 346, a change request declined task 348, and a change request approved task 350.

Figure 110:
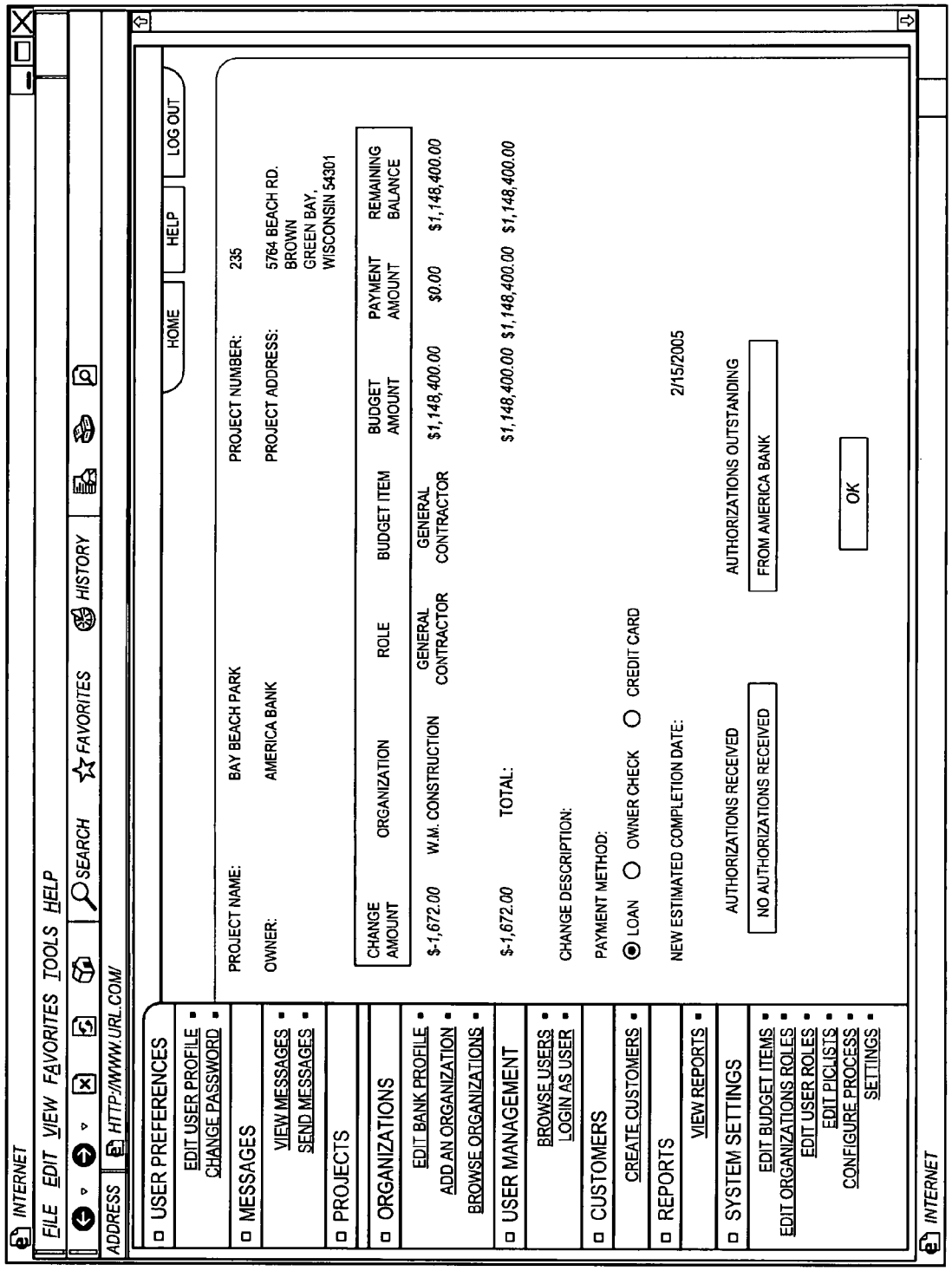
FIG. 110 is an illustration of a view pending change request screen.

FIG. 110 illustrates a view pending change request screen that can be associated with the view pending change requests task 344. A GC, subcontractor, owner, owner's representative, lender, or architect can access the view pending change request screen through the change order module 48. The view pending change request screen can include the project name, the project number, the project address, the owner name, and a list of the amounts to change. The list of amounts to change can include the change amount, the organization name, the organization role, the budget item, the budget amount, the payment amount, and the remaining balance. The view pending change request screen can include a change description field. The view pending change request screen can include whether the payment method is loan, owner check, or credit card. The view pending change request screen can include the new estimated completion date, the authorizations received, and the authorizations outstanding.

Figure 111:
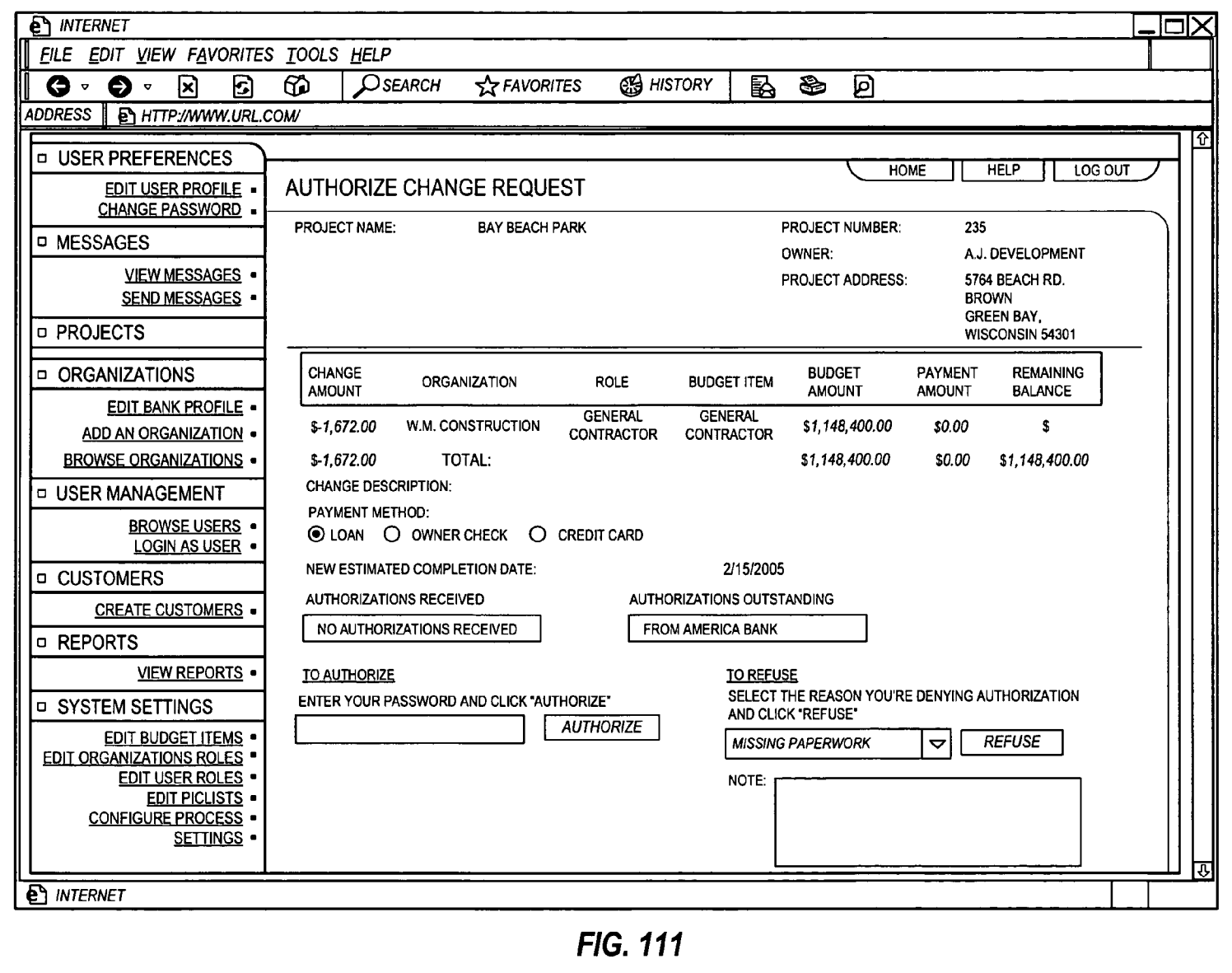

FIG. 111 illustrates an authorize change request form that can be associated with the authorize change request task 346. A GC, subcontractor, owner, owner's representative, lender, or architect can access the authorize change request form through the change order module 48. The authorize change request form can include the project name, the project number, the project address, the owner name, and a list of the amounts to change. The list of amounts to change can include the change amount, the organization name, the organization role, the budget item, the budget amount, the payment amount, and the remaining balance. The authorize change request form can include a change description field. The authorize change request form can include whether the payment method is loan, owner check, or credit card. The authorize change request form can include the new estimated completion date, the authorizations received, and the authorizations outstanding. The authorize change request form can include the ability to enter a password and to authorize the change request, and the ability to refuse the change request and enter a reason for the refusal.

Figure 112:
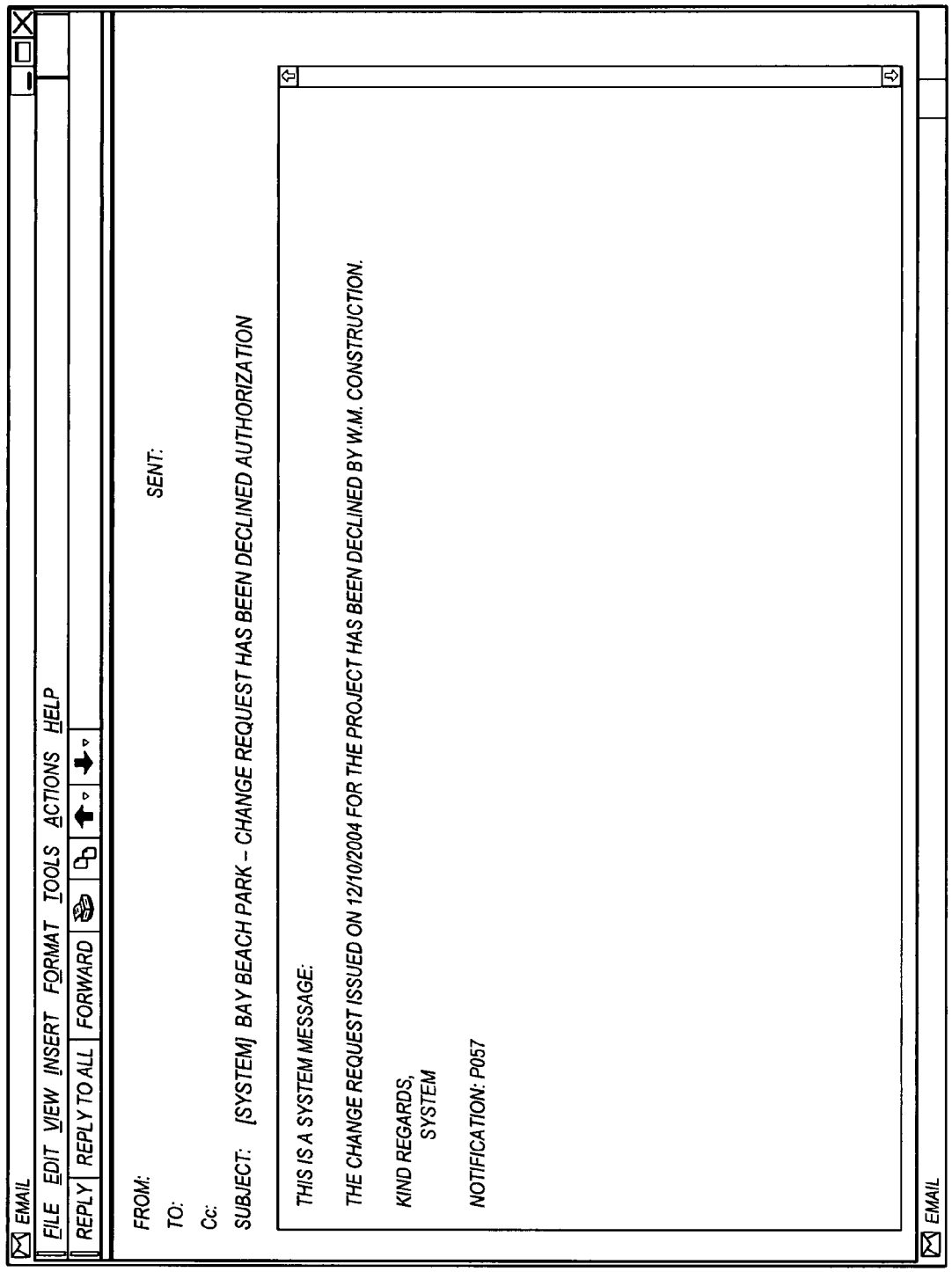
FIG. 112 is an illustration of a change request declined notification.

FIG. 112 illustrates a change request declined notification that can be transmitted during the change request declined task 348. The notification of FIG. 112 can include a statement that a change request issued on a date for a project has been declined by a participant.

Figure 113:
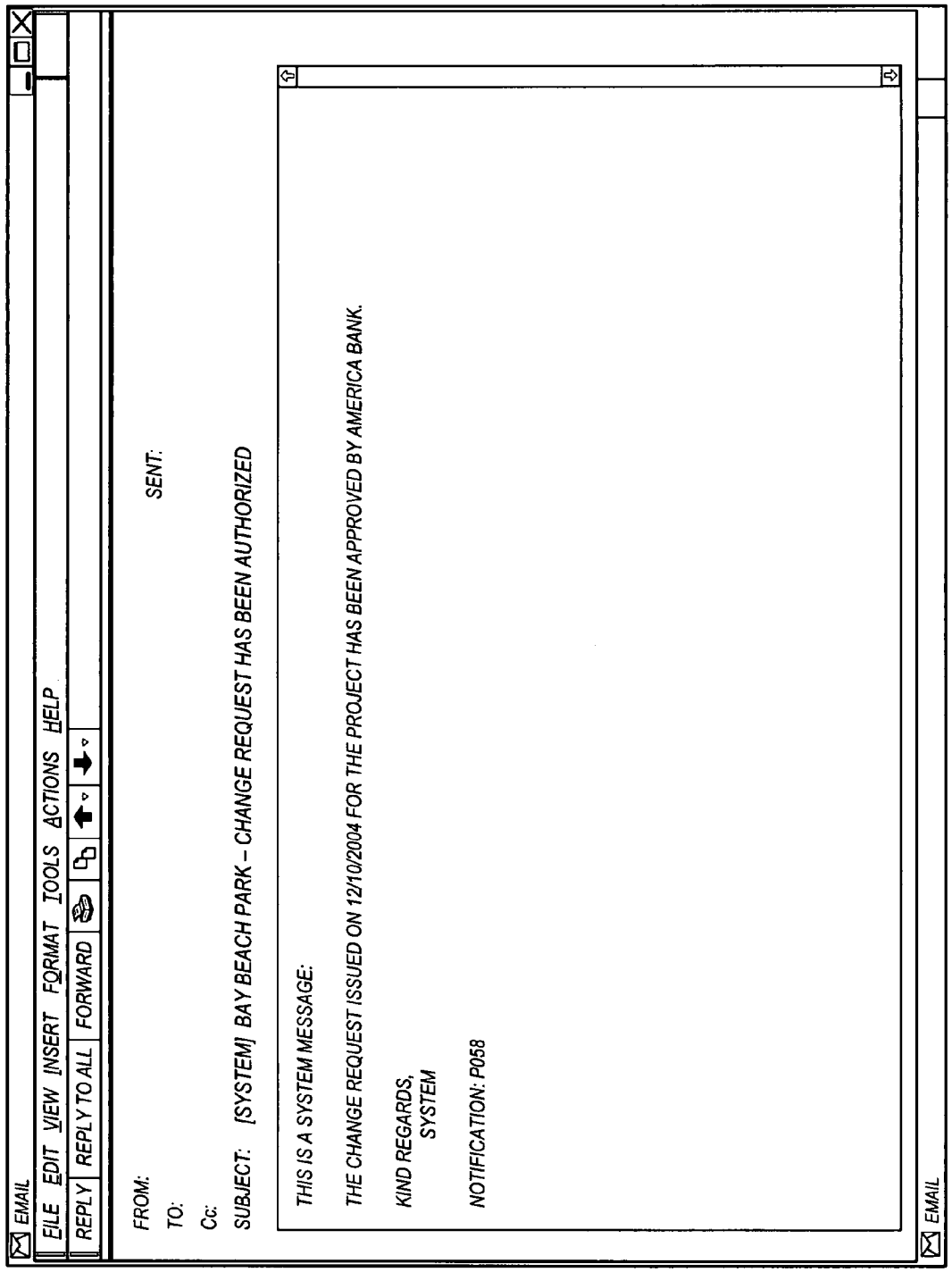
FIG. 113 is an illustration of a change request approved notification.

FIG. 113 illustrates a change request approved notification that can be transmitted during the change request approval task 350. The notification of FIG. 113 can include a statement that a change request issued on a date for a project has been approved by a participant (e.g., a lender). Only a change request can be used to modify the overall project budget (generally to expand the budget) by adding new line items, by changing existing line items, or by terminating subcontractors and making the remaining funds available to other participants. The CPMS 10 can be used to ensure that changes being made to the budget are authorized by the appropriate participant, such as the architect, the lender, the title company, the owner, the owner's representative, or the GC. The notification of FIG. 113 can be transmitted when the appropriate participant has approved the change request.

Figure 114:
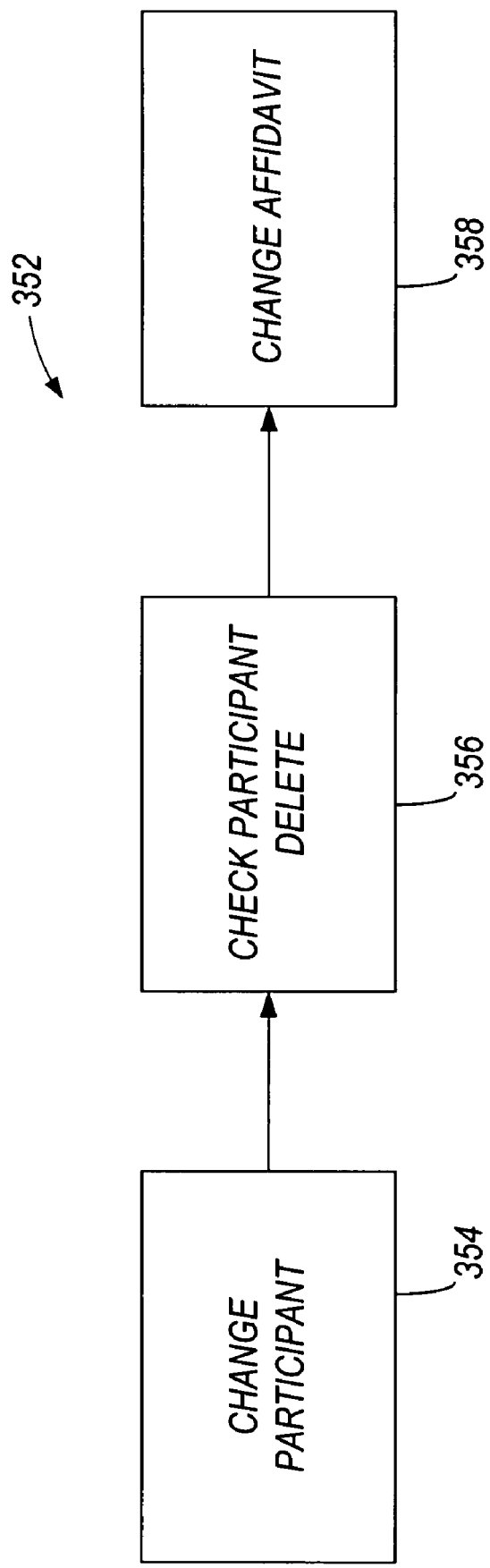
FIG. 114 is a schematic illustration of a change project participant process.

FIG. 114 illustrates a change project participant process 352, which can be included in the manage change order process 98. The change project participant process 352 can be used, for example, to terminate one subcontractor and to make the remaining funds available to another participant (such as a replacement subcontractor). The change project participant process 352 can be performed by a GC or a subcontractor using the change order module 48. The change project participant process 352 can include a change participant task 354, a check participant delete task 356, and a change affidavit task 358.

Figure 115:
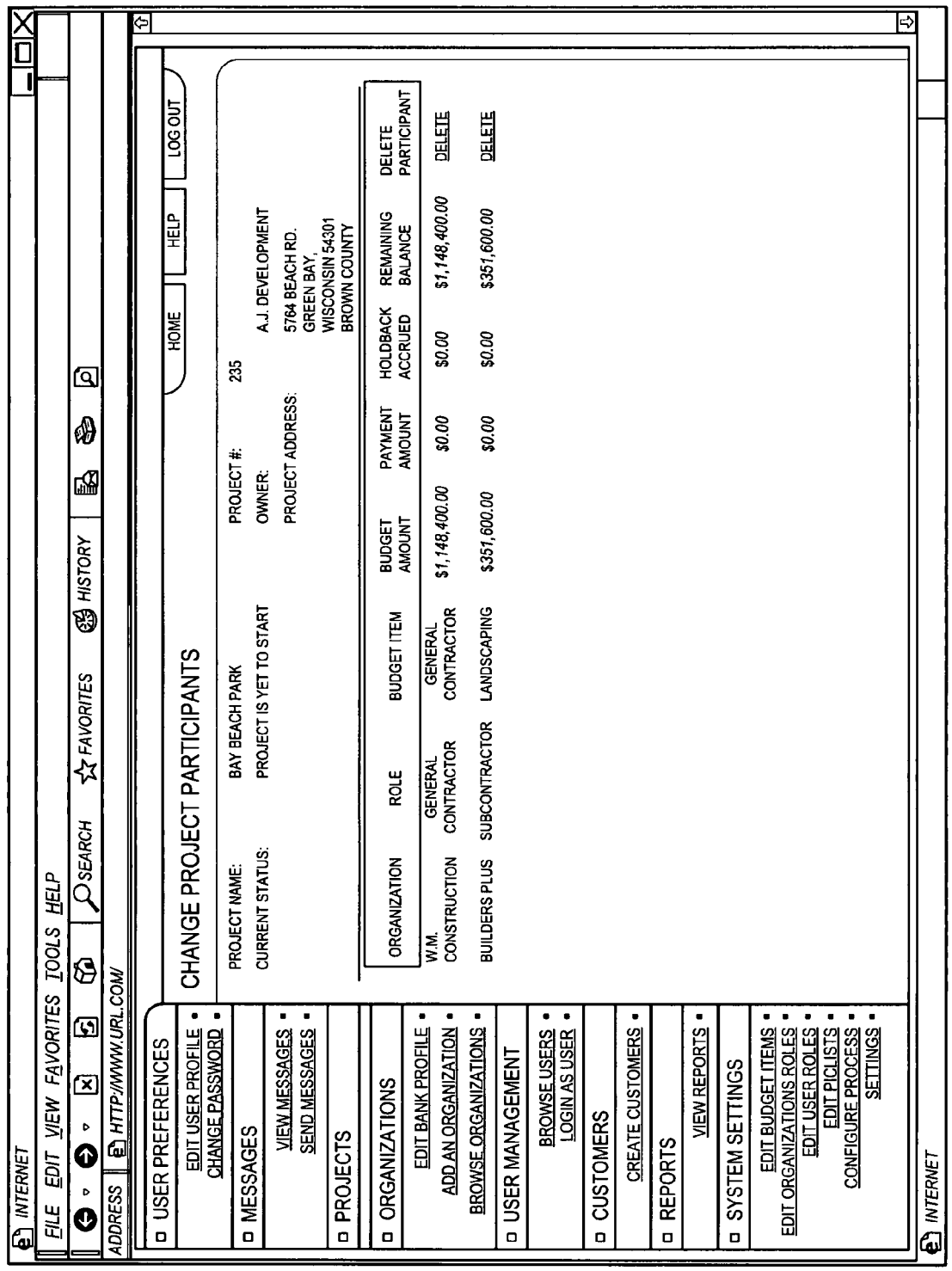
FIG. 115 is an illustration of a change participant screen.

FIG. 115 illustrates a change participant screen that can be associated with the change participant task 354. A GC or subcontractor can access the change participant screen through the change order module 48. The change participant screen can include the project name, the project number, the owner name, the project address, and the current status of the project. The change participant screen can include a list of the organizations that can be changed. The list of organizations can include organization name, organization role, budget item, budget amount, payment amount, holdback accrued, remaining balance, and a link to delete each participant.

Figure 116:
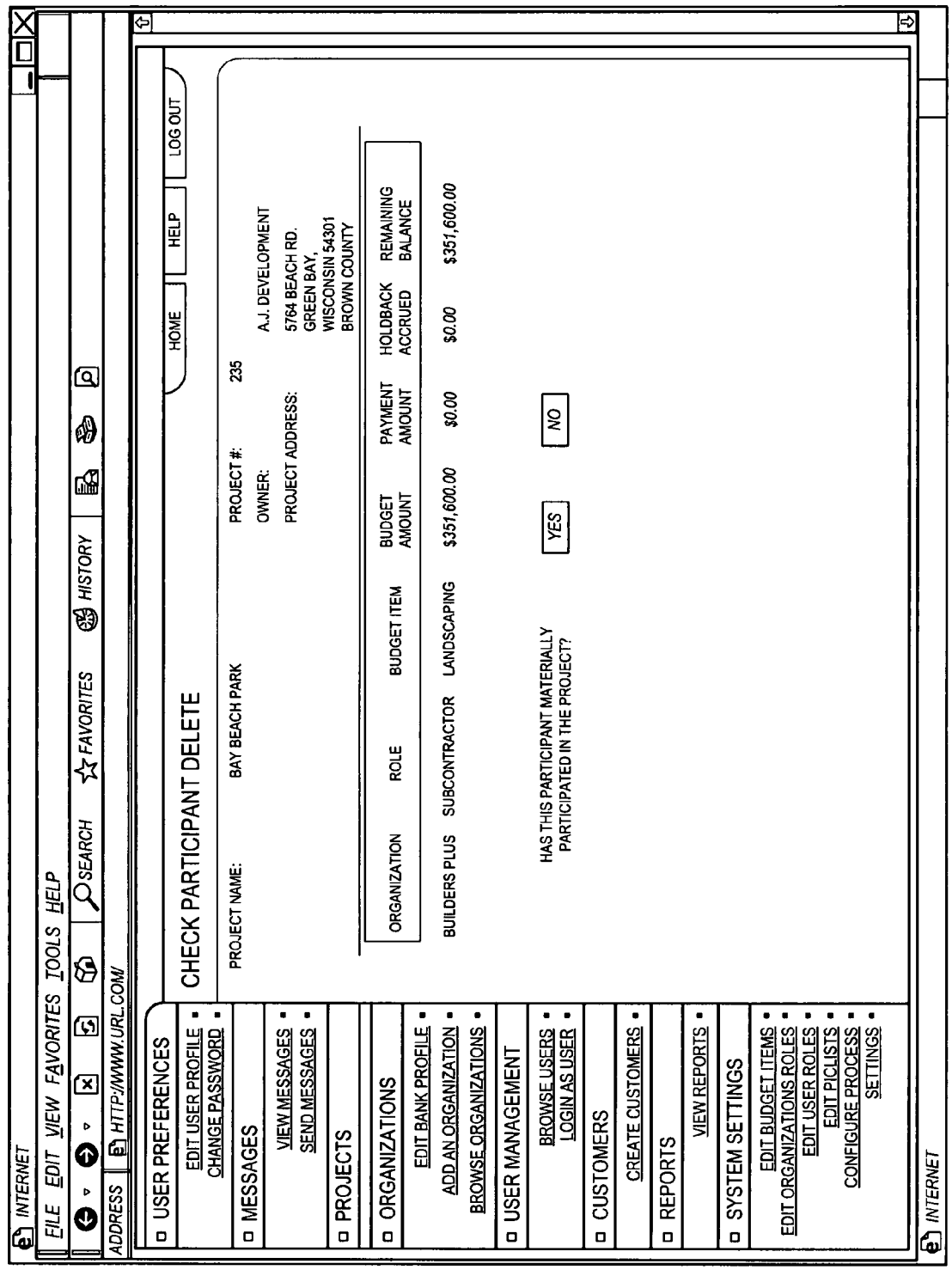
FIG. 116 is an illustration of a check participant delete screen.

FIG. 116 illustrates a check participant delete screen that can be associated with the check participant delete task 356. A GC or subcontractor can access the check participant delete screen through the change order module 48. The check participant delete screen can include the project name, the project number, the owner name, the project address, and information about the participant to be deleted (e.g., organization name, organization role, budget item, budget amount, payment amount, holdback accrued, and remaining balance). The check participant delete screen can include the ability to specify whether the participant has materially participated in the project.

Figure 117:
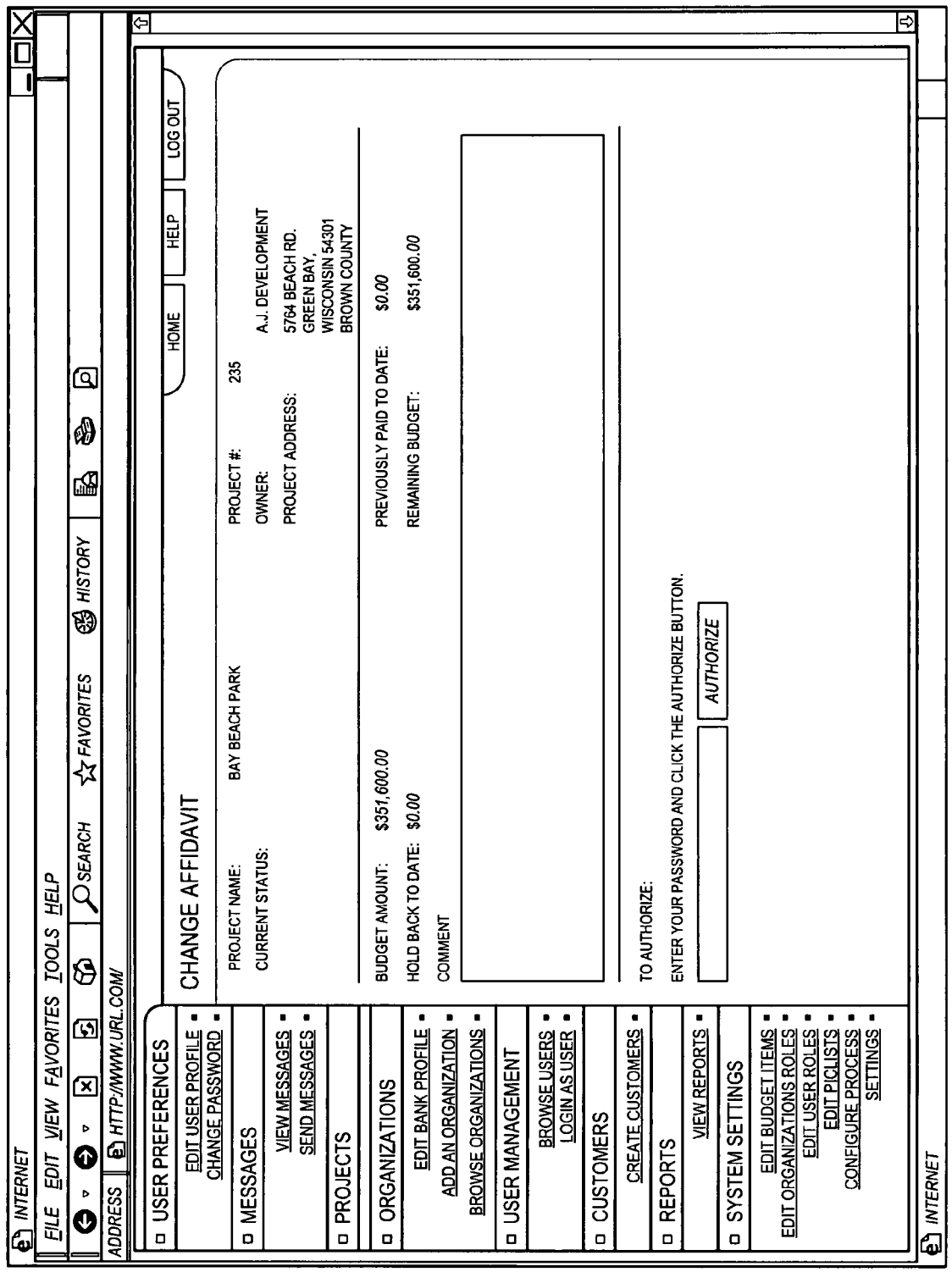
FIG. 117 is an illustration of a change affidavit screen.

FIG. 117 illustrates a change affidavit screen that can be associated with the change affidavit task 358. A GC or subcontractor can access the change affidavit screen through the change order module 48. The change affidavit screen can include the project name, the project number, the owner name, the project address, the current status of the project, the budget amount, the previously paid to date amount, the hold back to date amount, and the remaining budget. The change affidavit screen can include a field to enter comments and the ability to enter a password and authorize the change in the affidavit.

Figure 118:
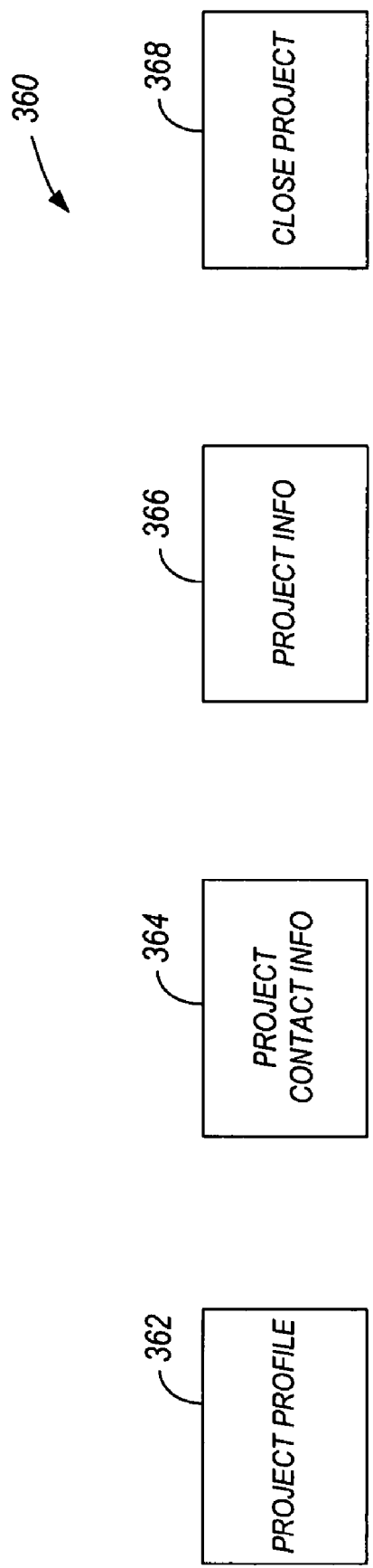
FIG. 118 is a schematic illustration of maintain project screen tasks.

FIG. 118 illustrates maintain project screens tasks 360, which can be included in the manage project process 94. The maintain project screens tasks 360 can be used to edit the project's profile, the contact information, and to close out a project. The maintain project screens tasks 360 can be performed by a GC, lender, owner, or owner's representative using the project module 28. The maintain project screens tasks 360 can include a project profile task 362, a project contact information task 364, a project information task 366, and a close project task 368.

FIG. 119 illustrates a project profile form that can be associated with the project profile task 362. A GC, lender, owner, or owner's representative can access the project profile form through the project module 28. The GC, lender, owner, or owner's representative can enter the requested information, such as project information, project funding information, project owner information, site information, and GC information.

Figure 120:
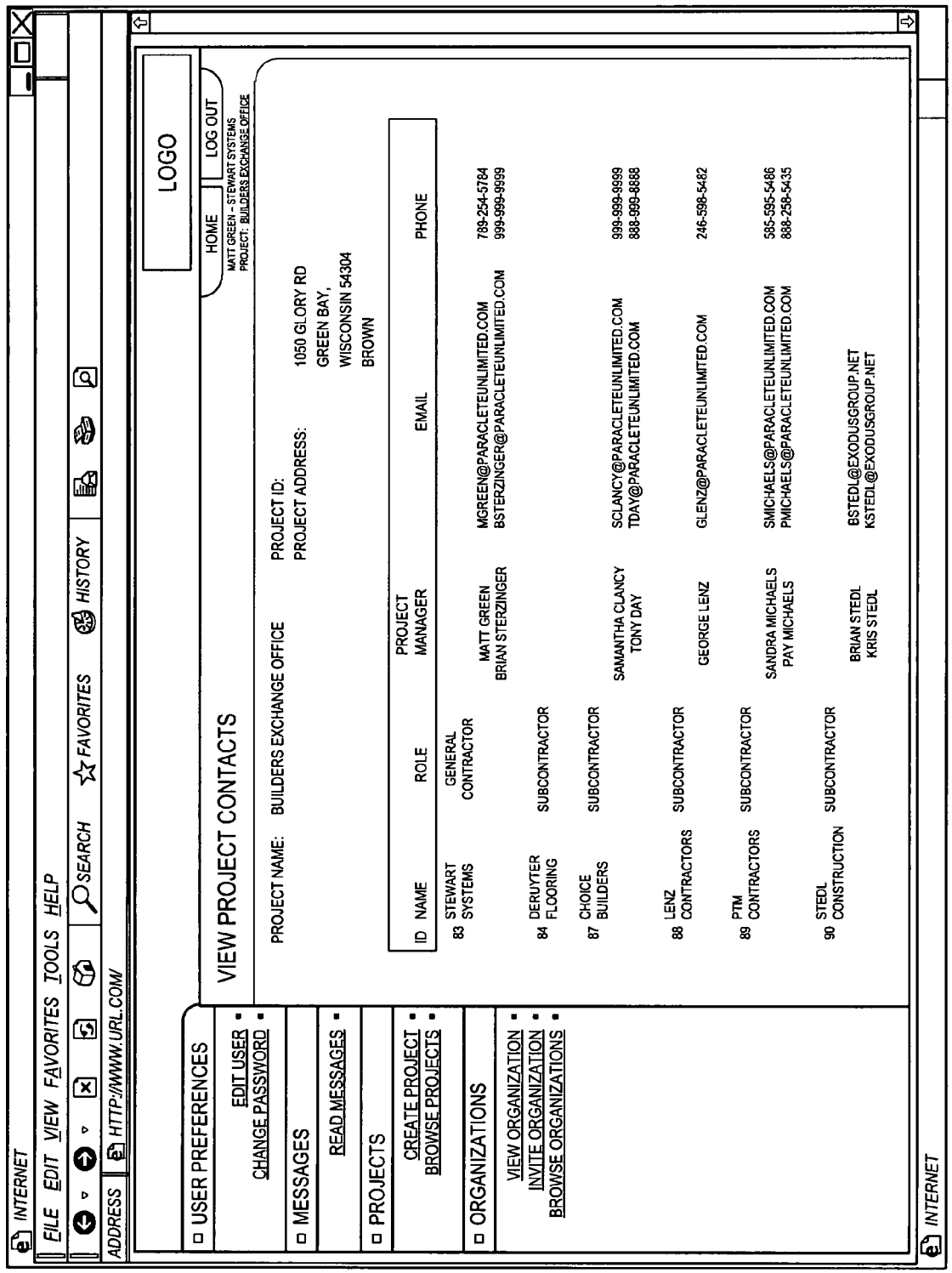
FIG. 120 is an illustration of a project contact information screen.

FIG. 120 illustrates a project contact information screen that can be associated with the project contact information task 364. A GC, lender, owner, or owner's representative can access the project contact information screen through the project module 28. The project contact information screen can include the project name, the project identification, the project address, and a list of contact information for the participants in the project. The list of contact information can include participant identification number, organization name, organization role, project manager name, contact email address, and contact phone number.

Figure 121:
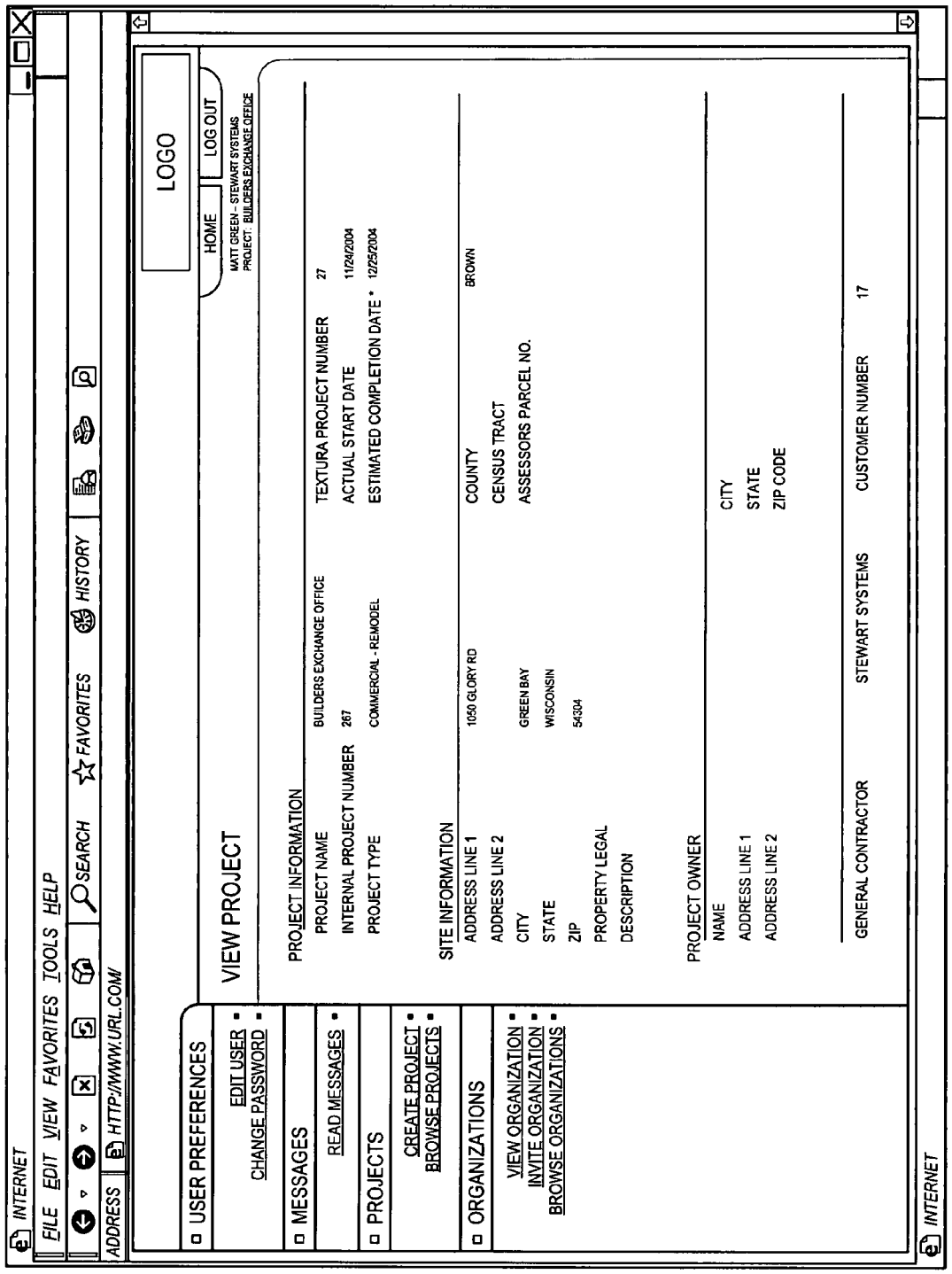

FIG. 121 illustrates a project information screen that can be associated with the create project information task 366. A GC, lender, owner, or owner's representative can access the project information screen through the project module 28. The project information screen can include project information, site information, project owner information, and GC information.

Figure 122:
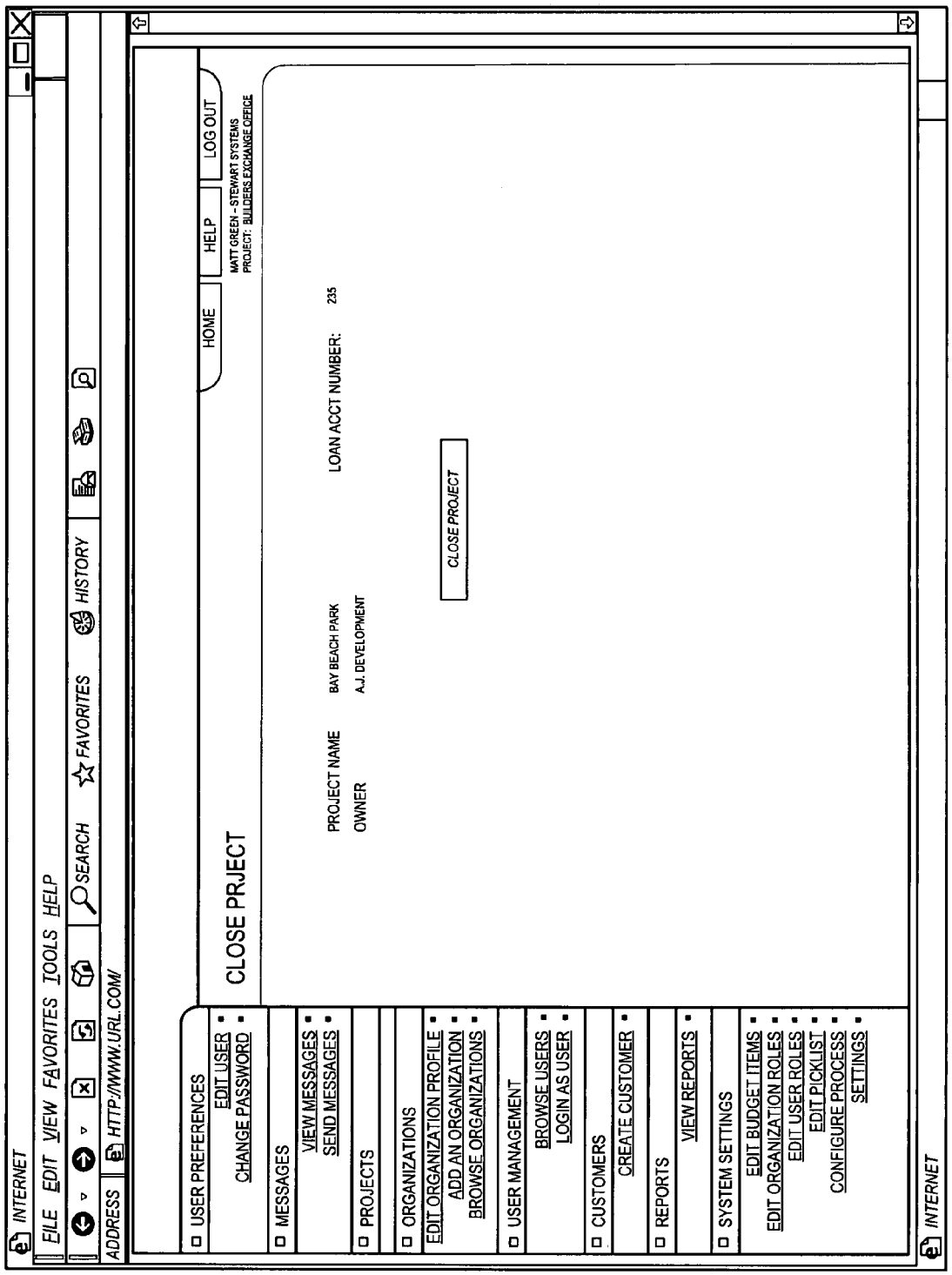

FIG. 122 illustrates a close project screen that can be associated with the close project task 368. A GC, lender, owner, or owner's representative can access the close project screen through the project module 28. The close project screen can include the project name, the loan account number, the owner name, and the ability to close the project.

Figure 123:
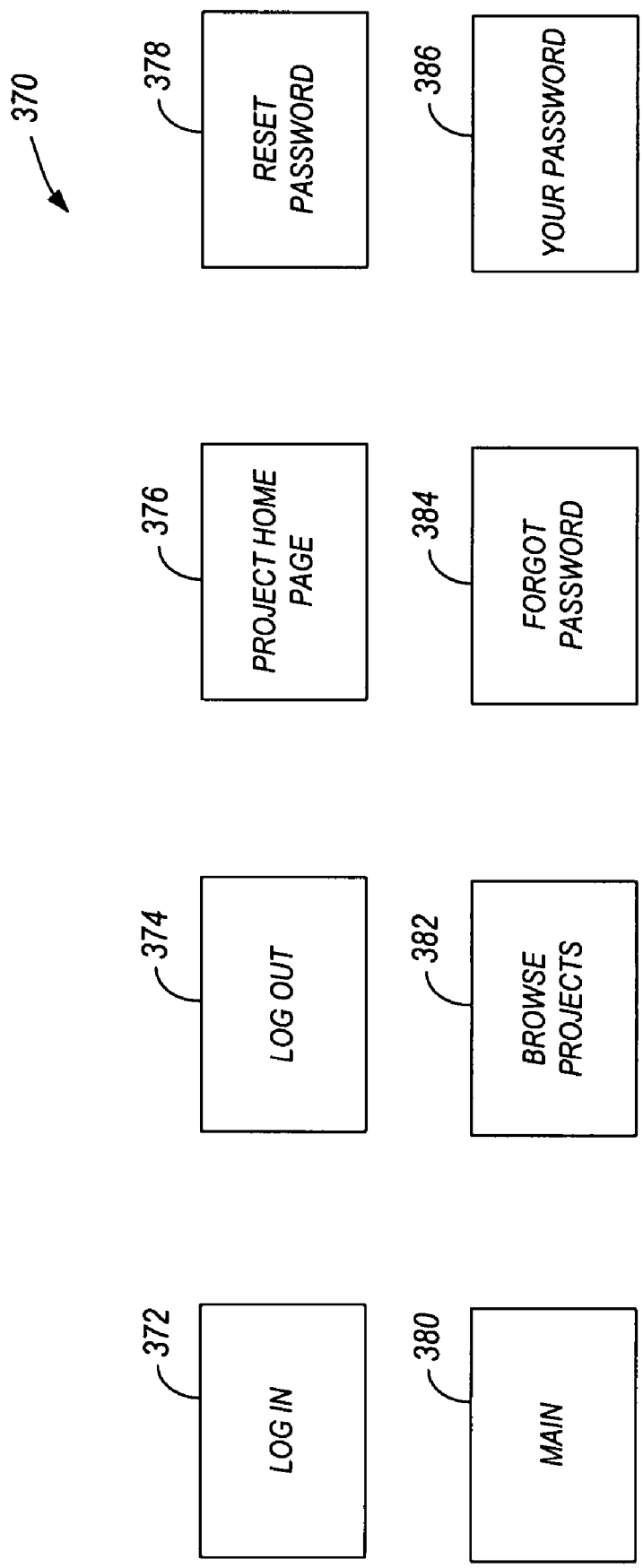

FIG. 123 illustrates manage access screens tasks 370, which can be included in the manage system environment process 102. The manage access screens tasks 370 can be used to customize the various screens displayed to particular users or organizations during the construction payment process. For example, the manage access screens tasks 370 can be used to include an organization's trademark or logo on one or more of the screens displayed during the construction payment process (e.g., a lender's trademark can be included in the upper right corner of each screen). In addition, the manage access screens tasks 370 can be used to change the layout of particular forms or screens according to the preferences or requirements of particular users or organizations. The manage access screens tasks 370 can be performed by any of the participants using the system environment manager 52. The manage access screens tasks 370 can include a log in task 372, a log out task 374, a project home page task 376, a reset password task 378, a main screen task 380, a browse projects task 382, a forgot password task 384, and a your password task 386.

Figure 124:
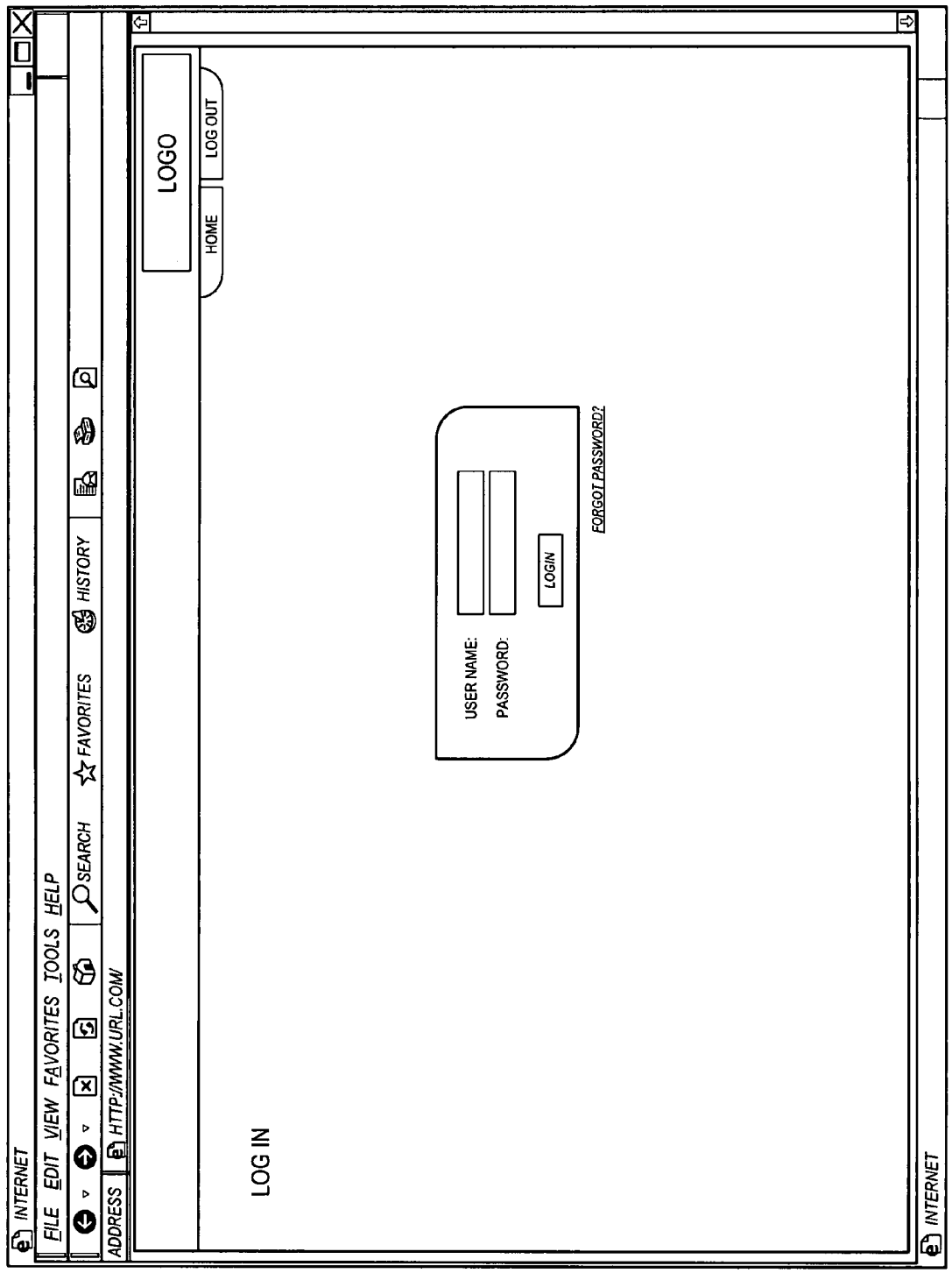

FIG. 124 illustrates a log in screen that can be associated with the log in task 372. Each participant can access the log in screen through the access manager 38. The participant can enter a user name and password to log in. The log in screen can provide a link if a user forgets his or her password.

Figure 125:
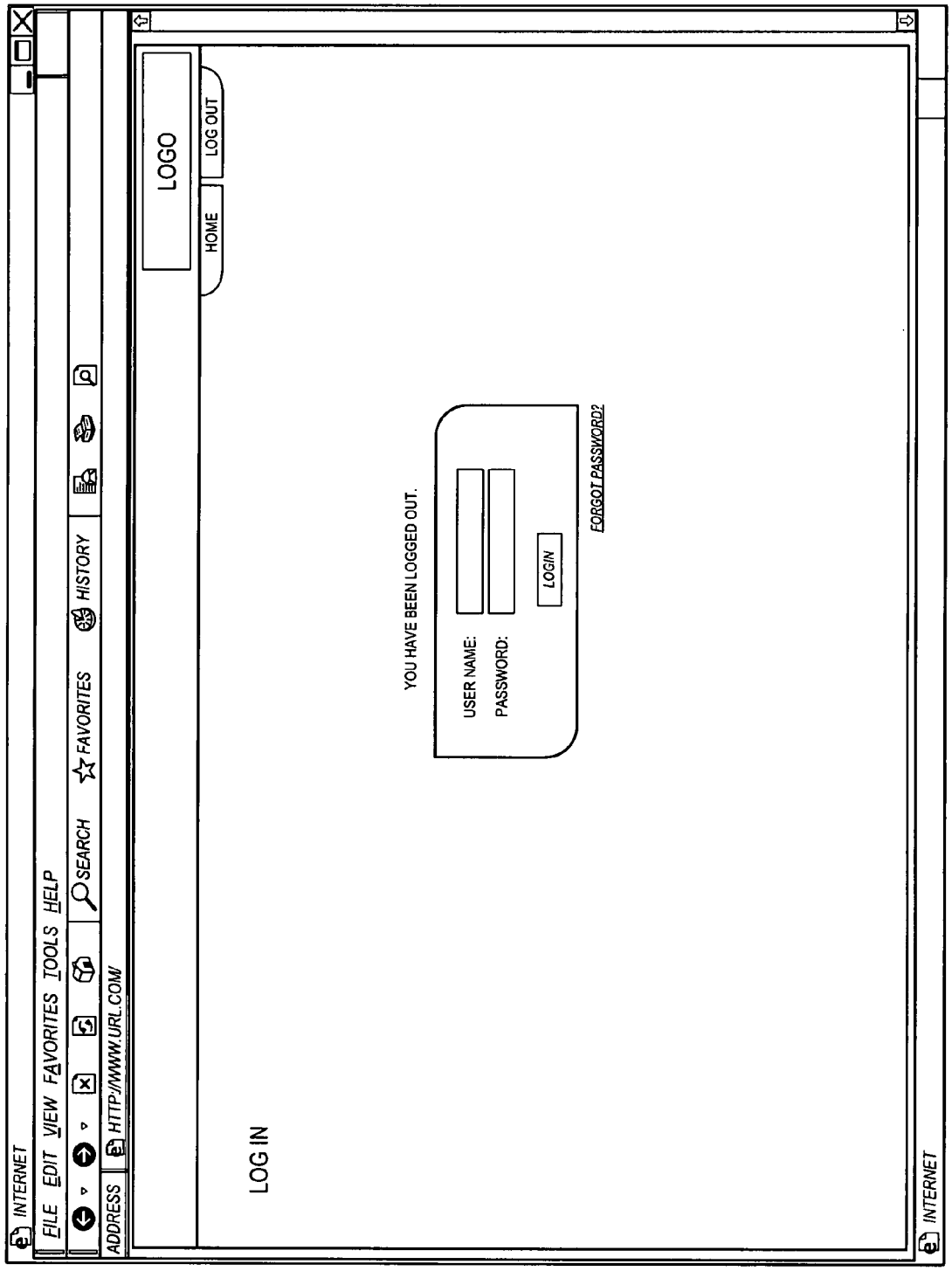

FIG. 125 illustrates a log out screen that can be associated with the log out task 374. Each participant can access the log out screen through the access manager 38. The log out screen can confirm that the user has been logged out.

Figure 126:
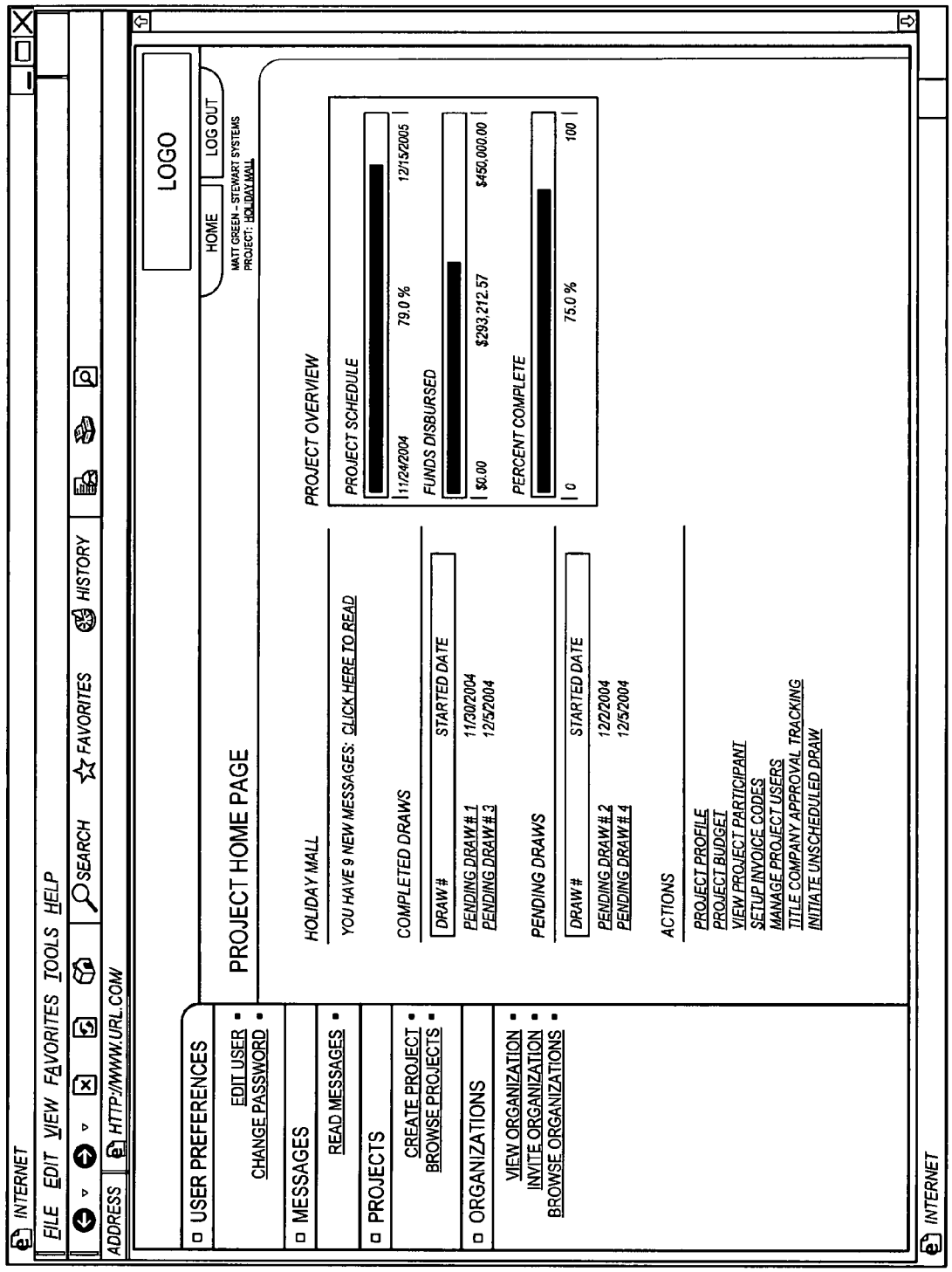

FIG. 126 illustrates a project home page screen that can be associated with the project home page task 376. Each participant can access the project home page screen through the access manager 38. The project home page screen can include the project name, the number of new messages, and a link to read the new messages. The project home page can include project overview information (including a project schedule progress bar and a funds disbursed progress bar), completed draws information (including draw number, draw date, and links to draw information), pending draw information (including draw number and started date). The project home page can include links to several actions, forms, or screens (e.g., project profile, project budget, view project participants, setup invoice codes, manage project users, title company approval tracking, initiate unscheduled draw, etc.).

Figure 127:
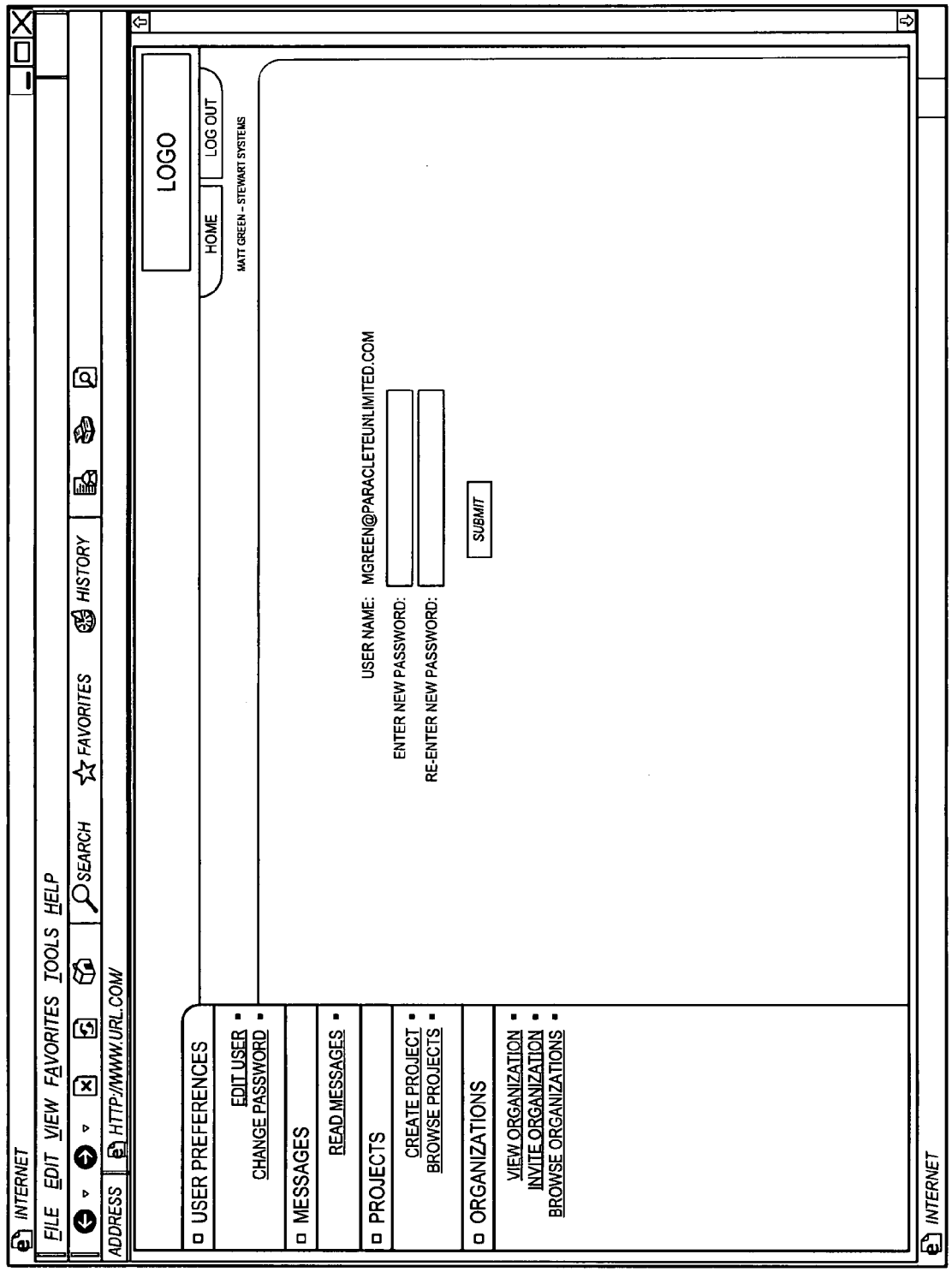

FIG. 127 illustrates a reset password screen that can be associated with the reset password task 378. Each participant can access the reset password screen through the access manager 38. The participant can enter the new password twice in order to change the password associated with a particular user name.

Figure 128:
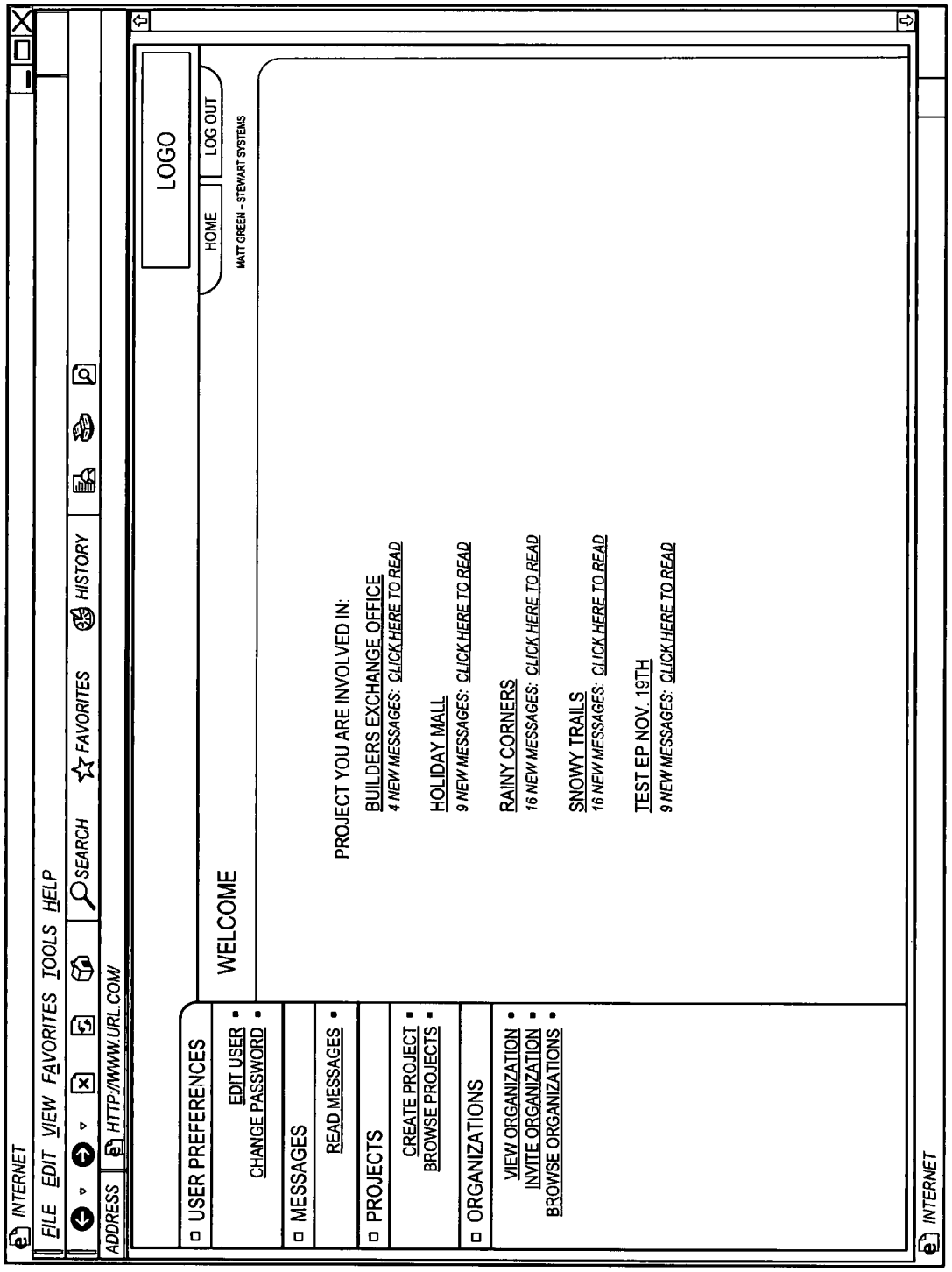

FIG. 128 illustrates a main screen for a particular user that can be associated with the main screen task 380. Each participant can access the main screen through the access manager 38. The main screen can list the projects that the participant is involved with, along with the number of new messages associated with each project and a link to read the new messages.

Figure 129:
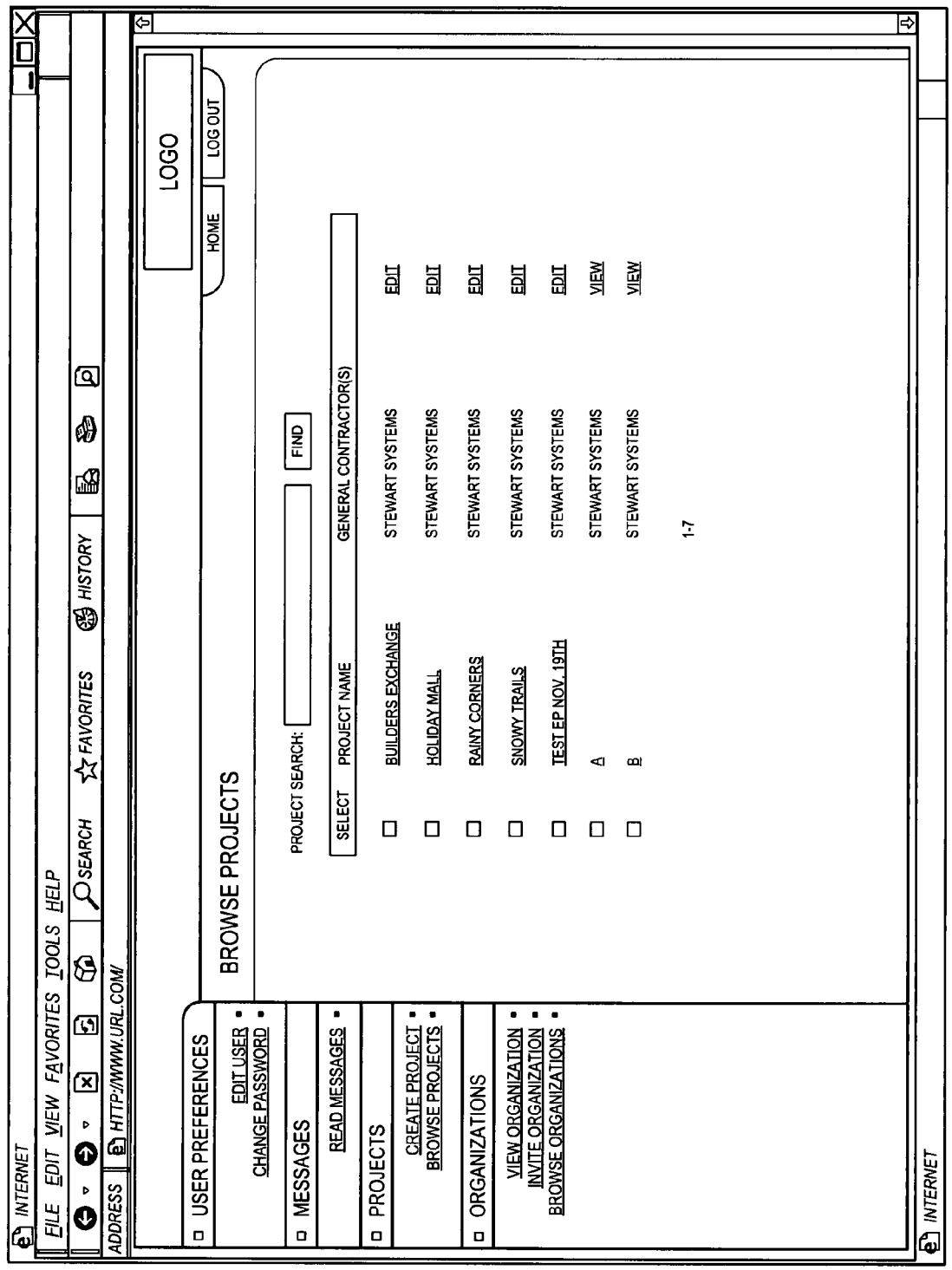

FIG. 129 illustrates a browse projects screen that can be associated with the browse projects task 382. Each participant can access the browse projects screen through the access manager 38. The browse projects screen can include a project search feature and a list of projects. The list of projects can include the project name, the GC name, a link to edit the project, and the ability to select one or more projects to browse.

Figure 130:
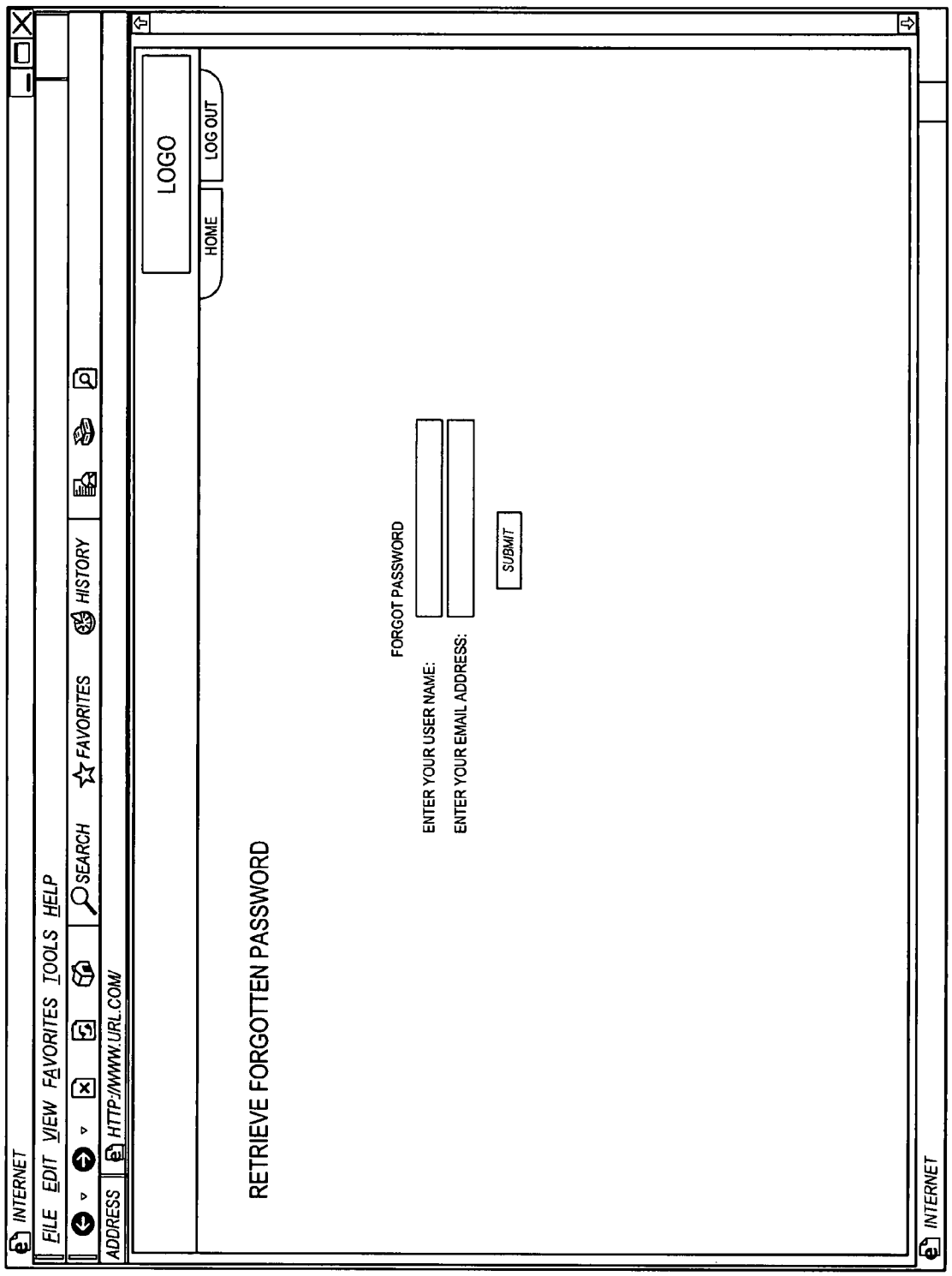

FIG. 130 illustrates a forgot password screen that can be associated with the forgot password task 384. Each participant can access the forgot password screen through the access manager 38. A user can enter his or her user name and email address, and the system can email the password to the user.

Figure 131:
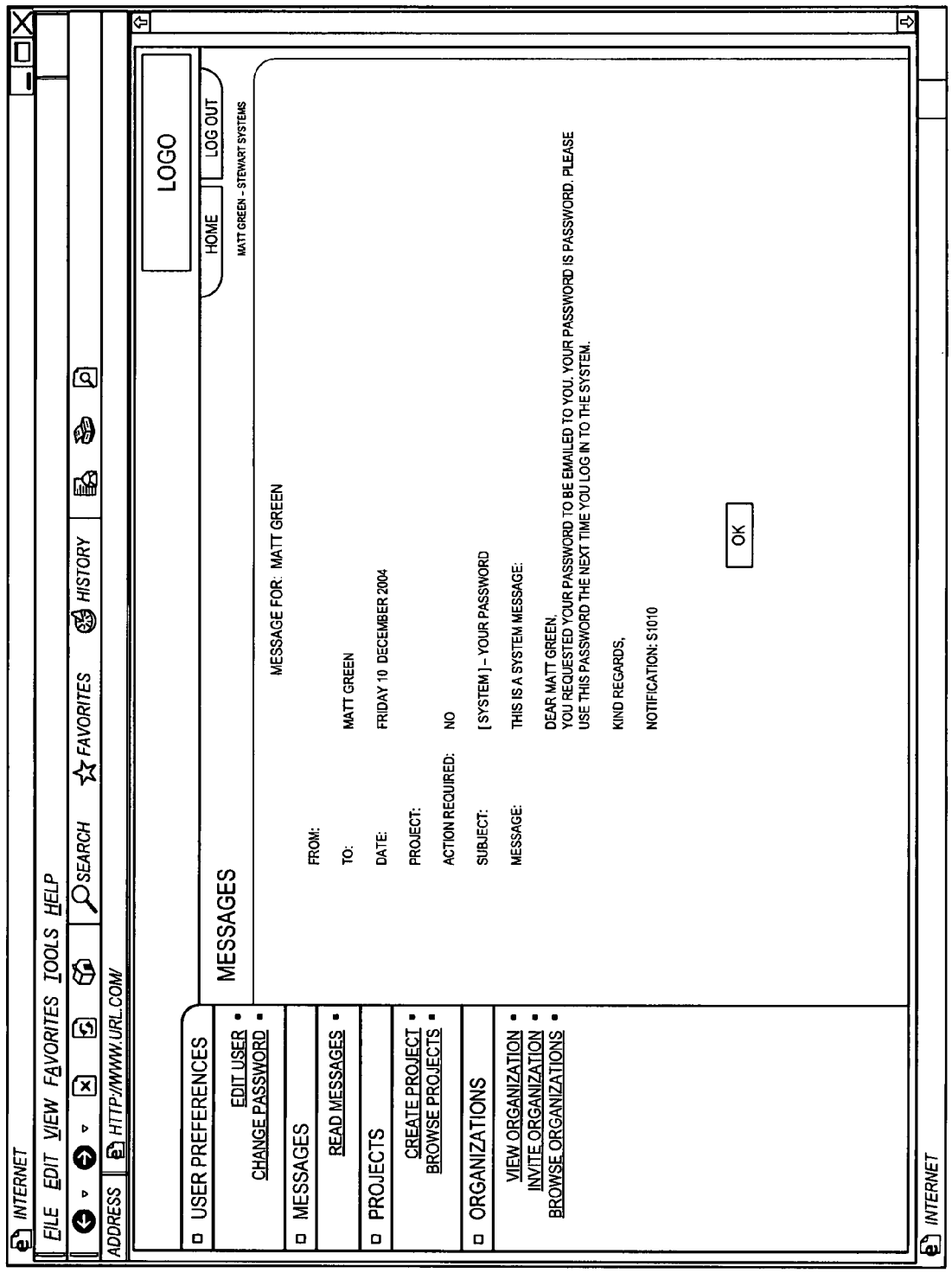

FIG. 131 illustrates a your password notification that can be transmitted during the your password task 386. The notification of FIG. 131 can include a statement that you requested your password be emailed to you, the password, and a request to use the password the next time you log in.

Figure 132:
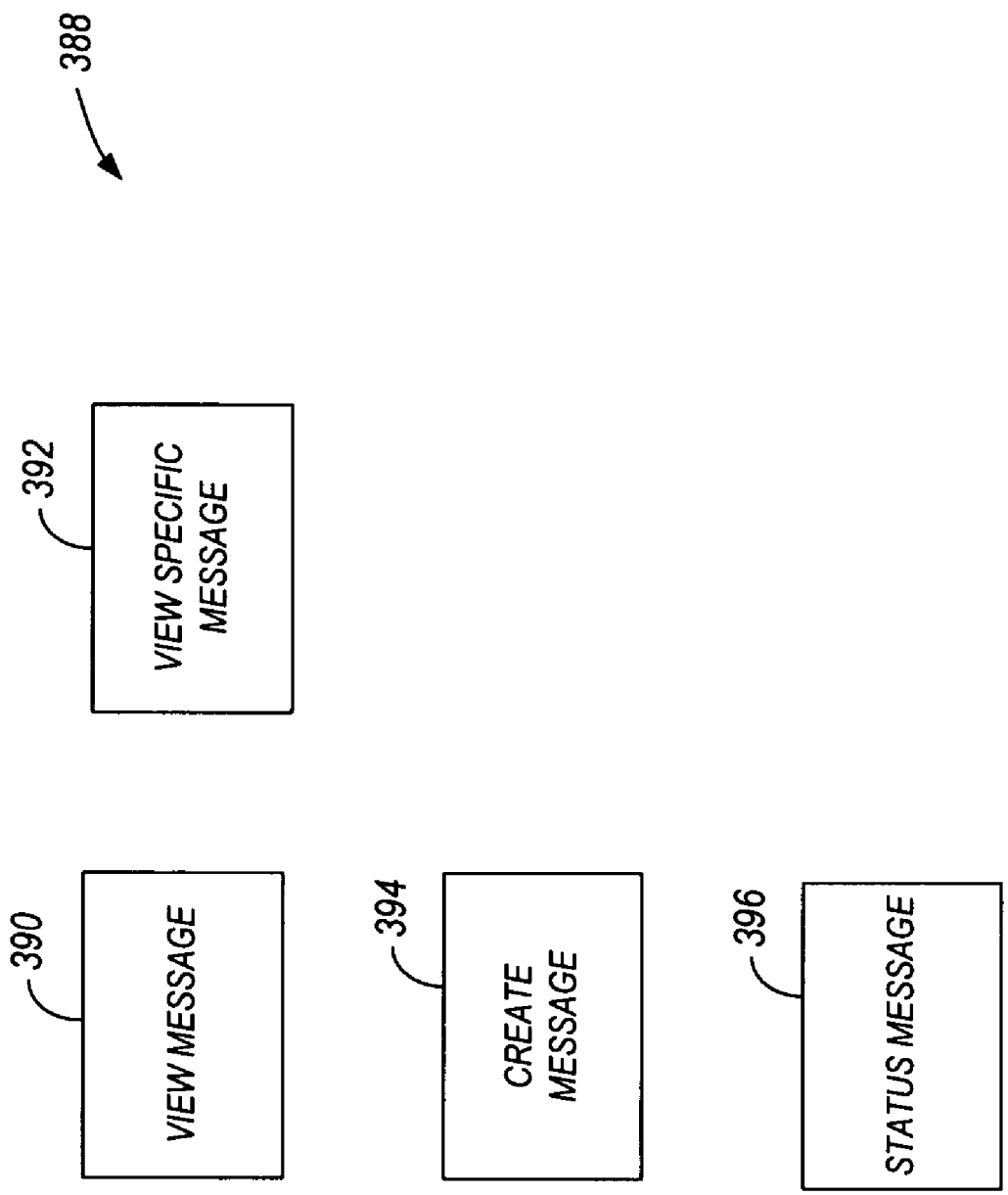

FIG. 132 illustrates a manage message screens process 388, which can be included in the manage system environment process 102. The manage message screens process 388 can be used to view messages, to create messages, or to view a system status message. The manage message screens process 388 can be performed by any of the participants using the system environment manager 52. The manager message screens process 388 can include a view message task 390, a view specific message task 392, a create message task 394, and a status message task 396.

FIG. 133 illustrates a view messages screen that can be associated with the view message task 390. Each participant can access the view message task 390 through the system environment manager 52. The view message screen can include the user's name, the ability to specify the type of messages that are displayed (e.g., unread, recent, all, sent messages, or archived), and a list of the type of messages specified. The list of messages can include the ability to select particular messages, the message date, the project name, the message subject, and whether an action is required. The view message screen can also provide the ability to archive selected messages and move to another screen of messages.

FIG. 134 illustrates a specific message being viewed by a user. The specific message can include any one of the notifications shown and described herein.

FIG. 135 illustrates a create/send messages screen that can be associated with the create message task 394. Each participant can access the create/send message screen through the system environment manager 52. A user can enter a project name, whether to send the message to an organization or a user, the organization names, the user names, a message subject, and a message.

FIG. 136 illustrates a status message screen that can be associated with the status message task 396. Each participant can access the status message screen through the system environment manager 52. The status message screen can post messages, such as a statement that a draw has been initiated for a project and that all participants have been notified. The status message screen can include a link to an organization or user home page.

FIGS. 137-153 illustrate a method of managing a construction payment process according to another embodiment of the invention. Aspects of the method of FIGS. 137-153 can be used in conjunction with the embodiment of the invention shown and described with respect to FIGS. 1-136 and FIGS. 154-179.

FIGS. 154-179 are input/output diagrams for a method of managing a construction payment process according to still another embodiment of the invention. Aspects of the method of FIGS. 154-179 can be used in conjunction with the embodiments of the invention shown and described with respect to FIGS. 1-136 and FIGS. 137-153.

Figure 155:
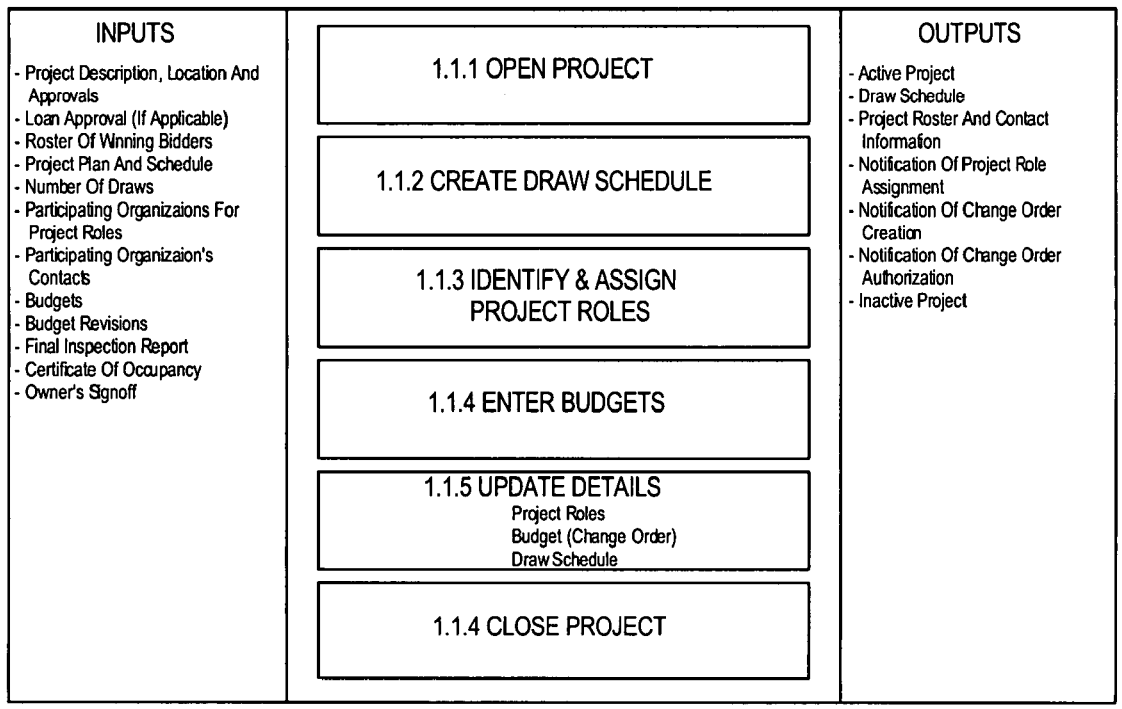

FIG. 155 includes an open project task, a create draw schedule task, and an identify and assign project roles task, each of which can be performed by an owner. An enter budget task can be performed by an owner, owner's representative, GC, lender, or title company. An update details task can be performed by a GC for subcontractors and/or material suppliers or by an owner, lender, or title company for any type of participant. A close project task can be performed by a title company, GC, or lender.

Figure 156:
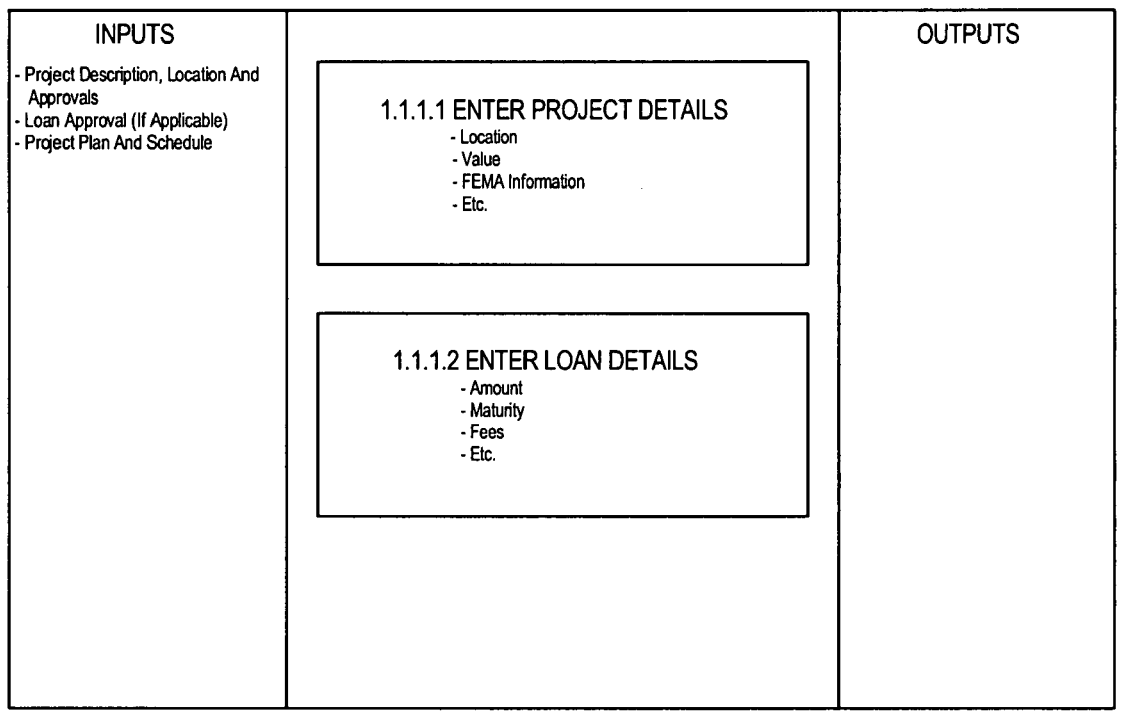

FIG. 156 includes an enter project details task in which the system can assume that the project has full approval from all necessary agencies and participating organizations before opening a project. FIG. 156 includes an enter loan details in which the lender may choose to input only select information for legal or business reasons. If there is no loan for the project, no information is entered.

Figure 157:
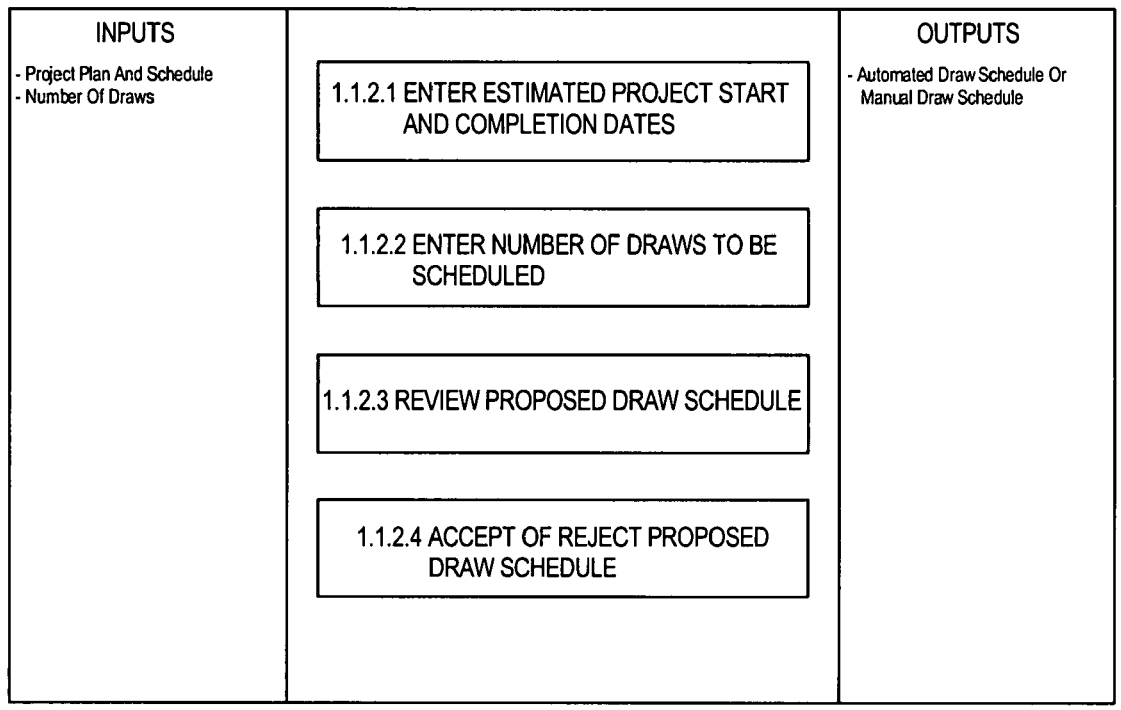
Figure 158:
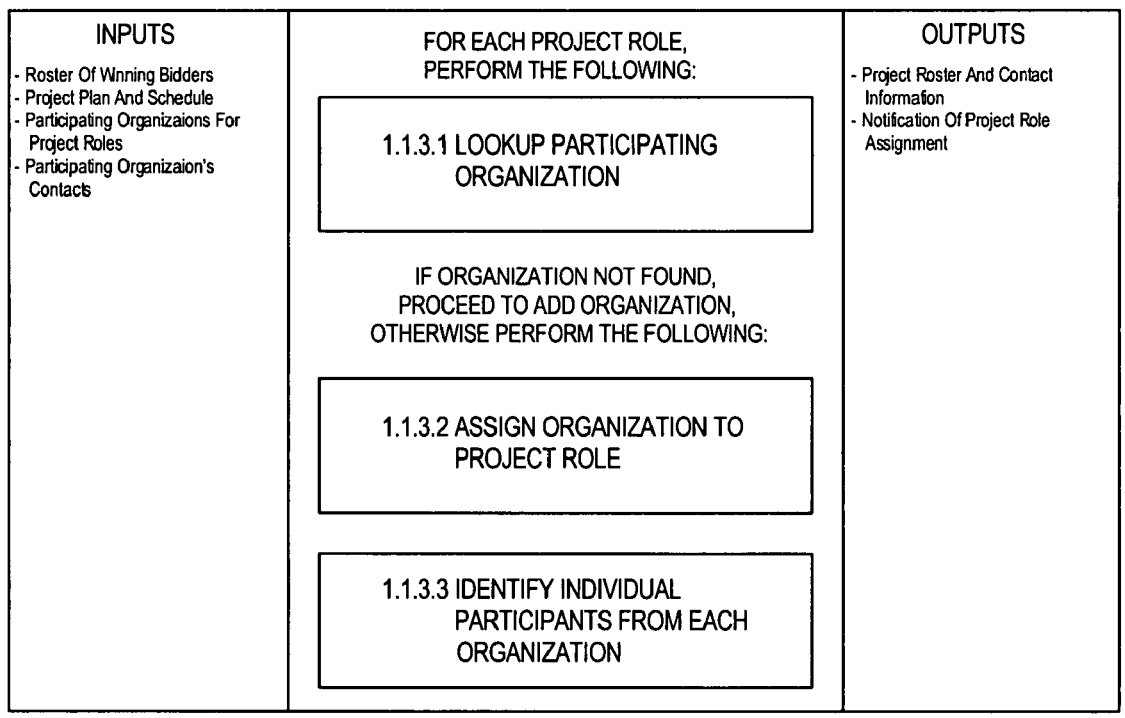

FIG. 157 includes a review proposed draw schedule task in which the system can generate a proposed draw schedule by equally spacing the number of draws across the estimated project schedule. FIG. 157 includes an accept or reject proposed draw schedule task in which a GC can manually declare draws according to a schedule established by the owner, the owner's representative, the lender, or the GC. An automated schedule can be rejected and the schedule can be manually maintained.

Figure 159:
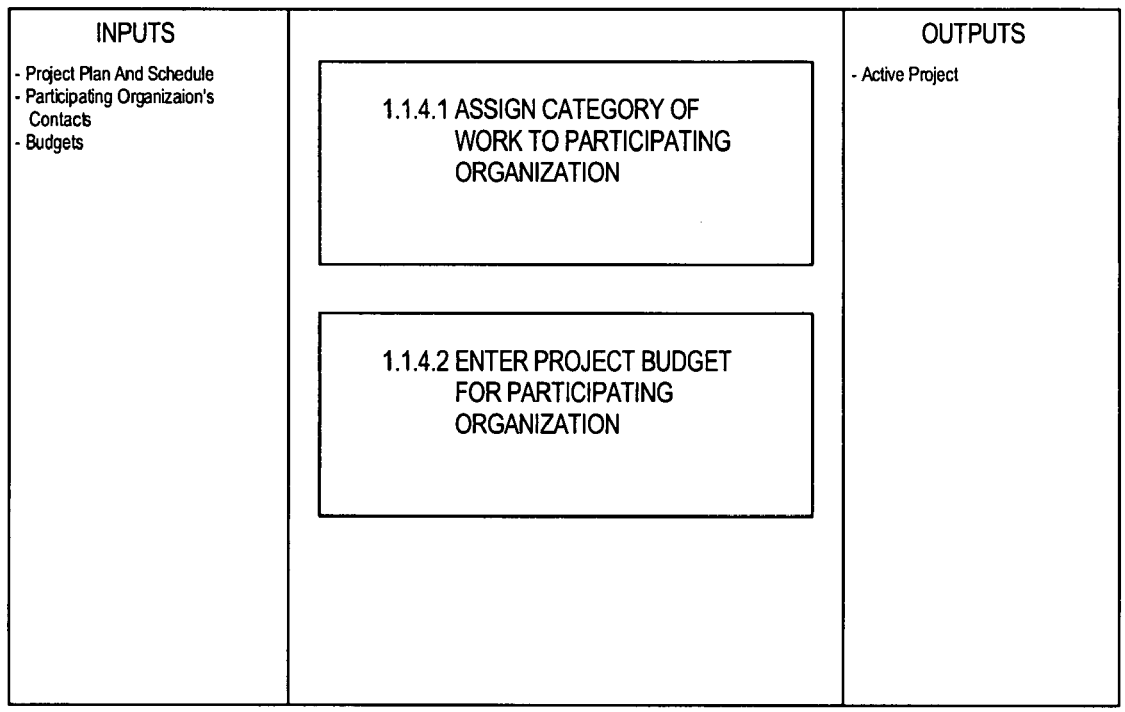

FIG. 159 includes an enter project budget for a participating organization in which a hierarchical process can be used. At each level, the participating organization can perform the process for the organizations that they use to support them.

Figure 160:
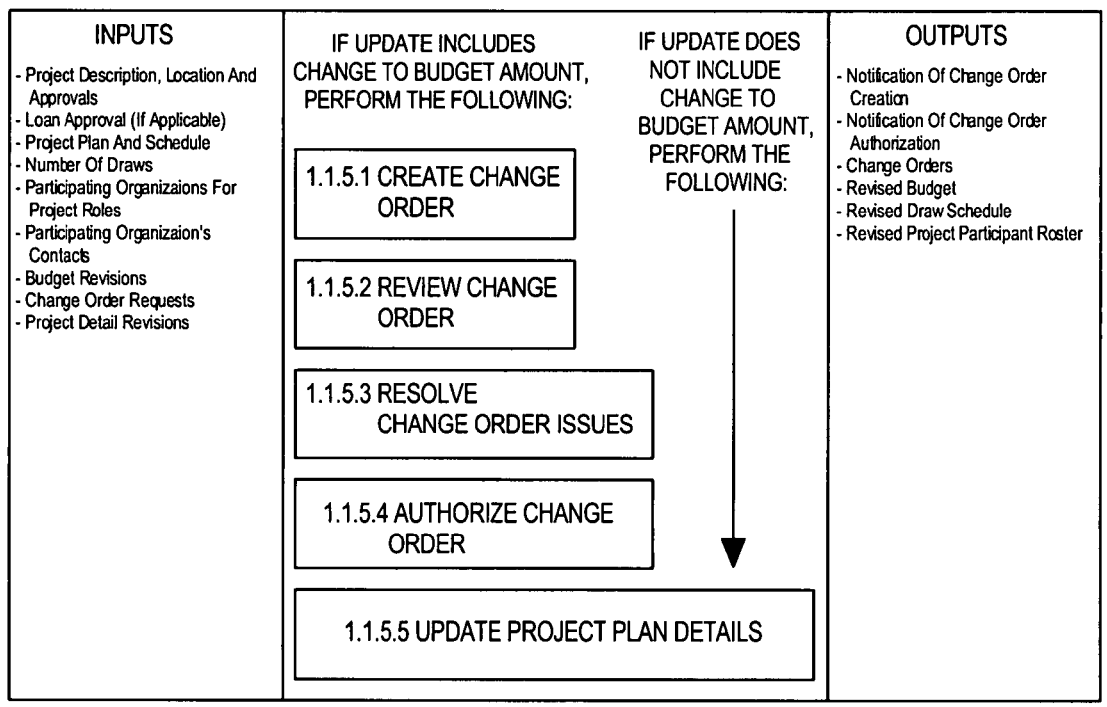
Figure 161:
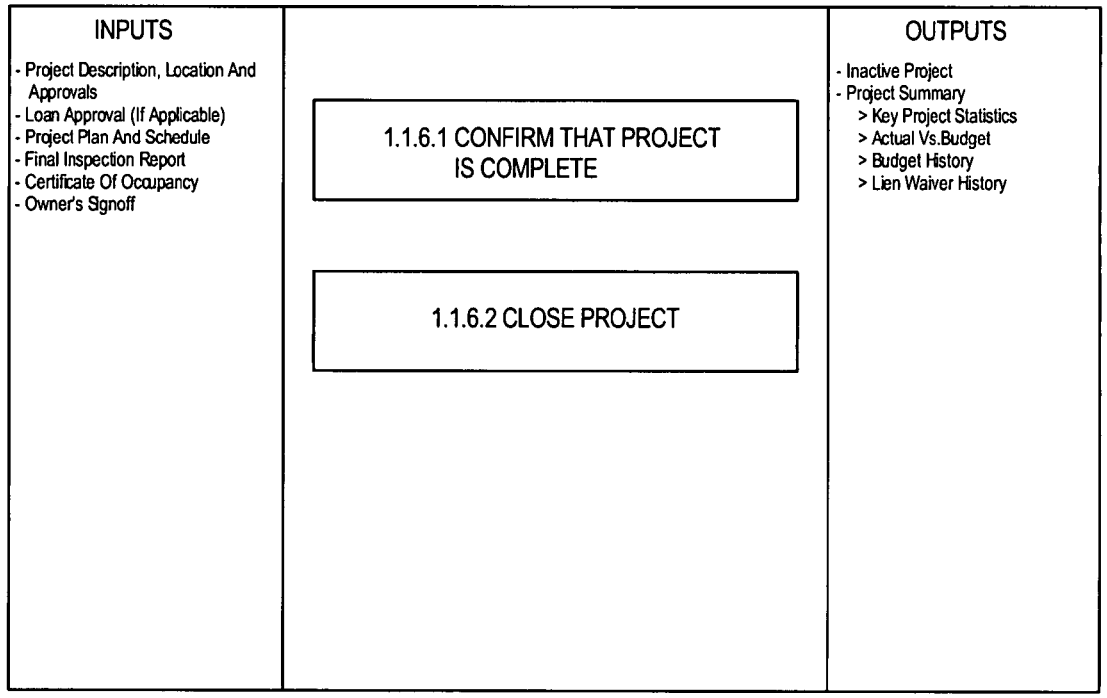

FIG. 160 includes an authorize change order task in which an issue resolution process may require rejection of an initial change order and creation of a second change order that is mutually agreeable to all parties. Only a final change order in the resolution process must be approved.

Figure 162:
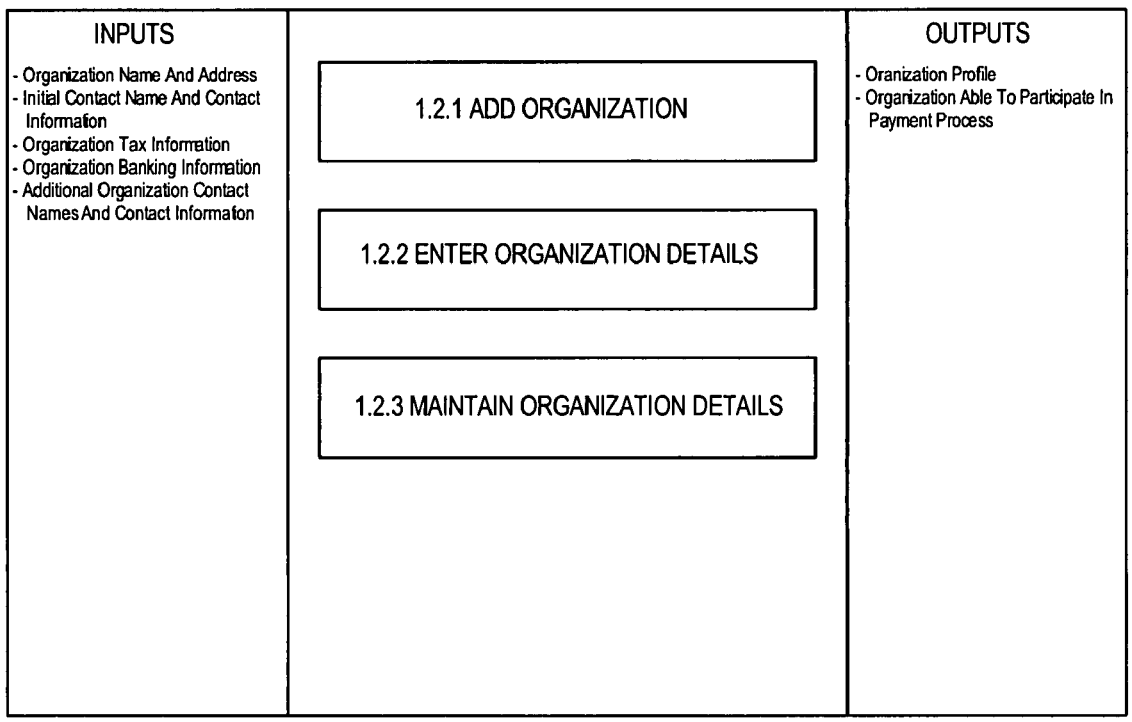
Figure 163:
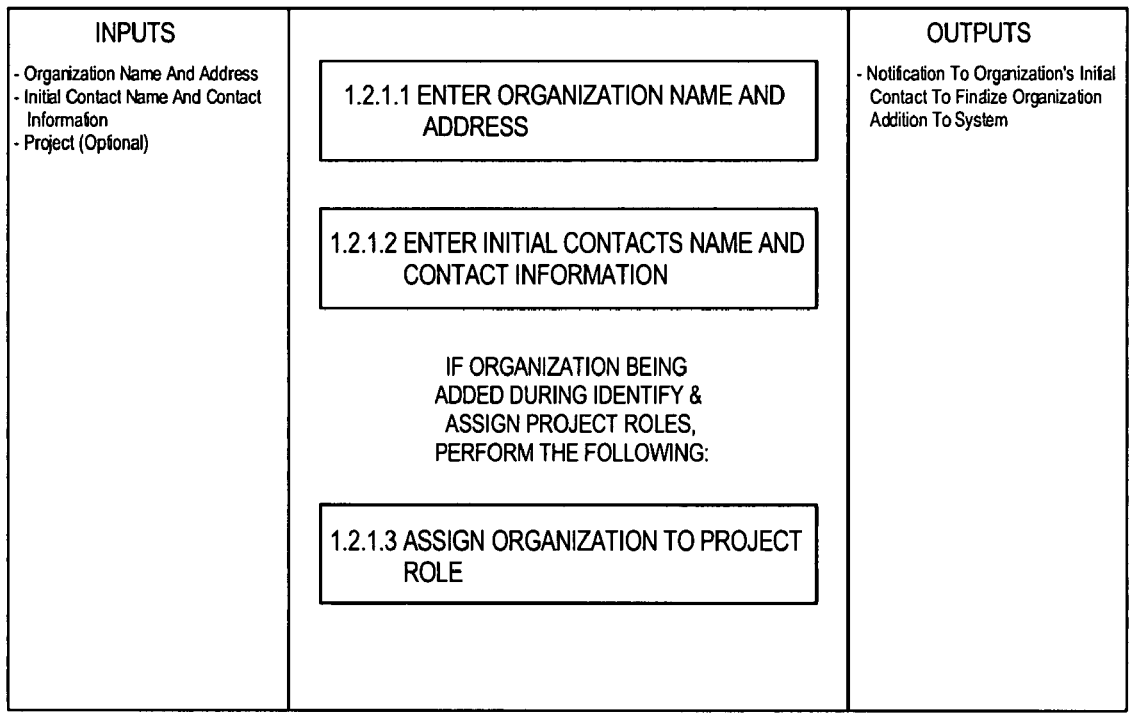

FIG. 162 includes an add organization task in which an organization must be added before it can participate in a project. The system, the title company, the lender, or the GC can add organizations to the system. While organizations can be added during the identify and assign project roles task of the maintain project payment plan process, organizations can be added independently of that process. FIG. 162 includes an enter organization details task in which the initial contact at an organization can be responsible for entering their organization's details and additional contact information. Each organization can identify an internal system administrator who can be responsible for updating their organization details and contact information. FIG. 162 includes a maintain organization details task in which security can be particularly stringent due to sensitive financial information.

Figure 164:
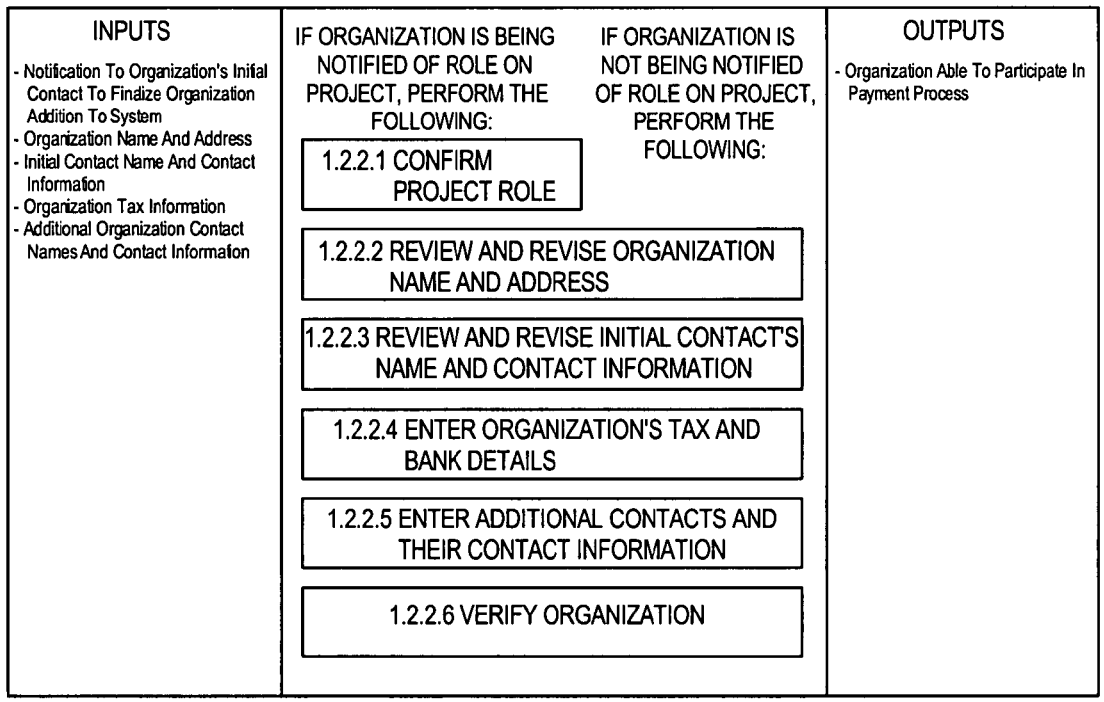
Figure 165:
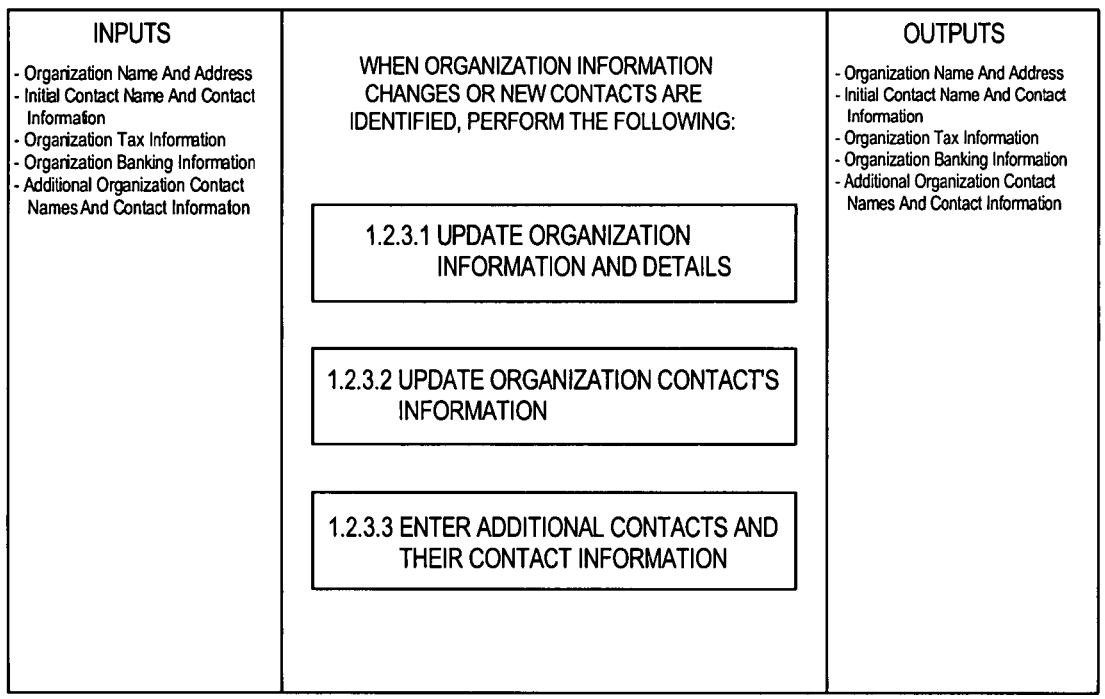

FIG. 164 includes a verify organization task which can be provided by a third party based on the requirements of the participants. The system can facilitate the verification of organizations and charge a service fee.

Figure 166:
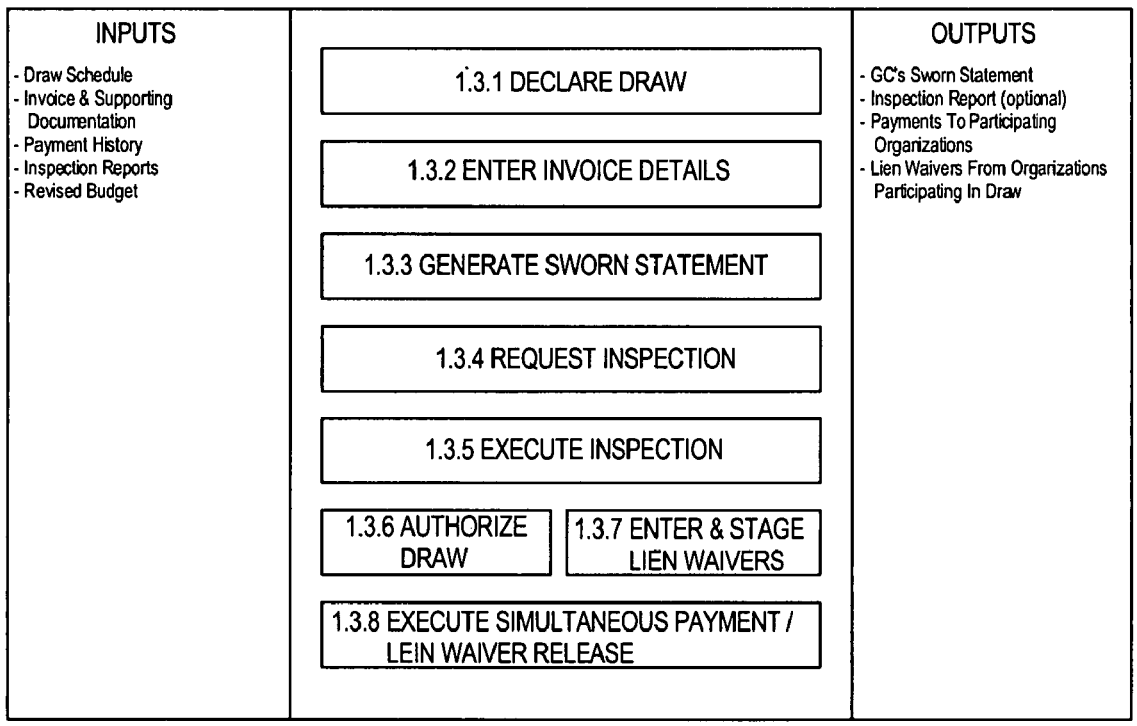

FIG. 166 includes a declare draw task that can be performed by a GC. The draw is the mechanism by which project participants can submit invoices, the owner (generally through the GC) can pay for work completed, and participating parties receive payment and release their associated lien waivers. FIG. 166 includes a generate sworn statement task in which the GC can review the submissions on-line (referring to backup paper documentation when necessary) and once the submission is correct, the system can generate a sworn statement based on the information that has been electronically submitted by the parties participating in the draw. The GC can reject submissions and they can be revised and resubmitted for approval. This mechanism can be used to resolve any issues with the invoice. FIG. 166 includes a request inspection task that can generally be performed by the lender or the title company. FIG. 166 includes an authorize draw task that can generally be performed by the lender, but may require involvement of the owner, the owner's representative, or another designated project participant. A configurable authorization mechanism can include any project participant in the authorization process. FIG. 166 includes an enter and stage lien waivers task which can be required to complete the draw. Funds are not transmitted to the invoicing parties until their lien waivers are entered and staged. This requirement ensures the substantially simultaneous execution of payment and lien waiver release. FIG. 166 includes an execute simultaneous payment/lien waiver release task in which the substantially simultaneous exchange of lien waiver for payment is automated. This automated exchange can eliminate the need for meetings and can eliminate time lags between payment and lien waiver release. This automated exchange can reduce the change that a lien waiver will be lost and can speed payment to all draw participants by eliminating intermediate organizations from the payment process.

Figure 167:
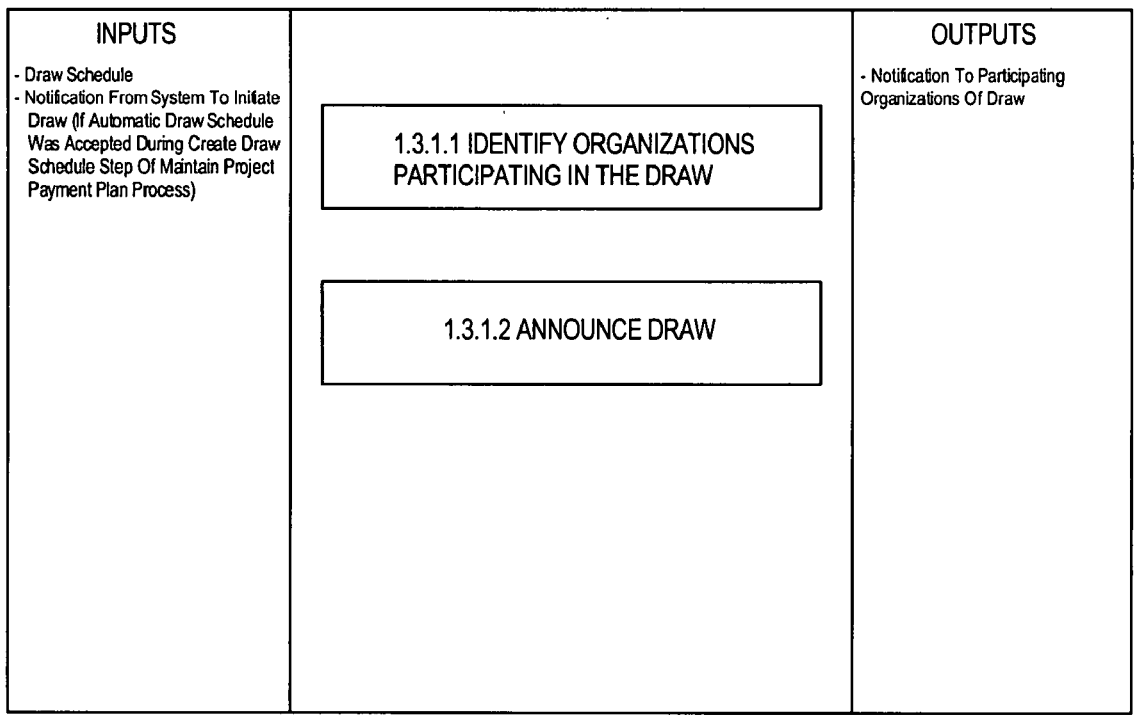

FIG. 167 includes an announce draw task in which an electronic message can be sent substantially simultaneously to all participating and/or interested organizations.

Figure 168:
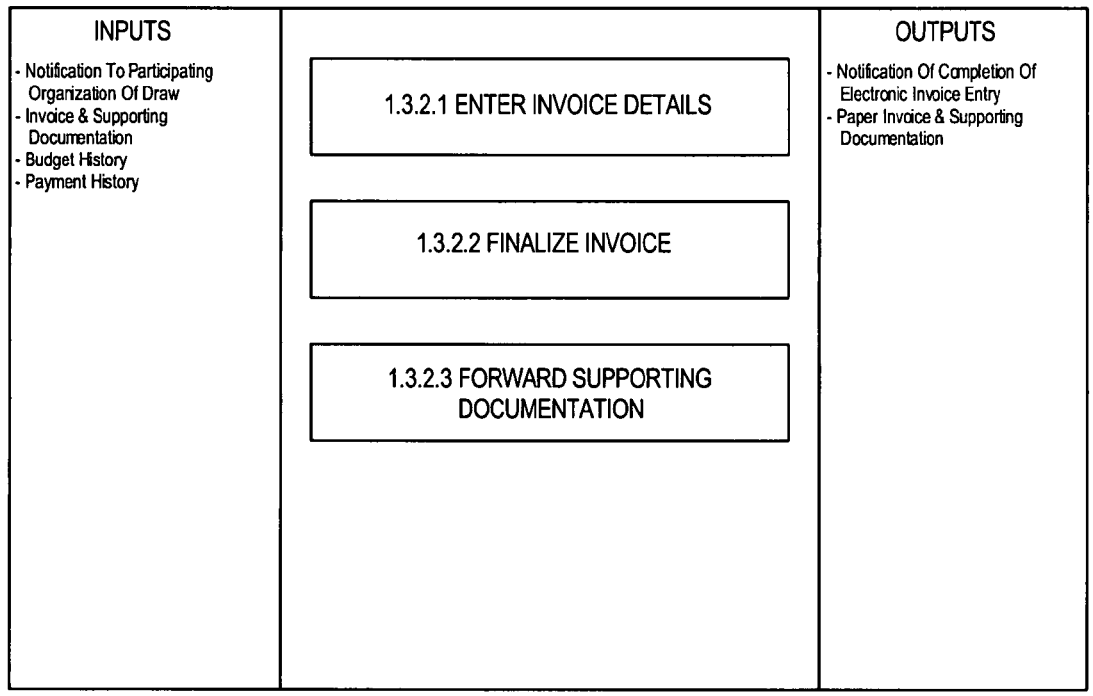

FIG. 168 includes an enter invoice details task which can be executed by any party wishing to be paid through the draw process. The electronic submission can be followed by paperwork that supports the submission. A service can be provided that allows the parties to submit the supporting information via scanning.

Figure 169:
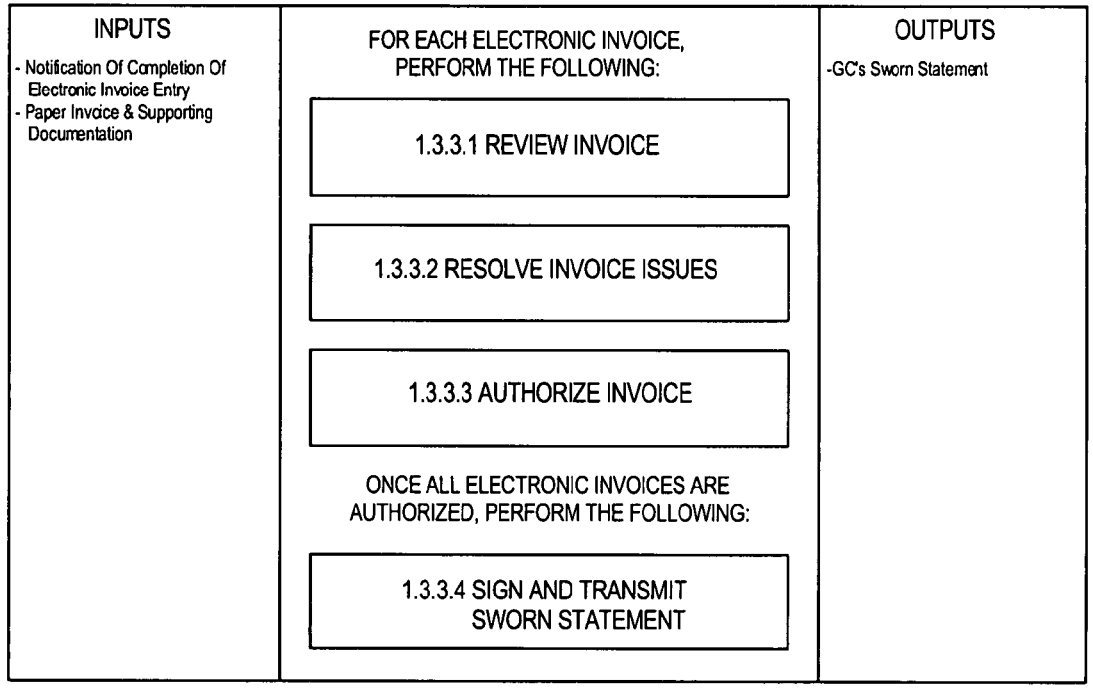

FIG. 169 includes an authorize invoice task in which an issue resolution process may require rejection of the initial invoice and creation of a second invoice that is mutually agreeable to all parties. Only the final invoice in the resolution process will be approved.

Figure 170:
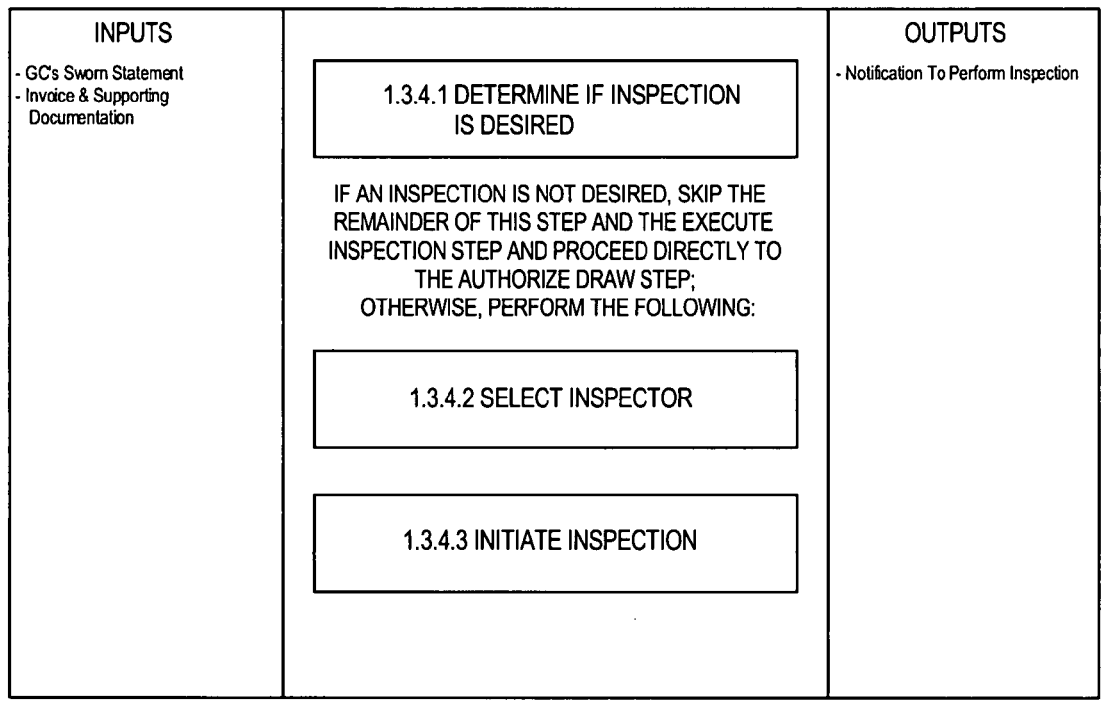

FIG. 170 includes a select inspector task in which there may be more than one inspector associated with a project. In this case, the correct inspector must be selected to perform the inspection.

Figure 171:
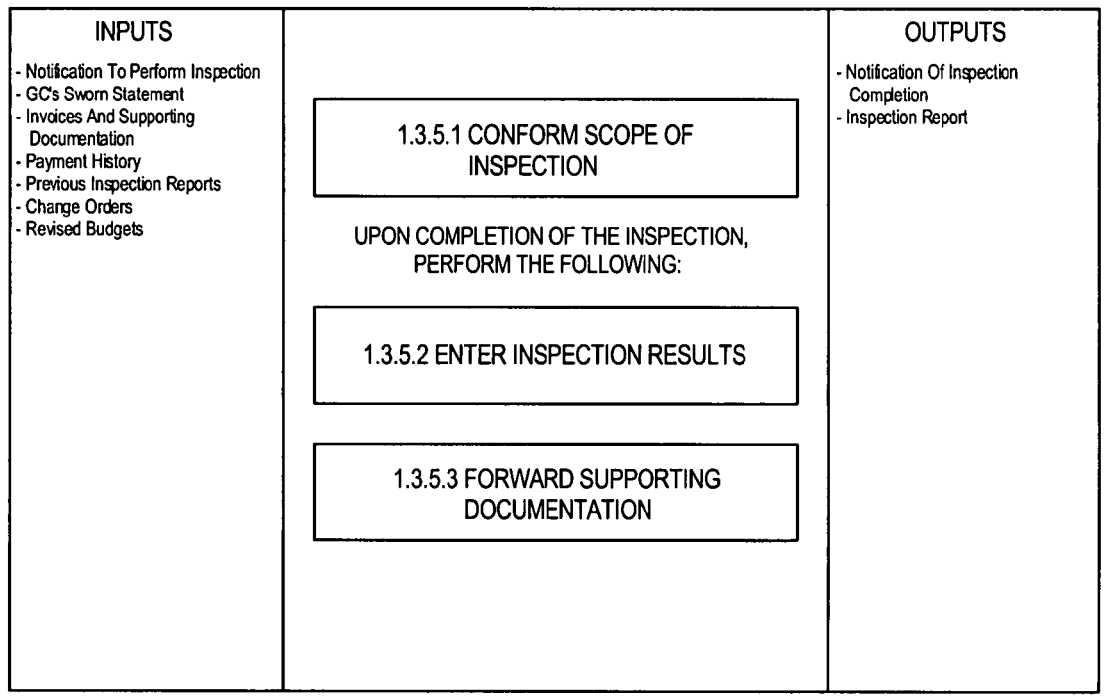
Figure 172:
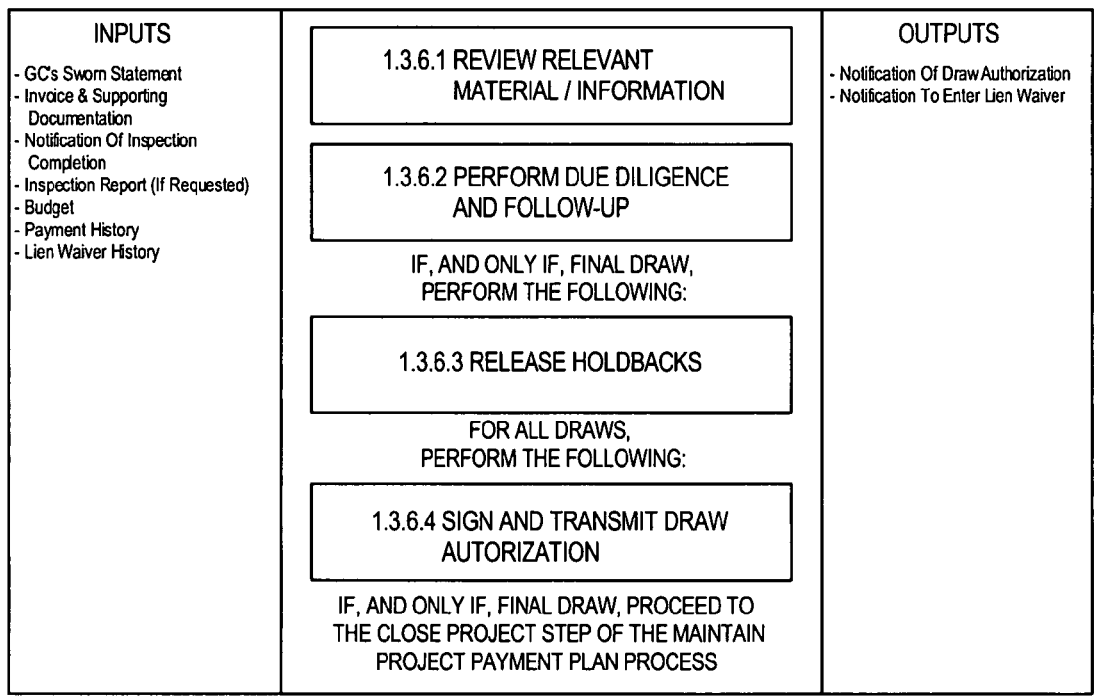

FIG. 171 includes a confirm scope of inspection task in which the organization requesting the inspection can define the scope of the inspection, either for the entire sworn statement or for a subset of the sworn statement. FIG. 171 includes an enter inspection results task in which supporting documentation may be necessary depending upon the scope and nature of the inspection. FIG. 171 includes a forward supporting documentation task in which the system can allow files with digital photographs or other electronic material to be attached to the electronic inspection reports.

Figure 173:
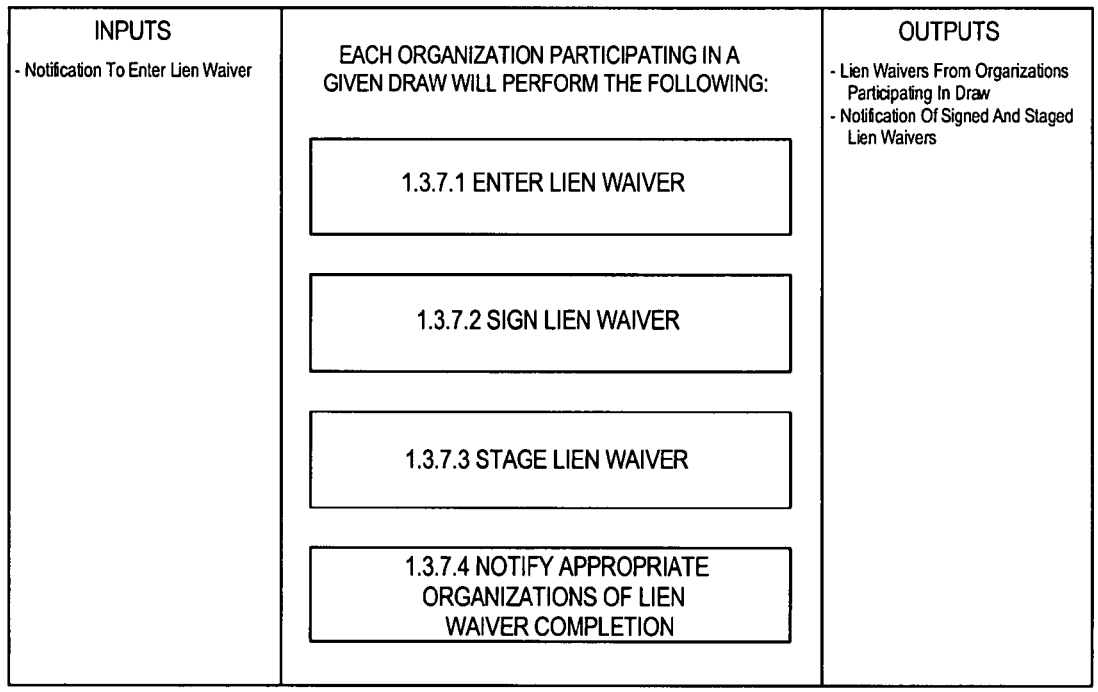

FIG. 173 includes a stage lien waiver task in which the electronic signed lien waiver can be staged in the system, secured from any alterations. In one embodiment of the invention, the lien waiver is not released to the title company until the substantially simultaneous exchange of payments and lien waivers occurs.

Figure 174:
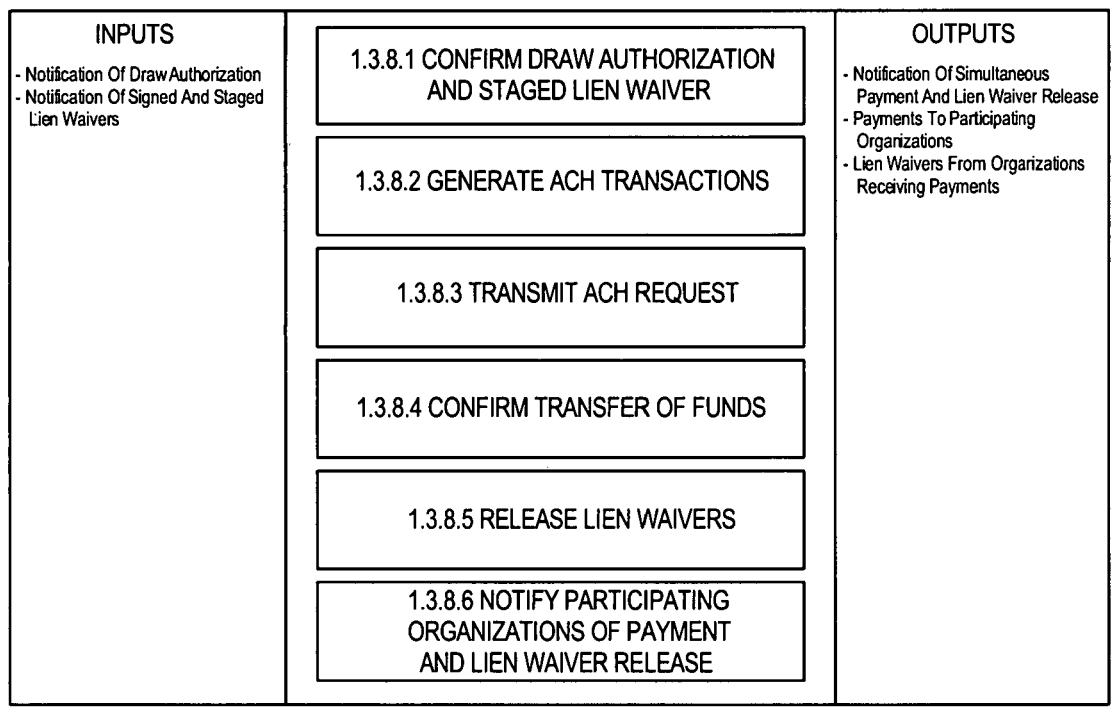
Figure 175:
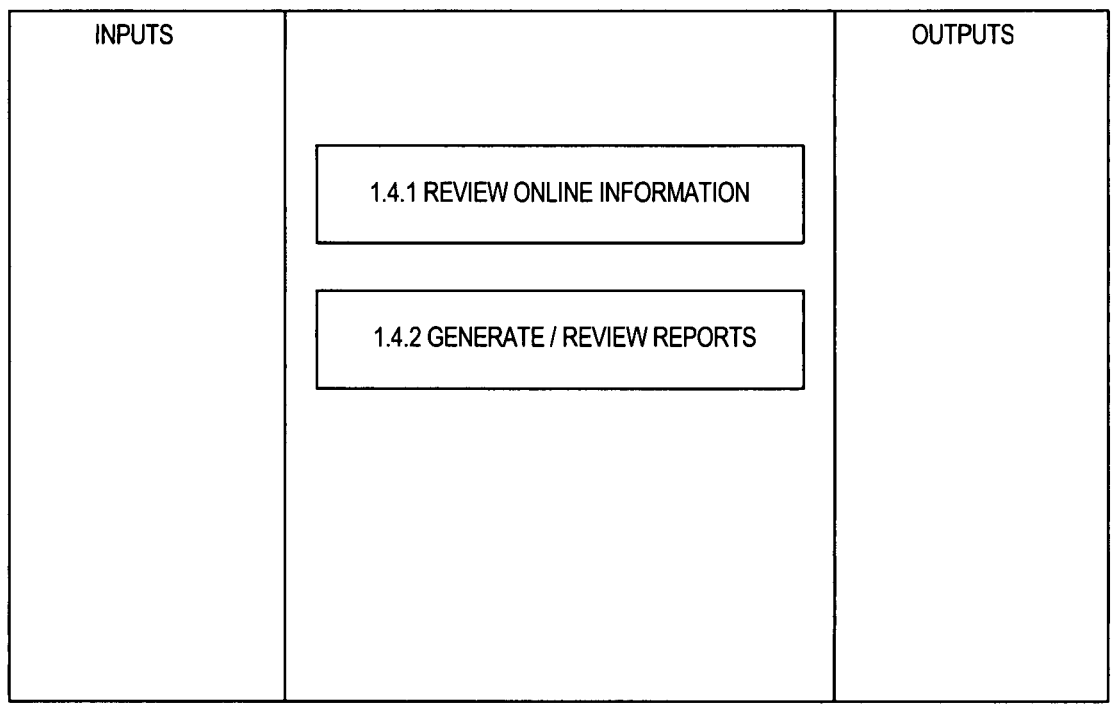
Figure 176:
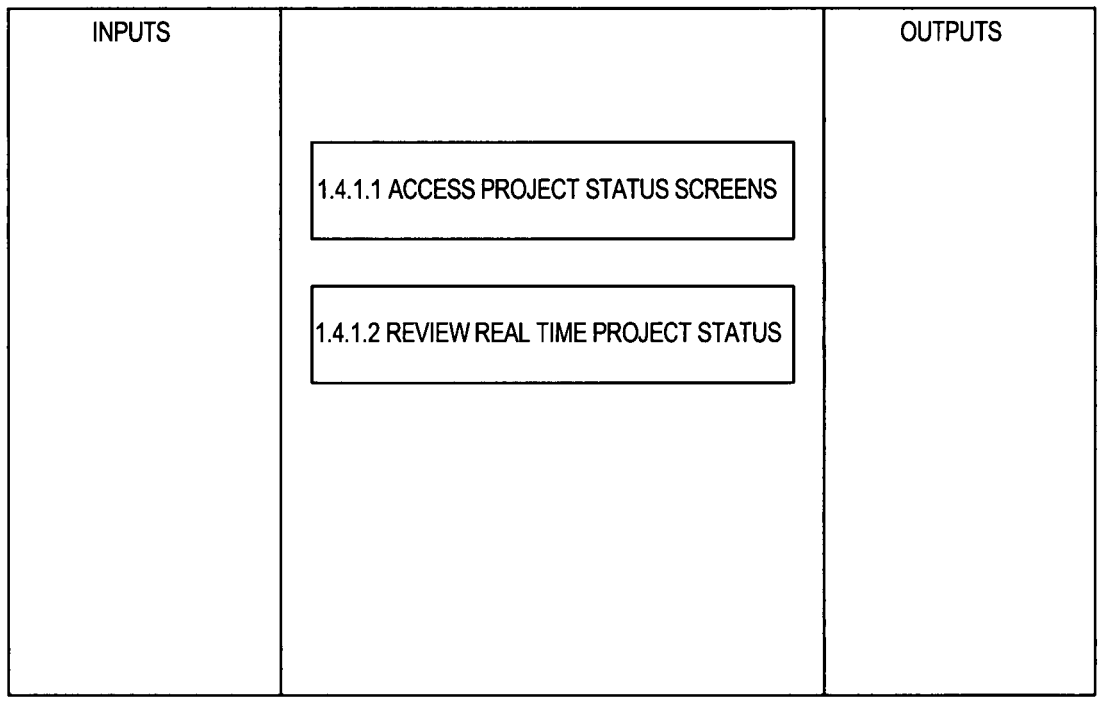
Figure 177:
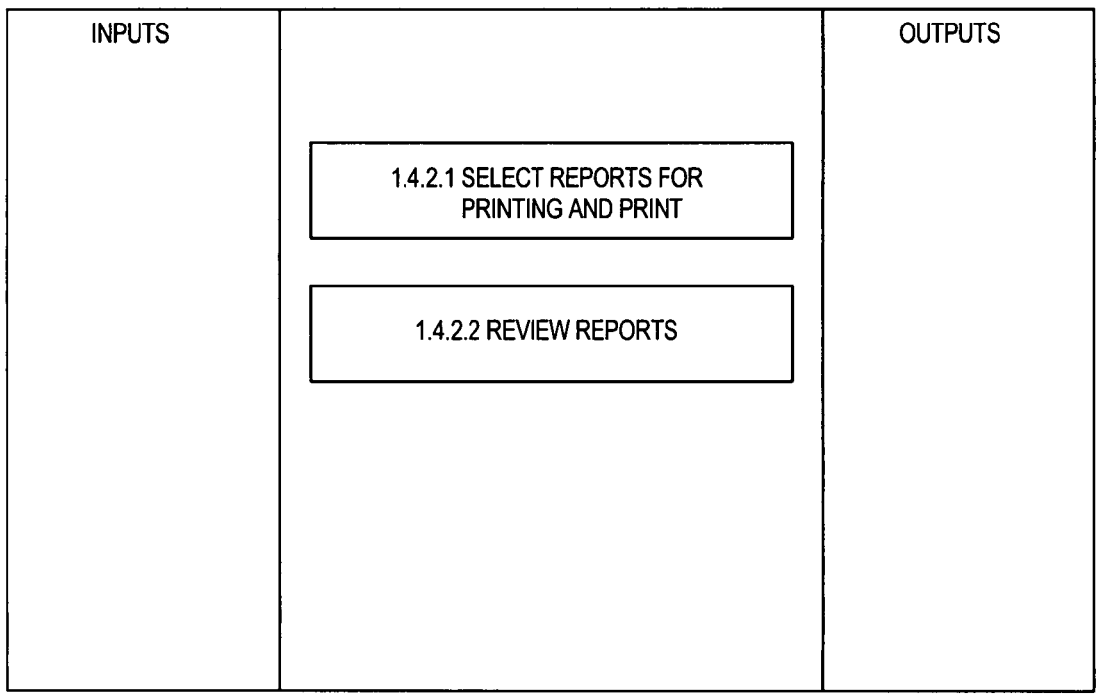

FIG. 174 includes a confirm draw authorization and staged lien waivers task which can include a review of all lien waivers to ensure they are complete and correct.

Figure 178:
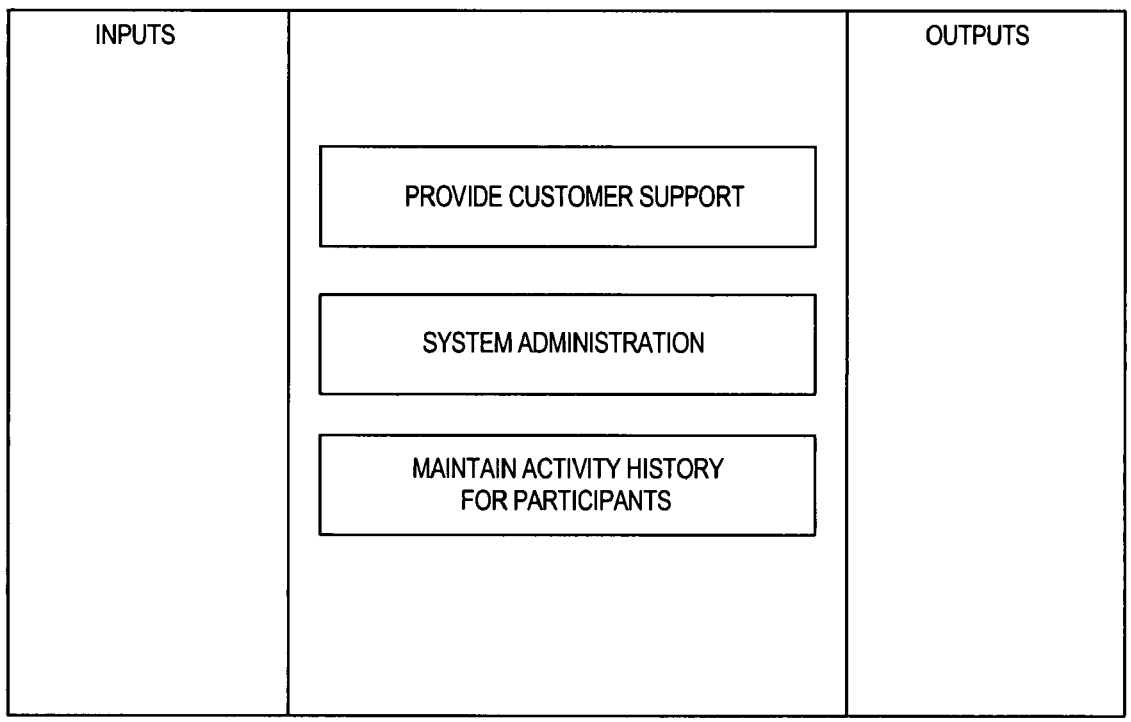
Figure 179:
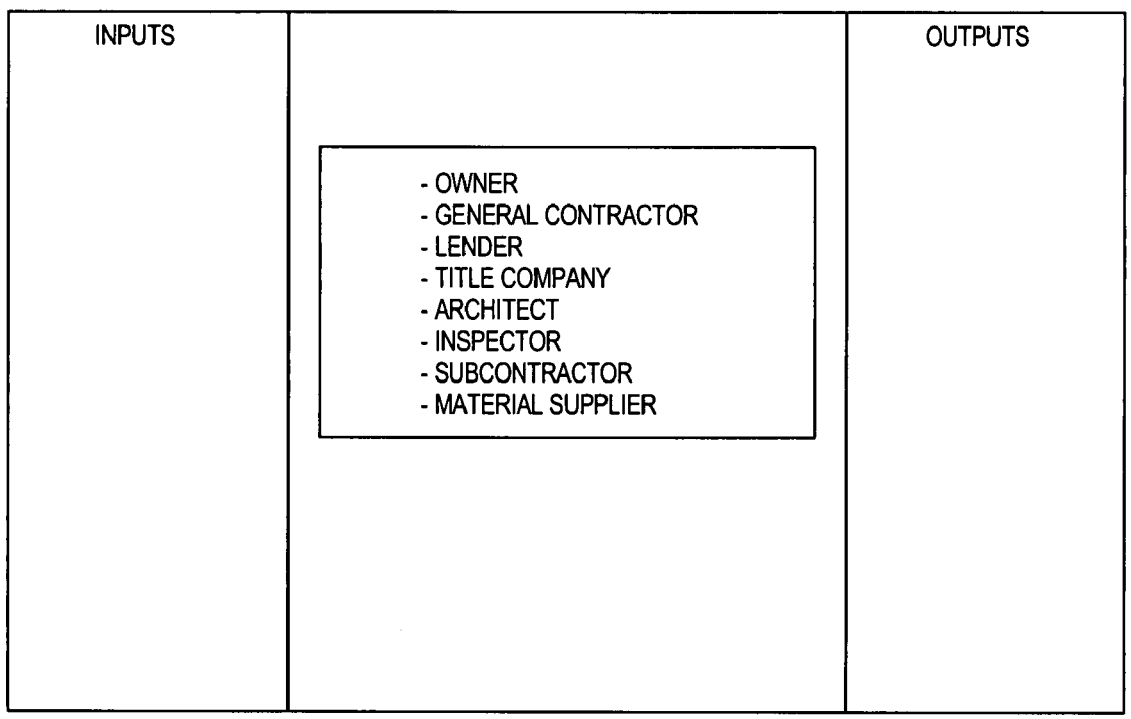

FIG. 178 includes a provide customer support task that can include support for adding or modifying organizations or projects, fixing password problems, fixing projects and transactions. FIG. 178 includes a system administration task that can include security administration, financial auditing, and contingency support. FIG. 178 includes a maintain activity history for system participants task that can include a vendor directory with history about the vendors and/or ratings of vendors.

It should be understood by one of ordinary skill in the art that embodiments of the invention can be implemented using various computer devices, such as personal computers, servers, and other devices that have processors or that are capable of executing programs or sets of instructions. In general, the invention can be implemented using existing hardware or hardware that could be readily created by those of ordinary skill in the art. Thus, the architecture of exemplary devices has not always been explained in detail, except to note that the devices will generally have a processor, memory (of some kind), and input and output applications. The processor can be a microprocessor, a programmable logic control, an application specific integrated circuit, or a computing device configured to fetch and execute instructions. In some cases, the devices can also have operating systems and application programs that are managed by the operating systems. It should also be noted that although components of the CPMS 10 are shown connected in a network, no specific network configuration is implied. One or more networks or communication systems, such as the Internet, telephone systems, wireless networks, satellite networks, cable TV networks, and various other private and public networks, could be used in various combinations to provide the communication links desired or needed to create embodiments or implementations of the invention, as would be apparent to one of ordinary skill in the art. Thus, the invention is not limited to any specific network or combinations of networks.

Various features and advantages of the invention are set forth in the following claims.

The invention claimed is:

1. A method of managing a construction payment process, the method comprising the acts of:

electronically receiving, by a construction project management computer system, organization registration information including payment information and an identification of a primary user for a participant organization;

electronically receiving, by the construction project management computer system, user registration information for one or more users associated with the participant organization;

electronically storing the organization registration information and the user registration information to a computer readable memory of the construction project management computer system for use in connection with multiple construction projects;

providing the primary user access to a management interface;

receiving, through the management interface, an electronic selection of additional users associated with the organization to be associated with a construction project;

providing the additional users associated with the construction project access to a general user interface;

displaying project data and documents associated with the construction project through the general user interface;

electronically receiving, through the management interface, a legal signature for the documents associated with the construction project;

receiving, through the management interface, a selection of an additional, previously registered, participant organization to be associated with the construction project and an indication of a role to be associated with the additional participant organization in the construction project; and transferring a payment to the additional participant organization by electronically accessing previously stored organization registration information for the additional participant organization.

2. The method of claim 1 wherein the organization registration information includes at least one of business information, tax information, and banking information.

3. The method of claim 1 wherein the participant organization and the additional participant organization include at least two of an owner, an owner's representative, a title company, a lender, an architect, an interior designer, an inspector, a general contractor, a subcontractor, a material supplier, a construction manager, an engineer, and a bonding company.

4. The method of claim 1 wherein the user registration information includes at least one of personal information, security information, and notification information.

5. The method of claim 1 and further comprising the acts of deeming one of the additional users the primary user for the participant and removing primary user status from an original primary user.

6. The method of claim 1 and further comprising the act of verifying a participant organization.

7. The method of claim 1 and further comprising the act of transmitting a notification that a participant organization has been registered.

8. The method of claim 1 wherein the organization registration information is stored in a database server and accessed with a database management system.

9. The method of claim 1 wherein the act of transferring a payment to the additional participant organization includes generating an automated payment instruction and transferring to the additional participant organization a payment using one of an automated clearing house system, a wire transfer of funds, a debit card system, a credit card system, and a check generating system.

10. The method of claim 1 and further comprising the act of preventing users associated with a participant organization from modifying stored organization registration information that pertains to another participant organization.

11. A construction payment management system comprising:
    an application server that stores an organization module, a user interface module, and a database management system on a computer readable memory, the organization module receiving
        organization registration information including payment information and an identification of a primary user for a participant organization, and
        user registration information for one or more users associated with the participant organization; and
    a database server connected to the database management system, the database server storing the organization registration information and the user registration information for use in connection with multiple construction projects, and the database management system accessing the organization registration information and the user registration information,
    the user interface module
        providing the primary user access to a management interface,
        receiving, through the management interface, an electronic selection of additional users associated with the participant organization to be associated with a construction project,
        providing the additional users associated with the construction project access to a general user interface,
        displaying project data and documents associated with the construction project through the general user interface,
        electronically receiving, through the management interface, a legal signature for the documents associated with the construction project, and
        electronically receiving, through the management interface, a selection of an additional, previously registered, participant organization to be associated with the construction project and an indication of a role to be associated with the additional participant organization in the construction project, and
    the application server using the organization registration information to transfer a plurality of payments to a plurality of participant organizations associated with a plurality of construction projects.

12. The construction payment management system of claim 11 wherein the organization registration information includes at least one of business information, tax information, and banking information.

13. The construction payment management system of claim 11 wherein the participant organization and the additional participant organization include at least two of an owner, an owner's representative, a title company, a lender, an architect, an interior designer, an inspector, a general contractor, a subcontractor, a material supplier, a construction manager, an engineer, and a bonding company.

14. The construction payment management system of claim 11 wherein the user registration information includes at least one of personal information, security information, and notification information.

15. The construction payment management system of claim 11 wherein the user interface module receives an identification of one of the additional users as the primary user for the participant organization for the construction project and removes primary user status from an original primary user.

16. The construction payment management system of claim 11 and further comprising a verification service connected to the application server, the verification service verifying a participant organization.

17. The construction payment management system of claim 11 and further comprising a notifications manager module stored in the application server, the notifications manager module transmitting a notification that a participant organization has been registered.

18. The construction payment management system of claim 11 wherein the database server is connected to the application server and the database management system accesses the organization registration information from the database server.

19. The construction payment management system of claim 11 and further comprising a payment system connected to the application server and a draw module stored in the application server, the draw module transmitting an automated payment instruction to the payment system and the payment system including one of an automated clearing house system, a wire transfer system, a debit card system, a credit card system, and a check generating system.

20. The construction payment management system of claim 11 wherein the organization module prevents a participant organization from modifying stored registration information that pertains to another participant organization.

* * * * *